US012022848B2

(12) United States Patent
Ulmasov et al.

(10) Patent No.: US 12,022,848 B2
(45) Date of Patent: Jul. 2, 2024

(54) LOW FIBER PENNYCRESS MEAL, SEEDS, AND METHODS OF MAKING

(71) Applicants: COVERCRESS INC., St. Louis, MO (US); BOARD OF TRUSTEES OF ILLINOIS STATE UNIVERSITY, Normal, IL (US); REGENTS OF THE UNIVERSITY OF MINNESOTA, Minneapolis, MN (US)

(72) Inventors: Tim Ulmasov, St. Louis, MO (US); Gary Hartnell, St. Peters, MO (US); John C. Sedbrook, Bloomington, IL (US); Michael David Marks, Roseville, MN (US); Ratan Chopra, St. Louis, MO (US); Maliheh Esfahanian, Stanford, CA (US)

(73) Assignees: COVERCRESS INC., St. Louis, MO (US); BOARD OF TRUSTEES OF ILLINOIS STATE UNIVERSITY, Normal, IL (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 18/185,195

(22) Filed: Mar. 16, 2023

(65) Prior Publication Data

US 2023/0263190 A1 Aug. 24, 2023

Related U.S. Application Data

(62) Division of application No. 17/643,730, filed on Dec. 10, 2021, now Pat. No. 11,647,765, which is a division of application No. 16/893,636, filed on Jun. 5, 2020, now Pat. No. 11,224,237, which is a division of application No. 16/131,633, filed on Sep. 14, 2018, now Pat. No. 10,709,151.

(60) Provisional application No. 62/559,122, filed on Sep. 15, 2017.

(51) Int. Cl.
*A23K 10/30* (2016.01)
*A23K 20/158* (2016.01)

(52) U.S. Cl.
CPC ............ *A23K 10/30* (2016.05); *A23K 20/158* (2016.05)

(58) Field of Classification Search
None
See application file for complete search history.

(56) References Cited

U.S. PATENT DOCUMENTS

| | | | |
|---|---|---|---|
| 4,933,166 | A | 6/1990 | Shen et al. |
| 7,268,276 | B2 | 9/2007 | Ruezinsky et al. |
| 7,960,612 | B2 | 6/2011 | Zhang et al. |
| 10,266,575 | B2 | 4/2019 | Heard et al. |
| 2004/0045049 | A1 | 3/2004 | Zhang et al. |
| 2006/0150283 | A1 | 7/2006 | Alexandrov et al. |
| 2009/0138981 | A1 | 5/2009 | Repetti et al. |
| 2010/0186117 | A1 | 7/2010 | Fabijanski et al. |
| 2015/0004672 | A1 | 1/2015 | de Crecy, Jr. |
| 2016/0138034 | A1 | 5/2016 | Hancock et al. |

FOREIGN PATENT DOCUMENTS

| | | | |
|---|---|---|---|
| EP | 0312763 | A1 | 4/1989 |
| WO | 2006010096 | A2 | 1/2006 |
| WO | 20090148336 | A1 | 12/2009 |
| WO | 2010002984 | | 1/2010 |
| WO | 2016055838 | A1 | 3/2019 |

OTHER PUBLICATIONS

Alhotan et al, 2017, Poultry Science, 96:2281-2293.*
Badani et al, 2006, Genome, 49:1499-1509.*
Tsogtbaatar et al, 2015, Journal of Experimental Biology, 66:4267-4277.*
Koch et al, 2001, AM. J. Bot. 88:534-544.*
Chopra, et al., "Translational genomics using *Arabidopsis* as a model enables the characterization of pennycress genes through forward and reverse genetics", The Plant Journal, vol. 96, pp. 1093-1105, 2018.
European Patent Office, "Extended European Search Report", issued in connection to Application No. 18855603.9, 9 pages, dated May 19, 2021.
Hojilla-Evangelista et al., "Preparation, composition and functional properties of pennycress (*Thlaspi arvense* L.) seed protein isolates", Industrial Crops and Products, vol. 55, pp. 173-179, 2014.
Piotrowska et al., "Characteristic of yellow-seeded lines of winter oilseed rape", pp. 1-3, XP55801867, Dec. 1, 2003.
Alhotan et al., "Nutritive value and the maximum inclusion level of pennycress meal for broiler chickens", Poultry Science Association, Inc., pp. 2281-2293 Jan. 4, 2017.
Badani et al, Genome, 49: 1499-1509 2006.
Tsogtbaatar et al, Journal of Experimental Biology, 66: 4267-4277 2015.
Alhotan et al., "Nutritive Value and the Maximum Inclusion Level of Pennycress Meal for Broiler Chickens", Poultry Science Association, Inc., pp. 2281-2293, vol. 96 Jan. 4, 2017.
Badani et al., "Colocalization of a Partially Dominant Gene for Yellow Seed Colour with a Major QTL Influencing Acid Detergent Fibre (ADF) Content in Different Crosses of Oilseed Rape (*Brassica napus*)", Genome, 2006, pp. 1499-1509, vol. 49.
Tsogtbaatar et al., "Metabolite Fingerprinting of Pennycress (*Thlaspi arvense* L.) Embryos to Assess Active Pathways During Oil Synthesis", Journal of Experimental Biology, 2015, pp. 4267-4277, vol. 66, No. 14.
An, et al. "Phylogeography of *thlaspi arvense* (*Brassicacea*) in China Inferred from Chloroplast and Nuclear DNA Sequences and Ecological Niche Modeling", Int. J. Mol. Sci. 2015, vol. 16, 13339-13355. https://doi.org/10.3390/jms160613339.
AOAC Official Method 973.18 Fiber (Acid Detergent) and Lignin (H2SO4) in Animal Feed, AOAC International, 2000, downloaded from http://www.cankaowuzhi.com/document/guowai/AOAC973_18.pdf Mar. 21, 2020.

(Continued)

*Primary Examiner* — Jason Deveau Rosen
(74) *Attorney, Agent, or Firm* — McKee, Voorhees & Sease, PLC

(57) ABSTRACT

Pennycress seed, seed lots, and seed meal having reduced fiber content and improved suitability for use in producing animal feed are provided.

21 Claims, 6 Drawing Sheets

Specification includes a Sequence Listing.

(56) References Cited

OTHER PUBLICATIONS

Herbicide safener definition downloaded from the National Agricultural Library of the US Department of Agriculture website https://agclass.nal.usda.gov/glossary.shtml on Mar. 25, 2020.
Selling et al., "Extraction of Proteins from Pennycress Seeds and Press Cake", Industrial Crops and Products, Apr. 2012, pp. 113-119, vol. 41 2017.
Evangelista et al., "Extraction of Pennycress (*Thiaspi arvense* L.) Seed Oil by Full Pressing", Industrial Crops and Products, Dec. 2011, pp. 76-81, vol. 37.
International Search Report and Written Opinion for PCT/US2018/051163 dated Jan. 4, 2019.
Appelhagen et al., "Transparent Testa1 Interacts with R2R3-MYB Factors and Affects Early and Late Steps of Flavonoid Biosythesis in the Endothelium of *Arabidopsis thaliana* Seeds", The Plant Journal, 2011, pp. 406-419, vol. 67.
Appelhagen et al., "Update on Transparent Testa Mutants from *Arabidopsis thaliana:* Characterisation of New Alleles from an Isogenic Collection", Planta, 2014, pp. 955-970, vol. 240.
Baudry et al., "TT2, TT8, and TTG1 Synergistically Specify the Expression of BANYULS and Proanthocyanidin Biosynthesis in *Arabidopsis thaliana*", the Plant Journal, 2004, pp. 366-380, vol. 39.
Chen et al., "The Effect of Transparent Testa2 on Seed Fatty Acid Biosynthesis and Tolerance to Environmental Stresses during Young Seedling Establishment in *Arabidopsis*", Oct. 2012, pp. 1023-1036, vol. 160.
Chen et al., "Transparent Testa8 Inhibits Seed Fatty Acid Accumulation by Targeting Several Seed Development Regulators in *Arabidopsis*", Plant Physiology, Jun. 2014, pp. 905-916, vol. 165.
Debeaujon et al., "The Transparent Testa12 Gene of *Arabidopsis* Encodes a Multidrug Secondary Transporeter-like Protein Required for Flavonoid Sequestration in Vacuoles of the Seed Coat Endothelium", The Plant Cell, Apr. 2001, pp. 853-871, vol. 13.
Dehaan et al., "A Pipeline Strategy for Grain Crop Domestication", Crop Science, 2016, pp. 917-930, vol. 56.
Dorn et al., "A Draft Genome of Field Pennycress (*Thlaspi arvense*) Provides Tools for the Domestication of a New Winter Biofuel Crop", DNA Research, 2015, pp. 121-131, vol. 22, No. 2.
Jordan et al., "Sustainable Commercialization of New Crops for the Agricultural Bioeconomy", Elementa: Science of the Anthropocene, Jan. 8, 2016, vol. 4, No. 81.
Kantar et al., "Perennial Grain and Oilseed Crops", Plant Biology, 2016, pp. 703-729, vol. 67.
Li et al., "A Large Insertion in bHLH Transcription Factor BrTT8 Resulting in Yellow Seed Coat in *Brassica rapa*", PLOS One, 2012, vol. 7, No. 9.
Lian et al., "Silencing of BnTT1 Family Genes Affects Seed Flavonoid Biosynthesis and Alters Seed Fatty Acid Composition in *Brassica napus*", Plant Science, 2017, pp. 32-47, vol. 254.
National Institute of Food and Agriculture, "Advancing Field Pennycress as a New Oilseed Biodiesel Feedstock that Does Not Require New Land Commitments Annual Report", Accession No. 1004021, Retrieved from https://portal.nifa.usda.gov/web/crisprojectpages/1004021 on Nov. 26, 2018, 10 pages.
Nesi et al., "The *Arabidopsis* TT2 Gene Encodes an R2R3 MYB Domain Protein That Acts as a Key Determinant for Proanthocyanidin Accumulation in Developing Seeds", The Plant Cell, Sep. 2001, pp. 2099-2114, vol. 13.
Nesi et al., "The Transparent Testa16 Locus Encodes the *Arabidopsis* Bsister Mads Domain Protein and is Required for Proper Development and Pigmentation of the Seed Coat", The Plant Cell, Oct. 2002, pp. 2463-2479, vol. 14.
Nesi et al., "The TT8 Gene Encodes a Basic Helix-Loop-Helix Domain Protein Required for Expression of DFR and BAN Genes in *Arabidopsis* Siliques", The Plant Cell, Oct. 2000, pp. 1863-1878, vol. 12.
Pourcel et al., "Transparent Testa10 Encodes a Laccase-Like Enzyme Involved in Oxidativ Polymerization of Flavonoids in *Arabidopsis* Seed Coat", The Plant Cell, Nov. 2005, pp. 2966-2980, vol. 17.
Sagasser et al., "*A. thaliana* Transparent Testa 1 is Involved in Seed Coat Development and Defines the WIP Subfamily of Plant Zinc Finger Proteins", Genes and Development, Jan. 1, 2002, pp. 138-149, vol. 16, No. 1.
Sedbrook et al., "New Approaches to Facilitate Rapid Domestication of a Wild Plant to an Oilseed Crop: Example Pennycress (*Thlaspi arvense* L.)", Plant Science, 2014, pp. 122-132, vol. 227.
Slominski et al., "Nutritive Value for Broilers of Meals Derived from Newly Developed Varieties of Yellow-Seeded Canola", Animal Feed Science and Technology, 1999, pp. 249-262, vol. 78.
United States Department of Agriculture, "Advancing Field Pennycress as a New Oilseed Biodiesel Feedstock that does not Require New Land Commitments Annual Progress Report", Accession No. 1004021, Date Submitted to NIFA Dec. 6, 2016, 9 pages.
United States Department of Agriculture, "Advancing Field Pennycress as a New Oilseed Biodiesel Feedstock that does not Require New Land Commitments Annual Progress Report", Accession No. 1004021, Date Submitted to NIFA Jan. 9, 2018, 7 pages.
United States Department of Agriculture, "Advancing Field Pennycress as a New Oilseed Biodiesel Feedstock that does not Require New Land Commitments Annual Progress Report", Accession No. 1004021, Date Submitted to NIFA, Nov. 30, 2015, 7 pages.
Zhang et al., "Map-Based Cloning and Characterization of a Gene Controlling Hairiness and Seed Coat Color Traits in *Brassica rapa*", Plant Molecular Biology, 2009, pp. 553-563, vol. 69.
Li et al., "Transformation with TT8 and HB12 RNAi Constructs in Model Forage (*Medicago sativa,* Alfalfa) Affects Carbohydrate Structure and Metabolic Characteristics in Ruminant Livestock Systems", Journal of Agricultural and Food Chemistry, 2015, pp. 9590-9600, vol. 63.
Vaughn et al., Biofumigant Compounds Released by Field Pennycress (*Thlaspi arvense*) Seedmeal, Journal of Chemical Ecology, 2005, pp. 167-177, vol. 31, No. 1.

* cited by examiner

A.
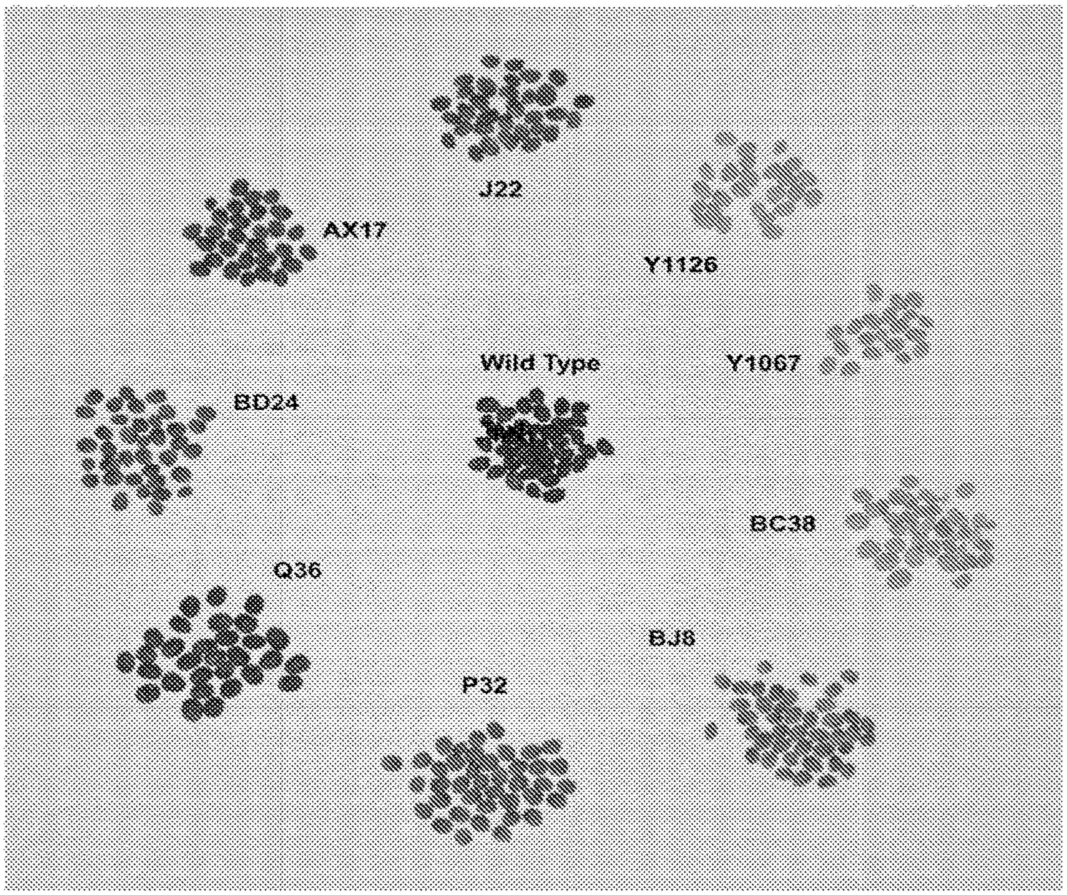
B.
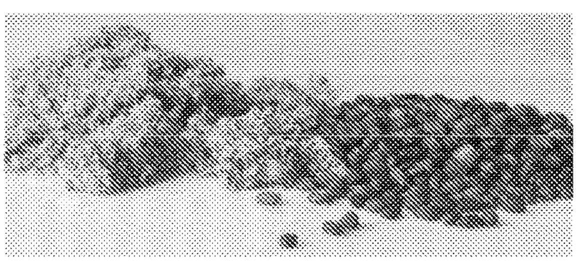
C.
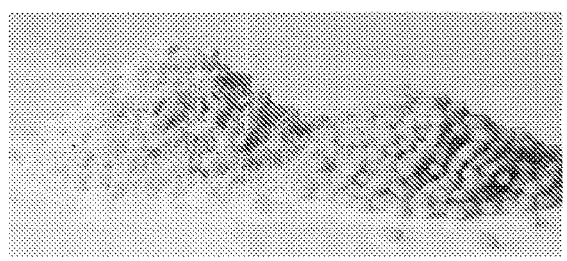
FIGURE 1A, B, C

A.
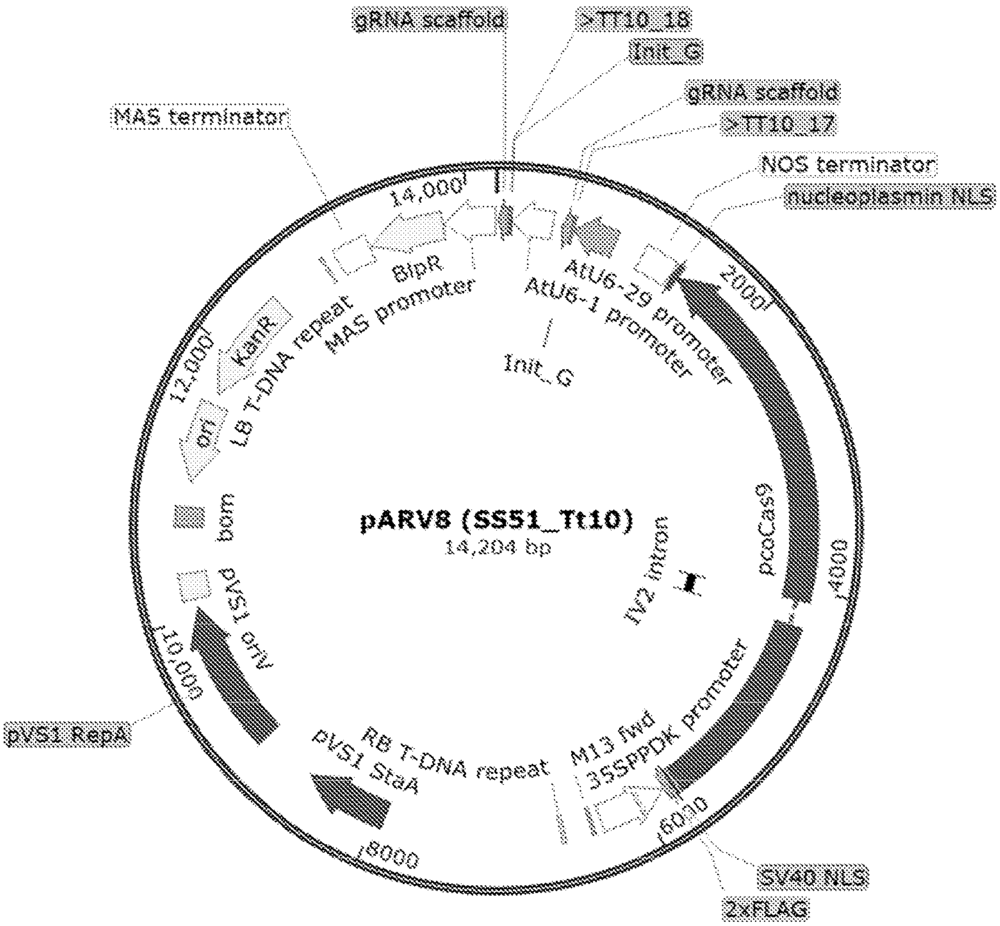
B.
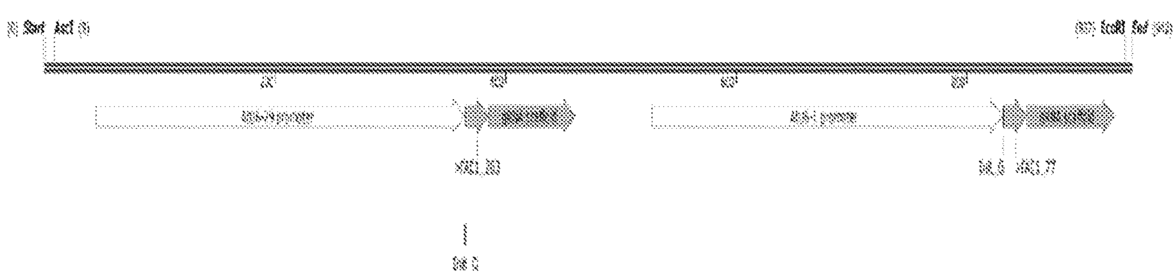
FIGURE 2A, B

FIGURE 5A, B, C, D, E, F, G

LOW FIBER PENNYCRESS MEAL, SEEDS, AND METHODS OF MAKING

CROSS-REFERENCE TO RELATED APPLICATIONS

This is a divisional patent application which claims priority under 35 U.S.C. § 120 to U.S. Ser. No. 17/643,730, now U.S. Pat. No. 11,647,765 filed Dec. 10, 2021, which is a divisional patent application of U.S. Ser. No. 16/893,636, now U.S. Pat. No. 11,224,237 filed Jun. 5, 2020, which is a divisional patent application of U.S. Ser. No. 16/131,633, now U.S. Pat. No. 10,709,151 filed Sep. 14, 2018, which claims the benefit of U.S. Provisional Patent Application Serial No. 62/559,122, filed Sep. 15, 2017, all of which are incorporated herein by reference in their entireties.

STATEMENT REGARDING FEDERAL FUNDING

This invention was made with government support under Grant Number 2014-67009-22305 and 2018-67009-27374 awarded by the National Institute of Food and Agriculture, USDA. The government has certain rights in the invention.

REFERENCE TO SEQUENCE LISTING SUBMITTED ELECTRONICALLY

The instant application contains a Sequence Listing which has been submitted electronically in XML format and is herein incorporated by reference in its entirety. Said XML copy, created on Mar. 13, 2023, is named "P13415US05_SequenceListing.xml" and is 409,212 bytes in size.

BACKGROUND

Different plants have seed contents that make them desirable for feed compositions. Examples are soybean, canola, rapeseed and sunflower. After crushing the seeds and recovering the oil, the resulting meal has a protein content making the meal useful as a feed ingredient for ruminants, monogastrics, poultry, and aquaculture. Nevertheless, there remains a desire for improved plant seeds that can provide additional sources of nutrition to animals.

Field Pennycress *Thlaspi arvense* L. (common names: fanweed, stinkweed, field pennycress), hereafter referred to as Pennycress or pennycress, is a winter cover crop that helps to protect soil from erosion, prevent the loss of farm-field nitrogen into water systems, and retain nutrients and residues to improve soil productivity. While it is well established that cover crops provide agronomic and ecological benefits to agriculture and environment, only 5% of farmers today are using them. One reason is economics—it requires on average ~$30-40/acre to grow a cover crop on the land that is otherwise idle between two seasons of cash crops such as corn and soy. In the last 5 years, it has been recognized that pennycress could be used as a novel cover crop, because in addition to providing cover crop benefits, it is an oilseed with its oil being useful as a biofuel. Extensive testing indicates that it can be interseeded over standing corn in early fall and harvested in spring prior to soybean planting (in appropriate climates). As such, its growth and development requires minimal incremental inputs (e.g., no/minimum tillage, no/low nitrogen, insecticides or herbicides). Pennycress also does not directly compete with existing crops when intercropped for energy production, and the recovered oil and meal can provide an additional source of income for farmers.

Pennycress is a winter annual belonging to the Brassicaceae (mustard) family. It's related to cultivated crops, rapeseed and canola, which are also members of the Brassicaceae family. Pennycress seeds are smaller than canola, but they are also high in oil content. They typically contain 36% oil, which is roughly twice the level found in soybean, and the oil has a very low saturated fat content (~4%). Pennycress represents a clear opportunity for sustainable optimization of agricultural systems. For example, in the US Midwest, ~35M acres that remain idle could be planted with pennycress after a corn crop is harvested and before the next soybean crop is planted. Pennycress can serve as an important winter cover crop working within the no/low-till corn and soybean rotation to guard against soil erosion and improve overall field soil nitrogen and pest management.

Pennycress has an oil content that makes it highly desirable as a biofuel, and potentially as a food oil. Once the oil is obtained from pennycress, either from mechanical expeller pressing or hexane extraction, the resulting meal has a high protein level with a favorable amino acid profile that could provide nutritional benefits to animals. However, studies of pennycress processing have consistently demonstrated that the meal produced has a high level of non-digestible fiber, and as a result, not enough metabolizable energy to be competitive with high-value products like soybean and canola meals as an animal feed.

SUMMARY

Compositions comprising non-defatted pennycress seed meal comprising an acid detergent fiber (ADF) content of 5% to 20% by dry weight are provided herein.

Compositions comprising defatted pennycress seed meal comprising an acid detergent fiber (ADF) content of 7% to 25% by dry weight are provided herein.

Pennycress seed meals comprising an acid detergent fiber (ADF) content of 5% to 20% by dry weight, wherein the seed meal is non-defatted, are provided herein.

Pennycress seed meals comprising an acid detergent fiber (ADF) content of 7% to 25% by dry weight, wherein the seed meal is defatted, are provided herein.

Pennycress seed cakes comprising an acid detergent fiber (ADF) content of 7% to 25% by dry weight are provided herein.

In one embodiment, this disclosure provides a low fiber pennycress meal composition.

Seed lots comprising a population of pennycress seeds that comprise an acid detergent fiber (ADF) content of 5% to 20% by dry weight are provided herein.

Methods of making non-defatted pennycress seed meal comprising an acid detergent fiber (ADF) content of 5% to 20% by dry weight, comprising the step of grinding, macerating, extruding, and/or crushing the aforementioned seed lots, thereby obtaining the non-defatted seed meal, are provided herein.

Methods of making defatted pennycress seed meal comprising an acid detergent fiber (ADF) content of 7% to 25% by dry weight, comprising the step of solvent extracting the, separating the extracted seed meal from the solvent, thereby obtaining the defatted seed meal, are provided herein.

Methods of making pennycress seed cake comprising an acid detergent fiber (ADF) content of 7% to 25% by dry weight, comprising the step of crushing or expelling the seed of any of the aforementioned seed lots, thereby obtaining a seed cake, are provided herein.

Methods of making a pennycress seed lot comprising the steps of: (a) introducing at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof; (b) selecting germplasm that is homozygous for said loss-of-function mutation; and, (c) harvesting seed from the homozygous germplasm, thereby obtaining a seed lot, wherein said seed lot comprises an acid detergent fiber (ADF) content of 5% to 20% by dry weight, are provided herein.

Method of making a pennycress seed lot comprising the steps of: (a) introducing at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof into a pennycress plant genome; (b) selecting a transgenic plant line that comprises said transgene and (c) harvesting seed from the transgenic plant line, thereby obtaining a seed lot, wherein said seed lot comprises an acid detergent fiber (ADF) content of 5% to 20% by dry weight, are provided herein.

In one embodiment, this disclosure provides a method for producing low fiber pennycress seeds and meal. The method comprises genetically modifying pennycress seed (e.g., using gene editing or transgenic approach) to modify expression of one or more genes involved in seed coat development. Genetically altered seed lots with improved composition, such as lower fiber content, increased oil content, and increased protein content, all in comparison to control seed lots that lack the genetic alteration can be obtained by these methods.

BRIEF DESCRIPTION OF THE DRAWINGS

The accompanying drawings, which are incorporated in and form a part of the specification, illustrate the embodiments of the present disclosure and together with the description, serve to explain the principles of the disclosure. In the drawings:

FIG. 1A, B, C illustrate mutant pennycress seeds with varying seed color. Dark seeds in the center are representative of a wild-type genetic background. The seeds of two pennycress seed isolates (Y1126 and Y1067), along with 7 pennycress M3-generation EMS mutants in the Spring 32 background are shown. All mutant seeds exhibit light-colored seed coats compared to the dark color of typical wild-type pennycress seeds (wild-type Spring 32 seeds shown as an example). Examples of dark and light-colored seed and meal (non-defatted) are also shown. Panel A: Spectrum of seed coat color ranging from dark to light in wild type and mutant pennycress seeds. Panel B: Pennycress meal produced from wild type (Beecher). Panel C: Pennycress meal produced from one of the light-colored seed lines (Y1126).

FIG. 2A, B illustrates pARV8 (SS51_Tt10), *Agrobacterium* CRISPR-Cas9 vector and its gene editing sgRNA cassette, for targeting pennycress homolog of Transparent testa 10 (Tt10) gene. Panel A: Plasmid map of pARV8 (SS51 Tt10). Panel B: sgRNA cluster in pARV8, targeting nucleotides 341-360 and 382-401 of SEQ ID NO: 33.

FIG. 5A illustrates a gRNA cassette stuffer, designed for insertion into the AarI-digested plant genome editing vector (such as pARV187 or pARV191) for targeting pennycress Tt1 gene, nucleotides 59-81 and 307-329 of SEQ ID NO: 27.

DETAILED DESCRIPTION

Figure 3:
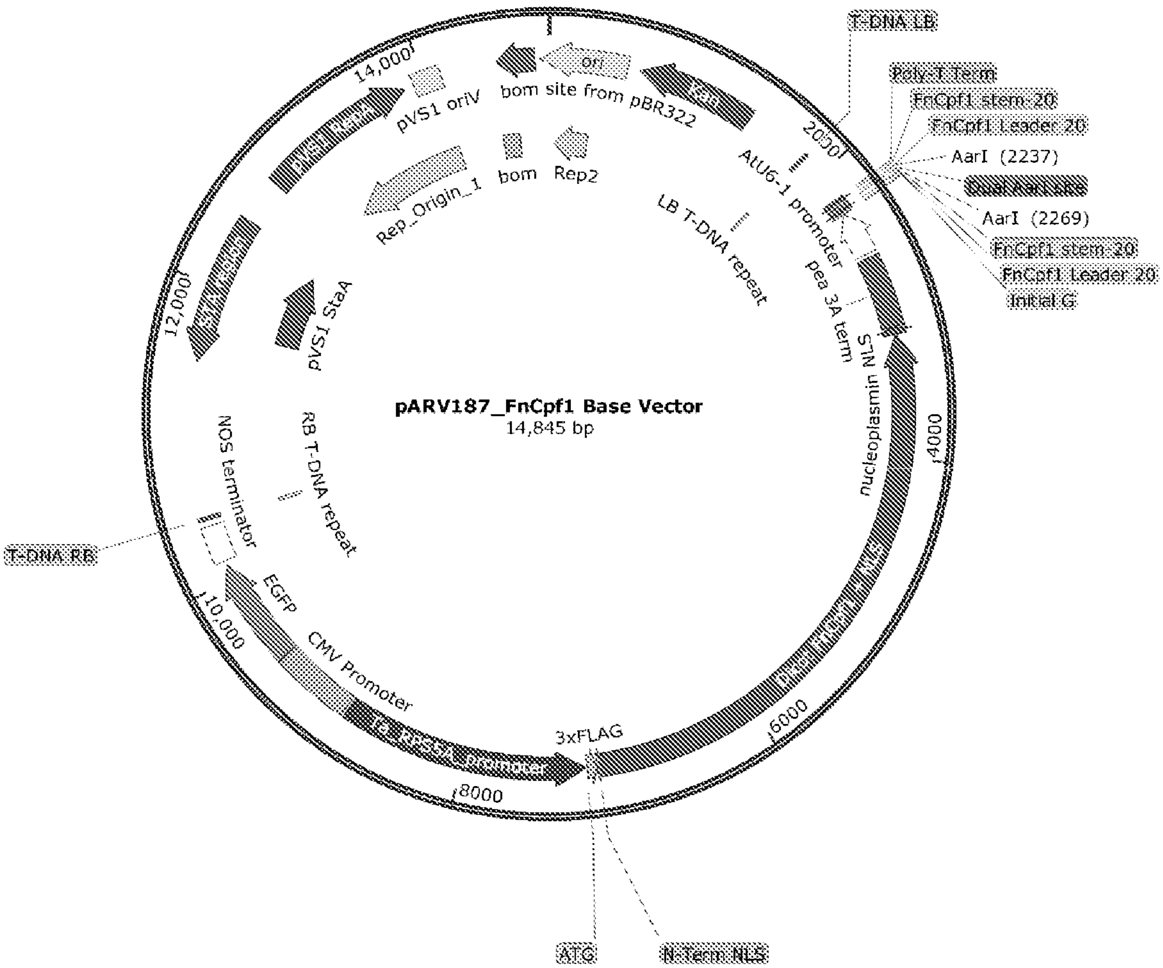
FIG. 3 illustrates pARV187, *Agrobacterium* CRISPR-FnCpf1 base vector for editing plant genome. gRNA cassette stuffers are inserted at the dual AarI site, replacing a small fragment of the vector with synthetic gRNA cassette.

The term "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the terms "include," "includes," and "including" are to be construed as at least having the features to which they refer while not excluding any additional unspecified features.

Where a term is provided in the singular, other embodiments described by the plural of that term are also provided.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Pennycress has value in both its oil and the resulting meal following the removal of oil. The meal is used for animal feed and is typically valued for its energy, protein and sometimes fiber. Fiber is usually delivered by forage elements (not protein supplements) and only a modest amount is desired. Fiber is measured by multiple measures including Crude Fiber (CF), Acid detergent Fiber (ADF) and Neutral detergent fiber (NDF). ADF is a useful determinant in estimating the energy available to animals. In certain embodiments, ADF can be measured gravimetrically using Association of Official Analytical Chemists (AOAC) Official Method 973.18 (1996): "Fiber (Acid Detergent) and Lignin in Animal Feed". In certain embodiments, modifications of this method can include use of Sea Sand for filter aid as needed. NDF can be determined as disclosed in JAOAC 56, 1352-1356, 1973. In certain embodiments, fiber (ADF and/or NDF), protein, and/or oil content can be determined by Near-infrared (NIR) spectroscopy.

Defatted-pennycress seed meal having less fiber than defatted control pennycress seed meal obtained from wild type pennycress seed is provided herein. In certain embodiments, the ADF content of defatted pennycress seed meal and compositions comprising the same that are provided herein is reduced from about 1.25-, 1.5-, 2-, or 3-fold to about 4-, 5-, 6-, or 7-fold in comparison to control defatted pennycress seed meal and compositions comprising the same obtained from control wild-type pennycress seeds. Typically, the level of acid detergent fiber (ADF) in wild-type pennycress seed varies from about 25 to about 31% by dry weight. Defatted-pennycress meal is a product obtained from high-pressure crushing of seed, via mechanical pressing and/or expanding/extrusion, followed by a solvent extraction process, which removes oil from the whole seed. Solvents used in such extractions include, but are not limited to, hexane or mixed hexanes. The meal is the material that remains after most of the oil has been removed. During a typical oilseed processing procedure, extraction of the oil leads to concentration of fiber as a result of oil mass removal. The typical range of ADF in meal made from wild-type pennycress seed is 35-45%. To be useful as a high protein animal feed, and competitive with other protein feedstuffs, the level of ADF level in meal should be less than 20% by dry weight, less than 15% by dry weight, or less than 10% by dry weight of the meal. In certain embodiments, defatted pennycress seed meal having an ADF content of less than 25% by dry weight, less than 20% by dry weight, less than 15% by dry weight, less than 10% by dry weight, or less than 7% by dry weight of meal is provided herein. In certain embodiments, defatted pennycress seed meal having an ADF content of about 5%, 8%, or 10% to 15%, 18%, 20%, or 25% by dry weight is provided herein. Compositions comprising such defatted pennycress seed meal are also provided herein.

Non-defatted pennycress seed meal having less fiber than non-defatted control pennycress seed meal obtained from wild type pennycress seed is provided herein. In certain embodiments, the ADF content of non-defatted pennycress seed meal and compositions comprising the same that are provided herein is reduced from about 1.25-, 1.5-, 2-, or 3-fold to about 4-, 5-, 6-, or 7-fold in comparison to control non-defatted pennycress seed meal and compositions comprising the same obtained from control wild-type pennycress seeds. In certain embodiments, the non-defatted pennycress seed meal is obtained from pennycress seeds that have been crushed, ground, macerated, expelled, extruded, expanded, or any combination thereof. Typically, the level of acid detergent fiber (ADF) in wild-type pennycress seed and non-defatted seed meal obtained therefrom varies from about 20% to about 38% by dry weight. To be useful as a high protein animal feed, and competitive with other protein feedstuffs, the level of ADF level in non-defatted meal should be less than 20% by dry weight, less than 15% by dry weight, or less than 10% by dry weight of the meal. In certain embodiments, non-defatted pennycress seed meal having an ADF content of less than 20% by dry weight, less than 15% by dry weight, less than 10% by dry weight, or less than 7% by dry weight of the meal is provided herein. In certain embodiments, non-defatted pennycress seed meal having an ADF content of about 5%, 8%, or 10% to 15%, 18%, or 20% by dry weight is provided herein. Compositions comprising such non-defatted pennycress seed meal are also provided herein.

In certain embodiments, pennycress seed lots comprising a population of seed having reduced fiber content, reduced fiber content and increased protein content, reduced fiber content and increased oil content, or reduced fiber content and increased protein and oil content, all in comparison to fiber, protein, and oil content of the control seed lots of wild-type pennycress seed, are provided. In certain embodiments, the seed lots will comprise loss-of-function (LOF) mutations in one or more genes, coding sequences, and/or proteins that result in reduced fiber content, reduced fiber content and increased protein content, reduced fiber content and increased oil content, or reduced fiber content, increased protein, and increased oil content. Such LOF mutations include, but are not limited to, INDELS (insertions, deletions, and/or substitutions or any combination thereof), translocations, inversions, duplications, or any combination thereof in a promoter, a 5' untranslated region, coding region, an intron of a gene, and/or a 3' UTR of a gene. Such Indels can introduce one or more mutations including, but not limited to, frameshift mutations, missense mutations, pre-mature translation termination codons, splice donor and/or acceptor mutations, regulatory mutations, and the like that result in an LOF mutation. In certain embodiments, the LOF mutation will result in: (a) a reduction in the enzymatic or other biochemical activity associated with the encoded polypeptide in the plant comprising the LOF mutation in comparison to a wild-type control plant; or (b) both a reduction in the enzymatic or other biochemical activity and a reduction in the amount of a transcript (e.g., mRNA) in the plant comprising the LOF mutation in comparison to a wild-type control plant. Such reductions in activity or activity and transcript levels can, in certain embodiments, comprise a reduction of at least 50%, 60%, 70%, 75%, 80%, 85%, 90%, 95%, 98%, 99%, or 100% of activity or activity and transcript levels in the LOF mutant in comparison to the activity or transcript levels in a wild-type control plant. In certain embodiments, reductions in activity, specific activity, and/or transcript levels are provided by at least one LOF mutation in an endogenous wild-type pennycress gene, promoter, terminator, or protein set forth in Table 1. In certain embodiments, such aforementioned reductions in activity, specific activity and/or transcript levels are provided by at least one LOF mutation in an endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, allelic variants thereof, or any combination thereof. In certain embodiments, such aforementioned reductions in activity, specific activity, and/or transcript levels are provided by at least one LOF mutation in an endogenous wild-type pennycress gene, promoter, or terminator comprising a polynucleotide sequence selected from the group consisting of SEQ ID NO: 69, 71, 75, 77, 87, 88, allelic variants thereof, or any combination thereof. In certain embodiments, any of the aforementioned allelic variants of endogenous wild-type pennycress genes can have at least 80, at least 85, at least 90, at least 95, at least 98, or at least 99 percent sequence identity to SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, or 173. In certain embodiments, such aforementioned reductions in activity, specific activity, and/or transcript levels are provided by at least one LOF mutation in an endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, allelic variants thereof, or any combination thereof. In certain embodiments, such aforementioned reductions in activity or activity and transcript levels are provided by at least one LOF mutation in an endogenous wild-type pennycress gene encoding a polypeptide selected from the group consisting of SEQ ID NO: 70, 76, allelic variants thereof, or any combination thereof. In certain embodiments, an endogenous wild-type pennycress gene can encode a polypeptide allelic variant having at least 80, at least 85, at least 90, at least 95, at least 98, or at least 99 percent sequence identity to SEQ ID NO:2, 7, 10, 13, 16, 19, 22, 25, 28, 31, 34, 37, 40, 43, 46, 49, 52, 55, 58, 61, 64, 67, 70, 73, 76, 79, or 172. In certain embodiments, an endogenous wild-type pennycress gene can encode a polypeptide allelic variant having one or more (e.g., 2, 3, 4, 5, 6, 7, 8, 9, or 10) amino acid modifications (e.g., substitutions) relative to SEQ ID NO:2, 7, 10, 13, 16, 19, 22, 25, 28, 31, 34, 37, 40, 43, 46, 49, 52, 55, 58, 61, 64, 67, 70, 73, 76, 79, or 172. In certain embodiments, the seed lots will comprise one or more transgenes that suppress expression of one or more genes, coding sequences, and/or proteins, thus resulting in reduced fiber content, reduced fiber content and increased protein content, reduced fiber content and increased oil content, or reduced fiber content, increased protein content, and increased oil content, all in comparison to control or wild-type pennycress seed lots. Transgenes that can provide for such suppression include, but are not limited to, transgenes that produce artificial miRNAs targeting a given gene or gene transcript for suppression. In certain embodiments, the transgenes that suppress expression will result in: (a) a reduction in the enzymatic or other biochemical activity associated with the encoded polypeptide in the plant comprising the transgene in comparison to a wild-type control plant; or (b) both a reduction in the enzymatic or other biochemical activity and a reduction in the amount of a transcript (e.g., mRNA) in the plant comprising the transgene in comparison to a wild-type control plant. Such reductions in activity and transcript levels can in certain embodiments comprise a reduction of at least 50%, 60%, 70%, 75%, 80%, 85%, 90%, 95%, 98%, 99%, or 100% of activity and/or transcript levels in the transgenic plant in comparison to the activity or transcript levels in a wild-type control plant. In certain embodiments, certain genes, coding sequences, and/or proteins that can be targeted for introduction of LOF mutations or that are targeted for transgene-mediated suppression are provided in the following Table 1 and accompanying Sequence Listing. In certain embodiments, allelic variants of the wild-type genes, coding sequences, and/or proteins provided in Table 1 and the sequence listing are targeted for introduction of LOF mutations or are targeted for transgene-mediated suppression. Allelic variants found in distinct pennycress isolates or varieties that exhibit wild-type seed fiber, protein, and or oil content can be targeted for introduction of LOF mutations or are targeted for transgene-mediated suppression to obtain seed lots having reduced fiber content, reduced fiber content and increased protein content, reduced fiber content and increased oil content, or reduced fiber content, increased protein, and increased oil content, all in comparison to fiber, protein, and oil content of the control seed lots of wild-type pennycress. Such allelic variants can comprise polynucleotide sequences that have at least 80%, 85%, 90%, 95%, 96%, 97%, 98%, or 99% sequence identity across the entire length of the polynucleotide sequences of the wild-type coding regions or wild-type genes of Table 1 and the sequence listing. Such allelic variants can comprise polypeptide sequences that have at least 80%, 85%, 90%, 95%, 96%, 97%, 98%, or 99% sequence identity across the entire length of the polypeptide sequences of the wild-type proteins of Table 1 and the sequence listing. Pennycress seed lots having reduced seed coat fiber, lighter-colored seed coat due to reduced proanthocyanidins content, increased protein content, and/or higher seed oil content as described herein can comprise one or more LOF mutations in one or more genes that encode polypeptides involved in seed coat and embryo formation or can comprise transgenes that suppress expression of those genes. Polypeptides affecting these traits include, without limitation, TRANSPARENT TESTA1 (TT1) through TRANSPARENT TESTA19 (TT19) (e.g., TT1, TT2, TT3, TT4, TT5, TT6, TT7, TT8, TT9, TT10, TT12, TT13, TT15, TT16, TT18, and TT19), TRANSPARENT TESTA GLABRA1 and 2 (TTG1 and TTG2), GLABROUS 2 (GL2), GLABROUS 3 (GL3), ANR-BAN, and AUTOINHIBITED H+-ATPASE 10 (AHA10) disclosed in Table 1. In certain embodiments, pennycress seed lots provided herein can comprise LOF mutations in any of the aforementioned wild-type pennycress genes disclosed in Table 1 or any combination of mutations disclosed in Table 1. Compositions comprising defatted or non-defatted seed meal obtained from any of the aforementioned seed lots, defatted or non-defatted seed meal obtained from any of the aforementioned seed lots, and seed cakes obtained from any of the aforementioned seed lots are also provided herein. Methods of making any of the aforementioned seed lots, compositions, seed meals, or seed cakes are also provided herein. As used herein, the phrase "seed cake" refers to the material obtained after the seeds are crushed, ground, heated, and expeller pressed or extruded/expanded prior to solvent extraction.

In certain embodiments, reductions or increases in various features of seed lots, seed meal compositions, seed meal, or seed cake are in comparison to a control or wild-type seed lots, seed meal compositions, seed meal, or seed cake. Such controls include, but are not limited to, seed lots, seed meal compositions, seed meal, or seed cake obtained from control plants that lack the LOF mutations or transgene-mediated gene suppression. In certain embodiments, control plants that lack the LOF mutations or transgene-mediated gene suppression will be otherwise isogenic to the plants that contain the LOF mutations or transgene-mediated gene suppression.

In certain embodiments, the controls will comprise seed lots, seed meal compositions, seed meal, or seed cake obtained from plants that lack the LOF mutations or transgene-mediated gene suppression and that were grown in parallel with the plants having the LOF mutations or transgene-mediated gene suppression. Such features that can be compared to wild-type or control plants include, but are not limited to, ADF content, NDF fiber content, protein content, oil content, protein activity and/or transcript levels, and the like.

TABLE 1

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 1 | TT2 CDS | WT Coding region | R2R3 MYB domain transcription factor, a key determinant in proanthocyanidin accumulation | MYB123, TRANSPARENT TESTA 2 (TT2) |
| 2 | TT2 ORF | WT Protein | | |
| 3 | TT2 Ta locus | WT Gene | | |
| 4 | TT2 CDS-Mut | Mutant Coding region | Modified TT2 gene isolated from an EMS-mutagenized population, GAACCATTG**G**AACTCAAAC (nt 321-339 of SEQ ID NO: 1)→ GAACCATTG**A**AACTCAAAC (nt 321-339 of SEQ ID NO: 4) | tt2-1, tt2-2, BC38, E5-547 |
| 5 | TT2 Mut P1 | Mutant Protein | Truncated protein, due to Trp (W) codon -> Stop mutation | |
| 6 | ATS-KAN4 CDS | WT Coding region | Member of the KANADI family of transcription factors, involved in integument formation during ovule development and expressed at the boundary between the inner and outer integuments. Essential for directing laminar growth of the inner integument | ABERRANT TESTA SHAPE, ATS, KAN4, KANADI 4 |
| 7 | ATS-KAN4 ORF | WT Protein | | |
| 8 | ATS-KAN4 Ta locus | WT Gene | | |
| 9 | BAN-ANR CDS | WT Coding region | Negative regulator of flavonoid biosynthesis, putative oxidoreductase. Mutants accumulate flavonoid pigments in seed coat. Putative ternary complex composed of TT2, TT8 and TTG1 is believed to be required for correct expression of BAN in seed endothelium | BAN, BANYULS, NAD(P)-binding Rossmann-fold superfamily protein |
| 10 | BAN-ANR ORF | WT Protein | | |
| 11 | BAN-ANR Ta locus | WT Gene | | |
| 12 | DTX35 CDS | WT Coding region | Encodes a multidrug and toxin efflux family transporter. Involved in flavonoid metabolism, affecting root growth, seed development and germination, pollen development, release and viability | Detoxifying Efflux Carrier 35, FFT, FLOWER FLAVONOID TRANSPORTER |
| 13 | DTX35 ORF | WT Protein | | |
| 14 | DTX35 Ta locus | WT Gene | | |
| 15 | GL2 CDS | WT Coding region | Glabra 2, a homeodomain protein affects epidermal cell identity including trichomes, root hairs, and seed coat. Abundantly expressed during early seed development and in atrichoblasts. Directly regulated by WER | Glabra 2, HD-ZIP IV homeobox-leucine zipper protein with lipid-binding START domain |
| 16 | GL2 ORF | WT Protein | | |
| 17 | GL2 Ta locus | WT Gene | | |
| 18 | MUM4_like1 CDS | WT Coding region | Encodes a putative NDP-L-rhamnose synthase, an enzyme required for the synthesis of the pectin rhamnogalacturonan I, major component of plant mucilage. Involved in seed coat mucilage cell development. Required for complete mucilage synthesis, cytoplasmic rearrangement and seed coat development | MUCILAGE-MODIFIED 4, RHAMNOSE BIOSYNTHESIS 2, RHM2, ATRHM2 |
| 19 | MUM4_like1 ORF | WT Protein | | |
| 20 | MUM4_like1 Ta locus | WT Gene | | |
| 21 | MUM4_like2 CDS | WT Coding region | | |
| 22 | MUM4_like2 ORF | WT Protein | | |
| 23 | MUM4_like2 Ta locus | WT Gene | | |
| 24 | MYB61 CDS | WT Coding region | Putative transcription factor. Mutants are deficient in mucilage extrusion from the seeds during imbibition, | MYB DOMAIN PROTEIN 61, ATMYB61 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 25 | MYB61 ORF | WT Protein | resulting in reduced deposition of mucilage during development of the seed coat epidermis in myb61 mutants | |
| 26 | MYB61 Ta locus | WT Gene | | |
| 27 | TT1_like1 CDS | WT Coding region | Encodes a zinc finger protein; involved in photomorphogenesis, flavonoid biosynthesis, flower and seed development | WIP DOMAIN PROTEIN 1, WIP1 |
| 28 | TT1_like1 ORF | WT Protein | | |
| 29 | TT1_like1 Ta locus | WT Gene | | |
| 30 | TT1_like2 CDS | WT Coding region | | |
| 31 | TT1_like2 ORF | WT Protein | | |
| 32 | TT1_like2 Ta locus | WT Gene | | |
| 33 | TT10 CDS | WT Coding region | Protein similar to laccase-like polyphenol oxidases, with conserved copper binding domains. Involved in lignin and flavonoids biosynthesis. Expressed in developing testa, colocalizing with flavonoid end products proanthocyanidins and flavonols. Mutants exhibit delay in developmentally determined browning of the testa, characterized by the pale brown color of seed coat | ATLAC15, ATTT10, LAC15 (LACCASE-LIKE 15), TRANSPARENT TESTA 10 (TT10) |
| 34 | TT10 ORF | WT Protein | | |
| 35 | TT10 Ta locus | WT Gene | | |
| 36 | TT12 CDS | WT Coding region | Proton antiporter, involved in the transportation of proanthocyanidin precursors into the vacuole. Loss-of-function mutation has strong reduction of proanthocyanidin deposition in vacuoles and reduced dormancy. Expressed in the endothelium of ovules and in developing seeds | TRANSPARENT TESTA 12 (TT12), ATTT12, MATE efflux family protein |
| 37 | TT12 ORF | WT Protein | | |
| 38 | TT12 Ta locus | WT Gene | | |
| 39 | TT13 CDS | WT Coding region | Proton pump from the $H^+$-ATPase family, involved in proanthocyanidin biosynthesis. Mutations disturb vacuolar biogenesis and acidification process. The acidification of the vacuole provides energy for import of proanthocyanidins into the vacuole | AHA10 (AUTOINHIBITED H(+)-ATPASE ISOFORM 10), TRANSPARENT TESTA 13 (TT13) |
| 40 | TT13 ORF | WT Protein | | |
| 41 | TT13 Ta locus | WT Gene | | |
| 42 | TT15 CDS | WT Coding region | Encodes a UDP-glucose:sterol-glucosyltransferase. Mutants produce pale greenish-brown seeds with slightly reduced dormancy | TRANSPARENT TESTA 15 (TT15), TRANSPARENT TESTA GLABROUS 15 (TTG15), UGT80B1, UDP-Glycosyltransferase superfamily protein |
| 43 | TT15 ORF | WT Protein | | |
| 44 | TT15 Ta locus | WT Gene | | |
| 45 | TT16 CDS | WT Coding region | MADS-box protein regulating proanthocyanidin biosynthesis and cell shape in the inner-most cell layer of the seed coat. Required for | ABS, AGAMOUS-LIKE 32 (AGL32), ARABIDOPSIS |
| 46 | TT16 ORF | WT Protein | | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 47 | TT16 Ta locus | WT Gene | determining the identity of the endothelial layer within the ovule. Paralogous to GOA. Plays a maternal role in fertilization and seed development | BSISTER, TRANSPARENT TESTA16 (TT16) |
| 48 | TT18 CDS | WT Coding region | Encodes leucoanthocyanidin dioxygenase, which is involved in proanthocyanin biosynthesis. Mutant analysis suggests that this gene is also involved in vacuole formation | ANS, ANTHOCYANIDIN SYNTHASE, LDOX, LEUCOANTHOCYANIDIN DIOXYGENASE, TANNIN DEFICIENT SEED 4 (TDS4), TT18 |
| 49 | TT18 ORF | WT Protein | | |
| 50 | TT18 Ta locus | WT Gene | | |
| 51 | TT19 CDS | WT Coding region | Encodes glutathione transferase belonging to the phi class of GSTs. Mutants display no pigments in the leaves or stems. Likely to function as a carrier to transport anthocyanin from the cytosol to tonoplasts | GLUTATHIONE S-TRANSFERASE PHI 12, ATGSTF12, GLUTATHIONE S-TRANSFERASE 26 (GST26), GLUTATHIONE S-TRANSFERASE PHI 12, GSTF12, TRANSPARENT TESTA 19 (TT19) |
| 52 | TT19 ORF | WT Protein | | |
| 53 | TT19 Ta locus | WT Gene | | |
| 54 | TT3 CDS | WT Coding region | Dihydroflavonol reductase. Catalyzes conversion of dihydroquercetin to leucocyanidin in the biosynthesis of anthocyanins | DFR, DIHYDROFLAVONOL 4-REDUCTASE, M318, TRANSPARENT TESTA 3, (TT3) |
| 55 | TT3 ORF | WT Protein | | |
| 56 | TT3 Ta locus | WT Gene | | |
| 57 | TT4 CDS | WT Coding region | Encodes chalcone synthase (CHS), a key enzyme in biosynthesis of flavonoids. Required for accumulation of purple anthocyanins in leaves, stems and seed coat. Also involved in regulation of auxin transport and root gravitropism | ATCHS, CHALCONE SYNTHASE, CHS, TRANSPARENT TESTA 4 (TT4) |
| 58 | TT4 ORF | WT Protein | | |
| 59 | TT4 Ta locus | WT Gene | | |
| 60 | TT5 CDS | WT Coding region | Another key enzyme in biosynthesis of flavonoids. Catalyzes the conversion of chalcones into flavanones. Required for the accumulation of purple anthocyanins leaves, stems and seed coat. Co-expressed with CHS | A11, ATCHI, CFI, CHALCONE FLAVANONE ISOMERASE, CHALCONE ISOMERASE, CHI, TRANSPARENT TESTA 5 (TT5) |
| 61 | TT5 ORF | WT Protein | | |
| 62 | TT5 Ta locus | WT Gene | | |
| 63 | TT6 CDS | WT Coding region | Encodes flavanone 3-hydroxylase, regulating flavonoid biosynthesis. Coordinately expressed with chalcone synthase and chalcone isomerases | F3'H, F3H, FLAVANONE 3-HYDROXYLASE, TRANSPARENT TESTA 6 (TT6) |
| 64 | TT6 ORF | WT Protein | | |
| 65 | TT6 Ta locus | WT Gene | | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 66 | TT7 CDS | WT Coding region | Required for flavonoid 3′-hydroxylase activity. Enzyme abundance relative to CHS determines Quercetin/Kaempferol metabolite ratio | F3'H CYP75B1, CYTOCHROME P450 75B1, D501, TRANSPARENT TESTA 7 (TT7) |
| 67 | TT7 ORF | WT Protein | | |
| 68 | TT7 Ta locus | WT Gene | | |
| 69 | TT8 CDS | WT Coding region | TT8 is a transcription factor acting in concert with TT1, PAP1 and TTG1 on regulation of flavonoid pathways, namely proanthocyanidin and anthocyanin biosynthesis. Affects dihydroflavonol 4-reductase gene expression. It is believed that a ternary complex composed of TT2, TT8 and TTG1 is required for correct expression of BAN in seed endothelium. Interacts with JAZ proteins to regulate anthocyanin accumulation | ATTT8, BHLH42, TRANSPARENT TESTA 8, (TT8) |
| 70 | TT8 ORF | WT Protein | | |
| 71 | TT8 Ta locus | WT Gene | | |
| 72 | TT9 CDS | WT Coding region | Encodes a peripheral membrane protein localized at the Golgi apparatus. Involved in membrane trafficking, vacuole development and in flavonoid accumulation in the seed coat. Mutant seed color is pale brown | GFS9, GREEN FLUORESCENT SEED 9, TRANSPARENT TESTA 9, TT9 CLEC16A-like protein |
| 73 | TT9 ORF | WT Protein | | |
| 74 | TT9 Ta locus | WT Gene | | |
| 75 | TTG1 CDS | WT Coding region | Part of a ternary complex composed of TT2, TT8 and TTG1 necessary for correct expression of BAN in seed endothelium. Required for the accumulation of purple anthocyanins in leaves, stems and seed coat. Controls epidermal cell fate specification. Affects dihydroflavonol 4-reductase gene expression. TTG1 was shown to act non-cell autonomously and to move via plasmodesmata between cells | TTG1, TTG, URM23, ATTTG1, Transducin/ WD40-repeat-containing protein |
| 76 | TTG1 ORF | WT Protein | | |
| 77 | TTG1 Ta locus | WT Gene | | |
| 78 | TTG2 CDS | WT Coding region | Belongs to a family of WRKY transcription factors expressed in seed integument and endosperm. Mutants are defective in proanthocyanidin synthesis and seed mucilage deposition. Seeds are yellow colored. Seed size is also affected; seeds are reduced in size but only when the mutant allele is transmitted through the female parent | TRANSPARENT TESTA GLABRA 2 (TTG2), AtWRKY44, DSL1 (DR. STRANGELOVE 1) |
| 79 | TTG2 ORF | WT Protein | | |
| 80 | TTG2 Ta locus | WT Gene | | |
| 81 | TT1 aMIR319a gene | Artificial miRNA | Artificial micro-RNA designed to reduce expression of TT1 in corresponding cell layer of developing seed coat | |
| 82 | TT10 aMIR319a gene | Artificial miRNA | Artificial micro-RNA designed to reduce expression of TT10 in corresponding cell layer of developing seed coat | |
| 83 | TT2 aMIR319a gene | Artificial miRNA | Artificial micro-RNA designed to reduce expression of TT2 in corresponding cell layer of developing seed coat | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 84 | TT8 aMIR319a gene | Artificial miRNA | Artificial micro-RNA designed to reduce expression of TT8 in corresponding cell layer of developing seed coat | |
| 85 | TT1 Promoter | Promoter | Genomic region of TT1 locus upstream of TT1 start codon containing TT1 promoter regulatory elements | |
| 86 | TT1 Terminator | Transcrip-tional terminator | Genomic region of TT1 locus downstream of TT1 stop codon containing regulatory elements | |
| 87 | TT8 Promoter | Promoter | Genomic region of TT8 locus upstream of TT8 start codon containing TT8 promoter regulatory elements | |
| 88 | TT8 Terminator | Transcrip-tional terminator | Genomic region of TT8 locus downstream of TT8 stop codon containing regulatory elements | |
| 89 | TT2_CRISPR-SpCAS9_F1 | Oligo-nucleotide | TT2 CDS targeted for cleavage by SpCAS9 enzyme; part of gRNA cassette | |
| 90 | TT2_CRISPR-SpCAS9_R1 | Oligo-nucleotide | TT2 CDS targeted for cleavage by SpCAS9 enzyme; part of gRNA cassette | |
| 91 | TT2_CRISPR-SaCAS9_F2 | Oligo-nucleotide | TT2 CDS targeted for cleavage by SpCAS9 enzyme; part of gRNA cassette | |
| 92 | TT2_CRISPR-SaCAS9_R2 | Oligo-nucleotide | TT2 CDS targeted for cleavage by SpCAS9 enzyme; part of gRNA cassette | |
| 93 | TT2_CRISPR-SaCAS9_F3 | Oligo-nucleotide | TT2 CDS targeted for cleavage by SpCAS9 enzyme; part of gRNA cassette | |
| 94 | TT2_CRISPR-SaCAS9_R3 | Oligo-nucleotide | TT2 CDS targeted for cleavage by SpCAS9 enzyme; part of gRNA cassette | |
| 95 | TT8_CRISPR-SpCAS9_F1 | Oligo-nucleotide | TT8 CDS targeted for cleavage by SpCAS9 enzyme; part of gRNA cassette | |
| 96 | TT8_CRISPR-SpCAS9_R1 | Oligo-nucleotide | TT8 CDS targeted for cleavage by SpCAS9 enzyme; part of gRNA cassette | |
| 97 | TT8_CRISPR-SpCAS9_F2 | Oligo-nucleotide | TT8 CDS targeted for cleavage by SpCAS9 enzyme; part of gRNA cassette | |
| 98 | TT8_CRISPR-SpCAS9_R2 | Oligo-nucleotide | TT8 CDS targeted for cleavage by SpCAS9 enzyme; part of gRNA cassette | |
| 99 | TT8_CRISPR-SpCAS9_F3 | Oligo-nucleotide | TT8 CDS targeted for cleavage by SpCAS9 enzyme; part of gRNA cassette | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 100 | TT8_CRISPR-SpCAS9_R3 | Oligo-nucleotide | TT8 CDS targeted for cleavage by SpCAS9 enzyme; part of gRNA cassette | |
| 101 | TT10_CRISPR-SaCAS9_F1 | Oligo-nucleotide | TT10 CDS targeted for cleavage by SpCAS9 enzyme; part of gRNA cassette | |
| 102 | TT10_CRISPR-SaCAS9_R1 | Oligo-nucleotide | TT10 CDS targeted for cleavage by SpCAS9 enzyme; part of gRNA cassette | |
| 103 | TT10_CRISPR-SaCAS9_F2 | Oligo-nucleotide | TT10 CDS targeted for cleavage by SpCAS9 enzyme; part of gRNA cassette | |
| 104 | TT10_CRISPR-SaCAS9_R2 | Oligo-nucleotide | TT10 CDS targeted for cleavage by SpCAS9 enzyme; part of gRNA cassette | |
| 105 | TT16_CRISPR-SpCAS9_F1 | Oligo-nucleotide | TT16 CDS targeted for cleavage by SpCAS9 enzyme; part of gRNA cassette | |
| 106 | TT16_CRISPR-SpCAS9_R1 | Oligo-nucleotide | TT16 CDS targeted for cleavage by SpCAS9 enzyme; part of gRNA cassette | |
| 107 | TT16_CRISPR-SpCAS9_F2 | Oligo-nucleotide | TT16 CDS targeted for cleavage by SpCAS9 enzyme; part of gRNA cassette | |
| 108 | TT16_CRISPR-SpCAS9_R2 | Oligo-nucleotide | TT16 CDS targeted for cleavage by SpCAS9 enzyme; part of gRNA cassette | |
| 109 | TT8_CRISPR-SpCAS9_F4 | Oligo-nucleotide | TT8 CDS targeted for cleavage by SpCAS9 enzyme; part of gRNA cassette | |
| 110 | TT8_CRISPR-SpCAS9_F5 | Oligo-nucleotide | TT8 CDS targeted for cleavage by SpCAS9 enzyme; part of gRNA cassette | |
| 111 | TT8_CRISPR-SaCAS9_F1 | Oligo-nucleotide | TT8 CDS targeted for cleavage by SaCAS9 enzyme; part of gRNA cassette | |
| 112 | TT8_CRISPR SaCAS9_F2 | Oligo-nucleotide | TT8 CDS targeted for cleavage by SaCAS9 enzyme; part of gRNA cassette | |
| 113 | TTG1_CRISPR-SpCAS9_F1 | Oligo-nucleotide | TTG1 CDS targeted for cleavage by SpCAS9 enzyme; part of gRNA cassette | |
| 114 | TTG1_CRISPR-SpCAS9_F2 | Oligo-nucleotide | TTG1 CDS targeted for cleavage by SpCAS9 enzyme; part of gRNA cassette | |
| 115 | TTG1_CRISPR-SaCAS9_F1 | Oligo-nucleotide | TTG1 CDS targeted for cleavage by SaCAS9 enzyme; part of gRNA cassette | |
| 116 | TTG1_CRISPR-SaCAS9_F2 | Oligo-nucleotide | TTG1 CDS targeted for cleavage by SaCAS9 enzyme; part of gRNA cassette | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 117 | TT4-1 CDS-Mut | Mutant Coding region | GTCTGCTCC**G**AGATCACAG (nt 580-598 of SEQ ID NO: 57)→ GTCTGCTCC**A**AGATCACAG (nt 580-598 of SEQ ID NO: 117) | tt4-1, A7-95 |
| 118 | TT4 Mut P1 | Mutant Protein | Presumed LOF due to E->K aa change | |
| 119 | TT4-2 CDS-Mut | Mutant Coding region | AAGTGACTG**G**AACTCTCTC (nt 894-912 of SEQ ID NO: 57)→ AAGTGACTG**A**AACTCTCTC (nt 894-912 of SEQ ID NO: 119) | tt4-2, E5-549 |
| 120 | TT4 Mut P2 | Mutant Protein | Truncated protein, W->Stop change | |
| 121 | TT6-1 CDS-Mut | Mutant Coding region | GAGACTGTG**C**AAGATTGGA (nt 364-382 of SEQ ID NO: 63)→ GAGACTGTG**T**AAGATTGGA (nt 364-382 of SEQ ID NO: 121) | tt6-1, AX17 |
| 122 | TT6 Mut P1 | Mutant Protein | Truncated protein, Q->Stop change | |
| 123 | TT6-2 CDS-Mut | Mutant Coding region | TTCAGAATC**C**GGCGCAGGA (nt 872-890 of SEQ ID: 63)→ TTCAGAATC**T**GGCGCAGGA (nt 872-890 of SEQ ID: 123) | tt6-2,Q36 |
| 124 | TT6 Mut P2 | Mutant Protein | Presumed LOF due to P->L aa change | |
| 125 | TT7-1 CDS-Mut | Mutant Coding region | CCAAATTCA**G**GAGCCAAAC (nt 304-322 of SEQ ID: 66)→ CCAAATTCA**A**GAGCCAAAC (nt 304-322 of SEQ ID: 125) | tt7-1, A7-3, E5-586, E5-484 P15, E5-484 P5 |
| 126 | TT7-1 Mut P1 | Mutant Protein | Presumed LOF due to G->R aa change | |
| 127 | TT8-1 CDS-Mut | Mutant Coding region | TTTACGGCA**G**AGAAAGTGA (nt 19-37 of SEQ ID: 69)→ TTTACGGCA**A**AGAAAGTGA (nt 19-37 of SEQ ID: 127) | tt8-1, D3-N10 P5 |
| 128 | TT8 Mut P1 | Mutant Protein | Presumed LOF due to E->K aa change | |
| 129 | TT8-2 CDS-Mut | Mutant Coding region | TCTTACATC**C**AATCATCAT (nt 940-958 of SEQ ID: 69)→ TCTTACATC**T**AATCATCAT (nt 940-958 of SEQ ID: 129) | tt8-2, D5-191, D3-N25P1, E5-590, A7-191 |
| 130 | TT8 Mut P2 | Mutant Protein | Truncated protein, Q->Stop change | |
| 131 | TT8-3 CDS-Mut | Mutant Coding region | TGCCACATG**G**AAGGCTGAT (nt 960-978 of SEQ ID: 69)→ TGCCACATG**A**AAGGCTGAT (nt 960-978 of SEQ ID: 131) | tt8-3, I0193, E5-542, E5-548 |
| 132 | TT8 Mut P3 | Mutant Protein | Truncated protein, W->Stop change | |
| 133 | TT8-11 CDS-Mut | Mutant Coding region | GCAATAAAGACGAGGAAGA (nt 172-190 of SEQ ID: 69)→ GCAATAAAGA**A**CGAGGAAGA (nt 172-191 of SEQ ID: 133) | tt8-11 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 134 | TT8 Mut P4 | Mutant Protein | Frameshift caused by 1 bp insertion | |
| 135 | TT8-12 CDS-Mut | Mutant Coding region | GCAATAAAGACGAGGAAGA (nt 172-190 of SEQ ID: 69)→ GCAATAAA--CGAGGAAGA (nt 172-188 of SEQ ID: 135) | tt8-12 |
| 136 | TT8 Mut P5 | Mutant Protein | Frameshift caused by 2 bp deletion | |
| 137 | TT8-13 CDS-Mut | Mutant Coding region | GCAATAAAGACGAGGAAGA (nt 172-190 of SEQ ID: 69)→ GCAATAAAG**G**ACGAGGAAGA (nt 172-191 of SEQ ID: 137) | tt8-13 |
| 138 | TT8 Mut P6 | Mutant Protein | Frameshift caused by 1 bp insertion | |
| 139 | TT10-1 CDS-Mut | Mutant Coding region | GACTGTTTG**G**TGGCATGCG (nt 354-372 of SEQ ID: 33)→ GACTGTTTG**A**TGGCATGCG (nt 354-372 of SEQ ID: 139) | tt10-1, E5-539, E5-543 |
| 140 | TT10 Mut P1 | Mutant Protein | Truncated protein, W->Stop change | |
| 141 | TT10-2 CDS-Mut | Mutant Coding region | TACCGCATT**C**GGATGGTAA (nt 646-664 of SEQ ID: 33)→ TACCGCATT**T**GGATGGTAA (nt 646-664 of SEQ ID: 141) | tt 10-2, E5-545 |
| 142 | TT10 Mut P2 | Mutant Protein | Presumed LOF due to R->W aa change | |
| 143 | TT10-11 CDS-Mut | Mutant Coding region | GGACCAGTGTTAAGGGCT (nt 154-171 of SEQ ID: 33)→ GGACCAGTG**T**TTAAGGGCT (nt 154-172 of SEQ ID: 143) | tt10-11 |
| 144 | TT10 Mut P3 | Mutant Protein | Frameshift caused by 1 bp insertion | |
| 145 | TT10-12 CDS-Mut | Mutant Coding region | GGACCAGTGTTAAGGGCT (nt 154-171 of SEQ ID: 33)→ GGACCAGTG**A**TTAAGGGCT (nt 154-172 of SEQ ID: 145) | tt10-12 |
| 146 | TT10 Mut P4 | Mutant Protein | Frameshift caused by 1 bp insertion | |
| 147 | TT10-13 CDS-Mut | Mutant Coding region | TCCTGGACCAGTGTTAAGG (nt 150-168 of SEQ ID: 33)→ TCCTGG--------TTAAGG (nt 150-161 of SEQ ID: 147) | tt10-13 |
| 148 | TT10 Mut P5 | Mutant Protein | Frameshift caused by 7 bp deletion | |
| 149 | TT12-1 CDS-Mut | Mutant Coding region | AACCCTTTGGCTTACATGTC (nt 604-623 of SEQ ID: 36)→ AACCCTTT----TACATGTC (nt 604-619 of SEQ ID: 149) | tt12-1, A7-261 |
| 150 | TT12 Mut P1 | Mutant Protein | Frameshift caused by 4 bp deletion | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 151 | TT12-2 CDS-Mut | Mutant Coding region | ATTCTCTCT**G**GTGTTGCCA (nt 1237-1255 of SEQ ID: 36)→ ATTCTCTCT**A**GTGTTGCCA (nt 1237-1255 of SEQ ID: 151) | tt 12-2, J22 |
| 152 | TT12 Mut P2 | Mutant Protein | Presumed LOF due to G->S aa change | |
| 153 | TT13-1 CDS-Mut | Mutant Coding region | GCTCTTAAC**C**TTGGAGTTT (nt 895-913 of SEQ ID: 39)→ GCTCTTAAC**T**TTGGAGTTT (nt 895-913 of SEQ ID: 153) | tt13-1, aha10-1, J22 |
| 154 | TT13 Mut P1 | Mutant Protein | Truncated protein, L->F change | |
| 155 | TT13-2 CDS-Mut | Mutant Coding region | ACAGGAAGG**C**GACTTGGGA (nt 958-976 of SEQ ID: 39)→ ACAGGAAGG**T**GACTTGGGA (nt 958-976 of SEQ ID: 155) | tt13-2, P32 |
| 156 | TT13 Mut P2 | Mutant Protein | Truncated protein, R->Stop change | |
| 157 | TT13-3 CDS-Mut | Mutant Coding region | GGAATGACC**G**GAGATGGTG (nt 1144-1162 of SEQ ID: 39)→ GGAATGACC**A**GAGATGGTG (nt 1144-1162 of SEQ ID: 157) | tt13-3, E5-540 |
| 158 | TT13 Mut P3 | Mutant Protein | Truncated protein, G->R change | |
| 159 | TT16-1 CDS-Mut | Mutant Coding region | TACTTGAAGACCAGTGGAAT (nt 211-230 of SEQ ID: 45)→ TACTTGAAGACC**C**CAGTGGAAT (nt 211-231 of SEQ ID: 159) | tt16-1 |
| 160 | TT16 Mut P1 | Mutant Protein | Frameshift caused by 1 bp insertion | |
| 161 | TT16-2 CDS-Mut | Mutant Coding region | TACTTGAAGACCAGTGGAAT (nt 211-230 of SEQ ID: 45)→ TACTTGAAGAC**G**CAGTGGAAT (nt 211-231 of SEQ ID: 161) | tt16-2 |
| 162 | TT16 Mut P2 | Mutant Protein | Frameshift caused by 1 bp insertion | |
| 163 | TT16-3 CDS-Mut | Mutant Coding region | TACTTGAAGACCAGTGGAAT (nt 211-230 of SEQ ID: 45)→ TACTTGAAGAC**T**CAGTGGAAT (nt 211-231 of SEQ ID: 163) | tt16-3 |
| 164 | TT16 Mut P3 | Mutant Protein | Frameshift caused by 1 bp insertion | |
| 165 | TTG1 CDS-Mut | Mutant Coding region | GATCTCCTCGCTTCCTCCGGCG ATTTCCT (nt 286-314 of SEQ ID: 75)→ GATC------------------ ---TCCT (nt 286-293 of SEQ ID: 165) | Y1067, Y1126 |
| 166 | TTG1 Mut P1 | Mutant Protein | LOF caused by 21 bp/7 aa deletion | |
| 167 | TTG1-1 CDS-Mut | Mutant Coding region | TCGCTTCCT**C**CGGCGATTT (nt 293-311 of SEQ ID: 75)→ TCGCTTCCT**T**CGGCGATTT (nt 293-311 of SEQ ID: 167) | ttg1-1, E5-544 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 168 | TTG1 Mut P2 | Mutant Protein | Presumed LOF due to S->F aa change | |
| 169 | TTG1-2 CDS-Mut | Mutant Coding region | TCGCTTGGG**G**AGAAGCTAG (nt 542-560 of SEQ ID: 75)→ TCGCTTGGG**A**AGAAGCTAG (nt 542-560 of SEQ ID: 169) | ttg1-2, A7-187 |
| 170 | TTG1 Mut P3 | Mutant Protein | Presumed LOF due to G->E aa change | |
| 171 | GL3 CDS | WT Coding region | Transcription activator of bHLH superfamily involved in cell fate specification. In association with TTG1, promotes trichome formation. Together with MYB75/PAP1, plays a role in the activation of anthocyanin biosynthesis. Activates the transcription of GL2. | GL3, MYC6.2 basic helix-loop-helix protein |
| 172 | GL3 ORF | WT Protein | | |
| 173 | GL3 Ta locus | WT Gene | | |
| 174 | GL3-1 CDS-Mut | Mutant Coding region | CAACTTAGG**G**AGCTTTACG (nt 241-259 of SEQ ID: 171)→ CAACTTAGG**A**AGCTTTACG (nt 241-259 of SEQ ID: 174) | gl3-1, E5-541, E5-559 |
| 175 | GL3 Mut P1 | Mutant Protein | Presumed LOF due to E->K aa change | |
| 176 | GL3-2 CDS-Mut | Mutant Coding region | GCCGACACA**G**AGTGGTACT (nt 358-376 of SEQ ID: 171)→ GCCGACACA**A**AGTGGTACT (nt 358-376 of SEQ ID: 176) | gl3-2, A7-92, E5-444 |
| 177 | GL3 Mut P2 | Mutant Protein | Presumed LOF due to E->K aa change | |
| 178 | GL3-3 CDS-Mut | Mutant Coding region | GGTTTAACT**G**ATAATTTAA (nt 1663-1681 of SEQ ID: 171)→ GGTTTAACT**A**ATAATTTAA (nt 1663-1681 of SEQ ID: 178) | gl3-3, A7-229, E5-582 |
| 179 | GL3 Mut P3 | Mutant Protein | Presumed LOF due to D->N aa change | |
| 180 | BAN-1 CDS-Mut | Mutant Coding region | ATCAAGCCA**G**GGATACAAG (nt 319-337 of SEQ ID: 9)→ ATCAAGCCA**A**GGATACAAG (nt 319-337 of SEQ ID: 9 and SEQ ID: 180) | ban-1, BJ8, BJ8D |
| 181 | BAN Mut P1 | Mutant Protein | Presumed LOF due to G->R aa change | |
| 182 | TT4-3 CDS-Mut | Mutant Coding region | CTCACCCTG**G**AGGTCCTGC (nt 923-941 of SEQ ID: 57)→ CTCACCCTG**A**AGGTCCTGC (nt 923-941 of SEQ ID: 182) | tt4-3, A7-229, E5-582 |
| 183 | TT4-3 Mut P1 | Mutant Protein | Presumed LOF due to G->R aa change | |

In certain embodiments, pennycress plants having reduced seed coat fiber, lighter-colored seed coat, and/or higher seed oil content as described herein can be from the Y1067, Y1126, BC38, BJ8, P32, J22, Q36, BD24, AX17, E5-444, E5-540, E5-541, E5-542, E5-543, E5-544, E5-545, E5-547, E5-549, E5-582, E5-586, D3-N10 P5, D5-191, A7-95, A7-187, or A7-261 variant lines provided herein, or can be progeny derived from those lines.

A representative wild-type (WT) pennycress TT2 coding sequence is as shown in sequence listing (SEQ ID NO:1). In certain embodiments, a WT pennycress TT2 coding sequence can have a sequence that deviates from the coding sequence set forth above (e.g., SEQ ID NO:1), and is referred to as an allelic variant sequence. In certain embodiments, a TT2 coding sequence allelic variant can have at least 80, at least 85, at least 90, at least 95, at least 98, or at least 99 percent sequence identity to SEQ ID NO:1. A representative wild-type pennycress TT2 polypeptide is shown in sequence listing (SEQ ID NO:2). In certain embodiments, a WT pennycress TT2 polypeptide can have a sequence that deviates from the polypeptide sequence set forth above (SEQ ID NO:2) and is referred to as an allelic variant sequence.

In certain embodiments, a WT pennycress TT2 polypeptide can have a sequence that deviates from the polypeptide sequence set forth above (SEQ ID NO:2), referred to herein as an allelic variant sequence, provided the polypeptide maintains its wild-type function. For example, a TT2 polypeptide can have at least 80, at least 85, at least 90, at least 95, at least 98, or at least 99) percent sequence identity to SEQ ID NO:2. A TT2 polypeptide of an allelic variant can have one or more (e.g., 2, 3, 4, 5, 6, 7, 8, 9, or 10) amino acid modifications (e.g., substitutions) relative to SEQ ID NO:2.

In certain embodiments, pennycress seed lots having reduced seed coat fiber, lighter-colored seed coat due to reduced proanthocyanidins content, and/or higher seed oil content as described herein can include at least one loss-of-function modification in a TT2 gene (e.g., in a TT2 coding sequence, in a TT2 regulatory sequence including the promoter, 5' UTR, intron, 3' UTR, or in any combination thereof) or a transgene that suppresses expression of the TT2 gene. As used herein, a loss-of-function mutation in a TT2 gene can be any modification that is effective to reduce TT2 polypeptide expression or TT2 polypeptide function. In certain embodiments, reduced TT2 polypeptide expression and/or TT2 polypeptide function can be eliminated or reduced in comparison to a wild-type plant. Examples of genetic modifications that can provide for a loss-of-function mutation include, without limitation, deletions, insertions, substitutions, translocations, inversions, duplications, or any combination thereof.

In certain embodiments, pennycress seed lots having reduced seed coat fiber, lighter-colored seed coat, and/or higher seed oil and/or protein content as described herein can include a substitution (e.g., a single base-pair substitution) relative to the WT pennycress TT2 coding sequence. In certain embodiments, a modified TT2 coding sequence can include a single base-pair substitution of the cytosine (G) at nucleotide residue 330 in a WT pennycress TT2 coding sequence (e.g., SEQ ID NO:1 or an allelic variant thereof). The G at nucleotide residue 330 can be substituted with any appropriate nucleotide (e.g., thymine (T), adenine (A), or cytosine (C)). For example, a single base-pair substitution can be a G to A substitution at nucleotide residue 330 in a WT pennycress TT2 coding sequence thereby producing a premature stop codon. A representative modified pennycress TT2 coding sequence having a loss-of-function single base pair substitution is presented in SEQ ID NO:4.

A modified pennycress TT2 coding sequence having a loss-of-function single base pair substitution (e.g., SEQ ID NO:4) can encode a modified TT2 polypeptide (e.g., a modified TT2 polypeptide having reduced TT2 polypeptide expression and/or reduced TT2 polypeptide function). For example, a modified pennycress TT2 coding sequence having a single base-pair substitution (e.g., SEQ ID NO:4) can encode a modified TT2 polypeptide. In certain embodiments, a modified TT2 polypeptide can include a truncation resulting from the introduction of a stop codon at codon position 110 within the TT2 open reading frame (e.g., SEQ ID NO:4). A representative truncated pennycress TT2 polypeptide is presented in SEQ ID NO:5. Representative pennycress varieties having a mutation in the TT2 gene include the tt2-1, tt2-2, BC38, and E5-547 varieties.

Figure 4:
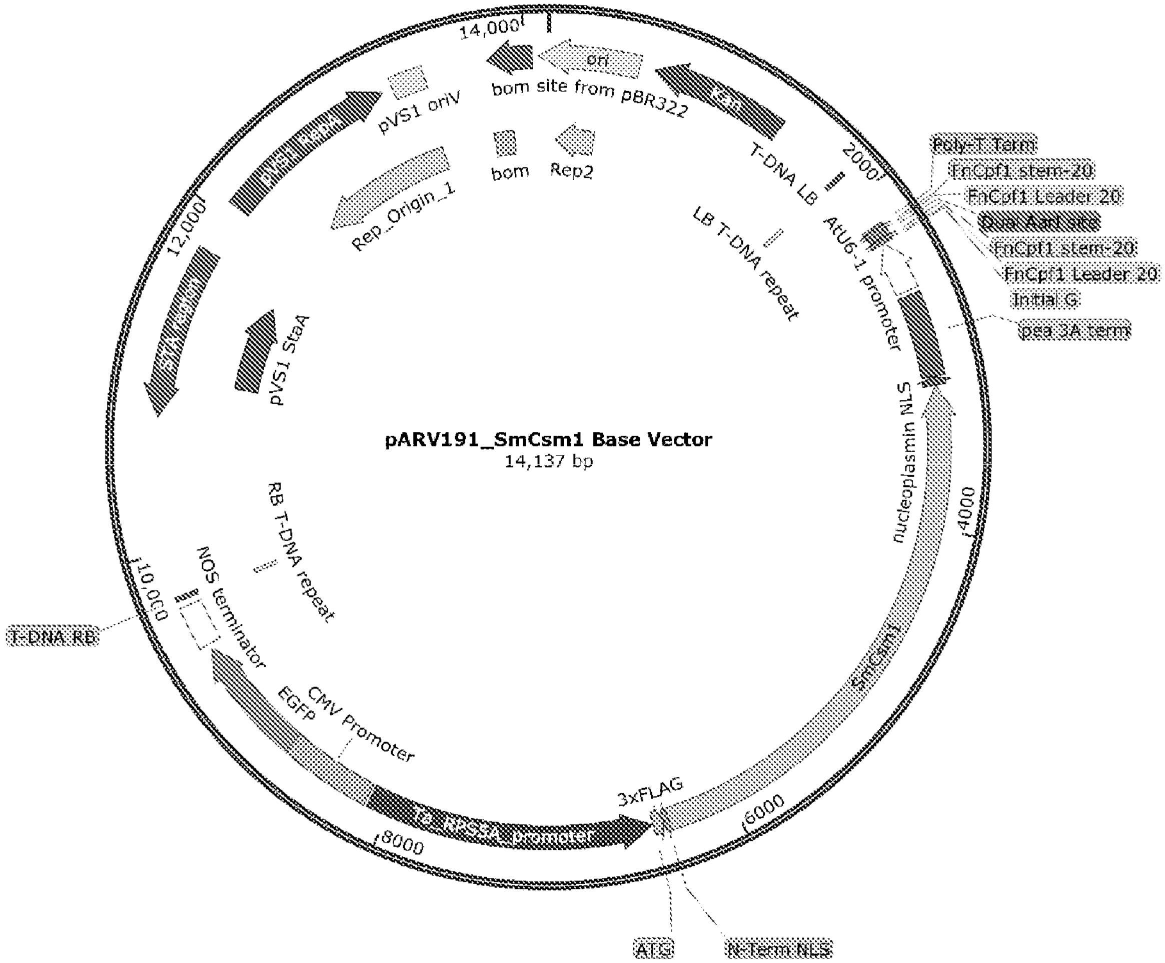
FIG. 4 illustrates pARV191, *Agrobacterium* CRISPR-SmCsm1 base vector for editing plant genome. gRNA cassette stuffers are inserted at the dual AarI site, replacing a small fragment of the vector with synthetic gRNA cassette.
Figure 5:
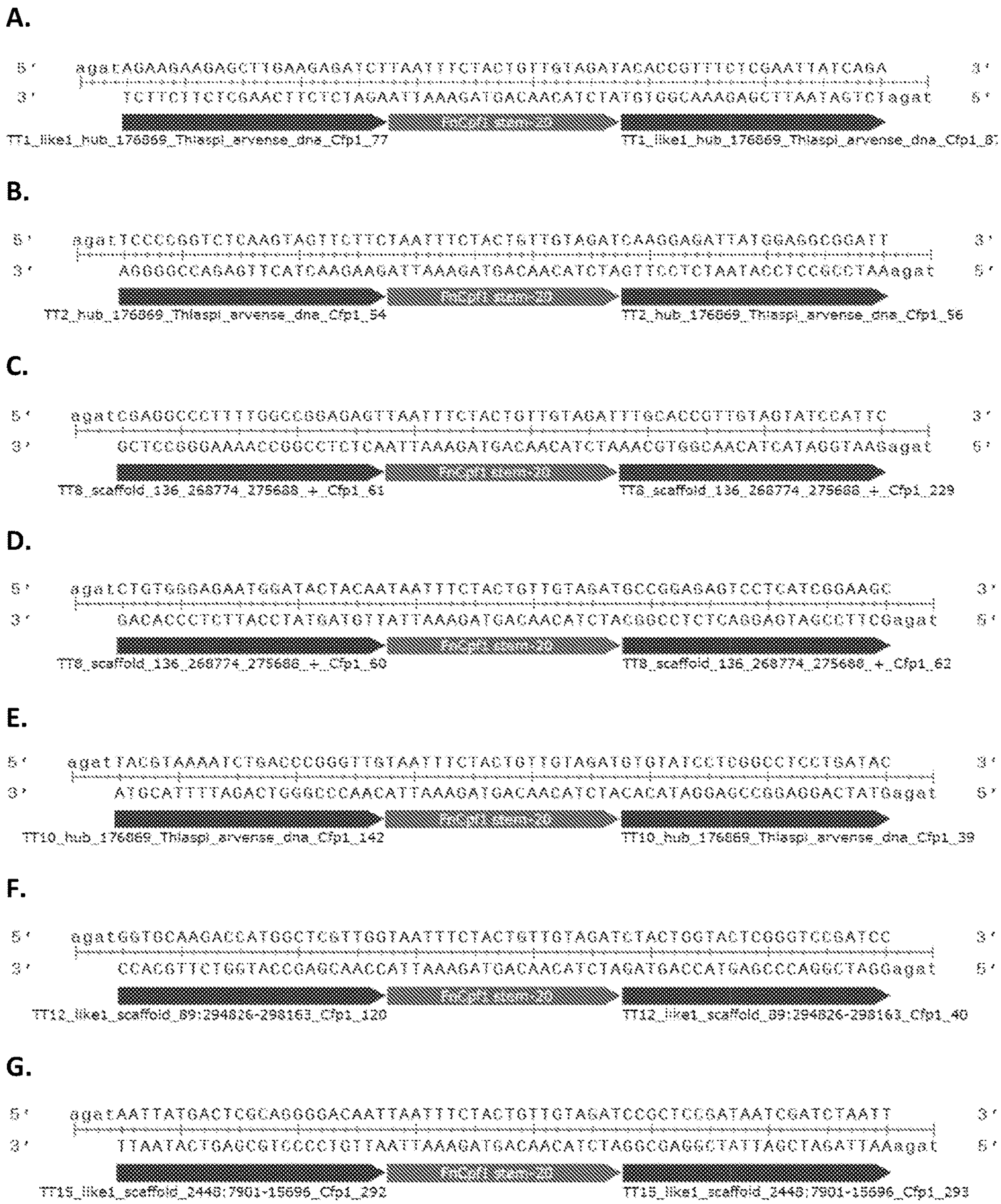
FIGS. 5A, B, C, D, E, F, G, gRNA cassettes targeting pennycress Transparent testa (Tt) genes.
FIG. 5B: gRNA cassette stuffer for targeting pennycress Tt2 gene, nucleotides 177-199 and 240-262 of SEQ ID NO: 1.
FIG. 5C: gRNA cassette stuffer for targeting pennycress Tt8 gene, nucleotides 261-283 and 153-175 of SEQ ID NO: 69.
FIG. 5D: gRNA cassette stuffer for targeting pennycress Tt8 gene, nucleotides 145-167 and 274-296 of SEQ ID NO: 69.
FIG. 5E: gRNA cassette stuffer for targeting pennycress Tt10 gene, nucleotides 304-326 and 415-437 of SEQ ID NO: 33.
FIG. 5F: gRNA cassette stuffer for targeting pennycress Tt12 gene, nucleotides 399-421 and 450-472 of SEQ ID NO: 36.
FIG. 5G: gRNA cassette stuffer for targeting pennycress Tt15 gene, nucleotides 255-277 and 281-303 of SEQ ID NO: 42.
Figure 6:
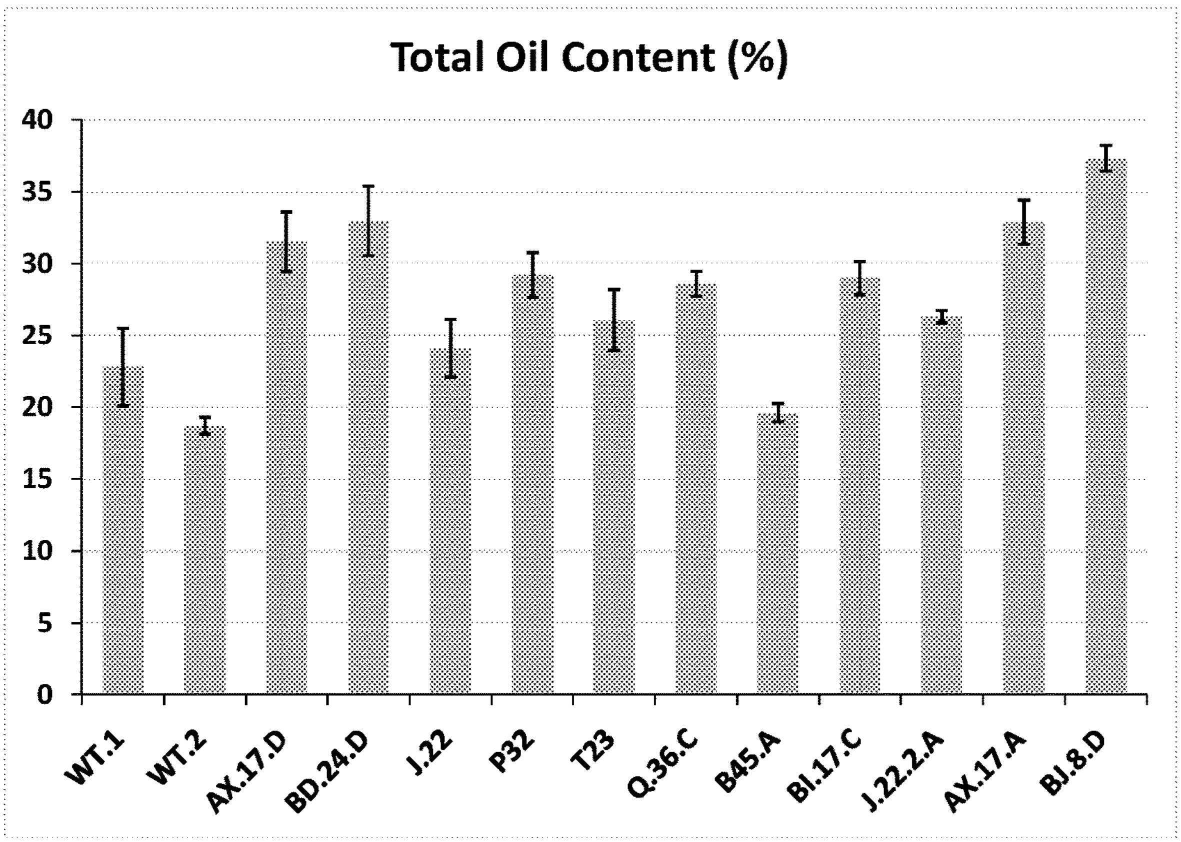
FIG. 6 illustrates total oil content in seeds of selected yellow-seeded pennycress mutants measured using GC-chromatography analysis.

A representative WT pennycress TRANSPARENT TESTA8 (TT8) coding region is presented in SEQ ID NO:69. Two protospacer locations and adjacent protospacer-adjacent motif (PAM) sites that can be targeted by, for example, CRISPR-SpCAS9 correspond to nucleotides 164-183 and 287-306 (protospacers) or 184-186 and 284-286 (PAM sites). In another embodiment, two separate examples of alternative protospacer locations and adjacent protospacer-adjacent motifs (PAM) sites are provided in FIGS. 3-5. In each case, two protospacer locations can be targeted by, for example, CRISPR-FnCpf1, CRISPR-SmCsm1 or a similar enzyme, correspond to nucleotides 175-153 and 261-283 (protospacers) or 179-176 and 257-260 (PAM sites); and nucleotides 145-167 and 274-296 (protospacers) or 141-144 and 270-273 (PAM sites), all of SEQ ID NO:69.

In certain embodiments, a WT pennycress TT8 coding sequence can have a sequence that deviates from the coding sequence set forth above (e.g., SEQ ID NO:69), and is referred to as an allelic variant sequence. In certain embodiments, a TT8 coding sequence allelic variant can have at least 80, at least 85, at least 90, at least 95, at least 98, or at least 99 percent sequence identity to SEQ ID NO:69. A representative WT pennycress TT8 polypeptide is presented in SEQ ID NO:70.

In certain embodiments, a WT pennycress TT8 polypeptide can have a sequence that deviates from the polypeptide sequence set forth above (SEQ ID NO:70) and is referred to as an allelic variant sequence. For example, a TT8 polypeptide can have at least 80, at least 85, at least 90, at least 95, at least 98, or at least 99 percent sequence identity to SEQ ID NO:70. A TT8 polypeptide can have one or more (e.g., 2, 3, 4, 5, 6, 7, 8, 9, or 10) amino acid modifications (e.g., substitutions) relative to SEQ ID NO:70.

In certain embodiments, pennycress seed lots having reduced fiber content as described herein can include a loss-of-function modification in a TT8 gene (e.g., in a TT8 coding sequence) or a transgene that suppresses expression of the TT8 gene. As used herein, a loss-of-function mutation in a TT8 gene can be any modification that is effective to reduce TT8 polypeptide expression or TT8 polypeptide function. In certain embodiments, reduced TT8 polypeptide expression and/or TT8 polypeptide function can be eliminated or reduced. Examples of genetic modifications include, without limitation, deletions, insertions, substitutions, translocations, inversions, duplications, and any combination thereof. Representative TT8 gene mutations include the mutations shown in SEQ ID NO:127, 129, 131, 133, 135, and 137 that result in the TT8 mutant polypeptides of SEQ ID NO:128, 130, 132, 134, 136, and 138, respectively. Representative pennycress varieties with TT8 gene mutations include the tt4-2 tt8-1, tt8-2, tt8-3, tt8-11, tt8-12, tt8-12, tt8-13, 10193, E5-542, E5-548, D5-191, D3-N25P1, E5-590, A7-191, and D3-N10 P5 varieties.

In certain embodiments, a WT pennycress TT1 coding sequence can have a sequence that deviates from the coding sequence set forth above (e.g., SEQ ID NO:27 or 30), and is referred to as an allelic variant sequence. In certain embodiments, a TT1 coding sequence allelic variant can have at least 80, at least 85, at least 90, at least 95, at least 98, or at least 99 percent sequence identity to SEQ ID NO:27 or 30. In certain embodiments, a WT pennycress TT1 polypeptide can have a sequence that deviates from the polypeptide sequence set forth above (SEQ ID NO:28 or 31), and is referred to as an allelic variant sequence. For example, a TT1 polypeptide allelic variant can have at least 80, at least 85, at least 90, at least 95, at least 98, or at least 99 percent sequence identity to SEQ ID NO:28 or 31. A TT1 polypeptide allelic variant can have one or more (e.g., 2, 3, 4, 5, 6, 7, 8, 9, or 10) amino acid modifications (e.g., substitutions) relative to SEQ ID NO:28 or 31.

In certain embodiments, pennycress seed lots having reduced fiber as described herein can include a loss-of-function modification in a TT1 encoding gene or a transgene that suppresses expression of the TT1 gene. As used herein, a loss-of-function mutation in a TT1 gene can be any modification that is effective to reduce TT1 polypeptide expression or TT1 polypeptide function. In certain embodiments, reduced TT1 polypeptide expression and/or TT1 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT1 encoding gene, a promoter thereof, or a terminator, thereof, or a transgene that suppresses expression of the TT1 gene. As used herein, a loss-of-function mutation in a TT1 gene can be any modification that is effective to reduce TT1 polypeptide expression or TT1 polypeptide function. In certain embodiments, reduced TT1 polypeptide expression and/or TT1 polypeptide function can be eliminated or reduced. Examples of genetic modifications include, without limitation, deletions, insertions, substitutions, translocations, inversions, duplications, and any combination thereof.

In certain embodiments, a WT pennycress TT4 coding sequence can have a sequence that deviates from the coding sequence set forth above (e.g., SEQ ID NO:57), and is referred to as an allelic variant sequence. In certain embodiments, a TT4 coding sequence allelic variant can have at least 80, at least 85, at least 90, at least 95, at least 98, or at least 99 percent sequence identity to SEQ ID NO:57. In certain embodiments, a WT pennycress TT4 polypeptide can have a sequence that deviates from the polypeptide sequence set forth above (SEQ ID NO:58), and is referred to as an allelic variant sequence. For example, a TT4 polypeptide allelic variant can have at least 80, at least 85, at least 90, at least 95, at least 98, or at least 99 percent sequence identity to SEQ ID NO:58. A TT4 polypeptide allelic variant can have one or more (e.g., 2, 3, 4, 5, 6, 7, 8, 9, or 10) amino acid modifications (e.g., substitutions) relative to SEQ ID NO:58.

In certain embodiments, pennycress seed lots having reduced fiber as described herein can include a loss-of-function modification in a TT4 encoding gene or a transgene that suppresses expression of the TT4 gene. As used herein, a loss-of-function mutation in a TT4 gene can be any modification that is effective to reduce TT4 polypeptide expression or TT4 polypeptide function. In certain embodiments, reduced TT4 polypeptide expression and/or TT4 polypeptide function can be eliminated or reduced. Examples of genetic modifications include, without limitation, deletions, insertions, substitutions, translocations, inversions, duplications, and any combination thereof. Representative TT4 gene mutations include the mutation shown in SEQ ID NO:119 that results in the truncated TT4 mutant polypeptide of SEQ ID NO:120. Representative TT4 gene mutations also include the mutations shown in SEQ ID NO:117 and 182 that result in the TT4 mutant polypeptides of SEQ ID NO: 118 and 183, respectively. Representative pennycress varieties with TT4 gene mutations include the tt4-1, tt4-2, tt4-3, A 7-229, E5-582 and E5-549 varieties.

In certain embodiments, a WT pennycress TT5, TT9, TT15, TT18, or TT19 coding sequence can have a sequence that deviates from the coding sequence set forth above (e.g., SEQ ID NO:60, 72, 42, 48, or 51, respectively), and is referred to as an allelic variant sequence. In certain embodiments, a TT5, TT9, TT15, TT18, or TT19 coding sequence allelic variant can have at least 80, at least 85, at least 90, at least 95, at least 98, or at least 99 percent sequence identity to SEQ ID NO:60, 72, 42, 48, or 51, respectively. In certain embodiments, a WT pennycress TT5, TT9, TT15, TT18, or TT19 polypeptide can have a sequence that deviates from the polypeptide sequence set forth above (SEQ ID NO:61, 73, 43, 49, or 52, respectively), and is referred to as an allelic variant sequence. For example, a TT5, TT9, TT15, TT18, or TT19 polypeptide allelic variant can have at least 80, at least 85, at least 90, at least 95, at least 98, or at least 99 percent sequence identity to SEQ ID NO:61, 73, 43, 49, or 52, respectively. A TT5, TT9, TT15, TT18, or TT19 polypeptide allelic variant can have one or more (e.g., 2, 3, 4, 5, 6, 7, 8, 9, or 10) amino acid modifications (e.g., substitutions) relative to SEQ ID NO:61, 73, 43, 49, or 52, respectively.

In certain embodiments, pennycress seed lots having reduced fiber as described herein can include a loss-of-function modification in a TT5, TT9, TT15, TT18, or TT19 encoding gene or a transgene that suppresses expression of the TT5, TT9, TT15, TT18, or TT19 gene. As used herein, a loss-of-function mutation in a TT5 gene can be any modification that is effective to reduce TT5, TT9, TT15, TT18, or TT19 polypeptide expression or TT5, TT9, TT15, TT18, or TT19 polypeptide function. In certain embodiments, TT5, TT9, TT15, TT18, or TT19 polypeptide expression and/or TT5, TT9, TT15, TT18, or TT19 polypeptide function can be eliminated or reduced. Examples of genetic modifications include, without limitation, deletions, insertions, substitutions, translocations, inversions, duplications, and any combination thereof.

In certain embodiments, a WT pennycress TT6 coding sequence can have a sequence that deviates from the coding sequence set forth above (e.g., SEQ ID NO:63), and is referred to as an allelic variant sequence. In certain embodiments, a TT6 coding sequence allelic variant can have at least 80, at least 85, at least 90, at least 95, at least 98, or at least 99 percent sequence identity to SEQ ID NO:63. In certain embodiments, a WT pennycress TT6 polypeptide can have a sequence that deviates from the polypeptide sequence set forth above (SEQ ID NO:64), and is referred to as an allelic variant sequence. For example, a TT6 polypeptide allelic variant can have at least 80, at least 85, at least 90, at least 95, at least 98, or at least 99 percent sequence identity to SEQ ID NO:64. A TT6 polypeptide allelic variant can have one or more (e.g., 2, 3, 4, 5, 6, 7, 8, 9, or 10) amino acid modifications (e.g., substitutions) relative to SEQ ID NO:64.

In certain embodiments, pennycress seed lots having reduced fiber as described herein can include a loss-of-function modification in a TT6 encoding gene or a transgene that suppresses expression of the TT6 gene. As used herein, a loss-of-function mutation in a TT6 gene can be any modification that is effective to reduce TT6 polypeptide expression or TT6 polypeptide function. In certain embodiments, reduced TT6 polypeptide expression and/or TT6 polypeptide function can be eliminated or reduced. Examples of genetic modifications include, without limitation, deletions, insertions, substitutions, translocations, inversions, duplications, and any combination thereof. Representative TT6 gene mutations include the mutation shown in SEQ ID NO:121 that results in the TT6 mutant polypeptide of SEQ ID NO:122. Representative pennycress varieties with TT6 gene mutations mutants include the tt6-1 and AX17 varieties. Representative TT6 gene mutations also include the mutation shown in SEQ ID NO:123 that results in the TT6 mutant polypeptide of SEQ ID NO:124. Representative pennycress varieties with TT6 gene mutations mutants also include the tt6-1, tt6-2 and Q36 varieties.

In certain embodiments, a WT pennycress TT7 coding sequence can have a sequence that deviates from the coding sequence set forth above (e.g., SEQ ID NO:66), and is referred to as an allelic variant sequence. In certain embodiments, a TT7 coding sequence allelic variant can have at least 80, at least 85, at least 90, at least 95, at least 98, or at least 99 percent sequence identity to SEQ ID NO:66. In certain embodiments, a WT pennycress TT7 polypeptide can have a sequence that deviates from the polypeptide sequence set forth above (SEQ ID NO:67), and is referred to as an allelic variant sequence. For example, a TT7 polypeptide allelic variant can have at least 80, at least 85, at least 90, at least 95, at least 98, or at least 99 percent sequence identity to SEQ ID NO:67. A TT7 polypeptide allelic variant can have one or more (e.g., 2, 3, 4, 5, 6, 7, 8, 9, or 10) amino acid modifications (e.g., substitutions) relative to SEQ ID NO:67.

In certain embodiments, pennycress seed lots having reduced fiber as described herein can include a loss-of-function modification in a TT7 encoding gene or a transgene that suppresses expression of the TT7 gene. As used herein, a loss-of-function mutation in a TT7 gene can be any modification that is effective to reduce TT7 polypeptide expression or TT7 polypeptide function. In certain embodiments, reduced TT7 polypeptide expression and/or TT7 polypeptide function can be eliminated or reduced. Examples of genetic modifications include, without limitation, deletions, insertions, substitutions, translocations, inversions, duplications, and any combination thereof. Representative TT7 gene mutations include the mutation shown in SEQ ID NO:125 that results in the TT7 mutant polypeptide of SEQ ID NO:126. Representative pennycress varieties with TT7 gene mutations include the tt7-1, A7-3, E5-586, E5-484 P15, and E5-484 P5 varieties.

In certain embodiments, a WT pennycress TTG1 coding sequence can have a sequence that deviates from the coding sequence set forth above (e.g., SEQ ID NO:75), and is referred to as an allelic variant sequence. In certain embodiments, a TTG1 coding sequence allelic variant can have at least 80, at least 85, at least 90, at least 95, at least 98, or at least 99 percent sequence identity to SEQ ID NO:75. In certain embodiments, a WT pennycress TTG1 polypeptide can have a sequence that deviates from the polypeptide sequence set forth above (SEQ ID NO:76), and is referred to as an allelic variant sequence. For example, a TTG1 polypeptide allelic variant can have at least 80, at least 85, at least 90, at least 95, at least 98, or at least 99 percent sequence identity to SEQ ID NO:28 or 31. A TTG1 polypeptide allelic variant can have one or more (e.g., 2, 3, 4, 5, 6, 7, 8, 9, or 10) amino acid modifications (e.g., substitutions) relative to SEQ ID NO:76.

In certain embodiments, pennycress seed lots having reduced fiber as described herein can include a loss-of-function (LOF) modification in a TTG1 encoding gene or a transgene that suppresses expression of the TTG1 gene. As used herein, a loss-of-function mutation in a TTG1 gene can be any modification that is effective to reduce TTG1 polypeptide expression or TTG1 polypeptide function. In certain embodiments, reduced TTG1 polypeptide expression and/or TTG1 polypeptide function can be eliminated or reduced. Examples of genetic modifications include, without limitation, deletions, insertions, substitutions, translocations, inversions, duplications, and any combination thereof. In certain embodiments, a LOF mutation in a TTG1 gene can comprise a 21 bp deletion in the TTG1 coding sequence as shown in SEQ ID NO:165. In other embodiments, a LOF mutation in a TTG1 gene can comprise ttg1-1 and ttg1-2 mutant alleles having single nucleotide substitutions that result in the substitution of a conserved amino acid residue in the TTG protein (SEQ ID NOs:167-170). Representative TTG1 gene mutations thus include the mutations shown in SEQ ID NO:165, 167, and 169 that result in the TTG1 mutant polypeptides of SEQ ID NO:166, 1268, and 170, respectively. Representative pennycress varieties with TTG1 gene mutations include the Y1067, Y1126, ttg1-1, E5-544, ttg1-2, and A7-187 varieties.

In certain embodiments, a WT pennycress TT10 coding sequence can have a sequence that deviates from the coding sequence set forth above (e.g., SEQ ID NO:33), and is referred to as an allelic variant sequence. In certain embodiments, a TT10 coding sequence allelic variant can have at least 80, at least 85, at least 90, at least 95, at least 98, or at least 99 percent sequence identity to SEQ ID NO:33. In certain embodiments, a WT pennycress TT10 polypeptide can have a sequence that deviates from the polypeptide sequence set forth above (SEQ ID NO:34), and is referred to as an allelic variant sequence. For example, a TT10 polypeptide allelic variant can have at least 80, at least 85, at least 90, at least 95, at least 98, or at least 99 percent sequence identity to SEQ ID NO:34. A TT10 polypeptide allelic variant can have one or more (e.g., 2, 3, 4, 5, 6, 7, 8, 9, or 10) amino acid modifications (e.g., substitutions) relative to SEQ ID NO:34.

In certain embodiments, pennycress seed lots having reduced fiber as described herein can include a loss-of-function modification in a TT10 encoding gene or a transgene that suppresses expression of the TT10 gene. As used herein, a loss-of-function mutation in a TT10 gene can be any modification that is effective to reduce TT10 polypeptide expression or TT10 polypeptide function. In certain embodiments, reduced TT10 polypeptide expression and/or TT10 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT10 encoding gene or a transgene that suppresses expression of the TT10 gene. As used herein, a loss-of-function mutation in a TT10 gene can be any modification that is effective to reduce TT10 polypeptide expression or TT10 polypeptide function. In certain embodiments, reduced TT10 polypeptide expression and/or TT10 polypeptide function can be eliminated or reduced. Examples of genetic modifications include, without limitation, deletions, insertions, substitutions, translocations, inversions, duplications, and any combination thereof. Representative TT10 gene mutations include the mutations shown in SEQ ID NO:139, 141, 143, 145, or 147 that result in the TT10 mutant polypeptides of SEQ ID NO: 140, 142, 144, 146, or 148, respectively. Representative pennycress varieties with TT10 gene mutations include the tt10-1, tt10-2, tt10-1, tt10-12, tt10-13, E5-539, E5-543, and E5-545 varieties.

In certain embodiments, a WT pennycress TT12 coding sequence can have a sequence that deviates from the coding sequence set forth above (e.g., SEQ ID NO:36), and is referred to as an allelic variant sequence. In certain embodiments, a TT12 coding sequence allelic variant can have at least 80, at least 85, at least 90, at least 95, at least 98, or at least 99 percent sequence identity to SEQ ID NO:36. In certain embodiments, a WT pennycress TT12 polypeptide can have a sequence that deviates from the polypeptide sequence set forth above (SEQ ID NO:37), and is referred to as an allelic variant sequence. For example, a TT12 polypeptide allelic variant can have at least 80, at least 85, at least 90, at least 95, at least 98, or at least 99 percent sequence identity to SEQ ID NO:37. A TT12 polypeptide allelic variant can have one or more (e.g., 2, 3, 4, 5, 6, 7, 8, 9, or 10) amino acid modifications (e.g., substitutions) relative to SEQ ID NO:37.

In certain embodiments, pennycress seed lots having reduced fiber as described herein can include a loss-of-function modification in a TT12 encoding gene or a transgene that suppresses expression of the TT12 gene. As used herein, a loss-of-function mutation in a TT12 gene can be any modification that is effective to reduce TT12 polypeptide expression or TT12 polypeptide function. In certain embodiments, reduced TT12 polypeptide expression and/or TT12 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT12 encoding gene or a transgene that suppresses expression of the TT12 gene. As used herein, a loss-of-function mutation in a TT12 gene can be any modification that is effective to reduce TT12 polypeptide expression or TT12 polypeptide function. In certain embodiments, reduced TT12 polypeptide expression and/or TT12 polypeptide function can be eliminated or reduced. Examples of genetic modifications include, without limitation, deletions, insertions, substitutions, translocations, inversions, duplications, and any combination thereof. Representative TT12 gene mutations include the mutations shown in SEQ ID NO:149 or 151 that result in the TT12 mutant polypeptides of SEQ ID NO:150 or 152, respectively. Representative pennycress varieties with TT12 gene mutations include the tt12-1, tt12-2, A7-261, and J22 varieties.

In certain embodiments, a WT pennycress TT13 coding sequence can have a sequence that deviates from the coding sequence set forth above (e.g., SEQ ID NO:39), and is referred to as an allelic variant sequence. In certain embodiments, a TT13 coding sequence allelic variant can have at least 80, at least 85, at least 90, at least 95, at least 98, or at least 99 percent sequence identity to SEQ ID NO:39. In certain embodiments, a WT pennycress TT13 polypeptide can have a sequence that deviates from the polypeptide sequence set forth above (SEQ ID NO:40), and is referred to as an allelic variant sequence. For example, a TT13 polypeptide allelic variant can have at least 80, at least 85, at least 90, at least 95, at least 98, or at least 99 percent sequence identity to SEQ ID NO:40. A TT13 polypeptide allelic variant can have one or more (e.g., 2, 3, 4, 5, 6, 7, 8, 9, or 10) amino acid modifications (e.g., substitutions) relative to SEQ ID NO:40.

In certain embodiments, pennycress seed lots having reduced fiber as described herein can include a loss-of-function modification in a TT13 encoding gene or a transgene that suppresses expression of the TT13 gene. As used herein, a loss-of-function mutation in a TT13 gene can be any modification that is effective to reduce TT13 polypeptide expression or TT13 polypeptide function. In certain embodiments, reduced TT13 polypeptide expression and/or TT13 polypeptide function can be eliminated or reduced. Examples of genetic modifications include, without limitation, deletions, insertions, substitutions, translocations, inversions, duplications, and any combination thereof. Representative TT13 gene mutations include the mutations shown in SEQ ID NO:153, 155, or 157 that result in the TT13 mutant polypeptides of SEQ ID NO:154, 156, or 158, respectively. Representative pennycress varieties with TT13 gene mutations include the tt13-1, tt13-2, tt13-3, aha10-1, J22, and P32 E5-540 varieties.

In certain embodiments, a WT pennycress TT16 coding sequence can have a sequence that deviates from the coding sequence set forth above (e.g., SEQ ID NO:45), and is referred to as an allelic variant sequence. In certain embodiments, a TT16 coding sequence allelic variant can have at least 80, at least 85, at least 90, at least 95, at least 98, or at least 99 percent sequence identity to SEQ ID NO:45. In certain embodiments, a WT pennycress TT16 polypeptide can have a sequence that deviates from the polypeptide sequence set forth above (SEQ ID NO:46), and is referred to as an allelic variant sequence. In certain embodiments, a TT16 polypeptide allelic variant can have at least 80, at least 85, at least 90, at least 95, at least 98, or at least 99 percent sequence identity to SEQ ID NO:46. A TT16 polypeptide allelic variant can have one or more (e.g., 2, 3, 4, 5, 6, 7, 8, 9, or 10) amino acid modifications (e.g., substitutions) relative to SEQ ID NO:46.

In certain embodiments, pennycress seed lots having reduced fiber as described herein can include a loss-of-function modification in a TT16 encoding gene or a transgene that suppresses expression of the TT16 gene. As used herein, a loss-of-function mutation in a TT16 gene can be any modification that is effective to reduce TT16 polypeptide expression or TT16 polypeptide function. In certain embodiments, reduced TT16 polypeptide expression and/or TT16 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT16 encoding gene or a transgene that suppresses expression of the TT16 gene. As used herein, a loss-of-function mutation in a TT16 gene can be any modification that is effective to reduce TT16 polypeptide expression or TT16 polypeptide function. In certain embodiments, reduced TT16 polypeptide expression and/or TT16 polypeptide function can be eliminated or reduced. Examples of genetic modifications include, without limitation, deletions, insertions, substitutions, translocations, inversions, duplications, and any combination thereof. Representative TT16 gene mutations include the mutations shown in SEQ ID NO:159, 161, or 163 that result in the TT16 mutant polypeptides of SEQ ID NO:160, 162, or 164, respectively. Representative pennycress varieties with TT16 gene mutations include the tt16-1, tt16-2, and tt16-3 varieties.

In certain embodiments, a genome editing system such as a CRISPR-Cas9 system can be used to introduce one or more loss-of-function mutations into genes such as the TRANSPARENT TESTA (TT) and related genes provided herewith in Table 1 and the sequence listing that are associated with agronomically-relevant seed traits including reduced seed coat fiber, lighter-colored seed coat due to reduced proanthocyanidins content, increased protein content, and/or higher seed oil content. For example, a CRISPR-Cas9 vector can include at least one guide sequence specific to a pennycress TT2 sequence (see, e.g., SEQ ID NO:1) and/or at least one guide sequence specific to a pennycress TT8 sequence (see, e.g., SEQ ID NO:5). A Cas9 enzyme will bind to and cleave within the gene when the target site is followed by a PAM sequence. For example, the canonical SpCAS9 PAM site is the sequence 5'-NGG-3', where N is any nucleotide followed by two guanine (G) nucleotides. The Cas9 component of a CRISPR-Cas9 system designed to introduce one or more loss-of-function modifications described herein can be any appropriate Cas9. In certain embodiments, the Cas9 of a CRISPR-Cas9 system described herein can be a *Streptococcus pyogenes* Cas9 (SpCas9). One example of an SpCas9 is described in (Fauser et al., 2014).

In certain embodiments, a WT pennycress GL3 coding sequence can have a sequence that deviates from the coding sequence set forth above (e.g., SEQ ID NO:171), and is referred to as an allelic variant sequence. In certain embodiments, a GL3 coding sequence allelic variants can have at least 80, at least 85, at least 90, at least 95, at least 98, or at least 99 percent sequence identity to SEQ ID NO:171. In certain embodiments, a WT pennycress GL3 polypeptide can have a sequence that deviates from the polypeptide sequence set forth above (SEQ ID NO:172), and is referred to as an allelic variant sequence. For example, a GL3 polypeptide allelic variant can have at least 80, at least 85, at least 90, at least 95, at least 98, or at least 99 percent sequence identity to SEQ ID NO:160. A GL3 polypeptide allelic variant can have one or more (e.g., 2, 3, 4, 5, 6, 7, 8, 9, or 10) amino acid modifications (e.g., substitutions) relative to SEQ ID NO:172.

In certain embodiments, pennycress seed lots having reduced fiber as described herein can include a loss-of-function modification in a GL3 encoding gene or a transgene that suppresses expression of the GL3 gene. As used herein, a loss-of-function mutation in a GL3 gene can be any modification that is effective to reduce GL3 polypeptide expression or GL3 polypeptide function. In certain embodiments, GL3 polypeptide expression and/or GL3 polypeptide function can be eliminated or reduced. Examples of genetic modifications include, without limitation, deletions, insertions, substitutions, translocations, inversions, duplications, and any combination thereof. In certain embodiments, the GL3 mutation can comprise the coding sequence mutations of SEQ ID NO:174, 176, 178 and/or the protein sequence mutation of SEQ ID NO:175, 177, 180. Representative pennycress varieties with GL3 gene mutations include the gl3-1, gl3-2, gl3-3, E5-541, E5-559, A7-92, E5-444, A7-229, and E5-582 varieties.

In certain embodiments, a WT pennycress BAN-ANR (or BAN) coding sequence can have a sequence that deviates from the coding sequence set forth above (e.g., SEQ ID NO:9), and is referred to as an allelic variant sequence. In certain embodiments, a BAN coding sequence allelic variant can have at least 80, at least 85, at least 90, at least 95, at least 98, or at least 99 percent sequence identity to SEQ ID NO:9. In certain embodiments, a WT pennycress BAN polypeptide can have a sequence that deviates from the polypeptide sequence set forth above (SEQ ID NO:10), and is referred to as an allelic variant sequence. For example, a BAN polypeptide allelic variant can have at least 80, at least 85, at least 90, at least 95, at least 98, or at least 99 percent sequence identity to SEQ ID NO:10. A BAN polypeptide allelic variant can have one or more (e.g., 2, 3, 4, 5, 6, 7, 8, 9, or 10) amino acid modifications (e.g., substitutions) relative to SEQ ID NO:10.

In certain embodiments, pennycress seed lots having reduced fiber as described herein can include a loss-of-function modification in a BAN encoding gene or a transgene that suppresses expression of the BAN gene. As used herein, a loss-of-function mutation in a BAN gene can be any modification that is effective to reduce BAN polypeptide expression and/or BAN polypeptide function. In certain embodiments, BAN polypeptide expression and/or BAN polypeptide function can be eliminated or reduced. Examples of genetic modifications include, without limitation, deletions, insertions, substitutions, translocations, inversions, duplications, and any combination thereof. In certain embodiments, the BAN mutation can comprise the coding sequence mutation of SEQ ID NO:180 and/or the protein sequence mutation of SEQ ID NO:181. Representative pennycress varieties with BAN gene mutations include the ban-1, BJ8, and BJ8D varieties.

In certain embodiments, pennycress seeds or seed lots having reduced fiber, as well as pennycress seed meal obtained therefrom (including both defatted and non-defatted seed meal), as described herein can include a loss-of-function mutation in more than one of the genes or coding sequences set forth in Table 1. In certain embodiments, pennycress seeds or seed lots having reduced fiber can have a LOF mutation in the gene(s) and/or coding sequences of any combination of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and/or any allelic variants thereof. In certain embodiments, pennycress seed meal, including de-fatted and non-defatted forms) and having reduced fiber can comprise a detectable amount of any combination of nucleic acids having a LOF mutation in the gene(s) and/or coding sequences of any combination of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and/or any allelic variants thereof.

The LOF mutations in any of the genes or coding sequences of Table 1 can be introduced by a variety of methods. Methods for introduction of the LOF mutations include, but are not limited to, traditional mutagenesis (e.g., with EMS or other mutagens), TILLING, meganucleases, zinc finger nucleases, transcription activator-like effector nucleases, clustered regularly interspaced short palindromic repeat (CRISPR)-associated nuclease (e.g., *S. pyogenes* Cas9 and its variants, *S. aureus* Cas9 and its variants, eSpCas9, Cpf1, Cms1 and their variants) targetrons, and the like. Various tools that can be used to introduce mutations into genes have been disclosed in Guha et al. Comput Struct Biotechnol J. 2017; 15: 146-160. Methods for modifying genomes by use of Cpf1 or Csm1 nucleases are disclosed in US Patent Application Publication 20180148735, which is incorporated herein by reference in its entirety, and can be adapted for introduction of the LOF mutations disclosed herein. Methods for modifying genomes by use of CRISPR/CAS systems are disclosed in US Patent Application Publication 20180179547, which is incorporated herein by reference in its entirety, and can be adapted for introduction of the LOF mutations disclosed herein. The genome editing reagents described herein can be introduced into a pennycress plant by any appropriate method. In certain embodiments, nucleic acids encoding the genome editing reagents can be introduced into a plant cell using *Agrobacterium* or *Ensifer* mediated transformation, particle bombardment, liposome delivery, nanoparticle delivery, electroporation, polyethylene glycol (PEG) transformation, or any other method suitable for introducing a nucleic acid into a plant cell. In certain embodiments, the Site-Specific Nuclease (SSN) or other expressed gene editing reagents can be delivered as RNAs or as proteins to a plant cell and the RT, if one is used, can be delivered as DNA.

The disclosure will be further described in the following examples, which do not limit the scope of the disclosure described in the claims.

EXAMPLES

Example 1: Meal Made from Wild Type Pennycress Plants is High in Fiber, but Low in Metabolizable Energy Higher dietary fiber results in lower net energy for swine (Kil et al., 2013) and poultry (Meloche et al., 2013). It was also reported that hemicellulose displayed the strongest correlation with apparent metabolizable energy (AMEn), followed by neutral detergent fiber (NDF), total dietary fiber (TDF), and crude fiber (CF) in broilers fed corn co-products (Rochelle et al., 2011). Thus, a reduction in fiber will result in increased available energy to pigs and poultry.

When comparing mechanically expeller-pressed meals made from two USDA-developed pennycress varieties (Beecher and Ruby II) to mechanically expeller-pressed canola meal, the various fiber fractions when analyzed as crude fiber (CF), acid detergent fiber (ADF), neutral detergent fiber (NDF) and total dietary fiber (TDF) were 1.5-2 times the levels in canola meal (Table 2). Similar levels were observed when comparing different lots of pennycress meal with canola meal (Table 3). Analysis conducted by Arvegenix at University of Georgia showed similar results (Table 4).

TABLE 2

Nutrient composition of mechanically expeller-pressed canola and pennycress meals produced at Dairyland by Arvegenix in August 2015. All numbers are in percent dry weight (% DW).

| Meal Constituent | Expeller-Pressed Canola Meal | Pennycress Meal (Beecher) | Pennycress Meal (Ruby II) |
|---|---|---|---|
| Crude Protein | 38.7 | 31.3 | 31.1 |
| Either extract | 11.2 | 10.1 | 10.6 |
| Crude fiber | 10.9 | 27.1 | 27.9 |
| ADF | 18.1 | 35.6 | 33.8 |
| NDF | 22.7 | 40.5 | 36.8 |
| Total Dietary Fiber | 29.5 | 43.3 | 37.8 |

TABLE 3

Lot variation in proximate values in mechanically expeller-pressed pennycress meal, composite mechanically expeller-pressed pennycress meal blend (all produced by Arvegenix), and commercially available mechanically expeller-pressed canola (ME Canola). All numbers represent the average of duplicate analytical runs for mean and standard error measured in percent dry weight (% DW).

| | Meal Constituent Processing Date(s) | | | | | |
|---|---|---|---|---|---|---|
| | Lot 1 22 Jul. 2015 | Lot 2 23 Jul. 2015 | Lot 3 23 Jul. 2015 | Lot 4 23 Jul. 2015 | Blend* 22-27 Jul. 2015 | ME Canola N/A |
| Moisture (% FW) | 2.12 ± 0.08 | 6.10 ± 0.1 | 5.20 ± 0.01 | 4.06 ± 0.08 | 3.36 ± 0.05 | 4.41 ± 0.13 |
| Ash Content | 7.32 ± 0.06 | 7.24 ± 0.1 | 7.13 ± 0.01 | 7.17 ± 0.02 | 5.62 ± 2.38 | 6.88 ± 0.02 |
| Carbohydrates | 51.4 ± 0.07 | 50.9 ± 0.7 | 50.9 ± 0.14 | 49.7 ± 0.07 | 49.8 ± 2.26 | 40.7 ± 1.3 |
| Crude Fat | 8.99 ± 0.03 | 10.3 ± 0.01 | 10.6 ± 0.14 | 11.1 ± 0.01 | 11.6 ± 0.01 | 13.5 ± 1.5 |
| Crude Protein | 32.2 ± 0.1 | 31.6 ± 0.7 | 31.4 ± 0.1 | 32.0 ± 0.01 | 33.1 ± 0.1 | 38.9 ± 0.2 |
| Crude Fiber | 28.7 ± 1.2 | 29.5 ± 2.1 | 30.3 ± 0.2 | 28.0 ± 0.1 | 26.4 ± 0.6 | 10.9 ± 0.5 |
| Acid Detergent Fiber | 37.9 ± 0.5 | 38.7 ± 0.1 | 36.7 ± 2.8 | 36.8 ± 0.5 | 32.1 ± 0.8 | 18.25 ± 0.1 |
| Neutral Detergent Fiber | 39.8 ± 0.6 | 39.9 ± 0.1 | 39.5 ± 0.8 | 38.5 ± 0.6 | 34.8 ± 2.0 | 23.3 ± 0.2 |
| Total Dietary Fiber | 41.6 ± 1.2 | 41.2 ± 1.2 | 41.0 ± 1.0 | 39.0 ± 0.1 | 42.2 ± 7.4 | 29.7 ± 1.3 |

*The Blend sample, consisting of Lots 1-4 (~66% by weight) and Lot 5 (~33% by weight), was blended and analyzed for nutrition studies.

TABLE 4

Proximate compositions (% as is) for canola meal (CM) and pennycress meal samples.

| | CM [1] | PM [2] |
|---|---|---|
| Crude Protein | 36.7 | 32.0 |
| Fat | 11.4 | 8.61 |
| Crude Fiber | 9.27 | 19.9 |
| ADF [3] | 18.3 | 39.6 |
| NDF [4] | 22.7 | 43.0 |
| Ash | 6.51 | 7.57 |
| Dry Matter | 94.1 | 94.4 |

Total Metabolizable Energy (TMEn) corrected for nitrogen was measured in mechanically expeller-pressed pennycress meal and canola meal. TMEn was found to be 18.2% or 18.9% less in the pennycress meal as compared to the canola meal when fed to chickens due to the higher fiber content (Table 5) and Metabolizable Energy (ME) was 16% less in pennycress meal as compared to the canola meal when fed to pigs due to the higher fiber content (Table 6).

TABLE 5

Total metabolizable energy corrected for nitrogen (TMEn) for mechanically expeller-pressed canola and pennycress meal when fed to chickens.

| | Mech Pennycress Meal (Beecher) | Mech Canola Meal | Difference, % |
|---|---|---|---|
| Energy | Parsons 2015 | Parsons 2006 | |
| TMEn (kcal/g DM) | 2.455 | 3 | −18.17 |

TABLE 6

Concentration of digestible energy (DE) and metabolizable energy (ME) in pennycress expeller and canola expellers when fed to pigs (data[1] produced at University of Illinois).

| | Ingredients | | | |
|---|---|---|---|---|
| Item | Pennycress expellers | Canola expellers | SEM | P - value |
| DE, kcal/kg | 3,191 | 3,582 | 92.18 | 0.009 |
| DE, kcal/kg of DM | 3,536 | 3,833 | 99.43 | 0.053 |
| ME, kcal/kg | 2,652 | 3,269 | 143.98 | 0.009 |
| ME, kcal/kg of DM | 2,938 | 3,499 | 158.17 | 0.025 |

[1]Data are means of 8 observations per treatment. SEM abbreviation stands for standard error of the mean. DM abbreviation is for Dry Matter.

In summary, Beecher and Ruby II varieties of pennycress meal contain between 1.5× to 2× the fiber content as compared to similarly processed canola meal resulting in 18-19% less energy when fed to chickens and pigs. Reduction in the fiber content of pennycress to levels of those in canola should result in a significant increase in value and energy to poultry and pigs.

Example 2: Selection of Mutant Pennycress Plants Low in Fiber, High in Oil and Protein from Cultivated Isolates About 850 wildtype pennycress seed samples exhibited a dark-brown seed coat were collected. These wildtype samples were then cultivated as independent lines for over two seasons in over 10,000 unique and managed plots. Upon careful analysis of the harvests from these dark type plantings, a few individual seeds which were yellow in color were identified in only two of the 850 cultivated lines (Table 2) and selected for further propagation and breeding. Certain selected pennycress variant lines Y1067 and Y1126 were isolated from a cultivated field in Grantfork IL. Certain selected pennycress Y1126 lines were isolated from a cultivated field in Macomb IL in 2015. As no yellow pennycress seeds were reported to date, initially, the isolates were first assumed to be weed seeds from a species other than pennycress. However, upon careful evaluations of plants grown from these seeds in the greenhouse, they were positively identified as pennycress using visual (plant morphology) and molecular (PCR/sequencing) inspections. The selected Y1067 and Y1126 lines were then carefully grown as single seed isolates to produce progeny lines which consisted of 100% yellow seeds. The yellow seed coat trait in the selected Y1067 and Y1126 lines has now been confirmed to be stable for several generations in both greenhouse and field environments.

Seeds from the yellow-seeded lines (Y1067 and Y1126) were carefully bulked up and sent to an analytical lab (Dairyland Laboratories) for analysis. Upon removal of the oil using standard defatting procedure, a small amount of yellow pennycress meal was produced and determined to have an ADF level (adjusted for oil content) of 15.5% and 11.5% vs. 27.5% in wild type, demonstrating 43-58% reduction in ADF fiber. Other measurements of fiber content such as NDF and CF were also significantly (29-55%) lower in the yellow-seeded lines relative to wild type, while the protein level was significantly (~50%) higher. The composition of yellow and dark brown seeds is listed in Table 7. The yellow Y1067 and Y1126 lines have since been crossed with "regular" dark brown-seeded pennycress and demonstrated a non-reciprocal pattern of inheritance indicating that yellow seed coat is a maternally inherited trait.

TABLE 7

The composition of meal (adjusted for oil content) made from yellow and dark brown seeds (Dairyland Laboratories, Arcadia, Wisconsin).

| Pennycress line | Seed coat color | % moisture | ADF fiber | NDF fiber | Crude fiber | Protein |
|---|---|---|---|---|---|---|
| Y1067 | yellow | 6.63 | 15.5 | 22.3 | 15.5 | 32.4 |
| Y1126 | yellow | 6.38 | 11.5 | 15.2 | 9.9 | 31.9 |
| 1063 | dark brown | 7.39 | 27.2 | 30.6 | 22.6 | 21.3 |
| 1067 | dark brown | 7.29 | 26.6 | 29.8 | 19.9 | 19.8 |
| 1126 | dark brown | 6.43 | 28.4 | 33.7 | 24.7 | 24.6 |
| 1139 | dark brown | 6.50 | 26.4 | 29.8 | 19.9 | 22.4 |
| 1204 | dark brown | 6.58 | 26.3 | 28.9 | 18.7 | 20.9 |
| 1228 | dark brown | 6.30 | 28.8 | 33.8 | 25.4 | 22.1 |
| 1326 | dark brown | 6.47 | 29.2 | 32.6 | 23.4 | 21.7 |
| 2032 | dark brown | 6.16 | 24.7 | 28.8 | 17.6 | 22.1 |
| 2084 | dark brown | 6.89 | 26.0 | 29.0 | 19.4 | 22.2 |
| 2116 | dark brown | 7.16 | 30.4 | 36.2 | 24.4 | 20.1 |
| 2133 | dark brown | 6.64 | 29.6 | 34.4 | 25.0 | 21.5 |
| 2206 | dark brown | 6.69 | 25.5 | 29.4 | 18.1 | 20.7 |
| 2229 | dark brown | 6.61 | 27.1 | 32.5 | 23.0 | 21.9 |
| 2253 | dark brown | 6.42 | 24.0 | 28.3 | 17.8 | 22.5 |
| 2288 | dark brown | 6.28 | 26.6 | 33.0 | 25.5 | N/A |
| 2329 | dark brown | 6.57 | 26.6 | 31.9 | 18.8 | 20.8 |
| 2369 | dark brown | 6.05 | 23.1 | 26.7 | 17.9 | 23.2 |
| 2458 | dark brown | 6.39 | 25.4 | 29.8 | 18.8 | 22.2 |
| 2460 | dark brown | 6.49 | 30.6 | 36.3 | 26.7 | 21.2 |
| 2369 | light brown | 6.50 | 36.9 | 45.8 | 32.1 | 19.1 |
| Average | yellow | 6.51 | 13.5 | 18.7 | 12.7 | 32.2 |
| Average | dark brown | 6.59 | 27.5 | 32.1 | 22.0 | 21.6 |
| % change | yellow | Y1067 | −43% | −30% | −29% | 50% |
| % change | yellow | Y1126 | −58% | −53% | −55% | 48% |

Example 3: Identification of Mutated Gene in Pennycress Plants Low in Fiber, High in Oil and Protein from Cultivated Isolates In order to determine molecular nature of the mutations responsible for the low fiber, high oil/high protein phenotype in Y1067 and Y1126 lines, a combination of a genetic method called bulk segregant analysis (Michelmore et. al., 1991) and a next generation sequencing (NGS) method was used. In brief, for each of the yellow-seeded lines, a genetically close black-seeded relative line was identified and 200 individuals from each population were grown. They were harvested in bulk and used for DNA isolation that was subsequently used for preparation of NGS libraries and sequencing using standard Illumina technology. It was determined that Y1067 and Y1126 lines carry the same 21 bp deletion in TTG1 gene (Seq ID No. 165) by analyzing the sequencing data through comparative bioinformatics techniques. Comparative bioinformatics tools that were used in part to analyze the data are disclosed in Magwene et. al., 2011. This mutation results in a deletion of 7 amino acids in the conserved area of TTG1 protein, likely leading to a complete loss of function. The definitive nature of this 21 bp deletion was confirmed in heterologous (black ♀×yellow ♂) crosses, where only the progeny of F2 segregants carrying the described deletion displayed the yellow-seeded phenotype.

Example 4: Generation and Characterization of EMS-Mutagenized Light-Colored Seed Coat Mutant Lines BC38, BJ8, P32, J22, Q36, BD24, AX17, E5-444, E5-540, E5-541, E5-542, E5-543, E5-545, E5-547, E5-549, E5-582, E5-586, D3-N10 P5, D5-191, A7-95, A7-187 and A7-261

In addition to mutants carrying domestication enabling traits selected from natural isolates, light colored pennycress mutants were isolated from a mutant population created using chemical mutagen (EMS) using the protocol described in the Materials and Methods section below.

To identify useful domestication genes in pennycress plants, pennycress seeds were mutagenized with several different mutagens, including ethyl methanesulfonate (EMS), fast neutrons (FN) and gamma rays (□ rays). Treatment of dry plant seeds with mutagens results in the generation of distinct sets of mutations in a variety of cells in the seed. The fate of many of these cells can be followed when a mutation in one of these cells results in a visible phenotype creating a marked plant sector.

Pennycress plants exhibiting domestication enabling traits such as reduced seed coat fiber, lighter-colored seed coat due to reduced proanthocyanidins content, and/or higher seed oil content were analyzed and loss of function mutations in domestication genes were identified.

Materials and Methods

Solutions:

| | | |
|---|---|---|
| A) | 0.2M sodium phosphate monobasic ($NaH_2PO_4*H_2O$) | 6.9 g/250 mL |
| B) | 0.2M sodium phosphate dibasic ($NaH_2PO_4$ anhydrous) | 7.1 g/250 mL |

For 50 mL of 0.1 M sodium phosphate buffer at pH 7:

| | |
|---|---|
| 9.75 mL | A |
| 15.25 mL | B |
| 25.0 mL | $dH_2O$ |

0.2% EMS in buffer:

20 mL 0.1M Sodium Phosphate Buffer, pH 7

40 µL EMS liquid (Sigma #M0880-5G)

0.1 M sodium thiosulfate at pH 7.3:

12.4 g sodium thiosulfate in 500 mL

Primary Seed Surface Sterilization

Wild-type pennycress (*Thlaspi arvense*) seeds (Spring 32 ecotype) were surface sterilized for 10 minutes in a 30% bleach, 0.05% SDS solution before being rinsed 3× with sterile water. Sterilized seeds were immediately subjected to EMS treatment.

Ethyl Methane Sulfonate (EMS) Treatment of Pennycress Seeds

Sterilized pennycress seeds (41 g) were agitated in distilled water overnight. Four 250 mL Erlenmeyer flasks with 10 g seed each, and 1 g in a separate small flask as a control, were agitated. The water was decanted.

25 mLs of 0.2% EMS in 0.1M sodium phosphate buffer (pH 7) was added. The control received only phosphate buffer with no EMS. The flasks were shaken in fume hood for 18 hours. The EMS solution was decanted off into an EMS waste bottle.

To rinse the seeds, 25 ml of $dH_2O$ was added to each flask, and the flasks were shaken for 20 minutes. The rinse water was decanted into the EMS waste bottle.

To deactivate the EMS, seeds were washed for 20 minutes in 0.1M sodium thiosulfate (pH 7.3), rinsed 4 with dH2O for 15 minutes, suspended in 0.1% agarose, and germinated directly in autoclaved Reddiearth soil at a density of approximately 10 seeds per 4-inch pot.

Plant Growth Conditions

EMS-treated pennycress seeds were germinated and grown in an environmental growth chamber at 21° C., 16:8 6400K fluorescent light/dark, 50% humidity. Approximately 14 days after planting, plants were thinned and transplanted to a density of 4 plants per 4-inch pot. These $M_1$-generation plants showed telltale chlorotic leaf sectors that are indicative of a successful mutagenesis.

After dry down, these $M_1$-generation plants were catalogued and harvested. The M2- and M3-generation seeds were surface sterilized, planted and grown according to the protocols previously described.

Identification and Characterization of Light-Colored Seed Coat Mutant Lines

Light-colored seed coat mutants in the M3-generation were identified as those having mature seed coats of a lighter color relative to that of wild type. Seeds (M3-generation) from putative M2-generation mutants were planted and grown in potting soil-containing 4-inch pots in a growth chamber and the seed coat color phenotype re-assessed upon plant senescence.

Near infrared (NIR) spectroscopic analysis was used to determine the fiber content of selected seed lines to compare the obtained values to the range of fiber in control dark brown seeds. The results are presented in Table 8 of Example 5 (five light-colored lines mentioned above vs. almost one hundred control dark brown seed lines). These results indicate that ADF and NDF fiber levels in certain selected light-colored seed lines are significantly lower and are outside of the corresponding ranges found in control dark-colored seeds, while oil and protein levels are often higher and are also outside of their corresponding ranges found in dark-colored control seeds.

EMS mutagenesis typically introduces single-nucleotide transition mutations (e.g. G to A, or C to T) into plant genomes. To identify the causative mutations in selected light seed colored plants, DNA was extracted from mutant and wild-type leaf tissue and used for NGS and comparative bioinformatics analysis as described in Example 3. Underlying gene and protein mutations were identified (Table 1, SEQ ID NO: 117-132, 139-142, 149-158, 167-170 and 174-181) and confirmed using standard Sanger sequencing and genetic segregation analyses.

Example 5: Generation of Transgenic Pennycress Lines Harboring the CRISPR-Cas9 or CRISPR-Cpf1 or CRISPR-Cms1 Constructs Materials and Methods Construction of the *Thlaspi arvense* (Pennycress) TT1, TT2, TT8, TT10, and TT16 Gene-Specific CRISPR Genome-Editing Vectors.

The constructs and cloning procedures for generation of the *Thlaspi arvense* (pennycress) TT2-, TT8-, TT10-, and TT16-specific CRISPR-SpCas9, CRISPR-SaCas9, CRISPR-Cpf1 and CRISPR-Cms1 constructs are described in Fauser et. al., 2014, Steinert et. al., 2015 and Begemann et. al., 2017.

The plant selectable markers (formerly NPT) in the original pDe-SpCas9 and pDe-SaCas9 binary vectors were swapped for hygromycin resistance (Hygromycin phosphotransferase (HPT) gene.

Complementary oligo pairs described in Table 1 (Seq ID NO: 89-116) were synthesized, annealed to create the 20-mer protospacers specific to the designated pennycress genes and used for construction of gene-editing binary vectors as described (Fauser et. al., 2014, Steinert et. al., 2015 and Begemann et. al., 2017).

Vector Transformation into *Agrobacterium*

The pDe-SpCas9_Hyg and pDe-SaCas9_Hyg and related vectors containing the CRISPR nuclease and guide RNA cassettes with the corresponding sequence-specific protospacers were transformed into *Agrobacterium tumefaciens* strain GV3101 using the freeze/thaw method (Holsters et al, 1978).

The transformation product was plated on 1% agar Luria Broth (LB) plates with gentamycin (50 μg/ml) rifampicin (50 μg/ml) and spectinomycin (75 μg/ml). Single colonies were selected after two days of growth at 28° C.

Plant Transformation—Pennycress Floral Dip

DAY ONE: 5 mL of LB+5 uL with appropriate antibiotics (Rifampin (50), Spectinomycin (75), and/or Gentamycin (50)) were inoculated with *Agrobacterium*. The cultures were allowed to grow, with shaking, overnight at 28° C.

DAY TWO (early morning): 25 mL of Luria Broth+25 uL appropriate antibiotics (Rifampin (50), Spectinomycin (75), and/or Gentamycin (50)) were inoculated with the initial culture from day one. The cultures were allowed to grow, with shaking, overnight at 28° C.

DAY TWO (late afternoon): 250 mL of Luria Broth+250 uL appropriate antibiotic (Rifampin (50), Spectinomycin (75), and/or Gentamycin (50)) were inoculated with 25 mL culture. The cultures were allowed to grow, with shaking, overnight at 28° C.

DAY THREE: When the culture had grown to an OD600 of ~1.0, the culture was decanted into large centrifuge tubes and spun at 3,500 RPM at room temperature for 10 minutes to pellet cells. The supernatant was decanted off. The pelleted cells were resuspended in a solution of 5% sucrose and 0.02% Silwet L-77. The suspension was poured into clean beakers and placed in a vacuum chamber.

Newly flowering inflorescences of pennycress were fully submerged into the beakers and subjected to a negative vacuum pressure of 25-30 PSI for 10 minutes.

After pennycress plants were dipped, they were covered loosely with Saran wrap to maintain humidity and kept in the dark overnight before being uncovered and placed back in the environmental growth chamber.

Screening Transgenic Plants and Growth Condition

Pennycress seeds were surface sterilized by first rinsing in 70% ethanol then incubating 10 minutes in a 30% bleach, 0.05% SDS solution before being rinsed two times with sterile water and plated on selective plates (0.8% agar/one half-strength Murashige and Skoog salts with hygromycin B selection (40 U/ml) or glufosinate (18 μg/ml). Plates were wrapped in parafilm and kept in an environmental growth chamber at 21° C., 16:8 day/night for 8 days until antibiotic or herbicide selection was apparent.

Surviving hygromycin or glufosinate-resistant $T_1$-generation seedlings were transplanted into autoclaved Reddiearth soil mix and grown in an environmental growth chamber set to 16-hour days/8-hour nights at 21° C. and 50% humidity. $T_2$-generation seeds were planted, and ~1.5 mg of leaf tissue from each $T_2$-generation plant was harvested with a 3-mm hole punch, then processed using the Thermo Scientific™ Phire™ Plant Direct PCR Kit as per manufacturer's instructions. Subsequently, PCR reactions for genotyping (20 μl volume) were performed.

Gene editing using Cas9, Cpf1 and Cms1 nucleases typically introduces a double-stranded break into a targeted genome area in close proximity to the nuclease's PAM site. During non-homologous end-joining process (NHEJ), these double-stranded breaks are repaired, often resulting in introduction of indel-type mutations into targeted genomes. To identify plants with small indels in genes of interest, standard Sanger sequencing or T7 endonuclease assay (Guschin et. al., 2010) were employed. Sequence analysis revealed that multiple guide RNAs/CRISPR nuclease combinations were effective in generating loss-of-function (LOF) mutations in targeted genes, as described in Table 1 (Seq ID Nos. 133-138, 143-148, 159-164). Plants carrying LOF mutations were grown to homozygosity, and the phenotypes were confirmed using visual and analytical assessments.

Example 6. Selected Yellow-Seeded Pennycress Mutants Demonstrate Significant Reductions in Fiber and Fiber Components Homozygous light seed coat-colored mutants obtained from screening EMS populations or from gene editing were bulked up in the greenhouse or in the fields and their fiber composition was assessed using standard methods below at Dairyland Laboratories (Arcadia, Wisconsin).

ADF (Acid Detergent Fiber)

Fiber (Acid Detergent) and Lignin in Animal Feed: AOAC Official Method 973.18 (1996) (Modification includes use of Sea Sand for filter aid as needed).

Crude Fiber

Fiber (Crude) in Animal Feed and Pet Food (Fritted Glass Crucible Method): AOAC Official Method 978.10 ch4 p28 (1979) (Modification includes use of Sea Sand for filter aid as needed).

Lignin

Fiber (Acid Detergent) and Lignin in Animal Feed: AOAC Official Method 973.18 (1996) (Modification includes use of Sea Sand for filter aid as needed, use of Whatman GF/C filter paper to collect residue, and holding crucibles in beakers to cover fiber with 72% sulfuric acid for full time required).

NDF (Neutral Detergent Fiber)

Amylase-Treated Neutral Detergent Fiber in Feeds AOAC Official Method 2002.04 2005 (Modification includes use of Sea Sand for filter aid and Whatman GF/C filter paper for residue collection).

The results presented in Table 8 indicate that majority of the light-colored mutants have 35-60% less fiber and its components relative to WT plants (MN106 and Beecher).

TABLE 8

Composition of sixteen selected light-colored pennycress mutants vs. two wild type pennycress accessions measured using wet chemistry methods at Dairyland Laboratories (Arcadia, Wisconsin). The numbers represent percent of dry matter (% DM).

| No. | Name/ID | Mutated Gene/Allele | Seed Coat | Moisture | Crude Protein | ADF | aNDF | Crude fiber |
|---|---|---|---|---|---|---|---|---|
| 1 | Y1126 | ttg1 | light | 7.6 | 28.1 | 13.9 | 16.6 | 9.6 |
| 2 | E5-543 | tt10-1 | light | 7.4 | 26.5 | 15.3 | 19.7 | 14.4 |
| 3 | E5-542 | tt8 | light | 7.5 | 30.6 | 9.1 | 17.5 | 13.8 |
| 4 | E5-547 | tt2-1 | light | 6.7 | 28.1 | 12.8 | 17.2 | 12.1 |
| 5 | A7-63 | N/A | light | 6.9 | 28.7 | 14.6 | 20.5 | 11.8 |
| 6 | A7-187 | ttg1-2 | light | 7.5 | 29.2 | 12.9 | 17.8 | 13.1 |
| 7 | E5-559 | gl3-1 | light | 7.0 | 26.3 | 21.8 | 32.5 | 22.5 |
| 8 | E5-539 | tt10-1 | light | 7.5 | 27.3 | 13.9 | 17.6 | 12.0 |
| 9 | A7-261 | tt12-1 | light | 6.6 | 27.2 | 14.9 | 19.5 | 13.6 |
| 10 | E5-549 | tt4-2 | light | 7.4 | 26.5 | 16.2 | 22.3 | 12.7 |
| 11 | E5-444 | gl3-2 | light | 7.8 | 27.7 | 14.6 | 17.5 | 10.8 |
| 12 | D5-191 | tt8-2 | light | 6.5 | 26.6 | 13.3 | 17.9 | 13.0 |
| 13 | E5-586 | tt7-1 | light | 7.4 | 27.9 | 12.6 | 17.2 | 11.3 |
| 14 | E5-542 | tt8-3 | light | 6.9 | 26.0 | 13.5 | 19.9 | 16.2 |
| 15 | E5-541 | gl3-1 | light | 6.8 | 27.2 | 15.1 | 19.2 | 13.2 |
| 16 | E5-545 | tt10-2 | light | 6.7 | 24.5 | 14.8 | 18.5 | 12.9 |
| 17 | MN106 | WT | dark | 6.7 | 25.2 | 22.7 | 25.8 | 16.1 |
| 18 | Beecher | WT | dark | 6.5 | 25.6 | 21.1 | 23.9 | 15.4 |
| 19 | MIN of | light-colored | % of DM | 6.5 | 24.5 | 9.1 | 16.6 | 9.6 |
| 20 | MAX of | light-colored | % of DM | 7.8 | 30.6 | 21.8 | 32.5 | 22.5 |
| 21 | MIN of | light-colored | % of WT | 97% | 97% | 40% | 64% | 60% |

Example 7. Selected Yellow-Seeded Pennycress Mutants Demonstrate Significant Increases in Protein and Oil Composition

TABLE 9

Composition of five selected light-colored pennycress mutants vs. 95 wild type pennycress accessions harvested at various locations across USA and measured using NIR spectroscopy analysis.

| No. | Accession | Color | % Moisture | % Erucic Acid | % Total Oil | Sinigrin μmol/g | % ADF Fiber | % NDF Fiber | % Protein |
|---|---|---|---|---|---|---|---|---|---|
| 1 | Y1067 | Yellow | 7.2 | 25.1 | 37.6 | 149.1 | 15.5 | 16.2 | 32.5 |
| 2 | Y1126 | Yellow | 8.3 | 31.1 | 43.3 | 49.9 | 11.5 | 14.9 | 31.8 |
| 3 | P32 | Light brown | 6.0 | 39.5 | 36.4 | 180.2 | 13.5 | 18.0 | 29.1 |
| 4 | Q36.C | Brown | 6.1 | 22.8 | 33.0 | 196.2 | 19.7 | 24.1 | 25.0 |
| 5 | BJ.8 | Tan | 7.0 | 39.0 | 49.0 | 107.4 | 10.0 | 13.1 | 33.6 |
| 6 | 1126 | Dark brown | 10.2 | 33.7 | 30.8 | 59.2 | 27.6 | 31.2 | 22.2 |
| 7 | Spring32 (WT) | Dark brown | 8.6 | 34.8 | 30.6 | 116.0 | 27.6 | 32.2 | 22.0 |
| 8 | 1069 | Dark brown | 8.8 | 32.9 | 29.4 | 103.4 | 37.8 | 35.1 | 22.6 |
| 9 | 1096 | Dark brown | 8.4 | 31.3 | 26.0 | 128.7 | 32.9 | 34.2 | 20.1 |
| 10 | 2139 | Dark brown | 8.7 | 29.6 | 23.1 | 147.0 | 29.0 | 33.9 | 20.4 |
| 11 | 2057 | Dark brown | 8.2 | 31.0 | 23.7 | 157.6 | 31.5 | 33.8 | 18.7 |
| 12 | 1126 | Dark brown | 7.8 | 29.2 | 30.6 | 117.4 | 34.7 | 31.1 | 20.8 |
| 13 | 2066 | Dark brown | 8.7 | 36.8 | 35.2 | 83.0 | 26.2 | 29.1 | 22.4 |
| 14 | 2142 | Dark brown | 8.9 | 32.6 | 32.5 | 85.5 | 29.8 | 32.7 | 20.4 |
| 15 | 2170 | Dark brown | 8.8 | 31.8 | 29.4 | 118.4 | 30.6 | 31.3 | 22.3 |
| 16 | 2055 | Dark brown | 8.7 | 30.8 | 27.6 | 87.1 | 36.1 | 34.0 | 21.1 |
| 17 | 2065 | Dark brown | 9.0 | 27.8 | 29.7 | 127.6 | 30.0 | 33.9 | 19.7 |

TABLE 9-continued

Composition of five selected light-colored pennycress mutants vs. 95 wild type pennycress accessions harvested at various locations across USA and measured using NIR spectroscopy analysis.

| | | | | | | | | | |
|---|---|---|---|---|---|---|---|---|---|
| 18 | 2110 | Dark brown | 9.0 | 27.3 | 31.4 | 85.3 | 35.4 | 33.1 | 20.5 |
| 19 | 2154 | Dark brown | 8.7 | 32.0 | 34.6 | 58.1 | 33.2 | 32.2 | 20.1 |
| 20 | 2195 | Dark brown | 8.6 | 32.3 | 34.3 | 61.6 | 29.2 | 32.5 | 19.1 |
| 21 | 1311 | Dark brown | 8.3 | 34.8 | 30.1 | 126.6 | 26.7 | 28.4 | 25.0 |
| 22 | 2003 | Dark brown | 8.3 | 33.4 | 25.4 | 79.5 | 29.6 | 29.6 | 20.7 |
| 23 | 1065 | Dark brown | 8.7 | 34.2 | 29.6 | 112.5 | 29.2 | 31.7 | 23.5 |
| 24 | 2045 | Dark brown | 8.8 | 33.9 | 25.3 | 122.0 | 33.0 | 31.9 | 22.4 |
| 25 | 2128 | Dark brown | 8.5 | 34.6 | 29.5 | 129.3 | 23.4 | 27.2 | 25.2 |
| 26 | 2182 | Dark brown | 8.4 | 32.7 | 33.7 | 81.6 | 28.2 | 29.6 | 22.2 |
| 27 | 2030 | Dark brown | 7.7 | 31.3 | 33.2 | 105.8 | 24.0 | 27.7 | 20.3 |
| 28 | 2034 | Dark brown | 8.1 | 32.4 | 29.6 | 116.9 | 26.6 | 30.0 | 22.9 |
| 29 | 2072 | Dark brown | 8.2 | 30.2 | 27.8 | 97.3 | 30.8 | 31.0 | 21.3 |
| 30 | 2145 | Dark brown | 8.2 | 33.1 | 29.7 | 119.0 | 23.3 | 28.6 | 24.1 |
| 31 | 1027 | Dark brown | 8.0 | 29.4 | 30.6 | 110.6 | 30.5 | 29.1 | 23.4 |
| 32 | 1323 | Dark brown | 8.5 | 31.2 | 28.2 | 115.3 | 33.0 | 32.2 | 23.3 |
| 33 | 1340 | Dark brown | 8.0 | 32.3 | 29.2 | 129.8 | 28.5 | 29.4 | 22.9 |
| 34 | 2129 | Dark brown | 8.0 | 33.1 | 29.6 | 109.4 | 21.5 | 27.4 | 24.1 |
| 35 | 2167 | Dark brown | 8.5 | 28.6 | 34.8 | 71.8 | 34.4 | 31.7 | 21.5 |
| 36 | 2171 | Dark brown | 8.0 | 33.4 | 28.6 | 108.1 | 24.5 | 28.5 | 20.7 |
| 37 | 1054 | Dark brown | 8.3 | 34.0 | 29.0 | 128.4 | 29.4 | 31.3 | 22.2 |
| 38 | 1092 | Dark brown | 8.3 | 36.6 | 29.8 | 131.6 | 27.2 | 30.1 | 22.6 |
| 39 | 2196 | Dark brown | 9.2 | 32.4 | 32.5 | 113.1 | 22.7 | 30.7 | 21.2 |
| 40 | 2183 | Dark brown | 8.1 | 33.4 | 28.0 | 111.7 | 27.0 | 30.0 | 21.2 |
| 41 | 2020 | Dark brown | 8.5 | 32.5 | 31.9 | 128.1 | 22.5 | 29.0 | 21.4 |
| 42 | 2123 | Dark brown | 8.5 | 34.9 | 30.9 | 122.3 | 22.7 | 27.1 | 25.3 |
| 43 | 1296 | Dark brown | 8.0 | 36.2 | 30.6 | 113.3 | 25.9 | 28.3 | 23.7 |
| 44 | 2062 | Dark brown | 8.8 | 31.6 | 26.7 | 117.5 | 29.5 | 31.7 | 22.2 |
| 45 | 1167 | Dark brown | 8.0 | 34.0 | 28.3 | 121.0 | 31.7 | 30.4 | 22.3 |
| 46 | 1359 | Dark brown | 7.7 | 33.4 | 29.4 | 125.9 | 25.2 | 27.2 | 22.9 |
| 47 | 1265 | Dark brown | 8.4 | 34.6 | 32.2 | 78.0 | 29.6 | 30.7 | 22.8 |
| 48 | 1331 | Dark brown | 8.0 | 37.6 | 29.0 | 112.3 | 27.0 | 28.3 | 23.1 |
| 49 | 2002 | Dark brown | 7.9 | 33.1 | 27.4 | 59.8 | 28.6 | 30.0 | 20.6 |
| 50 | 2009 | Dark brown | 7.4 | 35.9 | 32.3 | 67.1 | 26.7 | 26.9 | 22.7 |
| 51 | 2079 | Dark brown | 8.0 | 37.5 | 29.3 | 126.2 | 21.0 | 28.3 | 22.5 |
| 52 | 2092 | Dark brown | 9.1 | 32.3 | 33.4 | 89.7 | 27.6 | 33.4 | 21.0 |
| 53 | 2107 | Dark brown | 8.8 | 35.8 | 29.7 | 103.4 | 21.3 | 28.8 | 21.5 |
| 54 | 2113 | Dark brown | 8.8 | 31.9 | 33.7 | 83.4 | 28.5 | 30.3 | 23.0 |
| 55 | 2117 | Dark brown | 8.2 | 30.8 | 26.6 | 99.0 | 23.7 | 29.5 | 20.9 |

TABLE 9-continued

Composition of five selected light-colored pennycress mutants vs. 95 wild type pennycress accessions harvested at various locations across USA and measured using NIR spectroscopy analysis.

| | | | | | | | | | |
|---|---|---|---|---|---|---|---|---|---|
| 56 | 2132 | Dark brown | 8.0 | 36.1 | 29.2 | 121.4 | 25.1 | 27.9 | 23.4 |
| 57 | 2137 | Dark brown | 7.9 | 32.9 | 28.8 | 115.6 | 27.7 | 28.8 | 22.2 |
| 58 | 2140 | Dark brown | 8.7 | 32.0 | 27.5 | 103.9 | 24.7 | 31.2 | 20.7 |
| 59 | 2008 | Dark brown | 7.7 | 35.0 | 29.7 | 75.5 | 23.8 | 26.3 | 22.1 |
| 60 | 2102 | Dark brown | 7.9 | 18.3 | 24.0 | 193.8 | 35.2 | 32.3 | 16.4 |
| 61 | 2021 | Dark brown | 9.0 | 30.5 | 28.1 | 127.7 | 26.4 | 33.3 | 19.7 |
| 62 | 2114 | Dark brown | 9.4 | 30.6 | 30.1 | 114.7 | 27.1 | 32.2 | 20.3 |
| 63 | 1022 | Dark brown | 8.7 | 33.8 | 28.4 | 137.0 | 26.6 | 30.8 | 22.3 |
| 64 | 2051 | Dark brown | 9.4 | 34.8 | 31.7 | 73.9 | 30.1 | 32.7 | 21.3 |
| 65 | 2073 | Dark brown | 9.8 | 33.5 | 27.6 | 132.3 | 27.3 | 34.0 | 20.2 |
| 66 | 2078 | Dark brown | 7.6 | 37.1 | 29.2 | 74.5 | 22.3 | 27.4 | 22.0 |
| 67 | 2209 | Dark brown | 8.1 | 31.0 | 28.4 | 104.2 | 27.3 | 29.2 | 22.1 |
| 68 | 2210 | Dark brown | 8.6 | 32.5 | 33.4 | 86.3 | 24.9 | 29.4 | 20.5 |
| 69 | 1332 | Dark brown | 7.9 | 36.5 | 30.1 | 113.4 | 24.1 | 26.9 | 23.8 |
| 70 | 2095 | Dark brown | 8.6 | 31.0 | 27.4 | 114.6 | 30.7 | 31.2 | 22.8 |
| 71 | 2143 | Dark brown | 9.0 | 29.1 | 33.1 | 97.8 | 23.7 | 32.3 | 21.5 |
| 72 | 2156 | Dark brown | 8.1 | 35.5 | 28.5 | 144.4 | 22.1 | 28.7 | 23.7 |
| 73 | 1235 | Dark brown | 8.1 | 32.7 | 27.8 | 148.3 | 27.4 | 28.4 | 23.0 |
| 74 | 2058 | Dark brown | 8.2 | 31.1 | 26.1 | 142.6 | 26.3 | 28.8 | 23.4 |
| 75 | 2151 | Dark brown | 8.7 | 29.5 | 33.2 | 68.4 | 37.3 | 34.1 | 20.4 |
| 76 | 1002 | Dark brown | 8.1 | 29.2 | 26.8 | 141.7 | 28.7 | 31.1 | 22.1 |
| 77 | 1218 | Dark brown | 8.0 | 23.9 | 26.6 | 120.2 | 37.9 | 34.9 | 18.3 |
| 78 | 1345 | Dark brown | 8.0 | 36.1 | 32.5 | 99.1 | 27.4 | 27.9 | 24.5 |
| 79 | 1366 | Dark brown | 8.0 | 36.5 | 31.3 | 115.1 | 26.9 | 28.2 | 22.4 |
| 80 | 2185 | Dark brown | 9.1 | 32.9 | 31.7 | 97.0 | 28.1 | 32.4 | 21.5 |
| 81 | 2221 | Dark brown | 7.7 | 35.8 | 29.9 | 123.2 | 23.3 | 26.9 | 23.2 |
| 82 | 2332 | Dark brown | 8.2 | 30.6 | 28.7 | 70.4 | 34.0 | 31.9 | 20.9 |
| 8. | 1149 | Dark brown | 8.2 | 31.7 | 29.8 | 114.2 | 30.5 | 31.0 | 23.1 |
| 84 | 1001 | Dark brown | 7.7 | 30.4 | 30.7 | 124.6 | 29.6 | 28.2 | 23.7 |
| 85 | 1082 | Dark brown | 8.1 | 30.8 | 30.7 | 85.6 | 33.3 | 30.2 | 22.4 |
| 86 | 2286 | Dark brown | 8.5 | 34.2 | 34.3 | 74.7 | 27.2 | 30.7 | 22.8 |
| 87 | 2298 | Dark brown | 8.0 | 33.6 | 27.5 | 106.8 | 25.2 | 30.6 | 20.8 |
| 88 | 2304 | Dark brown | 7.6 | 33.5 | 29.7 | 108.0 | 23.8 | 26.9 | 23.0 |
| 89 | 2308 | Dark brown | 8.7 | 36.0 | 29.0 | 113.9 | 27.0 | 30.0 | 22.8 |
| 90 | 2318 | Dark brown | 9.2 | 31.4 | 32.5 | 90.6 | 28.8 | 32.3 | 21.5 |
| 91 | 2319 | Dark brown | 9.0 | 27.4 | 32.2 | 71.6 | 31.1 | 35.1 | 20.2 |
| 92 | 2332 | Dark brown | 8.8 | 25.0 | 22.9 | 169.3 | 26.7 | 31.5 | 17.0 |
| 93 | 2338 | Dark brown | 8.0 | 24.5 | 24.1 | 145.7 | 20.8 | 30.9 | 15.3 |

TABLE 9-continued

Composition of five selected light-colored pennycress mutants vs. 95 wild type pennycress accessions harvested at various locations across USA and measured using NIR spectroscopy analysis.

| | | Color | % Moisture | % Erucic Acid | % Total Oil | Sinigrin μmol/g | % ADF Fiber | % NDF Fiber | % Protein |
|---|---|---|---|---|---|---|---|---|---|
| 94 | 2346 | Dark brown | 8.3 | 31.7 | 27.6 | 140.9 | 27.6 | 30.4 | 22.8 |
| 95 | 2347 | Dark brown | 8.8 | 31.0 | 34.4 | 78.9 | 27.8 | 30.5 | 22.9 |
| 96 | 2349 | Dark brown | 9.6 | 31.2 | 32.3 | 88.0 | 26.6 | 32.2 | 21.7 |
| 97 | 2354 | Dark brown | 8.3 | 28.9 | 27.2 | 84.5 | 30.4 | 30.1 | 21.7 |
| 98 | 2359 | Dark brown | 7.6 | 29.3 | 27.7 | 101.4 | 28.2 | 30.2 | 20.3 |
| 99 | 2362 | Dark brown | 8.7 | 30.5 | 28.6 | 86.7 | 30.1 | 31.3 | 22.7 |
| 100 | 2364 | Dark brown | 9.2 | 31.4 | 32.2 | 89.6 | 28.9 | 34.4 | 21.6 |

| | Color | % Moisture | % Erucic Acid | % Total Oil | Sinigrin μmol/g | % ADF Fiber | % NDF Fiber | % Protein |
|---|---|---|---|---|---|---|---|---|
| Minimum | Light | 6.0 | 22.8 | 33.0 | 49.9 | 10.0 | 13.1 | 25.0 |
| Minimum | Dark | 7.4 | 18.3 | 22.9 | 58.1 | 20.8 | 26.3 | 15.3 |
| Maximum | Light | 8.3 | 39.5 | 49 | 196.2 | 19.7 | 24.1 | 33.6 |
| Maximum | Dark | 10.2 | 37.6 | 35.2 | 193.8 | 37.9 | 35.1 | 25.3 |

Example 8. Composition and Performance of Pennycress Meal Produced from Y1126 Yellow-Seeded Mutant is Superior Relative to Meal Made from Black-Seeded Pennycress and is Similar to Canola Meal Approximately 13 lbs each of cleaned Y1126 yellow-seeded mutant and regular black-seeded pennycress seed were processed into oil and hexane-extracted meal at the Texas A&M Engineering Experiment Station's Process Engineering Research & Development Center (College Station, TX). The material was conditioned using a single deck of the French cooker for approximately 5 minutes at 100° F.±10° F. Conditioned seed was processed using a Ferrel Ross flaking rolls to yield flakes with a thickness of approximately 0.012 inches or thinner.

The flakes were loaded into a cooker with the objective of inactivating lipases, myrosinases, and other hydrolytic enzymes to facilitate pre-pressing. Maximum steam was used to get the flakes to 190° F. without lingering to avoid activation of such enzymes. This was achieved in 10-15 minutes. The press (Rosedowns Mini 200) was fed from a Wenger metered feeder with flake at a rate of 3.5-4 pounds per minute. The press operated best at 50-55 Hz, which corresponds to 38-40 RPM.

The presscake was extracted in stainless batch cans using commercial hexane at a temperature of 110-140° F.±10° F. Solvent was added and drained sequentially in 6 rounds of incubation, each of which was approximately 12 minutes. To remove residual hexane and yield desolventized meal, a batch-type desolventizer/toaster (DT) was heated, which showed a product temperature of 150-175° F. under vacuum. Crude oil was made by desolventizing using a Precision Scientific Evaporator. The hexane extracted meal was air dried overnight.

Samples of the hexane extracted meal were sent to Dairyland and DairyOne Laboratories for analysis. A sample of commercial canola meal was acquired from a feed plant in Wisconsin, which was also sent to DairyOne for comparison.

TABLE 10

The meal produced from Y1126 yellow-seeded pennycress mutant is significantly more valuable (lower in fiber, higher in protein and available energy and nutrients) than regular pennycress meal and is closer in composition and predicted performance to canola meal.

| | Meal Component | Type | Unit | Desired Change | Pennycress | Yellow seed (Y1126) | Canola |
|---|---|---|---|---|---|---|---|
| CP | Crude Protein | Protein | % Dry Matter | Increased | 31.9 | 40.5 | 41.4 |
| RUP | Rumen Undegraded Protein | Protein | % CP | No change | 41.45 | 42 | 55 |
| Fat | Oil | Oil | % Dry Matter | No change | 1.17 | 1.69 | 3.6 |
| ADF | Acid Detergent Fiber | Fiber | % Dry Matter | Reduce | 41.7 | 20.6 | 22.9 |
| NDF | Neutral Detergent Fiber | Fiber | % Dry Matter | Reduce | 45.5 | 27.2 | 34.3 |
| Lignin | indigestible cell wall material | Fiber | % Dry Matter | Reduce | 24.3 | 7.7 | 10 |

TABLE 10-continued

The meal produced from Y1126 yellow-seeded pennycress mutant is significantly more valuable (lower in fiber, higher in protein and available energy and nutrients) than regular pennycress meal and is closer in composition and predicted performance to canola meal.

| | Meal Component | Type | Unit | Desired Change | Pennycress | Yellow seed (Y1126) | Canola |
|---|---|---|---|---|---|---|---|
| Starch | Starch | Starch | % Dry Matter | No change | 0.5 | 0.5 | 0.3 |
| Sugar | Sugar | Sugar | % Dry Matter | No change | 6.5 | 9.5 | 8 |
| IVTD 24 | 24 hour In Vitro Total Digestibility | Energy | % Dry Matter | Increase | 65 | 89 | 82 |
| TDN | Total Digestible Nutrients | Energy | % Dry Matter | Increase | 53 | 68.5 | 67 |
| ME, 1X | Calculated Metabolizable Energy, 1X maintenance | Energy | Mcal/lb | Increase | 0.93 | 1.33 | 1.33 |
| NEL, 1X | Calculated Net Energy Lactation, 1X maintenance | Energy | Mcal/lb | Increase | 1.08 | 1.52 | 1.55 |
| NEG, 1X | Calculated Net Energy Gain, 1X maintenance | Energy | Mcal/lb | Increase | 0.32 | 0.91 | 0.93 |
| NEM, 1X | Calculated Net Energy Maintenance, 1X maintenance | Energy | Mcal/lb | Increase | 0.86 | 1.5 | 1.52 |

Samples of the meal made from Y1126 yellow-seeded mutant, regular black-seeded pennycress and commercial canola meal were sent to the University of Illinois (Urbana-Champaign, IL) for Total Metabolizable Energy corrected for nitrogen (TMEn) and digestible amino acid analysis. The University of Illinois utilized the cecectomized rooster assay to measure TMEn and the digestibility of amino acids.

TABLE 11

Y1126 yellow-seed mutant had increased TMEn as compared to the black-seeded pennycress and was comparable to canola.

| Feed | Dry Matter (DM) % | TMEn Kcal/g DM |
|---|---|---|
| Pennycress | 97.0 | 1.68 |
| Yellow Seed (Y1126) | 97.6 | 2.02 |
| Canola | 89.1 | 2.14 |

TABLE 12

Y1126 yellow-seeded mutant has increased true amino acid digestibility as compared to the black-seeded pennycress and was as digestible or more so than canola.

| No. | Amino Acid | Unit | Canola | Yellow Seed Y1126 | Pennycress |
|---|---|---|---|---|---|
| 1 | ASP | % | 77.6 | 84.8 | 79.6 |
| 2 | THR | % | 77.0 | 79.2 | 73.6 |
| 3 | SER | % | 76.7 | 81.8 | 81.8 |
| 4 | GLU | % | 87.5 | 90.0 | 82.6 |
| 5 | PRO | % | 76.0 | 82.2 | 66.0 |
| 6 | ALA | % | 76.9 | 82.4 | 76.1 |
| 7 | CYS | % | 76.6 | 71.0 | 63.7 |
| 8 | VAL | % | 75.5 | 81.3 | 72.9 |
| 9 | MET | % | 85.9 | 84.9 | 75.8 |
| 10 | ILE | % | 77.2 | 82.2 | 75.7 |
| 11 | LEU | % | 81.5 | 86.1 | 79.1 |
| 12 | TYR | % | 77.1 | 83.8 | 78.2 |
| 13 | PHE | % | 81.6 | 87.1 | 80.4 |
| 14 | LYS | % | 73.5 | 76.7 | 68.9 |
| 15 | HIS | % | 83.4 | 86.6 | 70.1 |
| 16 | ARG | % | 87.0 | 93.0 | 83.6 |
| 17 | TRP | % | 95.4 | 93.2 | 89.2 |

REFERENCES

Kil, D. J., B. G. Kim, and H. H. Stein. (2013). Feed energy evaluation for growing pigs. Asian-Austrs. J. Animal. Sci. 26(9):1205-1217.

Meloche, K. J., B. J. Kerr, G. Shurson, and W. A. Dozier, III. (2013). Apparent metabolizable energy and prediction equations for reduced-oil corn distillers fried grains with solubles in broiler chicks. Poultry Science 92(12):3176-3183.

Rochelle, S. J., B. J. Kerr, and W. A. Dozier III. (2011). Energy determination of corn co-products fed to broiler chicks from 15 to 24 days of age and use of composition analysis to predict nitrogen-corrected apparent metabolizable energy. Poultry Science 90:1999-2007.

Slominski B A, Simbaya J, Campbell L D, Rakow G, Guenter W (1999) Nutritive value for broilers of meals derived from newly developed varieties of yellow-seeded canola. Anim Feed Sci Technol 78:249-262.

Chauhan, Y. S. and Kumar, K. (1987). Genetics of seed colour in mustard (*Brassica juncea* L. Czern and Coss), *Cruciferae* Newsletter 12, 22-23.

Appelhagen I, Lu G H, Huep G, Schmelzer E, Weisshaar B, Sagasser M. (2011) TRANSPARENT TESTA1 interacts with R2R3-MYB factors and affects early and late steps of flavonoid biosynthesis in the endothelium of *Arabidopsis thaliana* seeds. *Plant J.* 67:406-419.

Appelhagen I, Thiedig K, Nordholt N, Schmidt N, Huep G, Sagasser M, Weisshaar B. (2014) Update on transparent testa mutants from *Arabidopsis thaliana*: characterisation of new alleles from an isogenic collection. *Planta* 240: 955-970.

Baudry A, Heim M A, Dubreucq B, Caboche M, Weisshaar B, Lepiniec L. (2004) TT2, TT8, and TTG1 synergistically specify the expression of BANYULS and proanthocyanidin biosynthesis in *Arabidopsis thaliana. Plant J.* 39:366-380.

Begemann M B, Gray B N, January E, Gordon G C, He Y, Liu H, Wu X, Brutnell T P, Mockler T C, Oufattole M. (2017) Precise insertion and guided editing of higher plant genomes using Cpf1 CRISPR nucleases. *Scientific reports* 7:11606.

Begemann M B, Gray B N, January E, Singer A, Kesler D C, He Y, Liu H, Guo H, Jordan A, Brutnell T P, Mockler T C. (2017) Characterization and Validation of a Novel Group of Type V, Class 2 Nucleases for in vivo Genome Editing. *bioRxiv.* 2017:192799.

Chen M, Wang Z, Zhu Y, Li Z, Hussain N, Xuan L, Guo W, Zhang G, Jiang L. (2012) The effect of TRANSPARENT TESTA2 on seed fatty acid biosynthesis and tolerance to environmental stresses during young seedling establishment in *Arabidopsis. Plant Physiol.* 160:1023-1036.

Chen M, Xuan L, Wang Z, Zhou L, Li Z, Du X, Ali E, Zhang G, Jiang L. (2014) TRANSPARENT TESTA8 inhibits seed fatty acid accumulation by targeting several seed development regulators in *Arabidopsis. Plant Physiol* 165:905-916.

Debeaujon I, Peeters A J, Leon-Kloosterziel K M, Koornneef M. (2001) The TRANSPARENT TESTAJ2 gene of *Arabidopsis* encodes a multidrug secondary transporter-like protein required for flavonoid sequestration in vacuoles of the seed coat endothelium. *Plant Cell* 13:853-871.

Fauser F, Schiml S, Puchta H (2014) Both CRISPR/Cas-based nucleases and nickases can be used efficiently for genome engineering in *Arabidopsis thaliana. Plant J*79: 348-359.

Guschin D Y, Waite A J, Katibah G E, Miller J C, Holmes M C, Rebar E J. (2010) A rapid and general assay for monitoring endogenous gene modification. In: *Engineered zinc finger proteins:* 247-256. Humana Press, Totowa, NJ Holsters, M., De Waele, D., Depicker, A., Messens, E., Van Montagu, M., & Schell, J. (1978). Transfection and transformation of *Agrobacterium tumefaciens. Molecular and General Genetics* (*MGG*), 163(2), 181-187.

Li X, Chen L, Hong M, Zhang Y, Zu F, Wen J, Yi B, Ma C, Shen J, Tu J, Fu T. (2012) A large insertion in bHLH transcription factor BrTT8 resulting in yellow seed coat in *Brassica rapa. PLoS One* 7:e44145.

Lian J, Lu X, Yin N, Ma L, Lu J, Liu X, Li J, Lu J, Lei B, Wang R, Chai Y. (2017) Silencing of BnTT1 family genes affects seed flavonoid biosynthesis and alters seed fatty acid composition in *Brassica napus. Plant Sci.* 254:32-47.

Liang M, Davis E, Gardner D, Cai X, Wu Y. (2006) Involvement of AtLAC15 in lignin synthesis in seeds and in root elongation of *Arabidopsis. Planta* 224:1185-1196.

Michelmore R W, Paran I, Kesseli R V. (1991) Identification of markers linked to disease-resistance genes by bulked segregant analysis: a rapid method to detect markers in specific genomic regions by using segregating populations. *Proceedings of the National Academy of Sciences* 88: 9828-9832.

Magwene P M, Willis J H, Kelly J K. (2011) The statistics of bulk segregant analysis using next generation sequencing. *PLoS computational biology* 7:11.

Nesi N, Debeaujon I, Jond C, Pelletier G, Caboche M, Lepiniec L. (2000) The TT8 gene encodes a basic helix-loop-helix domain protein required for expression of DFR and BAN genes in *Arabidopsis* siliques. *Plant Cell* 12:1863-1878.

Nesi N, Debeaujon I, Jond C, Stewart A J, Jenkins G I, Caboche M, Lepiniec L. (2002) The TRANSPARENT TESTA16 locus encodes the *ARABIDOPSIS* BSISTER MADS domain protein and is required for proper development and pigmentation of the seed coat. *Plant Cell* 14:2463-2479.

Nesi N, Jond C, Debeaujon I, Caboche M, Lepiniec L. (2001) The *Arabidopsis* TT2 gene encodes an R2R3 MYB domain protein that acts as a key determinant for proanthocyanidin accumulation in developing seed. *Plant Cell* 13:2099-2114.

Pourcel L, Routaboul J M, Kerhoas L, Caboche M, Lepiniec L, Debeaujon I. (2005) TRANSPARENT TESTAIO encodes a laccase-like enzyme involved in oxidative polymerization of flavonoids in *Arabidopsis* seed coat. *Plant Cell* 17:2966-2980.

Sagasser M, Lu G H, Hahlbrock K, Weisshaar B. (2002) *A. thaliana* TRANSPARENT TESTA 1 is involved in seed coat development and defines the WIP subfamily of plant zinc finger proteins. *Genes Dev* 16:138-149.

Steinert J, Schiml S, Fauser F, Puchta H (2015) Highly efficient heritable plant genome engineering using Cas9 orthologues from *Streptococcus thermophilus* and *Staphylococcus aureus. Plant J*84:1295-305.

Zhang J, Lu Y, Yuan Y, Zhang X, Geng J, Chen Y, Cloutier S, McVetty P B, Li G. (2008) Map-based cloning and characterization of a gene controlling hairiness and seed coat color traits in *Brassica rapa. Plant Mol Biol.* 69:553-563.

Other Embodiments

It is to be understood that while certain embodiments have been described in conjunction with the detailed description thereof, the foregoing description is intended to illustrate and not limit the scope of the disclosure. Other aspects, advantages, and modifications are within the scope of the following embodiments and claims.

Embodiment 1. A composition comprising non-defatted pennycress seed meal comprising an acid detergent fiber (ADF) content of 5%, 8%, or 10% to 15%, 18%, or 20% by dry weight.

Embodiment 2. The composition of embodiment 1, wherein said composition has a protein content of 28%, 30%, 32%, or 34% to 38% or 40% by dry weight.

Embodiment 3. The composition of embodiment 1, wherein said composition has an oil content of 30%, 32%, or 34% to 40%, 42%, 46%, 48%, or 50% by dry weight.

Embodiment 4. The composition of embodiment 1, wherein said composition has a neutral detergent fiber (NDF) content of 10%, 12%, 14%, or 16% to 20%, 22%, 24%, or 25% by dry weight.

Embodiment 5. The composition of embodiment 1, wherein said composition has a protein content of 28%, 30%, 32%, or 34% to 38% or 40% by dry weight and an oil content of 30% to 50% by dry weight.

Embodiment 6. A composition comprising defatted pennycress seed meal comprising an acid detergent fiber (ADF) content of 7%, 8%, 10%, or 12% to 20%, 22%, 24%, or 25% by dry weight.

Embodiment 7. The composition of embodiment 6, wherein said composition has a protein content of 30%, 35%, 40%, or 45% to 55%, 60%, 65%, or 70% by dry weight.

Embodiment 8. The composition of embodiment 6, wherein said composition has an oil content of 0%, 2%, or 4% to 8%, 10%, or 12% by dry weight.

Embodiment 9. The composition of embodiment 6, wherein said composition has a neutral detergent fiber (NDF) content of 10%, 12%, or 15% to 20%, 25%, 28%, or 30% by dry weight.

Embodiment 10. The composition of embodiment 6, wherein said composition has a protein content of 30%, 35%, 40%, or 45% to 55%, 60%, 65%, or 70% by dry weight and an oil content of 0%, 2%, or 4% to 8%, 10%, or 12% by dry weight.

Embodiment 11. The composition of embodiment 6, wherein said composition has a protein content of 30%, 35%, 40%, or 45% to 55%, 60%, 65%, or 70% by dry weight and a neutral detergent fiber (NDF) content of 10%, 12%, or 15% to 20%, 25%, 28%, or 30% by dry weight.

Embodiment 12. The composition of any one of embodiments 1-11, wherein said composition further comprises a preservative, a dust preventing agent, a bulking agent, a flowing agent, or any combination thereof.

Embodiment 13. The composition of any one of embodiments 1-12, wherein said pennycress seed meal is obtained from pennycress seeds that have been crushed, ground, macerated, expelled, extruded, expanded, or any combination thereof.

Embodiment 14. The composition of any one of embodiments 1-13, wherein said pennycress seed meal is obtained from a population of pennycress seeds comprising seeds having at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 15. The composition of any one of embodiments 1-14, wherein said pennycress seed meal is obtained from a population of pennycress seeds comprising seeds having at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 16. The composition of any one of embodiments 1-15, wherein said composition comprises a detectable amount of a polynucleotide comprising at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 17. The composition of any one of embodiments 1-16, wherein said pennycress seed meal comprises: (i) pennycress variety Y1067, Y1126, BC38, BJ8, P32, J22, Q36, BD24, AX17, E5-444, E5-540, E5-541, E5-542, E5-543, E5-544, E5-545, E5-547, E5-549, E5-582, E5-586, D3-N10 P5, D5-191, A7-95, A7-187 or A7-261 seed meal; (ii) seed meal of hybrids of the varieties; (iii) seed meal from progeny of the varieties; (iv) seed meal from seed comprising germplasm from the varieties that provides seed comprising an acid detergent fiber (ADF) content of 5% to 20% by dry weight; or (v) seed meal of any combination of said varieties, hybrid varieties, progeny of said varieties, or seed comprising the germplasm.

Embodiment 18. The composition of any one of embodiments 1-17, wherein said pennycress seed meal comprises seed meal obtained from the seed lot of anyone of embodiments 43 to 62, or any combination thereof.

Embodiment 19. The composition of any one of embodiments 1 to 18, wherein the composition exhibits a lighter-color in comparison to a control composition comprising wild-type pennycress seed meal.

Embodiment 20. Pennycress seed meal comprising an acid detergent fiber (ADF) content of 5%, 8%, or 10% to 15%, 18%, or 20% by dry weight, wherein the seed meal is non-defatted.

Embodiment 21. The seed meal of embodiment 20, wherein said seed meal has a protein content of 28%, 30%, 32%, or 34% to 38% or 40% by dry weight.

Embodiment 22. The seed meal of embodiment 21, wherein said seed meal has an oil content of 30%, 32%, or 34% to 40%, 42%, 46%, 48%, or 50% by dry weight.

Embodiment 23. The seed meal of embodiment 21, wherein said seed meal has a neutral detergent fiber (NDF) content of 10%, 12%, 14%, or 16% to 20%, 22%, 24%, or 25% by dry weight.

Embodiment 24. The seed meal of embodiment 21, wherein said seed meal has a protein content of 28%, 30%, 32%, or 34% to 38% or 40% by dry weight and an oil content of 30%, 32%, or 34% to 40%, 42%, 46%, 48%, or 50% by dry weight.

Embodiment 25. Pennycress seed meal comprising an acid detergent fiber (ADF) content of 7%, 8%, 10%, or 12% to 20%, 22%, 24%, or 25% by dry weight, wherein the seed meal is defatted.

Embodiment 26. The seed meal of embodiment 25, wherein said seed meal has a protein content of 30%, 35%, 40%, or 45% to 55%, 60%, 65%, or 70% by dry weight. Embodiment 27. The seed meal of embodiment 25, wherein said seed meal has an oil content of 0%, 2%, or 4% to 8%, 10%, or 12% by dry weight.

Embodiment 27. The seed meal of embodiment 25, wherein said seed meal has a neutral detergent fiber (NDF) content of 10%, 12%, or 15% to 20%, 25%, 28%, or 30% by dry weight.

Embodiment 28. The seed meal of embodiment 25, wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 29. The pennycress seed meal of any one of embodiments 20-28, wherein the meal comprises ground and/or macerated seed of the seed lot of any one of embodiments 43 to 62.

Embodiment 30. The pennycress seed meal of any one of embodiments 20-29, wherein said meal comprises a detectable amount of a polynucleotide comprising at least one loss-of-function mutation in at least one endogenous wild-type pennycress gene comprising a polynucleotide sequence selected from the group consisting of SEQ ID NO:1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 31. The pennycress seed meal of any one of embodiments 20-30, wherein said meal comprises ground and/or macerated seed of a population of pennycress seeds comprising seeds having at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 32. The pennycress seed meal of any one of embodiments 20-31, wherein said meal comprises ground and/or macerated seed of a population of pennycress seeds comprising seeds having at least one loss-of-function mutation in at least one endogenous pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172 and allelic variants thereof.

Embodiment 33. The pennycress seed meal of any one of embodiments 20-32, wherein said meal comprises ground and/or macerated seed of a population of pennycress seeds comprising seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 34. The pennycress seed meal of any one of embodiments 20-33, wherein the meal exhibits a lighter-color in comparison to a control pennycress seed meal prepared from wild-type pennycress seed.

Embodiment 35. Pennycress seed cake comprising an acid detergent fiber (ADF) content of 7%, 8%, 10%, or 12% to 20%, 22%, 24%, or 25% by dry weight.

Embodiment 36. The seed cake of embodiment 35, wherein said seed meal has a protein content of 30%, 35%, 40%, or 45% to 55%, 60%, 65%, or 70% by dry weight.

Embodiment 37. The seed cake of embodiment 35, wherein said seed meal has an oil content of 0%, 2%, or 4% to 8%, 10%, or 12% by dry weight.

Embodiment 38. The seed cake of embodiment 35, wherein said seed meal has a neutral detergent fiber (NDF) content of 10%, 12%, or 15% to 20%, 25%, 28%, or 30% by dry weight.

Embodiment 39. The seed cake of embodiment 35, wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 40. The pennycress seed cake of any one of embodiments 35 to 39, wherein the cake comprises crushed or expelled seed of the seed lot of any one of embodiments 43 to 62.

Embodiment 41. The pennycress seed cake of any one of embodiments 35 to 40, wherein the cake comprises a detectable amount of a polynucleotide comprising at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 42. The pennycress seed meal or pennycress seed meal cake of any one of embodiments 36 to 41, wherein the cake exhibits a lighter-color in comparison to a control pennycress seed meal cake prepared from wild-type pennycress seed.

Embodiment 43. A seed lot comprising a population of pennycress seeds that comprise an acid detergent fiber (ADF) content of 5%, 8%, or 10% to 15%, 18%, or 20% by dry weight.

Embodiment 44. The seed lot of embodiment 43, wherein said seed has a protein content of 28%, 30%, 32%, or 34% to 38% or 40% by dry weight.

Embodiment 45. The seed lot of embodiment 43, wherein said seed has an oil content of 30%, 32%, or 34% to 40%, 42%, 46%, 48%, or 50% by dry weight.

Embodiment 46. The seed lot embodiment 43, wherein said seed has a neutral detergent fiber (NDF) content of 10%, 12%, 14%, or 16% to 20%, 22%, 24%, or 25% by dry weight.

Embodiment 47. The seed lot of embodiment 43, wherein said seed has a protein content of 28%, 30%, 32%, or 34% to 38% or 40% by dry weight and an oil content of 30%, 32%, or 34% to 40%, 42%, 46%, 48%, or 50% by dry weight.

Embodiment 48. The seed lot of any one of embodiments 43 to 47, wherein the population comprises at least 10, 20, 50, 100, 500, or 1,000 seeds comprising said ADF content.

Embodiment 49. The seed lot of any one of embodiments 43 to 48, wherein at least 95% of the pennycress seeds in the seed lot are seeds comprising said ADF content and said protein content.

Embodiment 50. The seed lot of any one of embodiments 43 to 49, wherein less than 5% of the seeds in said seed lot have an ADF content of greater than 20% by dry weight.

Embodiment 51. The seed lot of any one of embodiments 43 to 50, wherein said seeds further comprise an agriculturally acceptable excipient or adjuvant.

Embodiment 52. The seed lot of any one of embodiments 43 to 51, wherein said seeds further comprise a fungicide, a safener, or any combination thereof.

Embodiment 53. The seed lot of any one of embodiments 43 to 52, wherein said population of pennycress seeds comprise seeds having at least one loss-of-function mutation in at least one endogenous pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof or comprise seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 54. The seed lot of any one of embodiments 43 to 53, wherein said population of pennycress seeds comprise seeds having at least one loss-of-function mutation in an endogenous wild-type pennycress gene that encodes SEQ ID NO:2, 70, 76, or an allelic variant thereof.

Embodiment 55. The seed lot of embodiment 54, wherein the loss-of-function mutation in the gene encoding SEQ ID NO:2, 70, 76, or the allelic variant thereof comprises an insertion, deletion, or substitution of one or more nucleotides.

Embodiment 56. The seed lot of embodiment 54, wherein the loss-of-function mutation in the gene encoding SEQ ID NO:2 or the allelic variant thereof comprises a mutation that introduces a pre-mature stop codon or frameshift mutation at codon positions 1-108 of SEQ ID NO:1 or an allelic variant thereof, wherein the loss-of-function mutation in the gene encoding SEQ ID NO:70 or the allelic variant thereof comprises a mutation set forth in SEQ ID NO:127, 129, 131, 133, 135, or 137, or wherein the loss-of-function mutation in the gene encoding SEQ ID NO:76 or the allelic variant thereof comprises a mutation set forth in SEQ ID NO:165, 167, or 170.

Embodiment 57. The seed lot of any one of embodiments 54-56, wherein the loss-of-function mutation in the gene encoding SEQ ID NO:2 or the allelic variant thereof comprises a substitution of a guanine residue at nucleotide 491 of SEQ ID NO:1 with an adenine residue or a substitution of a guanine residue a nucleotide equivalent to nucleotide 491 of SEQ ID NO:1 in the allelic variant thereof with an adenine residue.

Embodiment 58. The seed lot of any one of embodiments 43 to 57, wherein said population of pennycress seeds comprise seeds having at least one loss-of-function mutation in at least one endogenous wild-type pennycress gene comprising a polynucleotide sequence selected from the group consisting of SEQ ID NO:1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 59. The seed lot of any one of embodiments 43 to 58, wherein said population of pennycress seeds comprising seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 60. The seed lot of any one of embodiments 43 to 59, wherein said population of pennycress seeds comprise: (i) pennycress variety Y1067, Y1126, BC38, BJ8, P32, J22, Q36, BD24, AX17, AX17, E5-444, E5-540, E5-541, E5-542, E5-543, E5-544, E5-545, E5-547, E5-549, E5-582, E5-586, D3-N10 P5, D5-191, A7-95, A7-187 or A7-261 seed; (ii) hybrid seed of said varieties; (iii) seed from progeny of said varieties; (iv) seed comprising germplasm from said varieties that provides seed having an acid detergent fiber (ADF) content of 10% to 20% by dry weight; or (v) any combination of said seed, hybrid seed, seed from progeny of said varieties, or seed comprising said germplasm.

Embodiment 61. The seed lot of any one of embodiments 43 to 60, wherein the seeds in the population exhibit a lighter-colored seed coat in comparison to a wild-type pennycress seed.

Embodiment 62. A method of making non-defatted pennycress seed meal comprising an acid detergent fiber (ADF) content of 5%, 8%, or 10% to 15%, 18%, or 20% by dry weight, comprising the step of grinding, macerating, extruding, and/or crushing the seed lot of any one of embodiments 43 to 62, thereby obtaining the non-defatted seed meal.

Embodiment 63. The method of embodiment 62, wherein the seed meal has a protein content of 28%, 30%, 32%, or 34% to 38% or 40% by dry weight, or the combination thereof.

Embodiment 64. The method of embodiment 62, wherein said seed meal has an oil content of 30%, 32%, or 34% to 40%, 42%, 46%, 48%, or 50% by dry weight.

Embodiment 65. The method of embodiment 62, wherein said seed meal has a neutral detergent fiber (NDF) content of 10%, 12%, 14%, or 16% to 20%, 22%, 24%, or 25% by dry weight.

Embodiment 66. The method of embodiment 62, wherein said seed meal has a protein content of 28%, 30%, 32%, or 34% to 38% or 40% by dry weight and an oil content of 30%, 32%, or 34% to 40%, 42%, 46%, 48%, or 50% by dry weight.

Embodiment 67. A method of making defatted pennycress seed meal comprising an acid detergent fiber (ADF) content of 7%, 8%, 10%, or 12% to 20%, 22%, 24%, or 25% by dry weight, comprising the step of solvent extracting the seed lot of any one of embodiments 43 to 62, separating the extracted seed meal from the solvent, thereby obtaining the defatted seed meal.

Embodiment 68. The method of embodiment 67, wherein the seed meal has a protein content of 30%, 35%, 40%, or 45% to 55%, 60%, 65%, or 70% by dry weight.

Embodiment 69. The method of embodiment 67, wherein said seed meal has an oil content of 0%, 2%, or 4% to 8%, 10%, or 12% by dry weight.

Embodiment 70. The method of embodiment 67, wherein said seed meal has a neutral detergent fiber (NDF) content of 10% to 30% by dry weight.

Embodiment 71. The method of embodiment 67 wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 72. The method of any one of embodiments 67 to 71, wherein the solvent is hexane or mixed hexanes.

Embodiment 73. A method of making pennycress seed cake comprising an acid detergent fiber (ADF) content of 7%, 8%, 10%, or 12% to 20%, 22%, 24%, or 25% by dry weight, comprising the step of crushing or expelling the seed of the seed lot any one of embodiments 43 to 62, thereby obtaining a seed cake.

Embodiment 74. The method of embodiment 73, wherein the seed cake has a protein content of 30%, 35%, 40%, or 45% to 55%, 60%, 65%, or 70% by dry weight.

Embodiment 75. The method of embodiment 74, wherein the seed cake has an oil content of 0%, 2%, or 4% to 8%, 10%, or 12% by dry weight.

Embodiment 76. A method of making a pennycress seed lot comprising the steps of:

(a) introducing at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof;

(b) selecting germplasm that is homozygous for said loss-of-function mutation; and, (c) harvesting seed from the homozygous germplasm, thereby obtaining a seed lot, wherein said seed lot comprises an acid detergent fiber (ADF) content of 5%, 8%, or 10% to 15%, 18%, or 20% by dry weight.

Embodiment 77. The method of embodiment 76, wherein said seed lot comprise the seed lot of any one of embodiments 43 to 61.

Embodiment 78. A method of making a pennycress seed lot comprising the steps of:

(a) introducing at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof into a pennycress plant genome;

(b) selecting a transgenic plant line that comprises said transgene; and, (c) harvesting seed from the transgenic plant line, thereby obtaining a seed lot, wherein said seed lot comprises an acid detergent fiber (ADF) content of 5%, 8%, or 10% to 15%, 18%, or 20% by dry weight.

Embodiment 79. The method of embodiment 78, wherein said harvested seed comprise a seed lot of any one of embodiments 43 to 61.

What is claimed is:

1. Pennycress seed meal comprising an acid detergent fiber (ADF) content of 7% to 25% by dry weight, wherein the seed meal is defatted, and wherein said meal comprises a detectable amount of a polynucleotide comprising: (i) at least one loss-of-function mutation in an endogenous wild-type pennycress gene comprising the polynucleotide sequence of SEQ ID NO: 56 or SEQ ID NO: 59; or (ii) at least one loss-of-function mutation in an allelic variant of the endogenous wild-type pennycress gene having at least 95% sequence identity to SEQ ID NO: 56 or SEQ ID NO: 59.

2. The seed meal of claim 1, wherein said seed meal has a protein content of 30% to 70% by dry weight, an oil content of 0% to 12% by dry weight, and/or a neutral detergent fiber (NDF) content of 10% to 30% by dry weight.

3. The seed meal of claim 1, wherein said meal comprises an acid detergent fiber (ADF) content of 8% to 20% by dry weight and a detectable amount of the polynucleotide comprising: (i) the at least one loss-of-function mutation in the endogenous wild-type pennycress gene comprising the polynucleotide sequence of SEQ ID NO: 56 or SEQ ID NO: 59; or (ii) the at least one loss-of-function mutation in an allelic variant of the endogenous wild-type pennycress gene, wherein the allelic variant has at least 99% sequence identity to SEQ ID NO: 56 or SEQ ID NO: 59.

4. The pennycress seed meal of claim 1, wherein the meal exhibits a lighter-color in comparison to a control pennycress seed meal prepared from wild-type pennycress seed.

5. A composition comprising the defatted pennycress seed meal of claim 1.

6. Pennycress seed meal comprising an acid detergent fiber (ADF) content of 5% to 20% by dry weight, wherein the seed meal is non-defatted, and wherein said meal comprises a detectable amount of a polynucleotide comprising: (i) at least one loss-of-function mutation in an endogenous wild-type pennycress gene comprising the polynucleotide sequence of SEQ ID NO: 56 or SEQ ID NO: 59; or (ii) at least one loss-of-function mutation in an allelic variant of the endogenous wild-type pennycress gene having at least 95% sequence identity to SEQ ID NO: 56 or SEQ ID NO: 59.

7. The seed meal of claim 6, wherein said meal comprises an acid detergent fiber (ADF) content of 8% to 20% by dry weight and a detectable amount of the polynucleotide comprising: (i) the at least one loss-of-function mutation in the endogenous wild-type pennycress gene comprising the polynucleotide sequence of SEQ ID NO: 56 or SEQ ID NO: 59; or (ii) the at least one loss-of-function mutation in an allelic variant of the endogenous wild-type pennycress gene, wherein the allelic variant has at least 99% sequence identity to SEQ ID NO: 56 or SEQ ID NO: 59.

8. The seed meal of claim 6, wherein said seed meal has a protein content of 28% to 40% by dry weight, an oil content of 30% to 50% by dry weight, and/or a neutral detergent fiber (NDF) content of 10% to 25% by dry weight.

9. The seed meal of claim 6, wherein the meal exhibits a lighter-color in comparison to a control pennycress seed meal prepared from wild-type pennycress seed.

10. A composition comprising the non-defatted seed meal of claim 6.

11. A seed lot comprising a population of pennycress seeds that comprise an acid detergent fiber (ADF) content of 5% to 20% by dry weight, wherein the population comprises at least 10 seeds comprising said ADF content and wherein said population of pennycress seeds comprise: (i) seeds having at least one loss-of-function mutation in an endogenous wild-type pennycress gene encoding a polypeptide having the amino acid sequence of SEQ ID NO: 55 or SEQ ID NO: 58; (ii) seeds having at least one loss-of-function mutation in an allelic variant of the endogenous wild-type pennycress gene encoding a polypeptide comprising an amino acid sequence with at least 95% sequence identity to SEQ ID NO: 55 or SEQ ID NO: 58; (iii) seeds having at least one transgene that suppresses expression of an endogenous wild-type pennycress gene encoding a polypeptide having the amino acid sequence of SEQ ID NO: 55 or SEQ ID NO:58; or (iv) seeds having at least one transgene that suppresses expression of an allelic variant of the endogenous wild-type pennycress gene encoding a polypeptide comprising an amino acid sequence with at least 95% sequence identity to SEQ ID NO: 55 or SEQ ID NO: 58.

12. The seed lot of claim 11, wherein said seeds have a protein content of 28% to 40% by dry weight, an oil content of 30% to 50% by dry weight, and/or a neutral detergent fiber (NDF) content of 10% to 25% by dry weight.

13. The seed lot of claim 11, wherein the population comprises at least 500 seeds comprising said ADF content.

14. The seed lot of claim 11, wherein at least 95% of the pennycress seeds in the seed lot are seeds comprising said ADF content.

15. The seed lot of claim 11, wherein said seeds further comprise an agriculturally acceptable excipient or adjuvant.

16. The seed lot of claim 11, wherein said seeds further comprise a fungicide, a safener, or any combination thereof.

17. The seed lot of claim 11, wherein the population of pennycress seeds comprise: (i) seeds having at least one loss-of-function mutation in the allelic variant of the endogenous wild-type pennycress gene, wherein the allelic variant encodes a polypeptide comprising an amino acid sequence with at least 99% sequence identity to SEQ ID NO: 55 or SEQ ID NO: 58; or (ii) seeds having at least one transgene that suppresses expression of the allelic variant of the endogenous wild-type pennycress gene, wherein the allelic variant encodes a polypeptide comprising an amino acid sequence with at least 99% sequence identity to SEQ ID NO: 55 or SEQ ID NO: 58.

18. The seed lot of claim 11, wherein the seeds in the population exhibit a lighter-colored seed coat in comparison to a wild-type pennycress seed.

19. A method of making defatted pennycress seed meal comprising an acid detergent fiber (ADF) content of 7% to 25% by dry weight, comprising solvent extracting the seed lot of claim 11 and separating the extracted seed meal from the solvent, thereby obtaining the defatted pennycress seed meal.

20. A method of making a composition comprising non-defatted pennycress seed meal comprising an acid detergent fiber (ADF) content of 7% to 25% by dry weight, wherein the method comprises the step of grinding, macerating, extruding, expanding, and/or crushing the seed lot of claim 11 to obtain said composition, and wherein said composition further comprises a preservative, a dust preventing agent, a bulking agent, a flowing agent, or any combination thereof, thereby obtaining the non-defatted pennycress seed meal composition.

21. A population of pennycress plants grown from the seed lot of claim 11, wherein the population of pennycress plants comprise the at least one loss-of-function mutation or the at least one transgene.

* * * * *

SEQUENCE LISTING

```
Sequence total quantity: 183
SEQ ID NO: 1           moltype = DNA  length = 795
FEATURE                Location/Qualifiers
source                 1..795
                       mol_type = genomic DNA
                       organism = Thlaspi arvense
SEQUENCE: 1
atggggaaga gaacaagtaa cagtttgaag aaagatgagt taaacagagg agcttggact  60
gatcaagaag acaagatcct taaagattat atcatgatcc atggcgaagg caaatggagc  120
actctcccaa accaagccgg tctcaagagg tgtggcaaaa gctgcagact caggtggaag  180
aactacttga gaccggggat aaagcgcgga aacatctcat ctgatgaaga agaactcata  240
atccgcctcc ataatctcct tggaaacaga tggtctctga tagctgggag gcttccgggg  300
cgaacagaca atgaaataaa gaaccattgg aactcaaacc tccgcaaaag acttcccaaa  360
acaaaaacca accaaccaaa acttcgaaaa cattcaacca acatcaagaa caatgtctgt  420
gttatacgca caaaggcgat taggtgctca aaggctctga cttttcagaa ccagagtagt  480
agtggtagta ccaatcttct tcctatgaaa gaacaagtga gctctatgat ggatcatgaa  540
gctggttctt cgttgttgga agatcttgaa attgattttg ataaaatcca atcagagttt  600
ctcttccctg atctgatgga tttggaaggt ttgggttgtg gaaacgtaac atcacttgtt  660
tcatctgagg agatttttagg agattatgtt cgtgctgatg aatcttctca gggtaatctt  720
gatctcaata gacctttcac tccttgtctt catcgtggca acgatgaaga ttggctccga  780
gttttcaatt gttag                                                   795

SEQ ID NO: 2           moltype = AA  length = 264
FEATURE                Location/Qualifiers
source                 1..264
                       mol_type = protein
                       organism = Thlaspi arvense
SEQUENCE: 2
MGKRTSNSLK KDELNRGAWT DQEDKILKDY IMIHGEGKWS TLPNQAGLKR CGKSCRLRWK  60
NYLRPGIKRG NISSDEEELI IRLHNLLGNR WSLIAGRLPG RTDNEIKNHW NSNLRKRLPK  120
TKTNQPKLRK HSTNIKNNVC VIRTKAIRCS KALTFQNQSS SGSTNLLPMK EQVSSMMDHE  180
AGSSLLEDLE IDFDKIQSEF LFPDLMDLEG LGCGNVTSLV SSEEILGDYV RADESSQGNL  240
DLNRPFTPCL HRGNDEDWLR VFNC                                         264

SEQ ID NO: 3           moltype = DNA  length = 3512
FEATURE                Location/Qualifiers
source                 1..3512
                       mol_type = genomic DNA
                       organism = Thlaspi arvense
SEQUENCE: 3
tctcagccaa attgacaaat aaaaatcaca tttagaaaac atttcacggt tttgtatgta  60
aactagtaaa aaaaaaaaaa gagaacatgt tatttcaata tataacattg gaaagtatag  120
tatattgatt ctctcactaa tctaaaaatt tatgcatcaa taatttttaa tagattaaaa  180
atctaaagtt aatcttattg gaaattaaat ataattatta agtttcaata tatatagaca  240
tgttatctct ttcattttta accaactagt gatatgggac aaagtacaaa atgttagtta  300
catcagtttt aatctgatat aaaatttgta tcaatttttt taatgttaac aaaattattg  360
attacattga ttatttaaat agtgtaaatt tataatttta tatcagtttt gtttaactga  420
tgtaaactaa tataagtttg tatcaatttt attgaacgga agtcaaataa tcaataaaaa  480
tatcaatttt cagaactgat gttaaatcac atattttata tcatttatta ataagtaatt  540
cacctttttt gtagtgtgat atgagttatt ggcgtttaat aataatttta aaaaattata  600
gtttcatgtt aaatcttaca aaattatata aatcttttaa aatcaaaaat tatttatttg  660
agcatttgca ataatgaaca gttgcgaatg aataattaat aaaatattta aaaattaaaa  720
atgtaaataa caaaatgtat ttaaactctg aatatatgta tataataaca taaattgact  780
taaaaaataa taaatcatat gtacaaagtt gacgccttct taaatactgt ttttataatt  840
tctaatataa taattattca aatggaaaaa ttaaacttga atatgaacct tttaactctt  900
tgattgtcaa aaataaaaag ttttcatgaa atagagttcc gaacttaaaa aagagacatt  960
tgaaacttgg gaccccaaat ttatgtaaca ctgaaagatc ttaaggagtt ttattttttg  1020
tttgttcatg acgcaggact atgtgtactg tgtaggcatg aagaccatgt gttaccgtct  1080
taactgtatc aaatgatgat tgcttacata ctagaatgtg gctagcaatg actattttca  1140
ctctgtatac atacttatac cccatatgca atacaataat gatcaaggtc gttttaggac  1200
ctatatgatt ggagtctaag gcacgagaga ctagactagc gatcatcgtg tgaagtgagt  1260
tcaaaggatt tcagatcctt agtaataagt acaaaagtat attcttgatg acaaaattcg  1320
gtagagttaa atctcaccaa aactgataca ctattattac caggtgagaa aaggattgat  1380
atttcaaagt gtgtgtgtgt gacagaagtt ttggaaagcg acatgtgtac ggacattgca  1440
acaactccat ataaagttac tttgttaaca caaaaagaat ctattctcta ctcaacacta  1500
aagacaattg taccaaccaa acaaccacaa gagagagaaa gagagtatgg ggaagagaac  1560
aagtaacagt ttgaagaaag atgagttaaa cagaggagct tggactgatc aagaagacaa  1620
gatccttaaa gattatatca tgatccatgg cgaaggcaaa tggagcactc tcccaaacca  1680
agccggtaca tatccatcta tctattgatc tatccgtctt taaatgcaaa tcttcatcta  1740
cttacaataa ttgcacataa aggtctcaag aggtgtggca aaagctgcag actcaggtgg  1800
aagaactact tgagaccggg gataaagcgc ggaaacatct catctgatga agaagaactc  1860
ataatccgcc tccataatct ccttggaaac aggttaatta acttcctctt tcaccgaaac  1920
acagattgtt ttcttttcaa gttaagtttt tccataattt ttgcggcgta atgcagatgg  1980
tctctgatag ctgggaggct tccggggcga acagacaatg aaataaagaa ccattggaac  2040
tcaaacctcc gcaaaagact tcccaaaaca aaaaccaacc aaccaaaact tcgaaaacat  2100
tcaaccaaca tcaagaacaa tgtctgtgtt atacgcacaa aggcgattag gtgctcaaag  2160
gctctgactt ttcagaacca gagtagtagt ggtagtacca atcttcttcc tatgaaagaa  2220
caagtgagct ctatgatgga tcatgaagct ggttcttcgt tgttggaaga tcttgaaatt  2280
```

```
gattttgata aaatccaatc agagtttctc ttccctgatc tgatggattt ggaaggtttg  2340
ggttgtggaa acgtaacatc acttgtttca tctgaggaga ttttaggaga ttatgttcgt  2400
gctgatgaat cttctcaggg taatcttgat ctcaatagac ctttcactcc ttgtcttcat  2460
cgtggcaacg atgaagattg gctccgagtt ttcaattgtt agagcgtatc actagtctac  2520
ataattacat acatatatat ctgtacgaac aaaattatat ttgtattttg tttgaaagct  2580
tctaatttct aattactaat tttgttgtgt tttctaatcc atagattatc aattttgcac  2640
tctttttcaa ttaaagactt atggaaatgg cttttgtctt tagaataaaa tacaaattgc  2700
aaaatatcgc aaatacgcaa tgaagattat ttattttcga tagattttat tcaattatta  2760
tgtgcatgca taaatgatag agcttttatt atagcctaac taccgcttaa ctaccctacc  2820
aataaattat acgagggtca ttgttcttgg taatacgaaa aaatctttg caatattgtc  2880
ttaacgaaat tgaattttaa tatacacaca tatccattta taggcagaca cggtcataca  2940
tctaaggatt tattgttttt tgtttcttat cattcttcgg aatcattgta taaatggtta  3000
ttgttgtaac aagagaaagg acatcgggtt ataattttat agaggaaacc taaatttgtg  3060
attgtcgact gtggccgctg acggcggttc agtgtcacta gtttatggtc ttttatctat  3120
gctattgtgg gtgcgaatat gtccttttgt taaccttctt aaatattgaa ataaggttgt  3180
tttcggattg tcaatgttat taaacaaatc cattctcaat agtttgacaa aaaaaaaaaa  3240
aaaatccatt ctcaataaat agctgatgca ggaaagacta ttggtttttc tgtattttaa  3300
gttatcggat cttttatatg atataatcca ttacaaatag acactaatta gacaagtgtt  3360
aaaaatagtt cttattatca atttggcagt gatacataaa taaacctatt acacctacct  3420
attaggtgat tatctgcgta tacatacata cacacggatt tacattttat tatagatttt  3480
aaaatgtata aataatatac catattttat tt                                3512

SEQ ID NO: 4            moltype = DNA  length = 795
FEATURE                 Location/Qualifiers
source                  1..795
                        mol_type = genomic DNA
                        organism = Thlaspi arvense
SEQUENCE: 4
atggggaaga gaacaagtaa cagtttgaag aaagatgagt taaacagagg agcttggact  60
gatcaagaag acaagatcct taaagattat atcatgatcc atggcgaagg caaatggagc  120
actctcccaa accaagccgg tctcaagagg tgtggcaaaa gctgcagact caggtggaag  180
aactacttga gaccggggat aaagcgcgga aacatctcat ctgatgaaga agaactcata  240
atccgcctcc ataatctcct tggaaacaga tggtctctga tagctgggag gcttccgggg  300
cgaacagaca atgaaataaa gaaccattga aactcaaacc tccgcaaaag acttcccaaa  360
acaaaaacca accaaccaaa acttcgaaaa cattcaacca acatcaagaa caatgtctgt  420
gttatacgca caaaggcgat taggtgctca aaggctctga cttttcagaa ccagagtagt  480
agtggtagta ccaatcttct tcctatgaaa gaacaagtga gctctatgat ggatcatgaa  540
gctggttctt cgttgttgga agatcttgaa attgattttg ataaaatcca atcagagttt  600
ctcttccctg atctgatgga tttggaaggt ttgggttgtg gaaacgtaac atcacttgtt  660
tcatctgagg agattttagg agattatgtt cgtgctgatg aatcttctca gggtaatctt  720
gatctcaata gacctttcac tccttgtctt catcgtggca acgatgaaga ttggctccga  780
gttttcaatt gttag                                                   795

SEQ ID NO: 5            moltype = AA  length = 109
FEATURE                 Location/Qualifiers
source                  1..109
                        mol_type = protein
                        organism = Thlaspi arvense
SEQUENCE: 5
MGKRTSNSLK KDELNRGAWT DQEDKILKDY IMIHGEGKWS TLPNQAGLKR CGKSCRLRWK  60
NYLRPGIKRG NISSDEEELI IRLHNLLGNR WSLIAGRLPG RTDNEIKNH              109

SEQ ID NO: 6            moltype = DNA  length = 813
FEATURE                 Location/Qualifiers
source                  1..813
                        mol_type = genomic DNA
                        organism = Thlaspi arvense
SEQUENCE: 6
atgagagatt caaactcaat ccttgatctg tctcttcaga tcagccttcc taactctcac  60
gccggagaac ttcttcacgg cggtgaccga agctccacca caagtagtga ttctggaagc  120
agtctcagtg agttgggcca tgagaacaac ttcttcaaca aacctctcct aagcttaggt  180
tttgatcatc attatcgtta tcaaaggcac tcaaacatga tccaaccaca aatctacggt  240
cgagatttca agagaagctc atcatcaatg gtttgtctta aacgaagcat tcgagctcca  300
agaatgagat ggacttctac tctccatgcg cactttgtcc atgctgttca gcttcttggc  360
ggccatgaaa gagctacgcc taaatcagtg ttggagttga tgaatgtgaa ggatctaacc  420
ctagctcatg tcaagagtca cttgcagatg tatagaacag tgaaatgcac tgataaagga  480
tcatcaggag aaggaaaggt agagaaagat acagagctga tgacagagga caataataat  540
aatgaagaag ctgacgaagg aactgacaca aattcgccaa actcatcatc tgtgcaaaag  600
acccaaaggg cttcttgttc atccaaaaag agagtgtgta tgaacatatc tacacaagca  660
gaacctcact tgggatcaac tcgtcacact aatgatgatg ggaagaaaga ggcgatcaac  720
gctcatctca atttggaatt cacattaggc cggcaaagtt gggggatgga ctattcggaa  780
cccttaagag atctaactct tctcaagtgc taa                               813

SEQ ID NO: 7            moltype = AA  length = 270
FEATURE                 Location/Qualifiers
source                  1..270
                        mol_type = protein
                        organism = Thlaspi arvense
SEQUENCE: 7
```

```
MRDSNSILDL SLQISLPNSH AGELLHGGDR SSTTSSDSGS SLSELGHENN FFNKPLLSLG  60
FDHHYRYQRH SNMIQPQIYG RDFKRSSSSM VCLKRSIRAP RMRWTSTLHA HFVHAVQLLG  120
GHERATPKSV LELMNVKDLT LAHVKSHLQM YRTVKCTDKG SSGEGKVEKD TELMTEDNNN  180
NEEADEGTDT NSPNSSSVQK TQRASCSSKK RVCMNISTQA EPHLGSTRHT NDDGKKEAIN  240
AHLNLEFTLG RQSWGMDYSE PLRDLTLLKC                                 270

SEQ ID NO: 8            moltype = DNA  length = 4752
FEATURE                 Location/Qualifiers
source                  1..4752
                        mol_type = genomic DNA
                        organism = Thlaspi arvense
SEQUENCE: 8
gaggtcggtc gattcaaact tcttttccct ttttgtcttt tgtgtatatt tccatatcta  60
tcctttattc tccgagtaat aaggaaattc ttctttatct tttgaattag tccgatgttt  120
ccggtcttca aaggttatcc ttaagagatt tccttaaatc cgaactaggt cggcacggtc  180
ttcctagtct tgatgggctt aagttattgc gagggaaaac cttttaggaa atgtattcat  240
tttccctcta acaatgtttt aagtatgtat taacaaaata aaaattaata tatgaaaaca  300
attaataaaa ataagtaaga tgcttatgtg aagcagaata ttcccgaccg tgtgtctact  360
taccgtggcc aaagacatcg catgaaaaaa caaaccaaag agtaaggtaa attaaataga  420
atgtatttaa ctagattgaa cttggagtaa ttagttgtct ttctcttttt gcacttttga  480
aaagataaac aaaatttcct tttggagcta ctttgtggtt caaacaagaa tccccatggc  540
aaaacggcag ttactttgtc agtcaacttt tgaaatctga ggctttcaag gattgtaaga  600
aatattaaat acaaaactct gttgtatttt ccatcgaccc taagagacag gccttttcaa  660
gcctatcttt ttagcattgg aaattttaaa gtgttttatt ttatttattt aaaatagtaa  720
aaacatgcaa atcatagggt actcattatc taattatcac actcactctc tttcctcggc  780
ttggtttaac ctttttaacc actgatcaaa taatacgtag ccaatttgtc caaaatcttc  840
caacttcttt tcctcctttc ttacttcttt aaattatttt agtattcgtc ataaatcaaa  900
agatacgttg tcttgaacat gtacacaggt tgtagtattt gtgtgaaaca caaaagtgta  960
tactagtatt ttagttagga aatctacacc atatatttac ttttcttata aattaagtat  1020
atgactttga cattatttta atgatacata atcttttgat tactttcatc agttattttt  1080
tttgctaaaa attaatttaa atgttgtttt taacctacta aagatttcat gcgtacgtca  1140
gagactattt tttgtttctc atatcatgat atgtaatcag aaaagtgaaa acaggttgcc  1200
atgtacattc atttatgata cacaattgat tttttttttc tttttaccaa ataacaggtt  1260
attcatcagt tgccacattg gcgaaagatg aaaatactat tttcattgat ccgcataaat  1320
aaaaaatcct ttgattttac cactttgtta tggtagtcat ttacgtagtt ttaattcggt  1380
tatctacccg aattacgttt tttttgctta aaagttgaaa atgttattct acgtagggac  1440
taacatctgg taatacagta ctacgataag agtgaataat taagagtttt ataaataggt  1500
tatatattta aatcatttgt acacgtagaa aataaaacat attattctta aaaaaagacg  1560
atagactatg tttattgaga taaagacaat agttacgtcg ttgcttttct tgctctctct  1620
ctctccattt ctttctctct ccgctattta aatagacaaa ggattaatga aaaagtagag  1680
agatgatgat gttagactcc agaagcagta tgagagattc aaactcaatc cttgatctgt  1740
ctcttcagat cagccttcct aactctcacg ccggagaact tcttcacggc ggtgaccgaa  1800
gctccaccac aagtagtgat tctggaagca gtctcagtga gttgggccat gagaacaact  1860
tcttcaacaa acctctccta agcttaggtt ttgatcatca ttatcgttat caaaggcact  1920
caaacatgat ccaaccacaa atctacggtc gagatttcaa gagaagctca tcatcaatgg  1980
tttgtcttaa acgaagcatt cgagctccaa gaatgagatg gacttctact ctccatgcgc  2040
actttgtcca tgctgttcag cttcttggcg gccatgaaag tattttgctt tcacattttc  2100
ctttttaaaa gaaataatca agatttatgt caagtaaaat gttttgaaac caaagtacta  2160
agatttgttg cttatttgct ggtctcagga gctacgccta aatcagtgtt ggagttgatg  2220
aatgtgaagg atctaaccct agctcatgtc aagagtcact tgcaggtcca tctctatttt  2280
aatttatttt tcttatatat tttattataa aaatagtaat ggaatctcat aagaatgcaa  2340
taggtttaag taaacattta tgaaagtgta tctatttggt ccactagcta acacatgatt  2400
gcgtagttga aataaacttg tattagctat acttttttta ttttttattt ggttttgatt  2460
tttaaaggat gtgtgtttgt tgatgcagat gtatagaaca gtgaaatgca ctgataaagg  2520
atcatcaggt atgcattcaa accggattgg ctgatttttg aattcctact ggatgtaaat  2580
gtaactatct catttttttt tttttgtttt aatttgtatt tgtttcttct tgggaataac  2640
aggagaagga aaggtagaga aagatacaga gctgatgaca gaggacaata ataataatga  2700
agaagctgac gaaggaactg acacaaattc gccaaactca tcatctgtgc aaaagaccca  2760
aaggttactc ttttatctat tctattttgt aaaaactttg catttaatct ctttgccttt  2820
gttatgcgcg aattttgatg aatccctctt ctagtcgtat gtgaccctgc ttgtccattt  2880
ttataaatag aaaaaatttc tatgatctca gttaaattgt gtgtattcac tgttgatagt  2940
aaataagtag gttcaaataa aacaatatat gaatatgaat gtccaacaat atgaattatt  3000
attagtagat ttctcaaatg tgttttttat catttaaatt tgaacagggc ttcttgttca  3060
tccaaaaaga gagtgtgtat gaacatatct acacaagcag aacctcactt gggatcaact  3120
cgtcacacta atgtacattc tttaacaaat tgttacaatg ttattataga tgtgcactct  3180
cacatatacg tacatatacc cttctgtata ctgtttctaa aatgtgaaat ctttggaaat  3240
aggatgatgg gaagaaagag gcgatcaacg ctcatctcaa tttggaattc acattaggcc  3300
ggcaaagttg gggatggac tattcggaac ccttaagaga tctaactctt ctcaagtgct  3360
aatcgtttag cttggagaac tacaacaaat aagtcagctt aggttatcaa tttaacataa  3420
ttaacttgtt tgatcgtaat agacattgga agaatcatta tcatcatata tgaatttctt  3480
acaaaaaatg ttctcatttt tttttttggg atgtaaacaa gagattcgga ttaagtagta  3540
gctatgttat ggttgtagtg gatgagaagg gagtgcaagt tcaagtagag atgaacttat  3600
gattggttgc caccaaatat gcatggtgga tttgttggta gttttttttt atgttttcat  3660
tgactgctat tcatattgtc gcagtgaata tatatttaaa tgattttgtt ttgattcttt  3720
gtcttgattt ggattagaaa gtagaattcg gcaaaactag aggtttttt actgatattc  3780
tgcatgacaa taaaactctc agttctattt aaatttttcg ctttgttatt gatacatata  3840
ccgtttaaaa ggatacatta aacaatactg aatagtactc tcaaattctg tttttcgaag  3900
gatatgagtt ggtagatatt tcacaacatc aaaaaacgaa ggtgaaaata ccttcttcag  3960
attgcaaaga attacagaaa ttttgtgcca ggtttcgcag accgcctgtt gtaagagatc  4020
```

```
gcaacatata tcttgaacca atccctcgaa agcataaata aacaaagtag acactaagaa  4080
atgattatat aaataatata atatgtttaa tttattaatt atatgtagct gcaattgctt  4140
catgaatatt atgtggtaga gactgacaaa aataaatgga aagagacact tcatcacaac  4200
atggtaatca taactcttca tccagaaaac ttccatacct cttcatttat atgagaattt  4260
aatgttatag gcaatctaat aaatactctc cctttgaagg tgcatccaac tgaaaagcag  4320
ggaccgatgc cttccctttc taggaaactt gtcgcgcctt accagaacag tactctgcca  4380
agtccaatct agacttcata ttgtcctttg tcttcctttg acattgagaa cggtgttgat  4440
tatgttgtct ataaaattct tcgtattgtg cataacatct agattatgcc ttatcaaatg  4500
gtccttccaa aaagacaatt cccaaaatat actcatctta tacaaactat gttggtcacc  4560
acaagcgttc acatgataat gataaccttc catgcattgg ccatcagaat aacatgccat  4620
atgctggaaa aaggctaata gtccacatta atactgaccc catgacaata ttctgctgac  4680
aagaaacatg aaatgcctga acactatgct cctataaatat ttgcagctca taaaacaatg  4740
attggagaaa tt                                                      4752

SEQ ID NO: 9            moltype = DNA  length = 1041
FEATURE                 Location/Qualifiers
source                  1..1041
                        mol_type = genomic DNA
                        organism = Thlaspi arvense
SEQUENCE: 9
atgacaatct tggatcagac cgttgtaaca accggatcga agaaggcttg tgtcatcggt  60
ggcacaggaa acttagcttc tactctcatc aagcatttgc ttcaaagtgg ctacaaagtt  120
aacactacag ttagagatcc agagaatgag aagaaaatgg ctcacttaag ggtacttcaa  180
gaacttgggg acctcaagat cttcaaggcg gaatttactg atgaagagag tttcgattca  240
ccagtttcgg gctgtgatta cgttttccat gtcgcaacgc ctatcaactt tacatctgaa  300
gatcccgaga aagacatgat caagccaggg atacaaggag tgaccaatgt gttgaaatct  360
tgcttaaaat cgaaatcagt caagcgtgtg atctacactt cttcagctgc tgcggtttcc  420
atcaacaatc tttctggacc tggacttgtg atgaacgaag aaaactggac tgaccttgat  480
tatctcacaa aggagaagcc gtttaactgg ggctacccag tgtcaaagat actagcagaa  540
aaggcagctt gtaaatttgc ggaagagaac aagatcgatc tagttaccgt gattccggca  600
ctcatatccg gaaaatctct cctctcggat cctcctccga gcagctcatt tctctctatg  660
tctttaatca ccgggaatga aatgtatctg aaaggtctca aggaaatgca gaagcaatct  720
ggctccatct cgttcagcca cgtgaaggat ttggctcgtg cccatttgtt tcttgcggag  780
aaagaaactg cgtctggtcg ttacatttgc tgtacttaca acacaagtgt tccggagatt  840
gcagattttc tcaggcagag atatcctaag tacaatgtgc tgtctgaatt cgaagagtgc  900
ttatcaagtg cgaagctgac gctatcttcg gaaaaactca tcaatgaagg ctttcgattc  960
gaatatggga ttaatgagat ctatgatgag atgatagagc acttcgagtc caaaggatta  1020
atcaaagcta aagaatcttg a                                             1041

SEQ ID NO: 10           moltype = AA  length = 346
FEATURE                 Location/Qualifiers
source                  1..346
                        mol_type = protein
                        organism = Thlaspi arvense
SEQUENCE: 10
MTILDQTVVT TGSKKACVIG GTGNLASTLI KHLLQSGYKV NTTVRDPENE KKMAHLRVLQ  60
ELGDLKIFKA EFTDEESFDS PVSGCDYVFH VATPINFTSE DPEKDMIKPG IQGVTNVLKS  120
CLKSKSVKRV IYTSSAAAVS INNLSGPGLV MNEENWTDLD YLTKEKPFNW GYPVSKILAE  180
KAACKFAEEN KIDLVTVIPA LISGKSLLSD PPPSSSFLSM SLITGNEMYL KGLKEMQKQS  240
GSISFSHVKD LARAHLFLAE KETASGRYIC CTYNTSVPEI ADFLRQRYPK YNVLSEFEEC  300
LSSAKLTLSS EKLINEGFRF EYGINEIYDE MIEHFESKGL IKAKES                  346

SEQ ID NO: 11           moltype = DNA  length = 4124
FEATURE                 Location/Qualifiers
source                  1..4124
                        mol_type = genomic DNA
                        organism = Thlaspi arvense
SEQUENCE: 11
gccgccgccg ccgcgaaggc caagaagaag gatgtggagg ctccgctgac aattgcttta  60
ggcttacagg cgccgaaatc gggaacgaag cggccgagtg aagggacttc aagggaggct  120
aattcaaagc gagctaagaa ggttacttca ggggacgacg agaagaagat cggcgaagac  180
tcaaagaaac ctgcttttca gagactgtgg tctgaggaag acgaaatcac tgtgcttcaa  240
ggtatgatcg atttcaatgc tgatacaggc aagtctcctt acgaagacac gaatgtgtat  300
tacgatttca tcaagaaaaa gattagcttt gaggttagca agaaccagtt catggataag  360
attaggagct tgaagaagaa gtatataggc aaaggaaaga ctgccttcac gaaacctcac  420
gatcagagat ctttcaagct gtgccaacac atatggggac ctgaaggaat ggctctcgag  480
tcagcggtta agtccaatgg cgtatcgaga aagagccaga agaagaagaa gcttgactct  540
gtgaagcaag agctgtcttt tgcttcttcc cctaatggca aaacggttga tgatgataaa  600
aaagtgttga tccatggagg agatgtggag tcttcggttg ctgcgaagaa gcatgattgg  660
ttcgagagct cgtttcttgt tcgcgccatt gccggtttgg gagttgatga gtatactgtg  720
aaacagaggt ggagcttggt gcctgttgag acgaagaaga aggttgaaga gaagatgaag  780
atgttgcagg ccaaggagat tgattttgtg ttggagaaga cacagttttt gcatgaggtt  840
acatcgatga tcgctgaagc atctaagaag aagacattag atatatagat ttgatccgaa  900
aatgccaatg ccaatgcctc tctcttttgt tttttgaatc ttaggaatta tctcttttac  960
ttccctttta tgatctatca atctatgtaa tttttctggt ttttctggtg gtttttaata  1020
tggaactctc tctcttttgg atttgttgct tatacataaa agcaccatgg aagtaaattc  1080
tacatggtga aatatgaaga agatccaaac aaactgtttt tttttttttt atgaaatggg  1140
tttattcagg atgaatttgg ttgaattgag gctaaaaaat tttggtgttc tctaaaacaa  1200
aaagttaaat gaaactttca gctcaaagat caaattggtt gaagaaagca aaactctttt  1260
```

```
cacaagtaga tgatatcaaa tcagcaagtc aattaaaagt ttgactcttt ttttgattct  1320
taggtgagag agttagttat taaagaagag gaaggtaaca caaaattagt tgcttcaaaa  1380
ctcacgtgct taccttctaa aaagactttt tgatcaatgg ttgtaccaaa tgtgcaagac  1440
cataagcttt gccactataa aaacgagtgc taaggccata aactcataac agtcagatct  1500
aaatatctgt gtttaagaac tagtatcaga tgacaatctt ggatcagacc gttgtaacaa  1560
ccggatcgaa gaaggcttgt gtcatcggtg gcacaggaaa cttagcttct actctcatca  1620
agcatttgct tcaaagtggc tacaaagtta acactacagt tagagatcca ggttcttcat  1680
ttcttctttc tttcttctct tgaggttctt tgagtgttta gtgactcttt tattctgaat  1740
ttgcagagaa tgagaagaaa atggctcact taagggtact tcaagaactt ggggacctca  1800
agatcttcaa ggcggaattt actgatgaag agagtttcga ttcaccagtt tcgggctgtg  1860
attacgtttt ccatgtcgca acgcctatca actttacatc tgaagatccc gaggtctgat  1920
tttcaacaga ttgtgtatgt ttttttttct ctgactctta agagaaacgt tttcagctat  1980
cctttgtttg tgtttccatg tacagaaaga catgatcaag ccagggatac aaggagtgac  2040
caatgtgttg aaatcttgct taaaatcgaa atcagtcaag cgtgtgatct acacttcttc  2100
agctgctgcg gtttccatca acaatctttc tggacctgga cttgtgatga acgaagaaaa  2160
ctggactgac cttgattatc tcacaaagga gaagccgttt aactgggtaa tttacaattt  2220
cttgcgagcc aagatagggt ttacttggac cagtttactt actacatctc tgttcttttc  2280
tagggctacc cagtgtcaaa gatactagca gaaaaggcag cttgtaaatt tgcggaagag  2340
aacaagatcg atctagttac cgtgattccg gcactcatat ccggaaaatc tctcctctcg  2400
gatcctcctc cgagcagctc atttctctct atgtctttaa tcaccggtaa acaccaattt  2460
tactgtttga ctccttctgt taaagtttca caataagaaa gtcaaagatg aatggttttt  2520
ttttgttagg gaatgaaatg tatctgaaag gtctcaagga aatgcagaag caatctggct  2580
ccatctcgtt cagccacgtg aaggatttgg ctcgtgccca tttgtttctt gcggagaaag  2640
aaactgcgtc tggtcgttac atttgctgta cttacaacac aagtgttccg gagattgcag  2700
attttctcag gcagagatat cctaagtaca atgtgctgtc tgagtaagca tttatatcca  2760
cagaaactga aaatcttaat ggaaaattct gaattttctc gttaattttc gctgtgaaat  2820
ttggcagatt cgaagagtgc ttatcaagtg cgaagctgac gctatcttcg gaaaaactca  2880
tcaatgaagg ctttcgattc gaatatggga ttaatgagat ctatgatgag atgatagagc  2940
acttcgagtc caaaggatta atcaaagcta aagaatcttg aaatttataa tgtgaagata  3000
tggatttatg agtatatgag tctttgttct cattctcatt ctataaatgg cattaaataa  3060
taagttggtt gatttgatat gtattttgat atacacacct agaaaatgaa aaacaagatt  3120
tttcaagctt tatattactc tacgaagctg attagtaatt ttacttctaa gtttctcaca  3180
tttcacaact accttttttc tttcccatgt tataaatata taactttttt ttcagcataa  3240
aaagaagttg tggaaagaat gcgacgaact attttaccaa aaaaaaaggt gacaatctac  3300
atggaaaaaa gtaaataaaa tgtgttaata aactttcgat ttaaacaagt tgtgtattta  3360
catacaattg atatatatat atataatact ttataatact gtattctttt atcaaaagga  3420
tatatactgt aatatttagc aaattataca taaaactatc aaattaaaga gtatgatgta  3480
ttccactgaa aacataaaaa atgatatatg tagaaaccaa cctgagtgta tgcgcgtgga  3540
tattcgttta gtaataatga taatgatatg agtagactat attacctaaa gccaatcaac  3600
atatgaccaa tctacaagct cgagctttat tagatcaaaa cataaaaatt ggtatatgta  3660
gaaatgttgt ctaaattaaa ccaagatgaa aaacatgaga aaacattaaa acatcacttt  3720
ttattcttgg tgatttgtta ttagaactcc gagcaaagaa cgaatctgtg aggacatcat  3780
gcatgtatgt cttactcagc gtaataggga cattgtgcaa gtcactgcaa gagatctcca  3840
atgatgatct aacggatcca agaaagtaaa ggaaaagaag aaggaagagc agattggtga  3900
gactcggatc caagaattag aggaagatct gaaggatctg aagcggatgt gcactgttct  3960
agaaaccttt ctagggaaag aaaaggcaaa tgtgtttgaa gccagagccc ctgctatgac  4020
gttagatgag ttgtataatg acttaggttc tgcatgatgc gttgtggtat tgtatgttca  4080
gggccggctc taagattatg ggagtttgaa acaaaataaa aaat                    4124
```

```
SEQ ID NO: 12           moltype = DNA  length = 1461
FEATURE                 Location/Qualifiers
source                  1..1461
                        mol_type = genomic DNA
                        organism = Thlaspi arvense
SEQUENCE: 12
atggatccga cgacgccgtt tctcggtggc gaggtcgaag aggattatgc tccggcgagg  60
acatggagcg acgtcaagcg agtttttgct acggagtcgg ccaaaatgtg gatgatcgcc  120
gctcccattg gtttcaacat catctgtcag tacggagtta cctccatcac caatattttc  180
gtcggccata tcggcgaggt cgagctctcc gccgtcgcca tctccctctc cgtcatcggc  240
acctttttcct tcggcttcct gcttggcatg ggaagtgcac ttgaaacact ctgtggacaa  300
gcatttggag ctggtcaagt ccatatgtta ggcgtttaca tgcagagatc ttggattatc  360
ttattcgtct cctgcatctt tctccttcct atttacatat tcgccacgcc gattctgaga  420
ctcctcggcc aagcagagga gatcgccgtt ccagctggag aattcactct tttaaccatc  480
cctcagctat tctcactcgc catcaacttc ccaacctcca agttccttca agcgcagagc  540
aaagtcatcg cgattgcttg gatcgggttc atcgctttcg tcctacacgt cggtatgctc  600
tggctgttta taatcgtgtt tggttgggga acaaacggtg ctgccttggc gtttaatctc  660
accaactggg gaacagcgat ctctcaagtc gtttatgtga ttggttggtg taatgaaggc  720
tggtctggtt tgtcttggtt ggcatttaaa gagatttggg ctttcgttag actctccata  780
gcatctgctg ttatgctttg tcttgagatc tggtacatga tgagtatcat cgtccttact  840
ggtcgccttg acaacgctgt tatcgctgtt gattcccttt ccatatgcat gaatctcaat  900
ggtctggagg ccatgttgtt catcggaata aacgctgcta taagtgtccg tgtctccaat  960
gagcttggct taggccgtcc acgagcagcg aaatactctg tctatgtcac ggtgttcgag  1020
tctctcctca tcggtcttgt ctttatggtg gctatcatca taggcagaga ccattttgcg  1080
atcatcttca cgagcagcaa agtacttcaa cgcgcagtgt ctaagctagc ttatcttctt  1140
ggtataacca tggttctcaa cagcgtgcag ccagtcattt ccggtgtggc tgttggagga  1200
ggttggcaaa gtttggtggc ttatataaac ttgggttgtt actacatttt cggccttccc  1260
tttggatatc ttcttggtta caaagcaaac ttaggagtga tgggactttg gtcgggaatg  1320
atagccggga cagcgcttca aacgttgcta ctgatgtttg tcttgtacaa gacaaactgg  1380
aataaagagg ttgaagagac gatggaacgt atgaagaaat ggggagggag cgagacgaca  1440
```

```
tcgaatgatg taactgcgtg a                                          1461

SEQ ID NO: 13          moltype = AA  length = 486
FEATURE                Location/Qualifiers
source                 1..486
                       mol_type = protein
                       organism = Thlaspi arvense
SEQUENCE: 13
MDPTTPFLGG EVEEDYAPAR TWSDVKRVFA TESAKMWMIA APIGFNIICQ YGVTSITNIF  60
VGHIGEVELS AVAISLSVIG TFSFGFLLGM GSALETLCGQ AFGAGQVHML GVYMQRSWII  120
LFVSCIFLLP IYIFATPILR LLGQAEEIAV PAGEFTLLTI PQLFSLAINF PTSKFLQAQS  180
KVIAIAWIGF IAFVLHVGML WLFIIVFGWG TNGAALAFNL TNWGTAISQV VYVIGWCNEG  240
WSGLSWLAFK EIWAFVRLSI ASAVMLCLEI WYMMSIIVLT GRLDNAVIAV DSLSICMNLN  300
GLEAMLFIGI NAAISVRVSN ELGLGRPRAA KYSVYVTVFE SLLIGLVFMV AIIIGRDHFA  360
IIFTSSKVLQ RAVSKLAYLL GITMVLNSVQ PVISGVAVGG GWQSLVAYIN LGCYYIFGLP  420
FGYLLGYKAN LGVMGLWSGM IAGTALQTLL LMFVLYKTNW NKEVEETMER MKKWGGSETT  480
SNDVTA                                                           486

SEQ ID NO: 14          moltype = DNA  length = 4540
FEATURE                Location/Qualifiers
source                 1..4540
                       mol_type = genomic DNA
                       organism = Thlaspi arvense
SEQUENCE: 14
gcagttcaca tttaaatagt ccaatatgtt attattggca agcaacccga attgaaatga  60
gacagtggaa acattagcaa tccaaaacat catacgaacc tacttctact tataccttag  120
agaagaataa tcagattacg agtaacaaga atgaagaacc tgagtcgctt agccttaatg  180
ttctaaatca aataactaat ctgagctcat ttgcaaaaca ttggcccatt ttaaaattct  240
tggcactgat acgcagcaca aaaggaggtt actgtaaaag cccaatgtgc gtacattcat  300
tattcacaaa aaaaaatctt gtttgactta aaattgtggc ccccttttttg ggtttgtctt  360
ttaatttcat gtatttttta attaattgtt ttctattttg gcattaatat ggctctatta  420
attataattt atgatacaaa atcagaatgg accgggctgg gcctttggtg aagttggtgg  480
gctcggttta agaattttat ttttttcatt attttgactt gcattaaata aaacaagtca  540
atgggaaatg tcatcattta tctgactggt ttaatgacaa aggtttaatg atgaaacagg  600
gaaataaata caaacgatga cgtaaactga aaggggacca caggaccctg tcgtttccga  660
tgaaaaagaa gaagaaaatt ccctctccga ttcttcttcc tgttcatatt cattttacaa  720
acggtacgta actcactttt taatacttca cttaaggaca tcaacctatt ttcggaaacg  780
acaactttttc cactcttggt tcgagcttag attgattcaa catttttttc ctaattaact  840
tacatatact gtattcattt tactgtctaa cagtaaactc gagctatcct ggcaagttta  900
atcttctcga caacttacta tatagttgat actatatcac taggatcaat tttataaaaa  960
aaaaaacaaa ttaatcacgt gaaaataatt ctcacacatg ataaataaac taggagtaac  1020
aagtttgatg tgacattaca ctaacaaact ttcacaacac taccctatca atattaaatg  1080
tcaaatgatg gaaaagagaa aagcagtttt atgcttttga ataatcttgt atgcatattt  1140
ctgatatgtc aaagtacgtg gtgtctcatg caccacccgt tagcctcacc tacctaatct  1200
acttctcaat tccatgccga attcggtaat aaatttctcg tacgttttgt ttttcctttc  1260
cgctaattac ccaaaaacta aaataggcta ataactcctt caatttttat tattgttatt  1320
atttgattag tatggcaaaa caaggggaga gagaagtgcg tgattcaacg gttttgttat  1380
ataaaccaaa accccataat tccgcaacaa acattgactc agagtgagag agagagagag  1440
agagagagag aagtctgtct gtgtgagctt tgggtttaac attttgagac tcgcacggag  1500
atggatccga cgacgccgtt tctcggtggc gaggtcgaag aggattatgc tccggcgagg  1560
acatggagcg acgtcaagcg agtttttgct acggagtcgg ccaaaatgtg gatgatcgcc  1620
gctcccattg gtttcaacat catctgtcag tacggagtta cctccatcac caatattttc  1680
gtcggccata tcggcgaggt cgagctctcc gccgtcgcca tctccctctc cgtcatcggc  1740
accttttcct tcggcttcct ggtatgcttt tctcttcttc taactgatat ctttcatgta  1800
actctgctat gtatcaatca agagcatctt cttgtgacaa atcgacaaga aacagagtct  1860
aatttaggtt tgaaaactgc agcttggcat gggaagtgca cttgaaacac tctgtggaca  1920
agcatttgga gctggtcaag tccatatgtt aggcgtttac atgcagagat cttggattat  1980
cttattcgtc tcctgcatct ttctccttcc tatttacata ttcgccacgc cgattctgag  2040
actcctcggc caagcagagg agatcgccgt tccagctgga gaattcactc ttttaaccat  2100
ccctcagcta ttctcactcg ccatcaactt cccaacctcc aagttccttc aagcgcagag  2160
caaagtcatc gcgattgctt ggatcgggtt catcgctttc gtcctacacg tcggtatgct  2220
ctggctgttt ataatcgtgt ttggttgggg aacaaacggt gctgccttgg cgtttaatct  2280
caccaactgg ggaacagcga tctctcaagt cgtttatgtg attggttggt gtaatgaagg  2340
ctggtctggt ttgtcttggt tggcatttaa agagatttgg gctttcgtta gactctccat  2400
agcatctgct gttatgcttt gtcttgagat ctggtacatg atgagtatca tcgtccttac  2460
tggtcgcctt gacaacgctg ttatcgctgt tgattccctt tccatatggt gagttttgat  2520
caacatttta caatgcttct tgtatcatca acatctttcc cactcttttt ttttgcattt  2580
catttcagca tgaatctcaa tggtctggag gccatgttgt tcatcggaat aaacgctgct  2640
ataaggtagt actatcatta tctgacacaa cttttgttta acccattgtt cagcttgtaa  2700
actgatcatg tgtctaccta cttgtgtact atatattagt gtccgtgtct ccaatgagct  2760
tggcttaggc cgtccacgag cagcgaaata ctctgtctat gtcacggtgt tcgagtctct  2820
cctcatcggt cttgtcttta tggtggctat catcataggc agagaccatt ttgcgatcat  2880
cttcacgagc agcaaagtac ttcaacgcgc agtgtctaag ctagcttatc ttcttggtat  2940
aaccatggtt ctcaacagcg tgcagccagt catttccggt aacaaaaatc taaaattctc  3000
atgttccatc aaaacaaaaa ccagaggtct cataagacca taaccgtccc ggtttgttca  3060
tcttgtttta ggtgtggctg ttggaggagg ttggcaaagt ttggtggctt atataaactt  3120
gggttgttac tacattttcg gccttccctt tggatatctt cttggttaca aagcaaactt  3180
aggagtgatg gtaagcgaat acaaagaatg acatgaataa tgtagatctt tcggacatgc  3240
atgtttcata aactgatacg tgagagatta taacgttttc agggactttg gtcgggaatg  3300
```

```
atagccggga cagcgcttca aacgttgcta ctgatgtttg tcttgtacaa gacaaactgg  3360
aataaagagg taaagaacac ctgagacaca aaaccgtagt atatacactg gttcattgag  3420
atcgattgac ttatggaaat ataaaattgt aaaaactgtg atgaacaggt tgaagagacg  3480
atggaacgta tgaagaaatg gggagggagc gagacgacat cgaatgatgt aactgcgtga  3540
ctatttcttt tgttaatatt aattaattaa ttattgttta gctttatata tatgaacatg  3600
taggtctcag ctttttttgtt tgttttccat tggtttggca gcaccagtaa ctctctattt  3660
actatttacg ctgtaggaaa cttttcattc agtgatgtaa cgatgcatgc ttttgtcact  3720
ttgtttctct tggagtaaac taaatgttag gtacattttc tcgtgtaaca caaattttat  3780
tagacggctt ttagtcttca atgcaaattc aagtgacttg tacatagatt cctgtcttct  3840
acttccattt ccttcagaag tcaattgtat gtttccattt tattcttcta ccggtggaaa  3900
ataatatagt atcagtacgt aatttttagc gtgcttgtaa cacaggatgg ccgagcggtc  3960
taagccacga gactcaagtt cttgtcctcc tataggagga tatggattca aatccctctt  4020
gtgacataat aatttcttta aaaaaaaaat cattttgcta tactttgcat atttttcttt  4080
ttctttttaa gaatgcatgc atgtcttact ttctcgtttc tgcttgatag gtcgtagtgt  4140
cctaataagc tcttctgaga aatctcttat ttttcttctt gaacgttgga ttcagcattt  4200
cttcattgtg atttttgact tgcgaagata cgcacactta tacattgatt agggtcatcc  4260
tcgtctcaag tgttattgca atgtctaggt ttggacatag cacactagtc tttgctattt  4320
catcacccaa aatccattaa atcatggtga tgatttgatt taaagctaat ggttttgcta  4380
atttgatttt ttttatgtgt attttttgtt ctgtaatagg tggcgtgagt ggaacaacag  4440
aagggtggaa cacaaacact tattaggtct ccctgttttc aacatgatgc atttgatttt  4500
gttggttata tctcctcaaa tgcttgttgc attgcctaaa                        4540

SEQ ID NO: 15          moltype = DNA  length = 2322
FEATURE                Location/Qualifiers
source                 1..2322
                       mol_type = genomic DNA
                       organism = Thlaspi arvense
SEQUENCE: 15
atgtcaatgg ccgtcgaaat gtcatcgaaa caacccacca aagatttctt ctcctctcca  60
gccctctccc tctctctcgc tggtatattc cggaatgcat cctccggcag caggaaccct  120
gaggaggact ttttggggag aagggtagtt gacgatgagg atcggacggt ggagatgagc  180
agcgagaact cgggacccac gagatccaga tcagaggaag acttggagga tcaagaggag  240
gaggaggagg atgaggagga agacggagca ggaaacaagg gcaacaagag gaagaggaag  300
aagtatcacc gccacaccac cgatcagatt agacacatgg aagcgctgtt caaagagacg  360
ccccatccag acgagaagca aagacagcag ctgagcaagc aattagggct ggctcctcgc  420
caggtcaaat tctggttcca aaaccgccgc acccagatca aggctattca agaacggcac  480
gagaactcgc tgctgaaagc ggaactagag aagctgaggg aggaaaacaa aggcatgaga  540
gagtcttttg ccaaggctaa ttcttgctgc ccaaactgcg gaggaggcac cgatgatgtc  600
cacatcgaga actccaaact gaaggcggag ctggataagc ttcgtgcggc tctcggacgc  660
actccctacc cactccaggc ctcatgctcc gatgatcaac cacaccgtct cgacttctac  720
acgggcgtct ttgccctcga caagtcccgc atcgtggaga ttgccagccg agccacccctt  780
gagctccaga agatggcctc ctccggccaa cctctttggc tccgcagcct tgagactggc  840
cgtgacattc tcaactacga cgagtatctc aaggacttcc ctcaagctca ggcctctccc  900
ctccatgcaa ggagatccat cgaagcatcc agggatgtgg ggatcgtgtt tatggacgca  960
cacaaacttg ctcagagttt tatggacgtg gggcaatgga aagagatgtt tgcgtgcttg  1020
atctcaaagg cggcgacggt tgatgtaatc cggcagggtg aagggccttc aaggatcgac  1080
ggtgcgattc agttgatgtt tggggagatg caactgctca ctccggttgt ccccacaaga  1140
gaagtgtact tcgtgagaag ctgccggcag cttagccctg agaaatgggc catcgtggac  1200
gtatcagtct ctctggagga agacgacaac aacaacaaca cggaggacaa ggaggcttcg  1260
ctgcttaaat gccggaaacg cccctcaggt tgcatcatcg aggacacctc caacggccac  1320
tccaaggtca cctgggtgga gcacctcgac ttgtctgcct ccaccgttca gcctctcttc  1380
cgctcctttg tcaacaccgg tttggccttt ggggctcgac actgggtcgc caccctccag  1440
ctccactgcg aacgcctcgt cttcttcatg gctaccaacg tccctaccaa ggactctctc  1500
ggtccgtcca ttatttacac tctctctctc cctctctctc tttctccctc tcaccttttc  1560
ttaaccccaa tcctcctctc aggagttaca acgcttgccg ggagaaagag cgtgctcaag  1620
atggcccaga ggatgacaca aagcttctac cgcgccattg ctgcttccag ctaccaccaa  1680
tggaccaaaa tcaccaccaa aactggacaa gacatgaggg tttcttccag gaagaacctc  1740
catgatcctg gtgagcccac cggagtcatc gtctgcgctt cttcctccct ctggttacct  1800
gtttctccca ctctcctctt cgatttcttt agagatgaag ctcgtcgcca tgagtgggat  1860
gctttgtcaa acggagctca tgttcagtct atcgcaagct tatccaaggg acaagacaga  1920
ggcaactcag tgtctatcca gacagtgaaa tcgagagaaa agagcatatg ggtgctgcag  1980
gacagcagca caaactcata tgagtcggtg gtcgtatacg ctcccgtaga tataaacacg  2040
acacagctgg tgattgcagg acatgatcca agcaacatcc aaatcctgcc ttgtggattc  2100
tcaatcatac ccgatggagt agaatcaaga ccactggtaa tcacgtctgc acaagaggac  2160
agaaacagcc aaggagggtc tctgctcaca ctggccctcc aaacgctcat caacacttct  2220
cctgcagcaa agctgaatat ggagtccgtg gaatccgtca caaacctcgt ctctctcacc  2280
ctccacaaca ttaagagaag cctccaaatc gaagattgtt ga                    2322

SEQ ID NO: 16          moltype = AA  length = 773
FEATURE                Location/Qualifiers
source                 1..773
                       mol_type = protein
                       organism = Thlaspi arvense
SEQUENCE: 16
MSMAVEMSSK QPTKDFFSSP ALSLSLAGIF RNASSGSRNP EEDFLGRRVV DDEDRTVEMS  60
SENSGPTRSR SEEDLEDQEE EEEDEEEDGA GNKGNKRKRK KYHRHTTDQI RHMEALFKET  120
PHPDEKQRQQ LSKQLGLAPR QVKFWFQNRR TQIKAIQERH ENSLLKAELE KLREENKGMR  180
ESFAKANSCC PNCGGGTDDV HIENSKLKAE LDKLRAALGR TPYPLQASCS DDQPHRLDFY  240
TGVFALDKSR IVEIASRATL ELQKMASSGQ PLWLRSLETG RDILNYDEYL KDFPQAQASP  300
```

```
LHARRSIEAS RDVGIVFMDA HKLAQSFMDV GQWKEMFACL ISKAATVDVI RQGEGPSRID  360
GAIQLMFGEM QLLTPVVPTR EVYFVRSCRQ LSPEKWAIVD VSVSLEEDDN NNNTEDKEAS  420
LLKCRKRPSG CIIEDTSNGH SKVTWVEHLD LSASTVQPLF RSFVNTGLAF GARHWVATLQ  480
LHCERLVFFM ATNVPTKDSL GPSIIYTLSL PLSLSPSHLF LTPILLSGVT TLAGRKSVLK  540
MAQRMTQSFY RAIAASSYHQ WTKITTKTGQ DMRVSSRKNL HDPGEPTGVI VCASSSLWLP  600
VSPTLLFDFF RDEARRHEWD ALSNGAHVQS IASLSKGQDR GNSVSIQTVK SREKSIWVLQ  660
DSSTNSYESV VVYAPVDINT TQLVIAGHDP SNIQILPCGF SIIPDGVESR PLVITSAQED  720
RNSQGGSLLT LALQTLINTS PAAKLNMESV ESVTNLVSLT LHNIKRSLQI EDC         773

SEQ ID NO: 17           moltype = DNA  length = 5982
FEATURE                 Location/Qualifiers
source                  1..5982
                        mol_type = genomic DNA
                        organism = Thlaspi arvense
SEQUENCE: 17
aacccataaa gagcattcat ttccttttaa ggtcgctgaa attaatgagt aacgatcagt  60
caatgcgtct cgttgacctt ccaaaacatc cgacgtctct ttccgttgca tatccctcgg  120
ctctgtccct gcagctccca cgtcatccat atttcccctc tatccaattt ttaactttct  180
aacttattca acaactcttc ctccatgcat ttacctcatt atctaatcgt attgtttact  240
agtagtaata tagcatacta gagtagtaga ttcggattcc cggaataata tatattagca  300
taagttattg gagcacaagg catttcaggt ttccatgtag ctccaataat atcctcttca  360
ctctctctta ccaatgcttt tccactttcc tatgtcacgc aattactagc ttgcttgctt  420
tacaaccaag ttttattaac caacataaaa tatagagatt taatgttgca ttttgtaatc  480
ataagttact aattgcttga agaaagagat cacaataaca gacaatacgt acacattaca  540
tcataaccag gtaagtatat agtatataat aaataaataa atagaagtca taataagaga  600
aatgatgatg ataatcaagg aggaaagaag aaagcagaaa atgcggttgg agaattaggt  660
gcttaaagtt agttgagtcc atcccagtat ctaacggtca actctctcct ctttcgtcct  720
tatttgtatt ttattttgtt tttgaaacaa taaactgaca tacaatatgt ctttctctca  780
ctactctctc tctctctctc tctatacaca aattcaatta aagaagagac agagaagttc  840
gccttttgtc tgtataccct taaatcatgc aacccccta ttctcattcc ttctctctgc  900
ctacagtaaa ctctaggaac gacattatgt ggtttaaacc gattcaattc atgattagtg  960
gcaaaattct atatgatttt caaccacatg atatatgatt ttcaacagta atattgtgcg  1020
gaaaaataat gcacagcatt ttattctata tacaaaaggt aaattggaaa ggagaatttt  1080
ccagatgcaa tagcgaattt gctcgaatat ttttataaaa aaaaacgaag tcgatatcga  1140
cgcctgcaaa taatgtagct ggccatgttt gcaaagtaat caagtgtgaa taaaattgta  1200
aaactaatgg agtatatata gatattaaaa agaagaaggg gttggttaaa tataattaaa  1260
tgaagcacct aaaagtcaag caatagagaa atatctgaaa aacgaccgtt tgtatgtata  1320
attagaattg aagggctagc ttagctatat agccatatac agtatatgtg aaagagtaca  1380
ttttggtaca cacacacaca aaaaaaaaga aataaggaaa atatatagag atatataaat  1440
agcacaagga agaaggagga gagggaagat aaagcaaata aaaaaattgg gagcgttcgt  1500
atgtcaatgg ccgtcgaaat gtcatcgaaa caacccacca aagatttctt ctcctctcca  1560
gccctctccc tctctctcgt acgcgtactc tctgttctac tactctcgta aactcatcta  1620
aataaaaatt tactgtattg tatatatgta tctatttgtg aatggtactg atataaatac  1680
aggctggtat attccggaat gcatcctccg gcagcaggaa ccctgaggag gactttttgg  1740
ggagaagggt agttgacgat gaggatcgga cggtggagat gagcagcgag aactcgggac  1800
ccacgagatc cagatcagag gaagacttgg aggatcaaga ggaggaggag gaggatgagg  1860
aggaagacgg agcaggaaac aagggcaaca agaggaagag gaagaagtat caccgccaca  1920
ccaccgatca gattagacac atggaagcgt acgttcttcc ttccttaatt attattcttt  1980
atatttcatc tgtagctcta atggattacc atttaatcaa attagggttt caaaacatgg  2040
aacatttcga ttaattggtc ttgatgatat atgaatttga tgacctcaac tcctccatat  2100
atacttcaat tatgactagt catcatcatc atgccctaca catagggatt agagtatata  2160
gtagtcagtc tgtgctgaac agtaggcctc ttcatttcta ctgccatata aaaaggaaga  2220
atgcatattt catgtattta ttagtagtga tgaacaaatt aatatatatt gcagatcgat  2280
gatccagcaa tagttaatta tttgaatgcg tttaattaca tatcttgctc tttaattttc  2340
tctcgtactc cctagtatat acatgtgttt atactataac ataggacggg acaagtgttt  2400
ccattcaatc accctatgat taaactaaaa ccaagttctt tcaaaacaaa aaactaaaac  2460
caagagcact aatgtgtata gctagttagg gctcatataa ttaagagttt aattcatact  2520
atgttttcga ataggaggat aaaaaaaaga tatgaaagaa ttaattaaat atgaagaatg  2580
atcatggagc tatgaatgag aaaactgagg gttgcattgc aggctgttca aagagacgcc  2640
ccatccagac gagaagcaaa gacagcagct gagcaagcaa ttagggctgg ctcctcgcca  2700
ggtcaaattc tggttccaaa accgccgcac ccagatcaag gtatgtatat cgacgtacgt  2760
gatgatgatg atatatatgg atttcttaag acaaaaagac tattcgcttg gagctacata  2820
tgtatatagt tatagtgaaa tactgaaatg taactgaaca ggctattcaa gaacggcacg  2880
agaactcgct gctgaaagcg gaactagaga agctgaggga ggaaaacaaa ggcatgagag  2940
agtcttttgc caaggctaat tcttgctgcc caaactgcgg aggaggcacc gatgatgtcc  3000
acatcgagaa ctccaaactg aaggcggagc tggataagct tcgtgcggct ctcggacgca  3060
ctccctaccc actccaggcc tcatgctccg atgatcaacc acaccgtctc gacttctaca  3120
cgggcgtctt tgccctcgac aagtcccgca tcgtggagat tgccagccga gccacccttg  3180
agctccagaa gatggcctcc tccggccaac ctctttggct ccgcagcctt gagactggcc  3240
gtgacattct caactacgac gagtatctca aggacttccc tcaagctcag gcctctcccc  3300
tccatgcaag gagatccatc gaagcatcca gggatgtggg gatcgtgttt atggacgcac  3360
acaaacttgc tcagagtttt atggacgtgg tactcttttt ctttcatttc ctccaaatat  3420
ttacgaatat acttttgtgt atcacatgta ggcaatataa agatatatat acaacgtgca  3480
ggggcaatgg aaagagatgt ttgcgtgctt gatctcaaag gcggcgacgg ttgatgtaat  3540
ccggcagggt gaagggcctt caaggatcga cggtgcgatt cagttggtta gtgaatcacc  3600
ttttgataga tagtgatgac acgcgagaga tgagagctaa tataatacat tgatggacat  3660
attggcagat gtttggggag atgcaactgc tcactccggt tgtccccaca agagaagtgt  3720
acttcgtgag aagctgccgg cagcttagcc ctgagaaatg ggccatcgtg gacgtatcag  3780
tctctctgga ggaagacgac aacaacaaca acacggagga caaggaggct tcgctgctta  3840
```

```
aatgccggaa acgcccctca ggttgcatca tcgaggacac ctccaacggc cactccaagg  3900
tcacctgggt ggagcacctc gacttgtctg cctccaccgt tcagcctctc ttccgctcct  3960
ttgtcaacac cggtttggcc tttggggctc gacactgggt cgccaccctc cagctccact  4020
gcgaacgcct cgtcttcttc atggctacca acgtccctac caaggactct ctcggtccgt  4080
ccattattta cactctctct ctccctctct ctctttctcc ctctcacctt ttcttaaccc  4140
caatcctcct ctcaggagtt acaacgcttg ccgggagaaa gagcgtgctc aagatggccc  4200
agaggatgac acaaagcttc taccgcgcca ttgctgcttc cagctaccac caatggacca  4260
aaatcaccac caaaactgga caagacatga gggtttcttc caggaagaac ctccatgatc  4320
ctggtgagcc caccggagtc atcgtctgcg cttcttcctc cctctggtta cctgtttctc  4380
ccactctcct cttcgatttc tttagagatg aagctcgtcg ccatgaggta ccttgtggca  4440
tacacttcct tcgcacacac agaaccaata aaaccgtttt aaatctaact atacatacgt  4500
attattatca tcagtgggat gctttgtcaa acggagctca tgttcagtct atcgcaagct  4560
tatccaaggg acaagacaga ggcaactcag tgtctatcca gacagtgaaa tcgagagaaa  4620
agagcatatg ggtgctgcag gacagcagca caaactcata tgagtcggtg gtcgtatacg  4680
ctcccgtaga tataaacacg acacagctgg tgattgcagg acatgatcca agcaacatcc  4740
aaatcctgcc ttgtggattc tcaatcatac ccgatggagt agaatcaaga ccactggtaa  4800
tcacgtctgc acaagaggac agaaacagcc aaggagggtc tctgctcaca ctggccctcc  4860
aaacgctcat caacacttct cctgcagcaa agctgaatat ggagtccgtg gaatccgtca  4920
caaacctcgt ctctctcacc ctccacaaca ttaagagaag cctccaaatc gaagattgtt  4980
gatgacaact cacagcaggt gtgatgattg ttgttacata tataagtata tcataatgta  5040
tagcagtgca ttaagttttg tacaaaaaca accctctctc tctctcccgc aatcatactg  5100
ttatccaaca ctttttgcag cattaagaga gcatcatact cgactaagaa cccaatacac  5160
aaaactttac cgaaacaaaa gtgggatcag atgaaccaaa tgcataaccc tgatttagat  5220
acacagtaat tggatcagaa acgaaggcct gatcaaattc cacaacttaa acaatacgca  5280
attcgagcag gaaaacaaaa tgcattccat aaacagagag aattacactt gattgcaata  5340
cacaacaaac agaaacgaaa aacagtaaaa aagacagctt ttttttttta ccaaaacaaa  5400
caaacactca gtgagtcgca ttctcctcta cgccggctgc tgagattcca agggaatgcc  5460
gaggtcgttc ccagcttctc ctccgccttc cgctttcctg ctgctccttg agacgacagc  5520
aagcgccacg aatgacttag tcttactgat gggtctgctc ttctccagcc tcaccacatc  5580
gcccaccttg aactgattat ccgggtcatg cgcctggtac ttcttcttct tcctcacgcg  5640
cctcttgtac ttgggatgcg gagccagcct caccacctcc accgccacgg tcttgtcgtt  5700
ggttgcgcac accacgcgcc cctgcatcgt tttcatggct ctgatgaccg gaaccaatgc  5760
cggccttcga gggttcggga ataaattggg cttagagaga gatgagagtg gagtcgagcc  5820
atgggcgaat ggagacgaaa gcttcagagc ttgcagagat gaggttatta gcgacgtcat  5880
cgttatcccc ctcctctatg ggatcgattt ggaagacgat gaagaagata aggcgataga  5940
tcatgttatt ataatattgg cttttgctaa atgggttaac aa                    5982

SEQ ID NO: 18          moltype = DNA  length = 2007
FEATURE                Location/Qualifiers
source                 1..2007
                       mol_type = genomic DNA
                       organism = Thlaspi arvense
SEQUENCE: 18
atggctacta cgtataagcc taagaacatt ctcatcactg gagctgctgg attcattgcc  60
tctcatgttg ccaacagatt aatccgtagc tatccagatt acaagatcgt tgtgttggac  120
aagcttgatt actgttcaga tctgaagaat ctcgatcctt cgttttcttc tccaaatttc  180
aagtttgtga aaggagatat cgcgagtgat gacctcgtta actacctcct catcactgaa  240
aacatcgaca ccatcatgca ctttgctgct caaacccatg ttgataactc ctttggtaat  300
agctttgagt tcaccaagaa caacatttat ggtactcatg tcctcttgga agcctgtaaa  360
gtaacaggac agatcaggag gtttattcat gtgagcaccg atgaagtcta tggagaaacc  420
gatgaggatg ctgctgtagg aaaccatgag gcgtctcagc ttttacccac aaacccatac  480
tcagccacta aggctggtgc tgagatgctt gtgatggctt acggtagatc atacggactg  540
ccggttatta caactcgtgg gaacaatgtt tacggtccta accagtttcc cgaaaaactg  600
attcctaagt tcatcttgtt ggctatgagt gggaagccgc ttccgatcca cggagatgga  660
tctaacgtaa ggagttactt atactgtgaa gacgttgctg aagcgtttga ggttgttctt  720
cacaaaggag aagtcggtca cgtctacaac atcgggacaa agagagaaag aagagtgatc  780
gatgtggcga cagacatctg caaacttttc gggaaagatc ctgagtcgag catcgagttc  840
gtggagaatc gaccgtttaa cgatcaaagg tacttccttg atgatcagaa gctgaagaat  900
ctgggttggt cagagcgaac cgcgtgggaa gatggactga agaagacaat ggaatggtac  960
attcagaatc ctgagtggtg gggtgatgtt tctggagctt tgcttcctca tccgagaatg  1020
cttatgatgc ccggaggaag agttcctgac ggctccgatg agaagaatga ctcgtcaagc  1080
aacgcggtcc agacattcac ggttgtaaca ccgaacaaca agactggtgg ttctagtgac  1140
aaagctttct tgaagttttt gatctacggt aagactggtt ggatcggtgg tctcttaggg  1200
aaactatgtg agaagcaagg gattacttat gagtatggga aaggacgttt agaagataga  1260
gcctctctcg tcgcggatat tcgcagtatc aaaccgaccc atgtgtttaa cgctgctggt  1320
ttaactggca gaccaaacgt tgactggtgt gaatctcaca aaccagagac cattcgtgtc  1380
aatgtcgctg gtactttgac tctcgctgat gtttgcagag agaatgatct cttgatgatg  1440
aacttcgcca ccggttgcat attcgagtac gatgctgcac atccagagcg ttcgggtatt  1500
ggtttcaagg aagaagacaa gccgaatttc actggctctt tctactcaaa aaccaaagcc  1560
atggtcgagg agcttctgag agaatttgac aatgtgtgta ccttgagagt gcggatgccg  1620
atctcatcag acctaaacaa cccgagaaac ttcatcacga agatctcgcg gtacaacaaa  1680
gtggtgaaca tcccgaacag catgaccata ctggacgagc ttctgccgat ctccatcgag  1740
atggcgaaga gaaacctaag agggatatgg aacttcacca acccaggggt ggtgagccac  1800
aacgagatac tggagatgta caagagttac atcgagccag ggtttaaatg gtccaacttc  1860
acagtggaag aacaagcaaa ggtcattgtt gctcctcgaa gcaacaatga aatggatggg  1920
actaaactaa gcaaggagtt cccagagatg ctaccaatta aagaggcgct gatcaaatac  1980
gtcttcgaac ctaacaagag aacctga                                     2007

SEQ ID NO: 19          moltype = AA  length = 668
```

```
FEATURE               Location/Qualifiers
source                1..668
                      mol_type = protein
                      organism = Thlaspi arvense
SEQUENCE: 19
MATTYKPKNI LITGAAGFIA SHVANRLIRS YPDYKIVVLD KLDYCSDLKN LDPSFSSPNF  60
KFVKGDIASD DLVNYLLITE NIDTIMHFAA QTHVDNSFGN SFEFTKNNIY GTHVLLEACK  120
VTGQIRRFIH VSTDEVYGET DEDAAVGNHE ASQLLPTNPY SATKAGAEML VMAYGRSYGL  180
PVITTRGNNV YGPNQFPEKL IPKFILLAMS GKPLPIHGDG SNVRSYLYCE DVAEAFEVVL  240
HKGEVGHVYN IGTKRERRVI DVATDICKLF GKDPESSIEF VENRPFNDQR YFLDDQKLKN  300
LGWSERTAWE DGLKKTMEWY IQNPEWWGDV SGALLPHPRM LMMPGGRVPD GSDEKNDSSS  360
NAVQTFTVVT PNNKTGGSSD KAFLKFLIYG KTGWIGGLLG KLCEKQGITY EYGKGRLEDR  420
ASLVADIRSI KPTHVFNAAG LTGRPNVDWC ESHKPETIRV NVAGTLTLAD VCRENDLLMM  480
NFATGCIFEY DAAHPERSGI GFKEEDKPNF TGSFYSKTKA MVEELLREFD NVCTLRVRMP  540
ISSDLNNPRN FITKISRYNK VVNIPNSMTI LDELLPISIE MAKRNLRGIW NFTNPGVVSH  600
NEILEMYKSY IEPGFKWSNF TVEEQAKVIV APRSNNEMDG TKLSKEFPEM LPIKEALIKY  660
VFEPNKRT                                                          668

SEQ ID NO: 20         moltype = DNA  length = 5240
FEATURE               Location/Qualifiers
source                1..5240
                      mol_type = genomic DNA
                      organism = Thlaspi arvense
SEQUENCE: 20
acccttattt tcaatcacag ctccccaaga tagatcagtt aagcaacagc aacacacata  60
tggccattga tgctaagctg ttgcaggcgc aatcacagtt cggtccagcg ggagcagcag  120
cggttgcggt agcggcacac cggaacattg gcacaattag ttacggcgca gcatcgtaga  180
ctcatcaaac aaacagcatt ttcagacaca tctttaactt acatcaccct ccaaatccag  240
gcaacgcgaa accaggtgat tccggtctcg gtctctttat gtaagtatta ttcagccagg  300
ctctgattta aacaactttg cagtgatatt aataaaagac tttcagttgt aactcaccag  360
aacaagatcg cttagatcag tctgatcccg ggttatcacc ggtgattgtt tcggttatct  420
tgtttgctcc atagtctttg aatttgttat aagcgtagtt catcgaagag aagaaaaccg  480
tcgtgattat atacttctta aacttcaaga tcggtcccat tactccttaa ttgttcttca  540
acaatgatga atctctttgt ctatcagaaa attgattgat ctatttggct atatagagag  600
aatcattagg ccgaaaattg tggaagtcaa caaaagtcat tggtccgtag atctttctca  660
tccgtaaatc aatcttttgc acattataat tagccatttt attcaatggt taccagtaaa  720
aaagatatgt aaaagataat ttcgaattct tgacgccatt aaagtgtcta tataatttac  780
ccgccaattt aagataaccg gttttatggg cctgaactca gcacattaaa ggttaacatt  840
tactataata attcaatgaa cttaactcct tttcttcaat tacatgaaaa agtgcatttt  900
tgtctacttg attttttaat tgatgaaaaa ggaagtaaat taattattcc gttacgtgac  960
cttaagcatc agcattgaat catctgttat gtttaatttc aggtcttttc ttgttgaact  1020
gatgattgat atcaggttga catgtgatat ttctattcag tctagaatta tttgtttttc  1080
taactgaaca tatgtacgtt ttatcataaa caaatcaggg attttattaa atcccaagtt  1140
taaccttcca ataaaagaaa tcatattttt attcagttta aatcatttta agaaatatat  1200
atcagacaaa aatgcaaaat attttgttta cttcttccac aattaattaa tctccttaat  1260
tatacaaatt ttattctctt tttatttttt ggaattttct tctattagta tagattttgt  1320
gtgaaaaaat aaacaaaaaa aagacatcaa atttttatgt cggacgctaa gctcacgtaa  1380
aatccgtaat atctaagaca agtaagggta aatttgtcaa ttgacccccta cggttctccg  1440
taactgtctc aggatatatg aggcgcactg ttcagagacg ctccgtagac cgtagattcc  1500
ctcttcttcc tcctctctct ctctctctct ctctctctct ctcttctcat agaagtgtct  1560
ctctctctct cttaggattc ttctctgatt ctaacctgaa ttgtgtcggt acgtgatatg  1620
ttgctctctt tttgttgctg ctgaaatttc cataatgctt taagttaatt ttgcgaaatg  1680
ctatacgtga gtaacggaca agtgtacaac atcagacaac tgatcttgtt tttgttcttt  1740
tttttagatt tctgtgttgt cggtttatga tcccatatga aaagttcatt atttttgttc  1800
gtataagatc tggctactga atttattcgg ttttggcgat tggatctgga tctgccttta  1860
ttctgatttc ctttcatatg atccgttctg aattttcgaa tgatactgtg acgttattgt  1920
tgttgttgtt gcagatactt gatttcaaat ggctactacg tataagccta agaacattct  1980
catcactgga gctgctggat tcattgcctc tcatgttgcc aacagattaa tccgtagcta  2040
tccagattac aagatcgttg tgttggacaa gcttgattac tgttcagatc tgaagaatct  2100
cgatccttcg ttttcttctc caaatttcaa gtttgtgaaa ggagatatcg cgagtgatga  2160
cctcgttaac tacctcctca tcactgaaaa catcgacacc atcatgcact ttgctgctca  2220
aacccatgtt gataactcct ttggtaatag ctttgagttc accaagaaca acatttatgg  2280
tactcatgtc ctcttggaag cctgtaaagt aacaggacag atcaggaggt ttattcatgt  2340
gagcaccgat gaagtctatg gagaaaccga tgaggatgct gctgtaggaa accatgaggc  2400
gtctcagctt ttacccacaa acccatactc agccactaag gctggtgctg agatgcttgt  2460
gatggcttac ggtagatcat acggactgcc ggttattaca actcgtggga acaatgttta  2520
cggtcctaac cagtttcccg aaaaactgat tcctaagttc atcttgttgg ctatgagtgg  2580
gaagccgctt ccgatccacg gagatggatc taacgtaagg agttacttat actgtgaaga  2640
cgttgctgaa gcgtttgagg ttgttcttca caaaggagaa gtcggtcacg tctacaacat  2700
cgggacaaag agagaaagaa gagtgatcga tgtggcgaca gacatctgca aacttttcgg  2760
gaaagatcct gagtcgagca tcgagttcgt ggagaatcga ccgtttaacg atcaaaggta  2820
cttccttgat gatcagaagc tgaagaatct gggttggtca gagcgaaccg cgtgggaaga  2880
tggactgaag aagacaatgg aatggtacat tcagaatcct gagtggtggg gtgatgtttc  2940
tggagctttg cttcctcatc cgagaatgct tatgatgccc ggaggaagag ttcctgacgg  3000
ctccgatgag aagaatgact cgtcaagcaa cgcggtccag acattcacgg ttgtaacacc  3060
gaacaacaag actggtggtt ctagtgacaa agctttcttg aagtttttga tctacggtaa  3120
gactggttgg atcggtggtc tcttagggaa actatgtgag aagcaaggga ttacttatga  3180
gtatgggaaa ggacgtttag aagatagagc ctctctcgtc gcggatattc gcagtatcaa  3240
accgacccat gtgtttaacg ctgctggttt aactggcaga ccaaacgttg actggtgtga  3300
```

```
atctcacaaa ccagagacca ttcgtgtcaa tgtcgctggt actttgactc tcgctgatgt  3360
ttgcagagag aatgatctct tgatgatgaa cttcgccacc ggttgcatat tcgagtacga  3420
tgctgcacat ccagagcgtt cgggtattgg tttcaaggaa gaagacaagc cgaatttcac  3480
tggctctttc tactcaaaaa ccaaagccat ggtaaaatac taatatctat aactcatgac  3540
agtctcgaaa caaagaagag tgtctttgtt tataatctgg ttctgctttt ttctcttctt  3600
ctttgttcac caggtcgagg agcttctgag agaatttgac aatgtgtgta ccttgagagt  3660
gcggatgccg atctcatcag acctaaacaa cccgagaaac ttcatcacga agatctcgcg  3720
gtacaacaaa gtggtgaaca tcccgaacag catgaccata ctggacgagc ttctgccgat  3780
ctccatcgag atggcgaaga gaaacctaag agggatatgg aacttcacca acccaggggt  3840
ggtgagccac aacgagatac tggagatgta caagagttac atcgagccag ggtttaaatg  3900
gtccaacttc acagtggaag aacaagcaaa ggtcattgtt gctcctcgaa gcaacaatga  3960
aatggatggg actaaactaa gcaaggagtt cccagagatg ctaccaatta aagaggcgct  4020
gatcaaatac gtcttcgaac ctaacaagag aacctgagac ctgaacagca ctcttcgcca  4080
caagtgctta cctataactg tttccttttc tttctttctc tttcaacaga aatgtctttt  4140
tatgtttact catcgtctta tgatccttgt aggtagtttc actatattga ttctactaaa  4200
atatgattta tcattattat ttatagagac taaagttttt tttttctttc tcaaattcta  4260
catttcccct cggattttac ttactaagag acagtagtac acttataaaa atgaagagcc  4320
acttactggt tgtgatcatt agggattcca ccaaggcagg ttcaaaacac ttgaacttga  4380
ttattaagct atagcctgag aagagaagca aacaacaagt gttgatttga aataaaccga  4440
agtatatgat gtgaatttgg tcaatattca gggttatagt tttcttacgt gaacagttga  4500
gggcgggaac gagagagctg agagcgttta ataggggaga gaataaggtt tcgtagagtt  4560
gactggggat tagcagcgcc accaccaccg ccaaatacag gatgtcctcc tcctcctgct  4620
cttctgtttc caaggtctgt tggaattgcg ggtgagtcgt tggagatgtc gaatggacct  4680
gagtttgaac tgttctgtct tgctggccaa atctcatctt taggtcctgg tgttgcagga  4740
gagtaaaacg accggtctgc gccaaataag tcaacttgat ttggagatat taaccaacaa  4800
tagacttgga atcaaaagaa gcactaggct caaggtagtt cattaacctt tgcgaggggg  4860
ctctctgttc tccatcatgt taactggtgg gtttgagaaa aagtcaggtt cgtggtgtcg  4920
tgggtagaaa ttgtttgctg gttggatggc tgtacgttta catgactcgt attcacttct  4980
tagctggtca tacatctcat cgagcttcct cttctgtctg gtgtttgaaa caataattac  5040
agctgagtta gagataagga acagaaccag gcaaacaaag cgtgtgttaa atcactgacc  5100
ttgatttctc ggagaacttc tcttggagct cttgtttatc cttggtcaag ttttctacct  5160
cttgctccat catctgacac ctcttgccca tcttctggta tgctgtatgc acctgctcca  5220
ttttctcgct aaactttgct                                              5240

SEQ ID NO: 21          moltype = DNA  length = 1995
FEATURE                Location/Qualifiers
source                 1..1995
                       mol_type = genomic DNA
                       organism = Thlaspi arvense
SEQUENCE: 21
atggctacat ataagcccaa gaacatcctc atcactgggg ctgctggatt catagcgtcc  60
catgtcgcca acaggcttgt tcgaagctac cctgactaca aaatcgttgt gcttgacaag  120
cttgattact gctcaaacct gaaaaacctc aatccttcga aatcctctcc aaacttcaag  180
tttgtcaagg gagacatcgc cagtgctgac ctcgtcaact accttctcat cactgaaaac  240
atcgacacga ttatgcactt tgctgctcag acccatgtcg acaattcctt cggtaacagc  300
ttcgagttta ccaagaacaa tatttacggc acccatgtcc ttctggaagc ttgcaaagtc  360
actgggcaga tcaggaggtt catccatgtg agtaccgatg aggtctatgg agagactgat  420
gaggatgctt cagtgggaaa ccatgaggct tctcagttgc tccctacaaa cccttactct  480
gccactaaag ctggagctga gatgcttgtg atggcatacg gtagatcata cgggttgcca  540
gttataacga ctcgcgggaa caatgtctat ggtccgaatc agtttcctga aaagttgatc  600
cctaagttca ttctgttggc tatgagtggg aagccactgc cgatccacgg agatggatct  660
aacgtgagga gttacctcta ctgcgaagat gttgctgagg cgtttgaggt tgttctacac  720
aaaggggaag tcaaccatgt ctacaatata gggacaacga gagaaaggag agtgattgat  780
gttgccaacg acatctcaaa actctttgga atagaccctg actccaccat tcagtttgtt  840
gagaaccggc cttttaatga ccagaggtac ttcctcgatg accagaagct gaagaagttg  900
ggatggtctg aacgaaccac ttgggaagaa ggactgaaaa agacaatgga ttggtacact  960
gcgaaccctg agtggtgggg agatgtctcc ggagctctgc tgcctcatcc acggatgttg  1020
atgatgcctg gtgatagact ctctgatggc tctgacgagc gcaaggatgc agacggtaat  1080
cagacattca cggtggttac tcccaccaag gccggtggtt ccgcagacaa aacatcctta  1140
aagttcctca tctatggcaa aactgggtgg ctcggtggtc tcctaggaaa gatatgtgag  1200
aagcaaggga ttccgtacga gtatggaaaa gggagactag aagacagagc ttcaatcatg  1260
gcggatattc gcagcgtcaa acctacccat gtcttcaatg ccgcgggctt aacaggcagg  1320
cctaatgttg actggtgtga gtctcacaaa accgagacta tccgagtcaa cgtcgctggt  1380
actttgactc tggcagatgt ttgcagagag aatgatctgt tgatgatgaa ctttgccacc  1440
ggttgtatat ttgagtatga cgctgcacat ccagaaggtt cagggattgg cttcaaggaa  1500
gaagacaaac cgaatttcac cggttccttc tactcaaaga caaaggcaat ggtcgaagag  1560
cttctaagag agtttgacaa cgtatgcacc ttgagagtga ggatgccaat ctcatccgac  1620
ttgaacaacc cgcgaaactt catcacaaag atctcgcgtt acaacaaagt ggtgaacatc  1680
ccaaacagca tgaccatact cgacgagctc ttaccaatct caatcgagat ggcgaagagg  1740
aacctacggg ggatttggaa tttcaccaac ccaggagtgg tgagtcacaa cgagatacta  1800
gagatgtaca agagctacat cgagccaggt ttcaaatggt ccaacttcac tttagaggaa  1860
caggctaagg tcattgtcgc accacggagc aacaacgaga tggatggttt taagctcagc  1920
aaggagtttc cagagatgct ttccatcaaa gattcgttga tcaaatacgt cttcgaaccc  1980
aacaagagaa cgtaa                                                   1995

SEQ ID NO: 22          moltype = AA  length = 664
FEATURE                Location/Qualifiers
source                 1..664
                       mol_type = protein
```

```
                        organism = Thlaspi arvense
SEQUENCE: 22
MATYKPKNIL ITGAAGFIAS HVANRLVRSY PDYKIVVLDK LDYCSNLKNL NPSKSSPNFK  60
FVKGDIASAD LVNYLLITEN IDTIMHFAAQ THVDNSFGNS FEFTKNNIYG THVLLEACKV  120
TGQIRRFIHV STDEVYGETD EDASVGNHEA SQLLPTNPYS ATKAGAEMLV MAYGRSYGLP  180
VITTRGNNVY GPNQFPEKLI PKFILLAMSG KPLPIHGDGS NVRSYLYCED VAEAFEVVLH  240
KGEVNHVYNI GTTRERRVID VANDISKLFG IDPDSTIQFV ENRPFNDQRY FLDDQKLKKL  300
GWSERTTWEE GLKKTMDWYT ANPEWWGDVS GALLPHPRML MMPGDRLSDG SDERKDADGN  360
QTFTVVTPTK AGGSADKTSL KFLIYGKTGW LGGLLGKICE KQGIPYEYGK GRLEDRASIM  420
ADIRSVKPTH VFNAAGLTGR PNVDWCESHK TETIRVNVAG TLTLADVCRE NDLLMMNFAT  480
GCIFEYDAAH PEGSGIGFKE EDKPNFTGSF YSKTKAMVEE LLREFDNVCT LRVRMPISSD  540
LNNPRNFITK ISRYNKVVNI PNSMTILDEL LPISIEMAKR NLRGIWNFTN PGVVSHNEIL  600
EMYKSYIEPG FKWSNFTLEE QAKVIVAPRS NNEMDGFKLS KEFPEMLSIK DSLIKYVFEP  660
NKRT                                                         664

SEQ ID NO: 23           moltype = DNA  length = 5650
FEATURE                 Location/Qualifiers
source                  1..5650
                        mol_type = genomic DNA
                        organism = Thlaspi arvense
SEQUENCE: 23
cctttcgttt gcatttttgt gttacggtgt gatatctggt gaggatgtac atatgtggta  60
aagtggcaat aatagtagct atttataaaa ttttatcata aatattattt tttacatgaa  120
actatatata atacaaaatt tttaggcaaa caaaaaattat tagtcaaaaa gtataattca  180
aaactcactt gattcaaata tcggaatcag cgcgctagat ggggtgataa gatttaccat  240
ctcaactaaa tgaccatata tatgactcca tataaatata atcaaatagt tttgatttaa  300
taaaacgttt actattatat acgtttaata aaaaagtact ttaccagctt ttacgtgagt  360
tatggaaaaa ttatgaaatc caagatgtaa tcaagggttg ctgtccaaaa aaataaaaaa  420
aaaacattag ttaagggttg ataagacgta gaaataaata gatcgttacg taaaacatct  480
gcaggaagtg tattgatttg taaacgttaa aatacttctc tctgaccatt tattatatgt  540
cagtcgttat aagagaaaac aaaacgcaca tgttatattg acatgtggac gataatgtat  600
attgacatgt gaagaagcca actccgtacg taaagcgcca tttgcgctgc aaatactgat  660
cctcaactac agtggattct ttctcacaa aaacatagac cgtttcaaat atatgttccc  720
aaacacttgt gagacattct atacaaagtt tatcatgcac ccttcctttt tttttaacgt  780
caaaatgatc atgtacttct gtcacattat ttttgtacat tatgaatata tagacatttg  840
tattctctct ttcgccgaat acacacatct atatatttgt aaatgtagca ggtttaaatt  900
ttggagtaaa agaatagttg attttgacca catagagaac taatggatca attctcacta  960
atacaaatat ttggtgaaag ccttagaggt gagaaagtcc aaggcccata aaggcctatt  1020
acggccaccc ccggtcacgt aaaaccaagc ctcgttctcg ttgatgaggc cgaatataaa  1080
aggcatcatc aaatcaaaca tgtgcgtaac gtgatattta atttagcatt tgcaagtaat  1140
gatcacttct gtttttttctt ttagtattta gttcttcact taagttttcc acgttattta  1200
ttaatataca ggaactgctt tttcttattt tattggaaaa atcatgtttt atgtttgttc  1260
aattaaaatt tcagcacaat ttctttttca ttttttttata tgaaaacttt aaggtagaaa  1320
tgggaaattg cgaaaccgaa tcatgcggac aaaacgaaat ttctgcgttg cctatatttt  1380
ttgttggtaa tttttaaaac aataaacaat taatttgacg tgataaaaac aaagggacat  1440
gaaaaaactc taaaagcgta gtaatggtaa tttggtaatt tcaaagtccg ctggttctcc  1500
gtaactgtct caaattaaaa agagggctta ctgttttctg acgctcgtta gattccctct  1560
ctttcttctt catttttctcc tcttcgtctt cactgctaat tcccttgatc tctctccctg  1620
tcctccaatt ttccctctct acaaatatcg actccttctt caatattaga ttgatcctga  1680
tccgattcga gccggtacgt acctgaactg tttctgtttc tctgagctaa ttcgtgaatg  1740
tacgaggttc tgctgcgttt tatttttttt gatggtatag ttgacatgtt ttcaggattt  1800
tttgttgtat actctgatct ttgatgcttg tttatcgttt tgccattgga tctgctgctc  1860
gatctgggca atttctcgca tttgattgct acatttgtca taacttcggg atctggatct  1920
accttttttt tctgatcatt tagaatttcg ctaacagctt tagattttcg tacttatcgc  1980
gtggatttgg cttcccgcta cttgttcagc tgtatctgtt aaaatctcac aaatttttat  2040
tgaactgaat catggggttt tcaataggat agatctggtt gagttgttct cctcagtagc  2100
tgtttccttc cacatttgag cttaatcgat ttcatggagt aatacgggtg atcgtgattt  2160
cgttaatcac atctgatccg atgacgttca tgatatatat actagccatt atttacctgt  2220
ttgctggatc ttttgtcctt cgattaaatc tggctgtttc gtcattgacg agtgtactga  2280
aagcttttcc gaatgcaaat ataatgtttt gtgttgttgc agattatata tttatcatca  2340
catggctaca tataagccca agaacatcct catcactggg gctgctggat tcatagcgtc  2400
ccatgtcgcc aacaggcttg ttcgaagcta ccctgactac aaaatcgttg tgcttgacaa  2460
gcttgattac tgctcaaacc tgaaaaacct caatccttcg aaatcctctc caaacttcaa  2520
gtttgtcaag ggagacatcg ccagtgctga cctcgtcaac taccttctca tcactgaaaa  2580
catcgacacg attatgcact ttgctgctca gacccatgtc gacaattcct tcggtaacag  2640
cttcgagttt accaagaaca atatttacgg cacccatgtc cttctggaag cttgcaaagt  2700
cactgggcag atcaggaggt tcatccatgt gagtaccgat gaggtctatg gagagactga  2760
tgaggatgct tcagtgggaa accatgaggc ttctcagttg ctccctacaa acccttactc  2820
tgccactaaa gctggagctg agatgcttgt gatggcatac ggtagatcat acgggttgcc  2880
agttataacg actcgcggga acaatgtcta tggtccgaat cagtttcctg aaaagttgat  2940
ccctaagttc attctgttgg ctatgagtgg gaagccactg ccgatccacg gagatggatc  3000
taacgtgagg agttacctct actgcgaaga tgttgctgag gcgtttgagg ttgttctaca  3060
caaaggggaa gtcaaccatg tctacaatat agggacaacg agagaaagga gagtgattga  3120
tgttgccaac gacatctcaa aactctttgg aatagaccct gactccacca ttcagtttgt  3180
tgagaaccgg ccttttaatg accagaggta cttcctcgat gaccagaagc tgaagaagtt  3240
gggatggtct gaacgaacca cttgggaaga aggactgaaa aagacaatgg attggtacac  3300
tgcgaaccct gagtggtggg gagatgtctc cggagctctg ctgcctcatc cacggatgtt  3360
gatgatgcct ggtgatagac tctctgatgg ctctgacgag cgcaaggatg cagacggtaa  3420
tcagacattc acggtggtta ctcccaccaa ggccggtggt tccgcagaca aaacatcctt  3480
```

```
aaagttcctc atctatggca aaactgggtg gctcggtggt ctcctaggaa agatatgtga  3540
gaagcaaggg attccgtacg agtatggaaa agggagacta gaagacagag cttcaatcat  3600
ggcggatatt cgcagcgtca aacctaccca tgtcttcaat gccgcgggct taacaggcag  3660
gcctaatgtt gactggtgtg agtctcacaa aaccgagact atccgagtca acgtcgctgg  3720
tactttgact ctggcagatg tttgcagaga gaatgatctg ttgatgatga actttgccac  3780
cggttgtata tttgagtatg acgctgcaca tccagaaggt tcagggattg gcttcaagga  3840
agaagacaaa ccgaatttca ccggttcctt ctactcaaag acaaaggcaa tggtaatata  3900
ctactacatc acataaccaa atcacatgtg atcctcaaac tgtgcaactc tgttcataaa  3960
tcctctgttt ctattttcgc caggtcgaag agcttctaag agagtttgac aacgtatgca  4020
ccttgagagt gaggatgcca atctcatccg acttgaacaa cccgcgaaac ttcatcacaa  4080
agatctcgcg ttacaacaaa gtggtgaaca tcccaaacag catgaccata ctcgacgagc  4140
tcttaccaat ctcaatcgag atggcgaaga ggaacctacg ggggatttgg aatttcacca  4200
acccaggagt ggtgagtcac aacgagatac tagagatgta caagagctac atcgagccag  4260
gtttcaaatg gtccaacttc actttagagg aacaggctaa ggtcattgtc gcaccacgga  4320
gcaacaacga gatggatggt tttaagctca gcaaggagtt tccagagatg ctttccatca  4380
aagattcgtt gatcaaatac gtcttcgaac ccaacaagag aacgtaatac cctcagtaac  4440
acatacacac acacacactt cctctttatc tgttcattgt tatattatta tcttgcaggt  4500
agtttcacca ctataatgat tctactataa ttttattttg tcatatgatt catttactct  4560
tttttggct ttctacgtcg aacatgtagc tctcttgacg cattctacgt cacaacacat  4620
tttgttttca ttaatattat ttattaaacg ataaaattgc ttgaagttta ttactttcac  4680
tattgattcc tccttttagt tttcatctca aaagagcaga ggacagagat taagaacgaa  4740
acagcattga ctgataactt atttccctat gcttttaaac ttgaggtttc tatttgttac  4800
aaaacaatgt ctttcataaa gttaaatctt tctattgcat aaatcgaaac tgcaaactca  4860
aaatgtaata taaattaaac cttctgtact tcctgtcccc aaatcttcac catacgacca  4920
tctaaaagca gaatttttca cactacgaac aacattccat aatctgatca tccttgcaac  4980
aaagcatacc gattcgtaag ccttcaattt gaatgaagac gtaaaatgat gaataaaagg  5040
taagagagag gaacagaaaa agctcagcac cttgaaattt gttgttctct tcacatagct  5100
tgagcgtatt gttgtctaga caatggtgga atttcttgtc ccgtcataaa atttaaagtc  5160
aaaagtcagt agtagttggt gattgattgg ctcctgagtt cttacaaagg aggagaacac  5220
ttaaaaaaca gagtatgaga atataccttc tgcctctgta gacaaccaat catgtgcaca  5280
gaacagagcc tgtctaatat cagggctcaa ggaactctgg ctatcatcga tcaccggtct  5340
cccggagttg aacgttgaat caggcgcaag gatcgacatc ggcgtcccca agatatcgcg  5400
tgccatcata gagaggatag ggtatctcgg cgtatggacc ttccagtaat tcagaatgtt  5460
gaactcgcca ctacgaggaa agattggttc agacaagtac ttgtccaagt ccgatgttgt  5520
gttctggctc tgagatgtct cgtggagaaa cttgtcgaat cctttcaacc tgtctctagt  5580
gtccatacct gctctaccta agccagagcc agagtaggaa gagtcgtccc caacaatggc  5640
tgagcatatc                                                         5650
```

```
SEQ ID NO: 24          moltype = DNA  length = 1092
FEATURE                Location/Qualifiers
source                 1..1092
                       mol_type = genomic DNA
                       organism = Thlaspi arvense
SEQUENCE: 24
atgggtagac attcttgctg ttacaaacaa aagctgagga aagggctttg gtctcctgaa  60
gaagacgaga agcttctcaa tcacatcaca aatcacggcc atggctgctg gagctctgtc  120
cctaaactcg ctggtttgca gagatgcgga aagagttgca gactgagatg gatcaattac  180
ttgagacctg atttaaagag aggagctttc tctccagagg aagaaaatct catcgtcgag  240
cttcacgctg tcctcggaaa cagatggtca cagattgcag caaggcttcc gggaagaacc  300
gataacgaga tcaagaatct gtggaattca agtatcaaga agaaactgaa acaaagaggc  360
attgatccaa acacacacaa acccatctct gaagttgagg gctttagcga caaagacaaa  420
ccagcaacaa gcgacaataa aagaagcagc aacgatcata agtctccgag ttcctcctct  480
gcaaccaacc aagacttctt cctagaaagg ccatctgatt tctccgacta cttcggtttt  540
cagaagctta acttcaactc caacctcgga ctctctgctg caactgattc ttcactctgc  600
tccatcattc cggcgcagtt tagccccgga aacatgtctg gttctgtctt ccagactccg  660
gtatgcgtaa agccttcaat tagtcttcct ccggacaaca gttcgagcac cgtctccgga  720
ggagatcatg tgaaactggc tgcacctaat tgggaatttc agacaaacaa cgcctccagt  780
ttcttcgaca atggcggatt ctcatggtca atcccaaatt cttcttcttc actagtcaaa  840
cccaatcata acttcgaaga aatgaaatgg tcagagtatt tgaacacacc gttcttcaat  900
gggagcactg tacagagtca aagctcacaa ccgatctaca tcaaatcaga ggcagattac  960
ttagccaatg tttcgaacat gacagatcct tggagccaaa cccagaacga gaatttgggc  1020
acaaatgaag ctactgacgt gttctccaag gatcttcaga gaatggccgt ctcctttggt  1080
cagtcccttt ag                                                      1092
```

```
SEQ ID NO: 25          moltype = AA  length = 363
FEATURE                Location/Qualifiers
source                 1..363
                       mol_type = protein
                       organism = Thlaspi arvense
SEQUENCE: 25
MGRHSCCYKQ KLRKGLWSPE EDEKLLNHIT NHGHGCWSSV PKLAGLQRCG KSCRLRWINY  60
LRPDLKRGAF SPEEENLIVE LHAVLGNRWS QIAARLPGRT DNEIKNLWNS SIKKKLKQRG  120
IDPNTHKPIS EVEGFSDKDK PATSDNKRSS NDHKSPSSSS ATNQDFFLER PSDFSDYFGF  180
QKLNFNSNLG LSAATDSSLC SIIPAQFSPG NMSGSVFQTP VCVKPSISLP PDNSSSTVSG  240
GDHVKLAAPN WEFQTNNASS FFDNGGFSWS IPNSSSSLVK PNHNFEEMKW SEYLNTPFFN  300
GSTVQSQSSQ PIYIKSEADY LANVSNMTDP WSQTQNENLG TNEATDVFSK DLQRMAVSFG  360
QSL                                                                363
```

```
SEQ ID NO: 26          moltype = DNA  length = 4198
```

```
FEATURE                Location/Qualifiers
source                 1..4198
                       mol_type = genomic DNA
                       organism = Thlaspi arvense
SEQUENCE: 26
aaaataatta attctaactt atgacttaaa aaccttgtat acgtctagct aaatcttatt  60
ttcgacgatc ttttttagga ttgggtccca ataaacaaat ggataaacgg taagagtcta  120
attacgagag gccatgtcca gataacgtaa gaaaactaca aaaattcaac atgtgaatat  180
ttgagggaaa gtttgggtaa atggacaaag aatataccct ctctattatg actggcttaa  240
aggcaaaaaa agggagaaaa ttgccaaaga gaagtgagtc catttaaatt taaaaatgta  300
taaagcaaac aaaagagaga cttaattatt ctcattcatc tgcaaaagaa accatgtatt  360
taaagcaaaa tttctaaatt ccgttatgta gacatttaat tccatttaat catttctgga  420
aacattaacc aatgatgaca atttcttgct ggttataaac ctttcccatt atttccttta  480
attgatgcgt tcatcttcac aaagatttag tccacattta gcatttgctt ttaattcatt  540
gcagaagtct ttcatgacga caacaatcaa ctcttctttg tccacattct tatctagcta  600
tacgatctac ctcgtgtgtt attttaattc ttccgttctc actgtaaatc atttttgtat  660
agcgcttcca ccgctaacta ttgaatatca cttttcaata cattaatcgt tacaataagt  720
ttgtagctgc aagaaaaaat ttagactcgg atgcatttgg taacatagat atcatataaa  780
acttttaaac tttttctcgt catgcatcac tcaaagagtg ctatatcctt gtcacatacc  840
aaaaacgttt taggagcacg cattgcttca aactctcgtc tatgtgcgat ttcgatacat  900
ttttctaatt actctcaagt ctcaactaag cacacttaat tatggatttc ttttttaaaa  960
atagcctatt tctcgattta caccactgta aatatatttc cataaattct atatcgaacc  1020
atatactaca tgagtatttt taagtgaaaa ctaattattt tgtgacataa aaaacctgat  1080
atacgtctac caaaaaaggt tttttttgta aaccatgact tacgtgaatc tccgaaataa  1140
aaatctttag aaaagttgtt gaggtcacgc tggcttttgg ctgcgtacgt atagagtggt  1200
ccgtaacatc ttcgaggaca aactgaacat aaatgagcat gtctccacta cttagaacca  1260
cacttactat taattttaaa agaagttttt tttttttttt atcaattgtt gcatttgtat  1320
gtatgatcat aatgggtcca tttggagatg acgaatgtat gatgattaga gtgatgtaaa  1380
ggtcaaaact acatgaactc catctcttaa ccctgattat tttaccattg gtgtgaacca  1440
atctgatgtg gaccaatcat attgttttta caaaagctaa aaaagatgta catacttttt  1500
gctatttaat ctttaaagag agtatagaat ttcaacaaac ccttccgaag aaagtgactt  1560
ttcttagtcc tattaatact ctctctctct ctggagatct gttatttcgt tttctccacc  1620
tttctcttca gattccatta accttcaaaa gttttaaata catgctctct gctcaaagcg  1680
tttttctttc gttacttgta aagtaaaaca cagagctctc ttctctttca tcgttccttt  1740
gctcagcatt gcagctttaa taaaccaaaa tgggtagaca ttcttgctgt tacaaacaaa  1800
agctgaggaa agggctttgg tctcctgaag aagacgagaa gcttctcaat cacatcacaa  1860
atcacggcca tggctgctgg agctctgtcc ctaaactcgc tggtaacatt ttcttcctta  1920
attcatggga tacaaaacat gaacttaaaa aggctacctt ttttgtaata acaattcaca  1980
aatctgagtc tactacaggt ttgcagagat gcggaaagag ttgcagactg agatggatca  2040
attacttgag acctgattta aagagaggag ctttctctcc agaggaagaa aatctcatcg  2100
tcgagcttca cgctgtcctc ggaaacaggt aataattcat agaaaacaga ggatcatgtt  2160
tgtgtcttaa gcttcctctg tttttaacag aggatcatgt atatctttta accttcctct  2220
gttttttat cagatggtca cagattgcag caaggcttcc gggaagaacc gataacgaga  2280
tcaagaatct gtggaattca agtatcaaga agaaactgaa acaaagaggc attgatccaa  2340
acacacacaa acccatctct gaagttgagg gctttagcga caaagacaaa ccagcaacaa  2400
gcgacaataa aagaagcagc aacgatcata agtctccgag ttcctcctct gcaaccaacc  2460
aagacttctt cctagaaagg ccatctgatt tctccgacta cttcggtttt cagaagctta  2520
acttcaactc caacctcgga ctctctgctg caactgattc ttcactctgc tccatcattc  2580
cggcgcagtt tagccccgga aacatgtctg gttctgtctt ccagactccg gtatgcgtaa  2640
agccttcaat tagtcttcct ccggacaaca gttcgagcac cgtctccgga ggagatcatg  2700
tgaaactggc tgcacctaat tgggaatttc agacaaacaa cgcctccagt ttcttcgaca  2760
atggcggatt ctcatggtca atcccaaatt cttcttcttc actagtcaaa cccaatcata  2820
acttcgaaga aatgaaatgg tcagagtatt tgaacacacc gttcttcaat gggagcactg  2880
tacagagtca aagctcacaa ccgatctaca tcaaatcaga ggcagattac ttagccaatg  2940
tttcgaacat gacagatcct tggagccaaa cccagaacga gaatttgggc acaaatgaag  3000
ctactgacgt gttctccaag gatcttcaga gaatggccgt ctcctttggt cagtcccttt  3060
agcttttttt ttttcttctt ttctttattc taacagatgt agagaacaaa aaaatataca  3120
atacatacat acgtacagtg gatttaagtc tgtatattcc atgagctgtc tttattttta  3180
catttttaa gtgtgtttta tacgtcaaat attcttctat tttttgcaaa cctttcagtc  3240
tcatactata tatacacttt tatttctttt gttttgttat aaagattatg atgcatagaa  3300
ttctcgatga tttcagaggc ctgtgtttgc aattaatctg ttgaagaaca atgatgaaag  3360
taataaatca gtttctgtct gtttccgtga acgagttgta atccagagtc acatccttca  3420
ccatttttca gacctgtaat gaattaaaag acaaaaaagg acaaaaacat aaaactaaag  3480
caaatcataa taaataaact aaagtgggaa ttagctcaac taataagaag ggacactttt  3540
ttcgaaagga cccgagtttt aatacgatgt aaatttttta aaaaaaaaga tttctctttt  3600
ctgaaatcaa tgactgatca catatttgag agattagaaa tcgaataccc ctaatttctt  3660
cgggctatta taaactttga aaaaggtacg tatgtcgttt ttgcttagtc ttatcagaga  3720
actggaattg tccccattga cggcgtcgga atattcttta gcggtagaaa attcggaaca  3780
gttcgagaat tttctatttt tttgtctgtt aaataaaata gttatatgat ttgaccttaa  3840
taaacatgaa ggaggtgatg actgatgaga aggtgacttc atttttaatc ctaaaaagtc  3900
aattgattta ttttataacc catatttttt tttttagatt ctaatccaaa acaattactt  3960
attacttttt tagaaataac ctaacgcaat aactcgactg ataggtaaaa ctaaggtact  4020
ataatatgtt tgttttgact ttaaatttaa agacgatgct atattttttt gaaaatgaaa  4080
agaaattgat ctatcaaaca cataagtcta gattcaacag taattataaa aatagaataa  4140
agagagaaaa gttaatattt tcttggcatt atgagaaatc aaatatattt aacctata    4198

SEQ ID NO: 27          moltype = DNA  length = 939
FEATURE                Location/Qualifiers
source                 1..939
```

```
                      mol_type = genomic DNA
                      organism = Thlaspi arvense
SEQUENCE: 27
atgttctcat cactctccaa ccacaattca ccacaatcaa tggagtcacc acaatacgag  60
atctcttcaa gctcttcttc tgaaaaacct agatactact ttcaatcatc tgatatattc  120
cccaacctca ctcaaaaccc tagtaacagc aatacccaaa tcgagtcgtt accgcttatc  180
gatgggataa atttaaactc aaaccttaac ctaaacctta agccaccgta tgttgaaaaa  240
gaagaggaag agaaagaaga ggaggaagat cacgttgatc tgagcttata catcggcctt  300
cctagctctg ataattcgag aaacggtgtt aaactgccga agaagaaaaa tgggaaggac  360
atcatcactc atgacgctgg aaaacagatg gagaatgaac tttccggcaa agcatactgg  420
attccggcgg tggagcaaat tataataggc ttcactcatt tttcttgcca tgtatgcttc  480
aagacattca atcgctacaa caatcttcag atgcacatgt ggggccacgg ttcacaatac  540
aggaaaggac cagagtcact taaagggacg cagccacgag caatgctagg gatcccttgt  600
tactgctgcg tcgaagggtg taggaaccac attgaccatc ctcgatccaa gccgcttaaa  660
gacttccgaa cgctccaaac acactacaaa cgcaaacacg gccaaaagcc ctatgcgtgt  720
cgcatctgcg gtaagctgtt ggctgtcaaa ggcgattggc gcacacacga gaagaattgt  780
gggaaacgct gggtttgcgt ttgcggttct gactttaaac acaaacgctc ccttaaggac  840
catgttaagg cttttgggcc tggtcatggg tcttatctaa ccggtttgct tgacgagcag  900
gcctctcatt cttctctctc tgagaatttg ttcttttaa                         939

SEQ ID NO: 28         moltype = AA  length = 312
FEATURE               Location/Qualifiers
source                1..312
                      mol_type = protein
                      organism = Thlaspi arvense
SEQUENCE: 28
MFSSLSNHNS PQSMESPQYE ISSSSSSEKP RYYFQSSDIF PNLTQNPSNS NTQIESLPLI  60
DGINLNSNLN LNLKPPYVEK EEEEKEEEED HVDLSLYIGL PSSDNSRNGV KLPKKKNGKD  120
IITHDAGKQM ENELSGKAYW IPAVEQIIIG FTHFSCHVCF KTFNRYNNLQ MHMWGHGSQY  180
RKGPESLKGT QPRAMLGIPC YCCVEGCRNH IDHPRSKPLK DFRTLQTHYK RKHGQKPYAC  240
RICGKLLAVK GDWRTHEKNC GKRWVCVCGS DFKHKRSLKD HVKAFGPGHG SYLTGLLDEQ  300
ASHSSLSENL FF                                                      312

SEQ ID NO: 29         moltype = DNA  length = 4025
FEATURE               Location/Qualifiers
source                1..4025
                      mol_type = genomic DNA
                      organism = Thlaspi arvense
SEQUENCE: 29
ttattgttta tcaccagttt ggttgtcatt aattaataag taagatttgt gtttagtgac  60
ggctgattcc gtttctagtg agtcagatgc gagatgattg aaaaccgaga agacgatgac  120
tccacaaaat aagattttgt ttaagtttta taattgagtt ttagcgaaat tcgttttcaa  180
ttttttttt tagctttatt ttttttattg agaatttaag aattataaaa gtttttttagg  240
taaaatttga agaaatttttg attaataaat tatttaatga aatagcttta aattattggt  300
tgtagaagat gacataacag ttttgaactc tactattgat taattatttt tgctgatgtg  360
gcatattgtt ttattcttat tagttagttt tttcataatt taatgatgtg gtaatttgtt  420
atattcttat taactgatta ttttgatgat tatttttgct tatgtgacac cttttagaga  480
gcaggaaatc tatcctttta tataaaggag attagatttt accgatcatg tattatttag  540
tagccaattc catacgtaaa aaaaaagatt tttacaattt ggttataaat agcctgcatg  600
ttttatcggt cctatcttga ttgtatatcg taaaaaaaga tgctgactct aagaaaacga  660
atttcatatg gaccgtagta acagggccca cgagtaatta gggttttaac ggctgacatt  720
ttgatctctc atacatctaa gtatctaact agaagtgttg accgttagag aagaattaaa  780
taacttacat acatacaaaa acataagtcg aagaataatc ataacagtgc atcttctaca  840
ataatgataa caaaaaaagt aaattagaaa ttagcattta ttccaattaa tacccatatt  900
cgaaaatgca catggtagaa aagcaaaaaa agcttacgta aattccaaat attgtcaaac  960
ccctgcaatg acaaagttgc caaaaattga agaggttggt ccacacaatt taaggttctt  1020
tgcttcacac tctatttata ggcaaagaga tgaaacagag gagattaaat tgcttcttaa  1080
caaaggttgt tttcactcaa ccacatgcct tctcaagtgt ctgctgctca cattccccga  1140
gattctcatt tactttttcc tctatttggt acgtacttta tattacaatt ctatttgttt  1200
ctttgattat tcgttttgtt catacttagt tatcataaac atacatagtt gatcttatat  1260
tatacagtaa atttgataaa tgtttctctt aattaattta ctcacgcaat ttaaaggaga  1320
cgattgatac gcgggcctac ttacgcacct gcatgattat tagttataaa agttattgca  1380
aacattaaat tactttgata gctagagagc aattattata taaagctaat ttttaattgt  1440
agatatacat ttagtcgaaa gttaaaaaga aaaatgaaat ccctaaacaa acgttcccaa  1500
atgttctcat cactctccaa ccacaattca ccacaatcaa tggagtcacc acaatacgag  1560
atctcttcaa gctcttcttc tgaaaaacct agatactact ttcaatcatc tgatatattc  1620
cccaacctca ctcaaaaccc tagtaacagc aatacccaaa tcgagtcgtt accgcttatc  1680
gatgggataa atttaaactc aaaccttaac ctaaacctta agccaccgta tgttgaaaaa  1740
gaagaggaag agaaagaaga ggaggaagat cacgttgatc tgagcttata catcggcctt  1800
cctagctctg ataattcgag aaacggtgtt aaactgccga agaagaaaaa tgggaaggac  1860
atcatcactc atgacgctgg aaaacagatg gagaatgaac tttccggcaa agcatactgg  1920
attccggcgg tggagcaaat tataataggc ttcactcatt tttcttgcca tgtatgcttc  1980
aagacattca atcgctacaa caatcttcag gtacaaacca atgttatctc atgcgcatta  2040
cgtgcatgca taaccaaata aaatcttaat tcatatttga atttgtttgt tagagaacaa  2100
acggagaaaa tcctattcga tttatatgtt tataaccccc ttatctaatg ttatgagtta  2160
gaatgaattt atacatacat aatcaaaccc taagttgact aactatatat tattttgtag  2220
aataattgtt aatatagatc tgtttggatg catggttgag atttaattaa aatatactgt  2280
taaataaacc caaatttaaa atgaatttaa tagtttttct ccatataatt aattaacgtt  2340
tcctttaaaa tttcatccaa attaataatt aatagattac ttcagtgaaa caatatgatc  2400
```

```
gatcaacaat aagattgtaa tgattaatga accattttat tagttgttaa acttatattt  2460
gattaaaaaa aggtgggggg tatttgttat gaaaatttat cttgaaatcg tcagtctaac  2520
cattgttatc catttcattt tttgttatta catatactga tatacaaatc tttgttgaca  2580
ccaaatatga attcagatgc acatgtgggg ccacggttca caatacagga aaggaccaga  2640
gtcacttaaa gggacgcagc cacgagcaat gctagggatc ccttgttact gctgcgtcga  2700
agggtgtagg aaccacattg accatcctcg atccaagccg cttaaagact tccgaacgct  2760
ccaaacacac tacaaacgca aacacggcca aaagccctat gcgtgtcgca tctgcggtaa  2820
gctgttggct gtcaaaggcg attggcgcac acacgagaag aattgtggga aacgctgggt  2880
ttgcgtttgc ggttctgact ttaaacacaa acgctccctt aaggaccatg ttaaggcttt  2940
tgggcctggt catgggtctt atctaaccgg tttgcttgac gagcaggcct ctcattcttc  3000
tctctctgag aatttgttct tttaaaactt tgtgcatcta tcagtctttt gacgtgtgtt  3060
gtccgtttat ttagtctaga ataatgtggt atctaataat tctcgtagtg aataatatca  3120
taatctactt gatatgagag gtcaacatat ttagtcccgc agttaataat atcataattt  3180
ggtgcaccaa ctaagggaaa tgactatcag ccacacttag ggattactca ttaatcgtag  3240
actcataaaa gctatatgtt taaaaatgct agtttgtata catatcatta gccacactta  3300
gggattacgc ataaaccgta gactcataaa atctatatgt ttaaaaatgt tagtttgtat  3360
aaaaggagat atatatgaaa tgagtaagga agtcacattc aagagcaagt gtagtgtgct  3420
ttccgagaaa tttcctccac atgtccagac ggtacgaaat gccagttaat tccaattcta  3480
tcattattga tctgaatgtg atcgcaaaac atgatttgat tagtttcctc tctttataat  3540
ttactaaaat aaaatgacga ccatataaca tcatttttca gaaggaaatt aaaacatatc  3600
aagaatattc atgtaaaata gttaaaatat cagttaaaaa tgttaccatt ctatacatat  3660
tatattttat atacatggac tgaattcgac aatattggta aatatcaata aatccaaaat  3720
cctgattatt tgtaaatcaa taaaatagta ttatgataca aaccaattca tatacggtga  3780
ttcgaaattt cagtacatca tgaacatgga acaatggatt ttatgaactg atgagttgtc  3840
caacgttcgt tacgtgcatg cattcaatgc ctcggtgcca cattactcac cttttatgta  3900
tcctctctcc attgtttttt ttttttatc taacttattg ggtatccaaa ttcatttttg  3960
atccttattt tagtgaaacc atgcatgtcc tacgtactat cgctcgtcat atttaaagga  4020
acagg                                                              4025

SEQ ID NO: 30          moltype = DNA  length = 966
FEATURE                Location/Qualifiers
source                 1..966
                       mol_type = genomic DNA
                       organism = Thlaspi arvense
SEQUENCE: 30
atgttctcat cactctccaa ccacgattca ccacattcaa tggagtcacc agactcacca  60
caatatgaga tctcttcatg ctcttcttct gaaaaaccta gatactactt tcaatccctt  120
gatctcttcc ccaacctcac tcaaaacgct tgtaacaaca ataacctaat cgagccttta  180
ccacttatcg atcggataga ctcaagctca aaccttaacc ttaaccgtaa gccaaaggca  240
ttgtatgttg aggaaggaga ggaagaggaa gaacaggagg aagaggacgt ggatgtgagc  300
ttacgcatcg gccttcctgg ctctgataat ttgagcaacg gtgctaaatt ttcgaagaaa  360
aatgggaagg agatcatcac tcacgatgcc ggaaaacaat cagagaatga actttccggc  420
aaggcatact ggattccagc agtggagcaa attataatag gcttcactca tttttcttgt  480
cacgtctgtt tcaagacatt caaccgctac aacaatcttc agatgcacat gtggggccac  540
ggttcacagt acaggaaagg accagattca cttaaaggga cgcagccacg agccatgcta  600
gggatccctt gttactgctg cgtcgaaggc tgtaagaacc acattgacca tcctcgctcc  660
aagccgctca aagactttcg aacgctccaa acgcactaca aacgcaaaca cggccaaaag  720
ccctatgcgt gtcgcatctg cggtaagctt ttggctgtca aaggtgattg gcgtacgcat  780
gagaagaatt gcgggaaacg gtgggtttgc gtttgcggtt ccgattttaa acacaaacgc  840
tccctgaagg atcacgttaa agcttttggg cctggtcatg ggtcttatcc gaccggtttg  900
tttgatgagc aggcctctaa ttcttctgtc tttgaaagtt tgttctgtgt gatcggtgag  960
tattag                                                             966

SEQ ID NO: 31          moltype = AA  length = 321
FEATURE                Location/Qualifiers
source                 1..321
                       mol_type = protein
                       organism = Thlaspi arvense
SEQUENCE: 31
MFSSLSNHDS PHSMESPDSP QYEISSCSSS EKPRYYFQSL DLFPNLTQNA CNNNNLIEPL  60
PLIDRIDSSS NLNLNRKPKA LYVEEGEEEE EQEEEDVDVS LRIGLPGSDN LSNGAKFSKK  120
NGKEIITHDA GKQSENELSG KAYWIPAVEQ IIIGFTHFSC HVCFKTFNRY NNLQMHMWGH  180
GSQYRKGPDS LKGTQPRAML GIPCYCCVEG CKNHIDHPRS KPLKDFRTLQ THYKRKHGQK  240
PYACRICGKL LAVKGDWRTH EKNCGKRWVC VCGSDFKHKR SLKDHVKAFG PGHGSYPTGL  300
FDEQASNSSV FESLFCVIGE Y                                            321

SEQ ID NO: 32          moltype = DNA  length = 3923
FEATURE                Location/Qualifiers
source                 1..3923
                       mol_type = genomic DNA
                       organism = Thlaspi arvense
SEQUENCE: 32
cacgaaacaa gttcaattaa atttaacgga aataaatggt aattaatgaa agtttgaatt  60
gtattaatta ctgcttccac gaaacaacca aaaaaatcat ttgacaaagt aatttgtgta  120
cggtattagc cacatggggc caatcctcta tgtatatcgg agttgttttg ccaaatgccc  180
aattcttact ctagtaaata ttaaaccatt ttgtagatcc taatcttgag tcaactcaaa  240
gtcctatgtt tggaaactaa aaataagttt aaatcctcta gactacgact aagttgtaaa  300
aagaaatgtt caaaattcct tagacattga aattgaatac ttcaattaaa gaaaatttta  360
ccagcatgtt catagtagta gaccaccaca gaacaaaatt aatagttttt acattgcatt  420
```

```
cttatataat aattttggag tataattgta attataaaca aaataactaa aagaaaagga  480
aagtattctt gacatattta taggtactaa tttgctagta cgactattaa ttatggagat  540
taaatctagt atttgactaa ccagaaacat tttaaaggta agtgataagt tgataacctc  600
gcaattattt ttgaaagcta ttaatcactt tagcagaatg tatacaagtt ctatattaac  660
aagtttatct caaaatcttg agatcctact aataaatcat aacttttctc ttattggtat  720
gtcgaatcta gtgtttacca aactagaggt gttgaccgtt agagacaatt aaacaactta  780
catacataca aaagtacaag ccgaagaata atagtaataa cagtgcattt tctacaataa  840
ttaaaacaaa aaagtatatt aaaaattagc atttattcca attaatacca atattcgaaa  900
attaatatgg tagaaaagca aaaagcttac gtaaattcca cagattgtca aaaccctgca  960
atgaaaaagt tgccaaaaat tgacgaggtt ggtccacaaa atttaaggtt ctttgcttca  1020
cactctattt ataggcgaag agatgaaaca gaggaaatta attactcctt aacaaaggtt  1080
gttttcactc aaccacatgc cttctcaagt gtctgctgct cacattcccc gagattctca  1140
tttacttact cctctatttg gtacgtcctt tatattacaa ttctagtatt ttttttttca  1200
ttattcgttt tgttcatact tcgtttcata aacatatata gttaatctta tattatacag  1260
taactttgat aaatatgtat cttaatttac tcacgcagtt tagagagacg attgatacgt  1320
ggggactact tacgtacctg catgattata taagttataa aagttattgc agaacattaa  1380
attactttga tagctcgaga gcaatcatta tataaagcta tatttttaat cacaaatata  1440
catctactcg aaagtttttt ttttaaaaaa aagatgaaat ccctaaacaa acgttcccaa  1500
atgttctcat cactctccaa ccacgattca ccacattcaa tggagtcacc agactcacca  1560
caatatgaga tctcttcatg ctcttcttct gaaaaaccta gatactactt tcaatcccct  1620
gatctcttcc ccaacctcac tcaaaacgct tgtaacaaca ataacctaat cgagccttta  1680
ccacttatcg atcggataga ctcaagctca aaccttaacc ttaaccgtaa gccaaaggca  1740
ttgtatgttg aggaaggaga ggaagaggaa gaacaggagg aagaggacgt ggatgtgagc  1800
ttacgcatcg gccttcctgg ctctgataat ttgagcaacg gtgctaaatt ttcgaagaaa  1860
aatgggaagg agatcatcac tcacgatgcc ggaaaacaat cagagaatga actttccggc  1920
aaggcatact ggattccagc agtggagcaa attataatag gcttcactca tttttcttgt  1980
cacgtctgtt tcaagacatt caaccgctac aacaatcttc aggtaccaat gttatctcaa  2040
ccaaattaaa accagaattc aaattcgttt ttttgtttct ttatttaata aaaatagact  2100
ttaatatata tatgtttgga tgcatggtaa agaaaatatt tattgaatag accatggttt  2160
aaattcaaat tacaagtttg attggctatc gttttaatag tttttcctct tataattaac  2220
tcttccttta atagttattc aaagagattt caaccaaatt aatacacaga tttcttcaat  2280
gaaacagtat gatcgatctc taacaagatt gtaatgattg atgaaccatg ttattattag  2340
ttaaaataaa attggagtca aagatatgtg tatttgctgt gaacatttat cttgaatacg  2400
gcagtcaaac catttttat caatttcatt ttttgttttt acgtatgcaa atctttgttg  2460
actccaaata tgaatgcaga tgcacatgtg gggccacggt tcacagtaca ggaaaggacc  2520
agattcactt aaagggacgc agccacgagc catgctaggg atcccttgtt actgctgcgt  2580
cgaaggctgt aagaaccaca ttgaccatcc tcgctccaag ccgctcaaag actttcgaac  2640
gctccaaacg cactacaaac gcaaacacgg ccaaaagccc tatgcgtgtc gcatctgcgg  2700
taagcttttg gctgtcaaag gtgattggcg tacgcatgag aagaattgcg ggaaacggtg  2760
ggtttgcgtt tgcggttccg attttaaaca caaacgctcc ctgaaggatc acgttaaagc  2820
ttttgggcct ggtcatgggt cttatccgac cggtttgttt gatgagcagg cctctaattc  2880
ttctgtcttt gaaagtttgt tctgtgtgat cggtgagtat tagagtaact gagaggaatg  2940
taactgagag aaaaaagaaa agtaataatt aaaataattg aaaataataa gtaagagcat  3000
ctagatagtc cttaccaaaa aaaagatcat ctagatagtc tttccatagt atctgattta  3060
tataatacta atataatgta tttatataat taaattataa attaataaag agatgaacca  3120
attcttaaca gacatttgcc tagagacata tctttattct taacaaacat ttggctagaa  3180
acatatctaa tagtttcttg tttcaaaaat gtcttcgctt tttttctgtt tttctccctt  3240
ccttttcct tattttttt attttctta ttcactaaat atactcccat aatatctgct  3300
atataatatt aatataatat atttatataa ttaaattaaa aattcataaa gagatgaacc  3360
aattcttaat agatatttgg ctaaatacat atttaatatt tttttgtttg aaagatatct  3420
ttgctatttt tttctgtttc cttctcttct tttcttctta tatttcttat ttttttatt  3480
caataaatat attttaaaaa acaccaattt tcttataaga atatctgaaa ataattgaga  3540
ataattaaat taaatatttt cttttagtaa aacttataat tatatatatg ctaaaaagat  3600
atgtgatatt tattattcta tctttaaaga tttttttatc gtgaatcact attttcagtt  3660
atccaaccta aaatgaatac tcagagagca accacatcga aagtgttaga gattgaatga  3720
atacagttct taaaaggttt atttcacatt aatgaagtct atcaaaacaa aatttatcta  3780
attacatctc tataacaaaa atgataattc taaagttaaa tgaaaaaaaa aaacaaaaaa  3840
atagagagaa tttttcttta aaaaaaagat aagaaagatc aataaaaccg acttcctcac  3900
attataaata gaaaagtctt cat                                         3923
```

```
SEQ ID NO: 33          moltype = DNA  length = 1707
FEATURE                Location/Qualifiers
source                 1..1707
                       mol_type = genomic DNA
                       organism = Thlaspi arvense
SEQUENCE: 33
atgtcacaat attccttctt ctatttcttc ctaatctctc ttttcctcta cgaaaattgc  60
attgcgtatc gctacacatt cacggttatt gaagctccat atagcaaact gtgtagcacg  120
aagaagattt tgaccgttaa tggtcagttt cctggaccag tgttaagggc ttacaaaggt  180
gacaccattt acgttaacgt tcgtaaccaa gctagtgaaa atatcacatt gcattggcat  240
ggtgtagagc agccgagaaa cccgtggtca gatggacccg aatacatcac acaatgcccg  300
attcaacccg ggtcagattt tacgtacaaa attttacttt ccatcgaaga cgcgactgtt  360
tggtggcatg cgcatagctc gtggacacgt gccaccgtac acggtctgat tttcgtgtat  420
cctcggcctc ctgataccct gccttttcca gaaccggact acgaagtccc cttagttttt  480
ggagagtggt ggaagaggga tgtgagagaa gtagtggagg atttcatgag gaacggaggt  540
gaacctaatg tgtccgatgc tttgactatc aatgggcatc ctggtttctt gtatccttgc  600
tctcaatcag atacattcaa gctcgtggta gagaagggca aaacctaccg cattcggatg  660
gtaaacgccg cgatgaacct aattctcttc ttcgccatcg cgaaccacaa actcaccgtg  720
gtcgccgccg atggccacta caccaaacct ctaaccgcta gttatatcac catatctcct  780
```

```
ggccaaacgc tagacctgtt actatacgcc gaccaaagtc cagagagcac ttataacatg  840
gcggccagag cttaccatag caaccccaac gttgggttca acaactctac caccgtcggg  900
atcttacgtt actactcttc aaacgacgcc ggaacgtctt catcagaacg ttacccgtac  960
cttcctggct acaatgacac ctcagcagct ttcgatttct tcacaaaaat caaaggctta  1020
tactccagag tagctcccgc caaagtttca cgtaggataa tcacgacggt ttcgataaat  1080
ctcctcaagt gtcccaacga ctcgtgtgca ggcccaaacg ggtcgaggtt agcggcgagt  1140
atgaacaaca tatcgttcgt cacaccgagc cacgtggaca tactaagagc ttattacctt  1200
cacattaacg gcgtttacgg aacgcggttt ccggagttcc caccgcggat attcaatttc  1260
acagcggacg accaaccgct gtttttgcag actccgaggc tggcgacgga ggtaaagaag  1320
tttcagtacg gggagacggt tgagattgtt atacaaggga cgagtttggt aggtggtgga  1380
atcgatcatc ctatgcatct ccatggtttt agcttctacg tggttggttt agggtttggg  1440
aattttaacg cacgtaaaga tccctccaac tataatctag acgatcctcc ttacagaaac  1500
acggcgactg tgcccaggaa cggttggatc gctatcagat tcgtagctga caatccaggg  1560
gtttggttca tgcactgtca ctttgataga catcaaacgt ggggtatgaa tgttgtcttc  1620
attgttaaga atggaataaa accaaatcag aagattctac ctccaccgcc tggcttacca  1680
ccttgtgacc aatttgagaa tctataa                                     1707
```

```
SEQ ID NO: 34          moltype = AA  length = 568
FEATURE                Location/Qualifiers
source                 1..568
                       mol_type = protein
                       organism = Thlaspi arvense
SEQUENCE: 34
MSQYSFFYFF LISLFLYENC IAYRYTFTVI EAPYSKLCST KKILTVNGQF PGPVLRAYKG  60
DTIYVNVRNQ ASENITLHWH GVEQPRNPWS DGPEYITQCP IQPGSDFTYK ILLSIEDATV  120
WWHAHSSWTR ATVHGLIFVY PRPPDTLPFP EPDYEVPLVF GEWWKRDVRE VVEDFMRNGG  180
EPNVSDALTI NGHPGFLYPC SQSDTFKLVV EKGKTYRIRM VNAAMNLILF FAIANHKLTV  240
VAADGHYTKP LTASYITISP GQTLDLLLYA DQSPESTYNM AARAYHSNPN VGFNNSTTVG  300
ILRYYSSNDA GTSSSERYPY LPGYNDTSAA FDFFTKIKGL YSRVAPAKVS RRIITTVSIN  360
LLKCPNDSCA GPNGSRLAAS MNNISFVTPS HVDILRAYYL HINGVYGTRF PEFPPRIFNF  420
TADDQPLFLQ TPRLATEVKK FQYGETVEIV IQGTSLVGGG IDHPMHLHGF SFYVVGLGFG  480
NFNARKDPSN YNLDDPPYRN TATVPRNGWI AIRFVADNPG VWFMHCHFDR HQTWGMNVVF  540
IVKNGIKPNQ KILPPPPGLP PCDQFENL                                    568
```

```
SEQ ID NO: 35          moltype = DNA  length = 5054
FEATURE                Location/Qualifiers
source                 1..5054
                       mol_type = genomic DNA
                       organism = Thlaspi arvense
SEQUENCE: 35
catgcacgta agaaactaaa tcaacacata aggtaacgag gctcggaata gttgggtttc  60
ggatttttat ttttaaaaag aaagcatcac ctaaccaaaa ctcataaggg catctccata  120
ttaaaaaata caaattaata gaatggaaaa agaaagatag agacgtatct cgtttgaact  180
ttgaaatatg tttagcaacg tatctaatta agtgtcatat tctgattagt ttatattatt  240
tttagatact ctatttaaga tatgcaccgt taaaggtgtt ctaaagcatc ttcatttact  300
ctgatagtat atccaaaact tattataata atataattta tttgtgtaat aaaatattaa  360
attattaaaa gtgtgatgca tatattaaaa atgacagata ttgagaaaca tatctcatgt  420
catgctcttt tctttgaaaa acagttcgta atttctctca ttctctctct ttctttctaa  480
ttaatttttt tattatccag atattctctg aaataccgtt gttgcaaata cttttagaac  540
acctttaaca gtgtataatc tcaaatagaa tatctaagat tttttttat taatataaaa  600
aaattaaact aactaatact tgacacttgg tcagatacat ttctagatag gattctctat  660
ctctctccat cctttccatt attttgtaca ttttaattat tataaattgg tcatatatga  720
ctttcagata ttattctcga attttccatc acttaccaac atttgttaaa ataattttcc  780
gtttaaaata gtttaatagt atatattaac aggttacagg tatgaaaatg actttagtat  840
gagataggga gtcgagagtt tttaaaatat tcgaatactt tagacttctc aaattaccca  900
tttaaaaata ttcaataact tagacttctc gcattaccca aaataccaaa tttgtctgaa  960
accaagctat atctgaattc ttttgtcctg tattttaatt actatacttc gaacagtata  1020
ttcagatatc tgaacaattc gttctcacct cttaccttct attactggtt tcaatactcg  1080
aaataaatgc tattgctaaa aagtctgttt gttactttta cactataaat ttagaatgtt  1140
atttccctta agttgaaagt tacgtttgac cgagagatgt caagtatttt caagagtatt  1200
acgattcttt tcagacatag atattctaat taacttttaa agcttacgat acgaagacag  1260
gatttgtgta tgaacatcga tggcataaca acatatcttg aatcttgtcc accagagtta  1320
tctggggggc agttttgaaa atataaaaga tctgtaaggt taataaaaaa aacattatct  1380
tgtaattccg tagttcttat atcgaaactg ttactaattt gagaaagacg tggagagcta  1440
gaggcgtcta taaatatata ttcctctctc agaaatcata atatacctaa tttattaaaa  1500
aagtctctca aaatgtcaca atattccttc ttctatttct tcctaatctc tctttcctc  1560
tacgaaaatt gcattgcgta tcgctacaca ttcacggtga gttcaaaatt aattaatcaa  1620
tttagtcagg cgtgagtaaa ctaacttaaa actgatggta tataggttat tgaagctcca  1680
tatagcaaac tgtgtagcac gaagaagatt ttgaccgtta atggtcagtt tcctggacca  1740
gtgttaaggg cttacaaagg tgacaccatt tacgttaacg ttcgtaacca agctagtgaa  1800
aatatcacat tgcattggta tttcatccaa aaccctttt ttcgtcttct taattatgta  1860
accattttaa atacaagaac ataaacgaaa tttcgatggt tgaataaaaa caggcatggt  1920
gtagagcagc cgagaaaccc gtggtcagat ggacccgaat acatcacaca atgcccgatt  1980
caacccgggt cagattttac gtacaaaatt ttactttcca tcgaagacgc gactgtttgg  2040
tggcatgcgc atagctcgtg gacacgtgcc accgtacacg gtctgatttt cgtgtatcct  2100
cggcctcctg ataccctgcc ttttccagaa ccggactacg aagtcccctt agtttttggt  2160
acaaaccagg acatataaca aaagatcagt gaagttgctt ttttttttt ttttttttt  2220
atctctctta aattaaaatt aatttcataa aaacttgaca ggagagtggt ggaagaggga  2280
tgtgagagaa gtagtggagg atttcatgag gaacggaggt gaacctaatg tgtccgatgc  2340
```

```
tttgactatc aatgggcatc ctggtttctt gtatccttgc tctcaatcag gtttctttta  2400
ctttttccct ttctcctatt aatttcttat tttgttttta atatacagtt gtgggataaa  2460
aactaattgt ggagatgaaa taaaatttag ggatattgat cattgaaaca aattgtgaaa  2520
tgattcaaac gagcattttt tttttcaagt caactgtttt taatttgttt ttcctcgttt  2580
tttcaaaagt ttcttactaa tttagttagt taaacataat taatgtttga tcaaattgtc  2640
caaaaattag ttaagaactt acgagtggtt gataaaaaaa aaatcacgag gcatattaat  2700
tcaaaccaaa atagttgtgt ttgtatttat tagttcttaa aaattgtgct cataaatttg  2760
aaactagcat ttgcatgcat atttatgttt aaaacctagt tagtaaagtc cgttattgac  2820
atgcatacgt tacgtatacg tatgtttaac agatacattc aagctcgtgg tagagaaggg  2880
caaaacctac cgcattcgga tggtaaacgc cgcgatgaac ctaattctct tcttcgccat  2940
cgcgaaccac aaactcaccg tggtcgccgc cgatggccac tacaccaaac ctctaaccgc  3000
tagttatatc accatatctc ctggccaaac gctagacctg ttactatacg ccgaccaaag  3060
tccagagagc acttataaca tggcggccag agcttaccat agcaacccca acgttgggtt  3120
caacaactct accaccgtcg ggatcttacg ttactactct tcaaacgacg ccggaacgtc  3180
ttcatcagaa cgttacccgt accttcctgg ctacaatgac acctcagcag ctttcgattt  3240
cttcacaaaa atcaaaggct tatactccag agtagctccc gccaaagttt cacgtaggat  3300
aatcacgacg gtttcgataa atctcctcaa gtgtcccaac gactcgtgtg caggcccaaa  3360
cgggtcgagg ttagcggcga gtatgaacaa catatcgttc gtcacaccga gccacgtgga  3420
catactaaga gcttattacc ttcacattaa cggcgtttac ggaacgcggt ttccggagtt  3480
cccaccgcgg atattcaatt tcacagcgga cgaccaaccg ctgtttttgc agactccgag  3540
gctggcgacg gaggtaaaga agtttcagta cggggagacg gttgagattg ttatacaagg  3600
gacgagtttg gtaggtggtg gaatcgatca tcctatgcat ctccatggtt ttagcttcta  3660
cgtggttggt ttagggtttg ggaattttaa cgcacgtaaa gatccctcca actataatct  3720
agacgatcct ccttacagaa acacggcgac tgtgcccagg aacggttgga tcgctatcag  3780
attcgtagct gacaatccag gtacgtacac ttacataaac ctctaacttt gatttggttc  3840
aaatctcttt ttaatatttt gtgtttttgt aggggtttgg ttcatgcact gtcactttga  3900
tagacatcaa acgtggggta tgaatgttgt cttcattgtt aagaatggaa taaaaccaaa  3960
tcagaagatt ctacctccac cgcctggctt accaccttgt gaccaatttg agaatctata  4020
aatgatttta tagcatgttg cagtattgtg tttgatgtaa taaactactg catatttaca  4080
aaaaaaaata taatcttaaa ttttgttttt atttaattaa ttttcacaag tttttctatc  4140
gtagcagtca taataaggaa agatactccc aagacaaaac agtgtctgaa gtcattattt  4200
taaccctgag cctttctttc tcataaatatc ttcaaaagct atagatgtgg tgaagtttac  4260
ctcgctcaca ctgataagtc catgtcttgt accatatcat cataatcttg agggacctct  4320
gcgtgatgga aacgccctgt gcaagtggag tgatgcatct gtgtaatgtg actctgttga  4380
agtgctatag ccttgtggct tctactccag tctcttcggc tccaaaggta taacggtggc  4440
ggcatattgt tccactgctc tatcgtttga tcatttacat ctatcgatcc aggcaagtag  4500
aacgactaca gagcaaaaaa acaaaggaat gtgattgaaa tgtattggtt atactaaacg  4560
agagtttgat tcattagtga acgtacttac catgccagaa agtaatctcg tgtcttccca  4620
aatcaagtca tactcagcta tctcgtcgac cctgtgattg tagaggaaaa caaaggttat  4680
gaaaagtttg taactgacac tctatatttg ctatttacct ttttgtttca cttggtacga  4740
tgaggattag aatcttgggt ctaaactcga gggccttcct gatgaaaatg ttagcaagac  4800
tggatttgta accgaaaggc gggtttaatc ccattatctg tttttactca cgaccaagta  4860
atatctcagt tagtgaattc aaaaagtgta tttcaccttt aggatgttgg ttgcgttttt  4920
taccagtcga gagccatcgg gtaactcttg tttcttcaca ctcaaccaat ctctcttctc  4980
aaagttgaag ttatactgcc atggaaacat agtgtttcag aaacatcttc aaacacaaca  5040
ataaaagagt agtg                                                    5054

SEQ ID NO: 36          moltype = DNA  length = 1524
FEATURE                Location/Qualifiers
source                 1..1524
                       mol_type = genomic DNA
                       organism = Thlaspi arvense
SEQUENCE: 36
atgagctcca cggagacata tgagcctcta ttgagacggc tccactcaga ttctcagtta  60
accgtaggtt cttcaccgga gatagaggag tttctcggcc gtcgtagatc cacggtgacg  120
ccacggtggt ggctaaggct ggccgtatgg gaatcaaagc ttctttggac gctctctgga  180
gcctccatag tggtctctgt gctgaattac atgctcagct tcgtcaccgt tatgttcatc  240
ggccatcttg gctctcttca gctcgccggc gcatccatcg ccaccgtcgg tatccaaggc  300
ctcgcttacg gtatcatgtt gggaatggcg agcgcggtcc agacagtgtg tggtcaagcg  360
tacggcgcga ggcagtactc atcaatggga ataatttgcc aacgagccat ggtcttgcac  420
ctcgcagctg cggtcctcct cacgttcctc tactggtact cgggtccgat cctaaaggcg  480
atgggccaat ccgcagccat cgcacgcgag ggtcaggtct ttgcacgtgg gattattccg  540
cagatttatg cttttgccct cgcttgccct atgcagaggt tcctccaggc tcaaaaaatt  600
gtaaaccctt tggcttacat gtcactagga gttttcgtgc tacacacgct actaacctgg  660
ctggtaacca acgtcctgca tttcggcttg ctcggtgcag ctctggtgct gagtttttcg  720
tggtggcttc tcgcggctgt gaatggtctg tatatcgtga tgagcccgag ttgcaaggaa  780
acttggaccg ggttctcagc tagggcttta agagggattt ggccttactt caagctcacg  840
atagcttcag cagtcatgct atgtttggag atatggtacg tccaagggct agtgattatt  900
tccggtttac tcaccaatcc cacaattgcc ctagacgcaa tttcgatttg catgtattac  960
tggaattggg atatgcagtt catgcttggt ctaagtgcgg caatcactgt ccgagtgagc  1020
aacgagctag gagcgggaaa cccacgagtg gctaagttat cagtggtagt ggttaacatc  1080
acgacggttg tcatcagctt attcctctgt gtcgttgtgc tcgtgttccg cattggcctt  1140
agtaaagcct tcaccagcga cgcagaggtt atagctgcag tctctgatct ctttcccctg  1200
ctcgccgttt ccattttctt aaacggaatc caaccaattc tctctggtgt tgccattgga  1260
agtgggtggc aagcagtggt ggcttatgtg aatcttgtta cttactatgt cattggtctt  1320
cctattggct gtgttcttgg cttcaaaacc agtcttggag ttgcggggat ctggtggggg  1380
atgattgcag gagttatact tcaaacccta actttgattg ttcttacact cagaactaac  1440
tggaattccg aggtggagaa tgcagctcat aggttaaaag cttcagcaaa tgagagtcaa  1500
gaaatggcta ccgaaggaat ctaa                                         1524
```

```
SEQ ID NO: 37          moltype = AA  length = 507
FEATURE                Location/Qualifiers
source                 1..507
                       mol_type = protein
                       organism = Thlaspi arvense
SEQUENCE: 37
MSSTETYEPL LRRLHSDSQL TVGSSPEIEE FLGRRRSTVT PRWWLRLAVW ESKLLWTLSG  60
ASIVVSVLNY MLSFVTVMFI GHLGSLQLAG ASIATVGIQG LAYGIMLGMA SAVQTVCGQA  120
YGARQYSSMG IICQRAMVLH LAAAVLLTFL YWYSGPILKA MGQSAAIARE GQVFARGIIP  180
QIYAFALACP MQRFLQAQKI VNPLAYMSLG VFVLHTLLTW LVTNVLHFGL LGAALVLSFS  240
WWLLAAVNGL YIVMSPSCKE TWTGFSARAL RGIWPYFKLT IASAVMLCLE IWYVQGLVII  300
SGLLTNPTIA LDAISICMYY WNWDMQFMLG LSAAITVRVS NELGAGNPRV AKLSVVVVNI  360
TTVVISLFLC VVVLVFRIGL SKAFTSDAEV IAAVSDLFPL LAVSIFLNGI QPILSGVAIG  420
SGWQAVVAYV NLVTYYVIGL PIGCVLGFKT SLGVAGIWWG MIAGVILQTL TLIVLTLRTN  480
WNSEVENAAH RLKASANESQ EMATEGI                                     507

SEQ ID NO: 38          moltype = DNA  length = 4858
FEATURE                Location/Qualifiers
source                 1..4858
                       mol_type = genomic DNA
                       organism = Thlaspi arvense
SEQUENCE: 38
accgtttctt tttgttgcgt gtcgagaata atagtcatct atgtgtttta tatatagaga  60
gtcatagact atagaaaaaa tgttataaga ggacaaaatt tcaataaatt gaattagttt  120
aaatttgatc aacaattttt ttatcatctt atttaattct tagatgatta tagtaaacaa  180
ctaagatatc ccagtatcaa tatattcatg cataaataga atgaaattgt attggggggg  240
ggggggaata tacattattt aattatatag attgtcatca agtaattaaa taaaatacca  300
aaatgacatt aaccataaca aagtgaatat gctgctgcat atttgtaaga aatcaaaaga  360
aactttgcag catataatta ctcgatgact aatacaagta tattgtgttg aaatttgatg  420
tagtgtggaa tagttaagat tatttagaaa ataaaaccac ttttaataat tacctgaaaa  480
tgagtaataa tcttctaatt tggtggggcc atccgaccta atagacaact cattgatttc  540
atcttacgtc agggacagtt cataaaatgc aaataattgt cttttttttt ggtaatgatt  600
gtctttaatc tttattttgt agattaacag attatattat tcctttttct ttcttactgt  660
tcttcagatt atttggatgg tttcagttgg gcctcaggag cagaccggta aatgggttgg  720
aggactattg gtgggccaca tttctgaaaa gcatttcttc ctctcaaaag ctcattatta  780
tgagtatctt tttatacggt agaaaggagt acataagtgg taacataaaa tatattctgc  840
caaaaaagtt agttgattct tcttaatcac tactcctttt cttgataatt atctacgtgg  900
gaaacactat ttgtcctccc cccatttaat ttggttgaaa gtcttgagac tagaggttgg  960
ctcaatccaa aatcgttgac gaacgttagg tatcgttatc aactacaact cttttttttca  1020
ctgaggtacc gttatattta tatacctacc tagttttact cttgtgcaca aggatatttc  1080
ggttcggttt gatatctttc tcgatcttga agaaatatta ccaatttgga gcttatacat  1140
tcctcggtct ggtatcattc aacaaagttt ttggtttggt ttgtttaaca aataaatatga  1200
atgtgtgttt agtcgtccct taggtatttc tcaatctctt tcttttaagc ttcactttct  1260
taataagcca ttaagtaacg taactagaga atggttgtta cactatacac taacaaaaat  1320
cagaccaaac agtcatgaaa gatcttaacc atcaattccg tttcggtcaa cgactcgaac  1380
cctcagcata accaaaacaa acagtcgtaa tataaacacg cccggtctat aactataaca  1440
aaataacggc aaaagaaaga aaatacgaga aaaagaagaa gacgaacaaa caaacggacc  1500
atgagctcca cggagacata tgagcctcta ttgagacggc tccactcaga ttctcagtta  1560
accgtaggtt cttcaccgga gatagaggag tttctcggcc gtcgtagatc cacggtgacg  1620
ccacggtggt ggctaaggct ggccgtatgg gaatcaaagc ttctttggac gctctctgga  1680
gcctccatag tggtctctgt gctgaattac atgctcagct tcgtcaccgt tatgttcatc  1740
ggccatcttg gctctcttca gctcgccggc gcatccatcg ccaccgtcgg tatccaaggc  1800
ctcgcttacg gtatcatggt atgtgcttta gagagtaaac gacgttgacg tcgttcgatg  1860
ttatagcttc acattcattt gcttatcatt ttgtaatata gtaaatccgg gttttgaatt  1920
aggtttctca atattttgac cattttatga ataccagcaa ccataataaa aatacaaact  1980
gtcggatcag ttttgttctc catttgagat ccgattttgg tctttcagat gcaaaccata  2040
ttaggataca gttcggtttt catgtcggct attttggtcc ggtttatcat ttttgatcaa  2100
tcttagcctt aggcatctcc caactgtttt tatgtatcaa atgtactagt tgggaatggc  2160
gagcgcggtc cagacagtgt gtggtcaagc gtacggcgcg aggcagtact catcaatggg  2220
aataatttgc caacgagcca tggtcttgca cctcgcagct gcggtcctcc tcacgttcct  2280
ctactggtac tcgggtccga tcctaaaggc gatgggccaa tccgcagcca tcgcacgcga  2340
gggtcaggtc tttgcacgtg ggattattcc gcagatttat gcttttgccc tcgcttgccc  2400
tatgcagagg ttcctccagg ctcaaaaaat tgtaaaccct ttggcttaca tgtcactagg  2460
agttttcgtg ctacacacgc tactaacctg gctggtaacc aacgtcctgc atttcggctt  2520
gctcggtgca gctctggtgc tgagtttttc gtggtggctt ctcgcggctg tgaatggtct  2580
gtatatcgtg atgagcccga gttgcaagga aacttggacc gggttctcag ctagggcttt  2640
aagagggatt tggccttact tcaagctcac gatagcttca gcagtcatgc tatggtaaat  2700
gtctttaatc taaacacaaa tctgtatgat ttgaccggtt aaaatttatg gtttgaagaa  2760
agctgatata taccaattta aaatgaaata tctgcagttt ggagatatgg tacgtccaag  2820
ggctagtgat tatttccggt ttactcacca atcccacaat tgccctagac gcaatttcga  2880
tttggtactc ctttcacccg agatttatca tatgccgacg aacctcaacg gttacgtctt  2940
aacccggtta agtgattttg cagcatgtat tactggaatt gggatatgca gttcatgctt  3000
ggtctaagtg cggcaatcac gtaacaaaac aaaattaaaa atggcatgta gtttttaatt  3060
taaatgatcc atttgcaaaa accgtgccgt ttttgtgtgt tttgtgttag tgtccgagtg  3120
agcaacgagc taggagcggg aaacccacga gtggctaagt tatcagtggt agtggttaac  3180
atcacgacgg ttgtcatcag cttattcctc tgtgtcgttg tgctcgtgtt ccgcattggc  3240
cttagtaaag ccttcaccag cgacgcagag gttatagctg cagtctctga tctctttccc  3300
ctgctcgccg tttccatttt cttaaacgga atccaaccaa ttctctctgg taaaaacaca  3360
```

```
cacaagaaaa agaggctctt ttgtgaattt tggtttgttg attgatcttt gctctatgga  3420
ttcaaaggtg ttgccattgg aagtgggtgg caagcagtgg tggcttatgt gaatcttgtt  3480
acttactatg tcattggtct tcctattggc tgtgttcttg gcttcaaaac cagtcttgga  3540
gttgcggtat aatctctttt actctttctt tgtgtttata tgtattgtat gcatcataag  3600
agatgggagg tatttcatta caggggatct ggtgggggat gattgcagga gttatacttc  3660
aaaccctaac tttgattgtt cttacactca gaactaactg gaattccgag gtaaaacaat  3720
caccaaatct ctcttttttt ctctaaatac tccaaagtcc ttacctttac tctgcatctc  3780
ttacaggtgg agaatgcagc tcataggtta aaagcttcag caaatgagag tcaagaaatg  3840
gctaccgaag gaatctaaca gcaactctgt tcttttctcc tctcttttgt tggcaagaga  3900
tatgaaataa ataccttctg tttattagga ttcagtaaca tatttcattt cgttaaacta  3960
cagacaaaaa ataatggaca aactacttaa tcctcttctg caaaatcttt cttctgcctt  4020
tagatgatta caaaaatcaa aactttctcg ttgttttcat aaccccacaa gtttttccgt  4080
ctgtgagcta acataagcca aagacttttc ttgtgtttta tcatacaaca cagtttctct  4140
tgcatcatca tcaccatctc cttcatagtc ctcctcatcc tcatcctcat cctcatcatc  4200
actactcaca tcgacatcat catcatcatc atcatcatca tcagatctgt agactccagc  4260
aatgatggtt gtagtctcat ctctgagacc agtaagttct ttagcttcct ctagctcatc  4320
ttgagttgaa gccaatgaca aaagcacatt cttcgctttc tgatcaggtg gtaccccaca  4380
actctccatc tccttgtacc aactaagagc gctcccgaaa tccttgcacc tcccagacgc  4440
atccatgata gtcgttatga tggtttgatt cgctttgatg ccacttaacc tcattttctc  4500
atatacctcc ataattttat caagatcgtt tgctttcgca tagcctttta tcattgtccc  4560
ataggtgact atattcggct caaaaccatc tacctttatc ctcttgaaga atttctcagc  4620
accctccatg tccgaagcat tcacatacgc tgataacata gttgtgtaag accagagatc  4680
cgggaaaaat ctgcaaaggg aattatgttt tgttaccaat ctaaaacaga gaagcaacac  4740
agttcacatg atagaattat tctttacctg tcacgtcgca tgctttgaaa aacggtcttt  4800
gcttgatcca ccattccaga aatagcgaat gcatcaagca aaatgttata agctttat    4858

SEQ ID NO: 39           moltype = DNA  length = 2214
FEATURE                 Location/Qualifiers
source                  1..2214
                        mol_type = genomic DNA
                        organism = Thlaspi arvense
SEQUENCE: 39
atgcttccat taatggcgat accacttgcg acttgcagga gcatcaactg gtcagccacg  60
gaaaggattc ctgtttcgct tctgttccgg agtattcttc tccaagacga cgaagtttgt  120
agcgctgtgc cactataccg gatcctcgat cagaatgacg ggcaacttgg tcctataagt  180
atggccgagg aatcagacaa accattgctg gatcctgata ctctcaacag agaaggaatt  240
gacttgggtc tgttgccatt ggaggaggtt tttgaatacc taagaacatc tccacggggg  300
cttttatctg gagatgctga agaaagattg acgatatttg gtcctaacag ccttgaagag  360
aaacgggaga acaagtttct gaagttccta ggttttatgt ggaatccttt gtcatgggtt  420
atggaagctg cagcattgat ggccatcgcc ctagcagata gtgaagtaga gactatcagt  480
cttttgctat accatttctg ctcagtgctg accggagaat cgctacctgt gaccaagaag  540
aagggtgagc aagtcttctc tggctctact tgtaagcaag gtgagataga agctgttgtg  600
atagccaccg gttcgagcac tttctttggt aaaacagcat ctttggtgga cagcacagat  660
gcaactggac attttcagca ggttctaagc ttgtgccagc agaaaaatga gattgcgcaa  720
agagtttatg ccatcataaa tagatttgca gaaaaaggtt tgaggtctct tgctgttgct  780
tatcaggaaa ttccagagag aagcagcaac agtcctggag gaccatggtt gttctgtggt  840
ctgttgccac tgtttgatcc tccaaggcat gacagtgctg aaaccatact gagagctctt  900
aaccttggag tttgtgttaa gatgatcacc ggtgatcagt tggcgattgc aaaggagaca  960
ggaaggcgac ttgggatggg aaccaatatg tatccttctt cctctttgtt aggccacaac  1020
aacgatgatc acgaagccat tccattggat gagcttattg aaatggcaga tggatttgct  1080
ggagtgttcc ctgaacacaa gtatgagatt gtaaagatat tacaagaaaa gaagcatgtg  1140
gttggaatga ccggagatgg tgtgaatgat gctcctgctc tgaaaaaggc tgacattgga  1200
atagctgtcg ctgatgcaac agatgccgca agaagttctg ctgacattgt actaactgag  1260
cctggcttaa gtgtaattat cagtgctgtc ttgaccagca gagccatttt ccagcgtatg  1320
aagaactata cagtatatgc agtctcgatc accatacgaa tagtgctcgg ttttacactt  1380
ttagcgttga tatgggaata cgactttcca cctttcatgg ttttgataat cgcaatactc  1440
aatgacggga ccatcatgac tatctctaaa gatcgagtaa ggccatctcc tacacccgag  1500
agttggaagc tcaaccagat atttgcgact ggaattgtca ttggaacata ccttgcattg  1560
gtcactgtcc tattctactg gatcattgtc tctaccacct tcttcgagaa acacttccat  1620
gtaaaatcaa tcggcaacaa cagtgaacaa gtctcatccg ctctgtatct ccaagtaagc  1680
atcatcagtc aagcactcat atttgtaaca cgtagtcgaa gctggtcttt tcttgaacgt  1740
cccgggactc tcctgatttt cgccttcctt gttgcccaac ttgccgctac attgattgct  1800
gtctatgcca acatcagctt tgctaacatc accggcattg gatggggatg ggcaggtgtt  1860
atatggttat acagtttgat tttttacata cctcttgata ttataaagtt cttcttccac  1920
tacgcattga gtggagatgc ttggaacctt gtatttgacc gtaagacagc atttactaat  1980
aagaaagatt atagaaaaga tgacggagcg tccaatgtaa ccatctctca gagaagtcac  2040
tctgcagaag aactcagtgg aagtcgttct cgcgcatctt ggatcgctga gcagaccaga  2100
aggcgtgcag aaaccgccag gctcttggag ggacactcgg tgtcaaggca tttggaatca  2160
gtaatgaagc tcaaacaaat tgaccccaag atgattcgtg cagacactgt ctaa        2214

SEQ ID NO: 40           moltype = AA  length = 737
FEATURE                 Location/Qualifiers
source                  1..737
                        mol_type = protein
                        organism = Thlaspi arvense
SEQUENCE: 40
MLPLMAIPLA TCRSINWSAT ERIPVSLLFR SILLQDDEVC SAVPLYRILD QNDGQLGPIS  60
MAEESDKPLL DPDTLNREGI DLGLLPLEEV FEYLRTSPRG LLSGDAEERL TIFGPNSLEE  120
KRENKFLKFL GFMWNPLSWV MEAAALMAIA LADSEVETIS LLLYHFCSVL TGESLPVTKK  180
```

```
KGEQVFSGST CKQGEIEAVV IATGSSTFFG KTASLVDSTD ATGHFQQVLS LCQQKNEIAQ  240
RVYAIINRFA EKGLRSLAVA YQEIPERSSN SPGGPWLFCG LLPLFDPPRH DSAETILRAL  300
NLGVCVKMIT GDQLAIAKET GRRLGMGTNM YPSSSLLGHN NDDHEAIPLD ELIEMADGFA  360
GVFPEHKYEI VKILQEKKHV VGMTGDGVND APALKKADIG IAVADATDAA RSSADIVLTE  420
PGLSVIISAV LTSRAIFQRM KNYTVYAVSI TIRIVLGFTL LALIWEYDFP PFMVLIIAIL  480
NDGTIMTISK DRVRPSPTPE SWKLNQIFAT GIVIGTYLAL VTVLFYWIIV STTFFEKHFH  540
VKSIGNNSEQ VSSALYLQVS IISQALIFVT RSRSWSFLER PGTLLIFAFL VAQLAATLIA  600
VYANISFANI TGIGWGWAGV IWLYSLIFYI PLDIIKFFFH YALSGDAWNL VFDRKTAFTN  660
KKDYRKDDGA SNVTISQRSH SAEELSGSRS RASWIAEQTR RRAETARLLE GHSVSRHLES  720
VMKLKQIDPK MIRADTV                                                737

SEQ ID NO: 41          moltype = DNA  length = 5382
FEATURE                Location/Qualifiers
source                 1..5382
                       mol_type = genomic DNA
                       organism = Thlaspi arvense
SEQUENCE: 41
atgcttccat taatggcgat accacttgcg acttgcagga gcatcaactg gtcagccacg  60
gaaaggtggt ttcaattttc attcgtggac cctttttaag gattcctgtt tcgcttctgt  120
tccggagtat tcttctccaa gacgacgaag tttgtagcgc tgtgccacta taccggatcc  180
tcgatcagaa tgacgggcaa cttggtcgta acatagtggt ttaagttcgt gtgtagctcg  240
tactatgttt tgatggtttg ctattacctt agaattttaa ataattatct tatgtacatc  300
gacgaagtta cggtttttgc tattgttcac tagttccaag gtgtggatcg aatctaggaa  360
tgtgggcttt gaagtggtac ttgtaccgtg gattttgaag ctataagtat ggccgaggaa  420
tcagacaaac cattgctgga tcctgatact ctcaacagag aaggaattga cttggtaaat  480
gatgtgtggt tcctttactt ttattaaaat tcttggattc tttagtggca aaaatggttt  540
tgacgcttga gctggacagg gtctgttgcc attggaggag gtttttgaat acctaagaac  600
atctccacgg gggcttttat ctggagatgc tgaagaaaga ttgacgatat ttggtcctaa  660
cagccttgaa gagaaacggg taataaaaag cttatcgtca aagtttttcc atagtgttcc  720
tgcctaagac aggagagaag cttactagtt ctgagatctt attcattatg aacactcttc  780
atttcttttt cacatattat ccttaggcca cacactgatt tttctgccaa gttgtggttc  840
tttacattag ctcttgtata atatgttagt gttgtcctaa tgacactgaa aacgaaacga  900
tacaggagaa caagtttctg aagttcctag gttttatgtg gaatcctttg tcatgggtta  960
tggaagctgc agcattgatg gccatcgccc tagcagatag tgaagtagag actatcagtc  1020
ttttgctata ccatttctgc gtacatgaga gtttatgaaa tcgtttctgc tcttgaaact  1080
catggtgaaa aatgtttatt acagagctta ggtcctgact gggaagactt tgttggaatc  1140
gtttgccttt tactgatcaa cgcaacaatc agcttctttg aagaaaacaa tgctgggaat  1200
gctgctggag ctcttatggc tcgcctggct ccaaaaacaa gagtctgctt cttcacctta  1260
tgcattttca ctcttattac cttaaatctg atcaagatcc actcttgata ggttcttaga  1320
gatggacagt ggcaagagca agacgcgtct atcttggtac ctggtgatat tattagcata  1380
aagcttgggg atatcattcc tgcagatgct cgccttcttg aaggagaccc cttgaaaatt  1440
gatcaggcac gcacagatta tatttagcgc taagtcacat ttcttctctc ttagtacatt  1500
atgtaaagac tgtatctgac agaatattcc tgcagtcagt gctgaccgga gaatcgctac  1560
ctgtgaccaa gaagaagggt gagcaagtct tctctggctc tacttgtaag caaggtgaga  1620
tagaagctgt tgtgatagcc accggttcga gcactttctt tggtaaaaca gcatctttgg  1680
tggacagcac agatgcaact ggacattttc agcaggttct ttattgttcc ttaactccct  1740
tttctggttg aaacagtctg actggtaaaa gaccaaacct tgtaaagctg tgaatacctt  1800
tgcaagaaca tgacatgttt ctgtgacatg ttttccttat aggttcttac gtcaattggg  1860
aacttctgca tttgctcaat tgctgttgga atggttcttg aaatcattgt catgttccct  1920
atacaacatc gctcatacag aattgggatc aataaccttc ttgtactact gattggaggg  1980
atacccattg ccatgcccac tgtactatct gtcacgcttg ccattggatc tcatcgactc  2040
tcacaacagg tgtcgtttct cttgactgat taactgtaac agagtgaacc aagaagaatc  2100
caacttttaa gcttctgtag aactttttgt tagcaatata atatgtgttt cttgttgttt  2160
taaaagggtg ccatcacgaa aaggatgacg gcgatagagg aaatggctgg gatggatgtc  2220
ctctgctgtg ataaaactgg aaccccttacc ttgaacagtc tcaccgttga tagaaatctt  2280
attgaggtac caaccaatac ttcccatgtg acttgcattt caaagtccaa agagtacagt  2340
taacaacagt tgcctccatc tttacaggtt ttcgatgact acatggacaa ggacacaatt  2400
ttgctgcttg caggcagagc ttcacggtta gaaaaccagg atgccataga tgcagcaatt  2460
gttagcatgc ttgctgatcc gaaagaggtg gagatgtttc ttttacataa actctgtttt  2520
atgaaaatat tgtcatcttc tttagaagtt ttacttatta gaaaaggttg tttatcttta  2580
ggcacgtgca aacattaaag aaattcattt cttgccattc aatcctgtgg acaaacgtac  2640
agcaataaca tatattgact ccgatggaaa atggtatcgc gctagcaaag gagctcccga  2700
acaggtaaca aagaatcacc ctatactact tggcactttc aaaactgact ctagatgtaa  2760
aaaaatgaaa gttcttttat atataggtcc ataaaagata tatcatcact gattcaattc  2820
caactgtact gtatacatag gttctaagct tgtgccagca gaaaaatgag attgcgcaaa  2880
gagtttatgc catcataaat agatttgcag aaaaaggttt gaggtctctt gctgttgctt  2940
atcaggtaaa atatttctgt tatccctttt ctctcttgat atggttttta ttgtaagtgt  3000
actatttggg gaagaagctt ataatgacat tagttatact cattcaatca ttttaatcat  3060
tgtttctagg aaattccaga gagaagcagc aacagtcctg gaggaccatg gttgttctgt  3120
ggtctgttgc cactgtttga tcctccaagg catgacagtg ctgaaaccat actgagagct  3180
cttaaccttg gagtttgtgt taagatgatc accggtaatt ctgaacccta gagcaggctt  3240
gcttgggacc acagaggaac agacacgctc tcatggtgaa aatctgataa gtttggataa  3300
aaaaaatgta ggtgatcagt tggcgattgc aaaggagaca ggaaggcgac ttgggatggg  3360
aaccaatatg tatccttctt cctctttgtt aggccacaac aacgatgatc acgaagccat  3420
tccattggat gagcttattg aaatggcaga tggatttgct ggagtgttcc ctggtcatac  3480
tcacaacaca gcgcttatat cttaccgagt ttcagatttt ctctctttta ctgatcccag  3540
tttcttttga tggctctcat gtttcagaac acaagtatga gattgtaaag atattacaag  3600
aaaagaagca tgtggttgga atgaccggag atggtgtgaa tgatgctcct gctctgaaaa  3660
aggctgacat tggaatagct gtcgctgatg caacagatgc cgcaagaagt tctgctgaca  3720
```

```
ttgtactaac tgagcctggc ttaagtgtaa ttatcagtgc tgtcttgacc agcagagcca  3780
ttttccagcg tatgaagaac tatacagtaa gtactaaaga caactatcat ctgattccac  3840
attgctaaag ataagcaaat ccatgtaata taggatatga atttcaagta gtttaatgaa  3900
attctgaagt ttcttttggt ttcctctgca ggtatatgca gtctcgatca ccatacgaat  3960
agtggtaagg agcttcaaga tacacgatct aacttgctaa gttacatcta cttgagcctt  4020
ctcttcttat cattgtttca tgcagctcgg ttttacactt ttagcgttga tatgggaata  4080
cgactttcca cctttcatgg ttttgataat cgcaatactc aatgacggta atcttttaat  4140
cctctcaata gcttcatgtt tgaattgttg atgttaaaaa ctctaaattc ttaacacttt  4200
caagtgctct tgtttatctc ctacgcaaca gggaccatca tgactatctc taaagatcga  4260
gtaaggccat ctcctacacc cgagagttgg aagctcaacc agatatttgc gactggaatt  4320
gtcattggaa cataccttgc attggtcact gtcctattct actggatcat tgtctctacc  4380
accttcttcg aggtatcttc ccgtcgctcg aaagtaatca aattcgattt gcttaccgag  4440
aaaaacgcat aaccatgacc atccctgaat cttaaatggc tgcagaaaca cttccatgta  4500
aaatcaatcg gcaacaacag tgaacaagtc tcatccgctc tgtatctcca agtaagcatc  4560
atcagtcaag cactcatatt tgtaacacgt agtcgaagct ggtcttttct tgaacgtccc  4620
gggactctcc tgattttcgc cttccttgtt gcccaacttg taagaactct tcatgtttaa  4680
cctttttcca tcacagaata ctacatacag catacatagg tcttggtttt gatttgtccg  4740
ttttcatgta cacaggccgc tacattgatt gctgtctatg ccaacatcag ctttgctaac  4800
atcaccggca ttggatgggg atgggcaggt gttatatggt tatacagttt gattttttac  4860
atacctcttg atattataaa gttcttcttc cactacgcat tgagtggaga tgcttggaac  4920
cttgtatttg accgtaaggt tagtgcatgt cttgtcctct gtctcagact ttaactctgt  4980
ttttttctta aaagacaaag agtgttggtt ttgtcttgca gacagcattt actaataaga  5040
aagattatag aaaagatgac ggagcgtcca atgtaaccat ctctcagaga agtcactctg  5100
cagaagaact cagtggaagt cgttctcgcg catcttggat cgctgagcag accagaaggc  5160
gtgcagaaac cgccaggttc tcttttgtct atacgacttt ttttgggttt ctctttcatt  5220
tcacatacta ccagaaccat ctctggtcca cagaaaatag aaacttagtt tttttgttca  5280
tttgataggc tcttggaggg acactcggtg tcaaggcatt tggaatcagt aatgaagctc  5340
aaacaaattg accccaagat gattcgtgca gacactgtct aa                      5382

SEQ ID NO: 42          moltype = DNA  length = 1857
FEATURE                Location/Qualifiers
source                 1..1857
                       mol_type = genomic DNA
                       organism = Thlaspi arvense
SEQUENCE: 42
atggagagta gtgtagttaa tcatccattg caagaagatg agaagggttt ttctgatgaa  60
gataatgctg taaataatga gaaagagagt ttattgcaaa catctggctc tgtagagaat  120
gctcctgaag gttctggtcg ttcttcggat tggcgtaggg gactagacca ctgcataact  180
gcacctgttg gtctctatgg agatatggta atcgatgaca atgaggttaa gtactctcgg  240
tccataacag agagattgtc ccctgcgagt cataattcaa aattagatcg attatcggag  300
cgggaaaagc aaaaactcat tgttgagcta gtcagaatac aaaatgacgg gaccgtggaa  360
gttgatatag ataacggtac accggtatcg gagttattgg agtttcagcc aaccaaaggg  420
cagccaacaa tcacatatga aaagtcattt gctgattcct ttagatcaat tccaagatta  480
aaaattgtga tacttgtggt tggaactcgc ggtgatgtgc agcctttctt ggccatggca  540
aagcgcctcc aggagtttgg tcatcgtgtt aggttggcaa ctcatgcaaa tttctgctct  600
tttgtacgat ctgctggagt agagttctat cccttgggtg gtgatcctcg agaactagct  660
ggatatatgg ctagaaataa aggtctgatt ccttctgggc ctggagaaat agcaaaacag  720
agaaaacagt tgagggcaat tatagagtct cttcttccgg cttgcacaga gcctgatatg  780
caaactgctg cctctttcag agctcaagca ataattgcaa accctcctgc gtatggacat  840
gtgcatgttg ctgaagctct aggagtacca attcacattt ttttcacaat gccttggacg  900
ccaactcatg aatttcccca ccctttggcc cgagttcctc aaagtcctgc gtattggcta  960
tcatatatag ttgttgatct gatggtatgg tggagcataa ggacatacat aaatgatttt  1020
aggaagagga agctaaacct tgcacctttc gcatatttca gcacatacca tggctcaatt  1080
tctcacttgc ctactgctta catgtggagt ccccatgttg tgccaaaacc aagtgattgg  1140
ggtcctttag ttgatgttgt tgggtattgt ttcttgagcc ttggatcgaa gtaccaacct  1200
cgtgaagatt ttatccactg gatagaaaga ggatcaccgc ccgtatatat tggtttcgga  1260
agcatgcctc ttgacaatcc gaaaaaaaca atggatatta tactggaaac actgagagat  1320
acagaacaca gagggatagt tgatcgaggt tggggtggcc ttggaaacct tgctgaagtt  1380
cctgaaaatg tattcctctt ggaggactgt cctcatgatt ggttgtttcc tcaatgttca  1440
gctgtgattc atcatggagg tgctggaacc acagcgactg gactaaaagc tgggtgtcca  1500
acaacaatcg tgccgttctt tggggatcag ttcttctggg gtgacaggat ctatgagaaa  1560
ggacttgggc ctgcgccaat accaatagct cagctcaatg ttgagaacct ctgcaattcc  1620
ataagattca tgcttcaacc agaggtgaaa tcacgagtga tggaactagc gaaagtactg  1680
gagaacgagg acggtgtagc tgcagctgtt gatgcattcc acaggcattt gccactggct  1740
ctgccactcc cggagtcctc gccggagaaa agacacgaag atgatcgacc agacctgtta  1800
cagtggttct tcatccagat tggtaaaaag tgttgccttc catgtggtgg tgtgtga     1857

SEQ ID NO: 43          moltype = AA  length = 618
FEATURE                Location/Qualifiers
source                 1..618
                       mol_type = protein
                       organism = Thlaspi arvense
SEQUENCE: 43
MESSVVNHPL QEDEKGFSDE DNAVNNEKES LLQTSGSVEN APEGSGRSSD WRRGLDHCIT  60
APVGLYGDMV IDDNEVKYSR SITERLSPAS HNSKLDRLSE REKQKLIVEL VRIQNDGTVE  120
VDIDNGTPVS ELLEFQPTKG QPTITYEKSF ADSFRSIPRL KIVILVVGTR GDVQPFLAMA  180
KRLQEFGHRV RLATHANFCS FVRSAGVEFY PLGGDPRELA GYMARNKGLI PSGPGEIAKQ  240
RKQLRAIIES LLPACTEPDM QTAASFRAQA IIANPPAYGH VHVAEALGVP IHIFFTMPWT  300
PTHEFPHPLA RVPQSPAYWL SYIVVDLMVW WSIRTYINDF RKRKLNLAPF AYFSTYHGSI  360
```

```
SHLPTAYMWS PHVVPKPSDW GPLVDVVGYC FLSLGSKYQP REDFIHWIER GSPPVYIGFG  420
SMPLDNPKKT MDIILETLRD TEHRGIVDRG WGGLGNLAEV PENVFLLEDC PHDWLFPQCS  480
AVIHHGGAGT TATGLKAGCP TTIVPFFGDQ FFWGDRIYEK GLGPAPIPIA QLNVENLCNS  540
IRFMLQPEVK SRVMELAKVL ENEDGVAAAV DAFHRHLPLA LPLPESSPEK RHEDDRPDLL  600
QWFFIQIGKK CCLPCGGV                                               618

SEQ ID NO: 44           moltype = DNA  length = 7708
FEATURE                 Location/Qualifiers
source                  1..7708
                        mol_type = genomic DNA
                        organism = Thlaspi arvense
SEQUENCE: 44
ctaaaagagc atgagcagca ccgcgatcat catcggaata gtccgccacc aacgcaattg  60
aactaagaaa ggctacaaaa ctgctttaaa tccatcctgc tgcttattcc ttttgcgtgt  120
ggccgccaga agaagatgag aaaacttact ttcaccatta gaaattagaa taaagagtca  180
ccgaaagtga aagtgaatag gatattcacc agaccgcctt tgagaagcgc cagttctgca  240
gatcctgcat ctcaatcact caagataact cccaaatctc aaatcaactc cgctaaagaa  300
acttcctctt cgcaatcacg acgatttatt aacagaaaag agaaggaatt gctctttcgg  360
gagaagatcc agcataacta acggaaagag tttcatcaaa ttcgtctgga ataaagatga  420
aaacaagcaa aaggaaaacc gaacgttgtc ggagaactta gaatcctata aacggaaaat  480
aaaatccgat caacggaaaa gaagatccga ttgacggaac tataagacag ccaaaaagcc  540
gatcaaatcg gatcaaagaa agaactctct cgctctgaaa gattttaaag agagaagaga  600
gagagagccc ttcaccttgt gccacccgta cttttaagag catctccaac catattctat  660
tttcaactcc aaatgctatt ttgaagtaaa atcctctcca accctagtct attttcaact  720
ttaaaataga gtaaacctaa attttactct atatttggag taaatctaaa ctttactcca  780
tcttggaatt agactttttt atttgcaaat taatccttga gatttattat aattatattt  840
tatactattt aatatttata acaaatatta taaaactgat aattatgaat atttaaatac  900
tgcaattatt cctacaaaat taaaaaatat aataaacttt aaaatacaaa ataagggcta  960
aaattaagat aaacaacata aataaattta agacaacaaa tactaaaaat attaatgata  1020
attttttttt attatagtaa tgtttaaata aaaattgcat atgctttttt gtgatgttat  1080
gtaattttta ttatttgata aatatttaag ttatagtttt tcaaagaaat tgtaaataat  1140
aaaataagtg ggatttattt ataaatttta aaactaaaaa atatttataa taaaatcaaa  1200
taagattcta tttagaatat ttctttttag agtaaaaaat aaagaaatac attagagtaa  1260
aacacaactc tattttagag ttactctatt tttctatttt ggagtagaaa atgaagaaat  1320
aattgaagat ggtataacaa acgaaaagtc gcattatctt actgttaaat tactataatt  1380
cataatcaat tggttttgtt tcggtggcat ccggcatccc ctaatatgat tgatttttat  1440
cgctgcattt attaaaatat atatatcttc atcctcgatc accacaattc attgattcaa  1500
aagtctccaa accccttgga agctcaacat tacaatctcg ccaaattcct caaaaccaga  1560
attttccaca gacccagaaa catttctcat caaagttctc tcctttcctg tctcttgaac  1620
tttctctcct actcactcag ttcaagaaca atctttcgat cattgatcag tgatggtaga  1680
ttcaattgtt gggtttcatt tacttgggca atggcttttc ttttcttttc tcttctcttt  1740
tcgattgatt gattggttaa ttctgtgtct ctgtacagtt tcgaattgtg tctttcaagt  1800
taaagctgga tcatttttct agttgatctc atcctcgcgc ttaacgtgag agactctctg  1860
ctctgtaatc tttccctgcg ttttcttgtt ttatctgaaa cggttaatat agagataaaa  1920
aaacccaatt tctctgactt ttttttcttt ctttaatata tcatttcttc tcccttttgc  1980
tttttgtata aagtgcagct aactttcctt aaggattcac tggttggttc aagcactgat  2040
tcgccgcgta cagcttttgg caggagccat ttgcatctct gatcgacatg gattagaata  2100
gtgtgcagtt gtgttgtgta caactcgctg catagatgtt actttgtgga gttcaattca  2160
tatgtagtat gtttgttgtt taagaagctg atctttgtgg gggcattggg tagtgagatc  2220
tgttaaattg aagtcggtga tggagagtag tgtagttaat catccattgc aagaagatga  2280
gaagggtttt tctgatgaag ataatgctgt aaataatgag aaagagagtt tattgcaaac  2340
atctggctct gtagagaatg ctcctgaagg ttctggtcgt tcttcggatt ggcgtagggg  2400
ttagtcctct attggaacac gtgtatttat cttattccaa gctttgccat caaaaccata  2460
acttagagca taacaactta tcaagattgt atgttcttga aggactagac cactgcataa  2520
ctgcacctgt tggtctctat ggagatatgg taatcgatga caatgaggtt aagtactctc  2580
ggtccataac agagagattg tcccctgcga gtcataattc aaaattagat cgattatcgg  2640
agcgggaaaa ggtaggaatc tgaaccttca ttgcaatgga tatgttcttc atttgattac  2700
aaattttttt ggtaacttga aaacttcttg ttattccagc aaaaactcat tgttgagcta  2760
gtcagaatac aaaatgacgg gaccgtggaa gttgatatag ataacggtac accggtatcg  2820
gagttattgg agtttcagcc aaccaaaggg cagccaacaa tcacatatga aaagtcattt  2880
gctgattcct ttagatcaat tccaagatta aaaattgtga tacttgtggt tggaactcgc  2940
ggtgatgtgc agcctttctt ggccatggca aagcgcctcc aggtagtttc gaaattgctt  3000
tctcattctt tgtatccttt tgcgaaatta agattcacag agggaatcat tgtgacttta  3060
catatgtata ttttgtggat gcatgcatat agtacactgc aattgaacag gctcgtatca  3120
aagtgttggc atgtgcctat atcatgtgtt ctcgtcattt taaatttgtt tcatttcttc  3180
atcctatcgt catatgtgtt cttgacgctt ttcttagcat ttggtgagag atttggaact  3240
gattggcatt gagagaggtt aaagttagat attgtttttc tctgttgcag gagtttggtc  3300
atcgtgttag gttggcaact catgcaaatt tctgctcttt tgtacgatct gctggagtag  3360
agttctatcc cttgggtggt gatcctcgag aactagctgg atgtaagaag tcctccttga  3420
aaagattcgt ttatatttta gtttctcgag ttttttttgt ttgatgatga aagctgtcat  3480
aaattctctc tttagcttca tgtgggtatt tttgaatgta gatatggcta gaaataaagg  3540
tctgattcct tctgggcctg gagaaatagc aaaacagaga aaacagttga gggcaattat  3600
agagtctctt cttccggctt gcacagagcc tgatatgcaa actgctgcct ctttcagagc  3660
tcaagcaata attgcaaacc ctcctgcgta tggtatatcc ttcgttaact ttaaaactct  3720
ttgatccatc agaacctcat tgtttgtaaa cctttcttaa gcacttttttc tatgaaactg  3780
atggtatggt ttttggttct aattatagga catgtgcatg ttgctgaagc tctaggagta  3840
ccaattcaca ttttttttcac aatgccttgg acgtgagttg acttctctgc ttttaaactt  3900
gccttaacgt gttatttggt ttcctgttct cttacatcat cttcatgtag gcaggccaac  3960
tcatgaattt ccccaccctt tggcccgagt tcctcaaagt cctgcgtatt gggtaatgtt  4020
```

```
attctttctt atgaccatat actctctcga agataatgag gcttattgtt tcacaacatt  4080
tttttgtctc agctatcata tatagttgtt gatctgatgg tatggtggag cataaggaca  4140
tacataaatg attttaggaa gaggaagcta aaccttgcac ctttcgcata tttcagcaca  4200
taccatggct caatttctca cttgcctact gcttacatgt ggagtcccca tgttgtgcca  4260
aaaccaagtg gtgagattcc cgctgcatcc ccagtacata tattccgctg aggtttatca  4320
tatgtattgt agcttcattc tggcttctag attaatgttg ttcttctggc tttgtcaatt  4380
ggcaagacca taatgggttg tcaattttag gctgagctct ttatctttcc ttcggtagat  4440
atctgaaaga ttttgctttt tgtttgacta atttgcagat tggggtcctt tagttgatgt  4500
tgttgggtat tgtttcttga gccttggatc gaagtaccaa cctcgtgaag attttatcca  4560
ctggatagaa agaggatcac cgcccgtata tattggtttc ggaagcatgg taaactgatg  4620
atccttagaa aatatgctct tccttgcttt ggtgatattc agttataatg catagtactg  4680
atattgttgt ttcttctctt ttacacaacc aagcctcttg acaatccgaa aaaaacaatg  4740
gatattatac tggaaacact gagagataca gaacacagag ggatagttga tcgaggttgg  4800
ggtggccttg gaaaccgtaa gcagcttctg taccttctct tttgatgctc tgtgtcctga  4860
ttcctgaact actttcttc tttgcttata cataattttt tttatcttca aacatcttgc  4920
agttgctgaa gttcctgaaa atgtattcct cttggaggac tgtcctcatg attggttgtt  4980
tcctcaatgt tcagctgtgg taaccccttt ttagattaac tacatcatgt ctccaaagac  5040
attatcttct aatccaggct atttcttgtg ttgtggatat gaagattcat catggaggtg  5100
ctggaaccac agcgactgga ctaaaagctg ggtaaaaaca ttttgctttc acagaaatgt  5160
cctgtagtga aatcagtttt cttgaccata tgaaacctaa tggttcctat attcttttga  5220
attctatgat atgtctccag tgtccaacaa caatcgtgcc gttctttggg gatcagttct  5280
tctggggtga caggatctat gagaaaggac ttgggcctgc gccaatacca atagctcagc  5340
tcaatgttga gaacctctgc aattccataa gattcatgct tcaaccagag gtaaacaaac  5400
ttaaattttc cttctttttt tccatgtatc tcatgcccat gtaggatgtt tgagtaaaga  5460
accacagtag aagttaaaca caaacactct ttcttgcaaa attaaacaaa ctaaacaaaa  5520
cccaaaacct aaagctgtcc ttttgagttc aaaaaagtag aaagatgtaa tcttgtatat  5580
acacttaaat attgcttata cagttcatac aaatagaaaa tgtcatcttt atagttcata  5640
gaagtagaaa gatgtaatct ttatatatac acttagaaat tgcttatata gttcatacaa  5700
atagaaaaat gtcatcttta tagttcatac aaatagaaag atttaatctt tatagttcat  5760
acaaatagaa agatgtaact tttatgtata tgcgtggata tcgctttatc agttttttaa  5820
tatgtgaagg ccctcgcaca aaaaaaaaaa tattatgtga aagaaagctc ggtgcttaat  5880
atttgaacta tgaagcaact ttctatatat atacacaaaa ctgacattgc tttatagttc  5940
atacaaaaaa aaagatgtaa tcgttatagt tagttcatac aaaagaaaga tgtgatcttt  6000
ctattttcgt tcagtgatgt tatgtgaaga aaaattcggt gtttagattt gaactatgaa  6060
gcatctttct atttatatac acaaaactga tattgtttta tactcataca aatagaaaga  6120
tgtatgaact ataaaaatag aaagcatcat acaaatacaa atagttcata caaacatcac  6180
acacaatgca cactagctca aagctttttc ctctgtttaa aactcataaa acttccaaag  6240
gtctctctct agctttgttg tatctcacaa acggaactgg aatcggtaga atatgtaaaa  6300
ccaatcatgg cctatccagg tgaaatcacg agtgatggaa ctagcgaaag tactggagaa  6360
cgaggacggt gtagctgcag ctgttgatgc attccacagg catttgccac tggctctgcc  6420
actcccggag tcctcgccgg agaaaagaca cgaagatgat cgaccagacc tgttacagtg  6480
gttcttcatc cagattggta aaaagtgttg ccttccatgt ggtggtgtgt gataacaaac  6540
tcccttagat attttgatct tgtctctgca actcgtttca tttcattcag ttgtcaagaa  6600
tatgattaga tttttaacac agctgcaaaa gatgggtttg gggcatcttt ataagtttgt  6660
tgttcagtga gaataagatg atatttgtgt gagtttgtct taagaacaaa gtaccgatct  6720
cctttattgt atacttaaaa cccattcgaa acagaatctc ccacgtcaaa ctacatttct  6780
cagcttgtag gcattggatt tcatcagctc ctgagcatgt gccagatgac ccttcatatg  6840
atctgttaag tttcagtggc tcaaaacggc acctttaaga gaagcttgaa gtatcaaaac  6900
gtgagattaa aacggaagtt gcagaaactt gcagaaagca gagtatgaga gattgagaga  6960
agaagaaggg agaagggaac acatacaaat atttaacgag ttcacgccca taacacgcta  7020
tatctcacca agactaagct ggaaatccac tagatatcag agagaataca tatttagaga  7080
cgaacaagtg accgttttaa tatctttcac tagcacttaa aattcactat gttaaatcaa  7140
ttaaaaccag aaaaaaaaca atagctaaac ttatgctaag atgtgttttt ctctccactc  7200
tcactagcga ctacattgtg tctatctcgt tctcttcctc atgtgtacta caatctctct  7260
cacgtcttca gcttcacttt atagtgacaa caacattaga cctaaagcac cttgccaaac  7320
gccaaaacag cttcctatag atgcgtttgc ttttttatca tatcttagag gcaaatactc  7380
cttagctttt aaattcacaa caagacaaaa gcaagaggct ctccttgtgg tcccaaaagt  7440
aactcaatcc aatatgaact caccaaagta atcatagtta tgccttgagt tacttgactt  7500
gaatttgctt gagcgacaag ttctcgtctt cacaaatctc cacctgagaa catgatgttc  7560
aagccaaacg acatacactc ttgagaaaga tatagaacgc cttcttctag cttatggatt  7620
ctaatcttgg tttctgagta tgattaccca gtcttgatac taagcagatt taaataccat  7680
aaaactgata gatccttgct ggatttaa                                   7708

SEQ ID NO: 45          moltype = DNA  length = 732
FEATURE                Location/Qualifiers
source                 1..732
                       mol_type = genomic DNA
                       organism = Thlaspi arvense
SEQUENCE: 45
atgggaagag ggaagataga gataaagaag atagagaatc agacagcgag gcaagtgacc  60
ttctgcaaga ggagaactgg tcttatcaag aagactaatg agctctctgt tctctgcgat  120
gctcacattg gtctcatcgt cttctcctcc accggaaagc tctcgcagta ctgttccgaa  180
cccctcagga tgcctcagct cattgaccga tacttgaaga ccagtggaat gcgacttcct  240
gatcctaatg acggccggga ggaattgtac caagagatgg aagtactaaa aagagagaca  300
tgtaagcttg agcttcgtct gcgtccatac catggacatg acttaacctc ccttcctcca  360
cacgagctcg atggtctcga gcaacagctc gaacattctg tccttaaagt ccgcgagcgt  420
aagaatgagt tgatgcagca acagttggag aatctaagca gaaagaggcg gatgctagaa  480
gaagataaca acaatatgta ccgtttgctt catgagcatc gtaacgcggt tgaatttcag  540
caagctggga tagagacgaa accaggggag tatcaacagt ttctagagca gcttcagtac  600
```

```
tataatgatc atcagcaaca accaaacagt gttcttcagc ttgctacgct tccttctgag  660
attgatccta attaccatct ccagcttgct cagcctaatc ttcaaaacga tccaacggcc  720
aagattgatt ag                                                      732

SEQ ID NO: 46          moltype = AA  length = 243
FEATURE                Location/Qualifiers
source                 1..243
                       mol_type = protein
                       organism = Thlaspi arvense
SEQUENCE: 46
MGRGKIEIKK IENQTARQVT FCKRRTGLIK KTNELSVLCD AHIGLIVFSS TGKLSQYCSE  60
PLRMPQLIDR YLKTSGMRLP DPNDGREELY QEMEVLKRET CKLELRLRPY HGHDLTSLPP  120
HELDGLEQQL EHSVLKVRER KNELMQQQLE NLSRKRRMLE EDNNNMYRLL HEHRNAVEFQ  180
QAGIETKPGE YQQFLEQLQY YNDHQQQPNS VLQLATLPSE IDPNYHLQLA QPNLQNDPTA  240
KID                                                                243

SEQ ID NO: 47          moltype = DNA  length = 5332
FEATURE                Location/Qualifiers
source                 1..5332
                       mol_type = genomic DNA
                       organism = Thlaspi arvense
SEQUENCE: 47
ttacatttca aacagatttg acataacatg taatattgct taggacattt gtgttcatca  60
cgtccgtctt tcaatgacca attaatgctg ttttgtttgt ttgttttaac cacgttttag  120
caaaagtaca tttatacagg actttttaa tccgctcgtt acttaatcga caaatatata  180
atgtccctca atactatttg gtatatattt tttacaaaac atgccactga aaatgattca  240
gttgtatatg ttcatatcat cacataattg tgttcaacct gatgtagcgg ctgattactc  300
tatgcacaat gttagaaaat ctgaatatta actcgatgat ctaaatacca atttcttttc  360
cagaatttta atacgttcga gtttcagcat aaaagctttt actcacacca cttgtttccc  420
cttgcgttgt gtggcaatgt cgctgtataa atgtacatat tccttttgtt ttcctccaaa  480
aagtttatta atgaaattca gattctacga tataataata aataatgtta cttcaaaaat  540
aaaagagtgt gccaatatgg actgtgcttt taccatgagg gatttaaact cgattttttt  600
tttgttacac tgaagttgat gaatatagac attaaattaa ctcgaataga caggaaaaat  660
ccgatgtcca aaaaaaaaga caggaaagag atatcacaaa taatctaaca aaactattat  720
ggctaagtat cacattttta gatatatcaa cggttcaaag cccgatccat actgtcatac  780
gtaaaaaaat attgttttgg caaaactaca tataaggtga tgttactata gaaataaaac  840
caaattaaga ggaaggtggg taagaaaaaa taagagagag tcactttcaa gtattgttac  900
attttgtctt ttcccatttg gctatctctc tcttttgcct tttccctttt gtggtaactt  960
tattttccct ataacatttt ttcattaagt ttccatttat ggattatttt ctagttgcgt  1020
caagcatgga atatcaaaga aattagttcg agatttgact aaaaagggtc atttctgcta  1080
aataaattac taacactgcc attaggccaa tcacatgtct agtaacaatt tgacatttca  1140
cttactattg taacttttga tagatattga gactttacaa aaaaatattt taagaaaatt  1200
ttgttgaaga aaaaaacttg aatatcattc actataaaaa aaaggaaaaa atgtataggt  1260
ttttgttaca atactgaacg taaattgtga ccatgattcc ataaagcagt aacatttcaa  1320
actctaaaaa ttgttgatat taaaaacttg aatatcatcc actataaaaa aaaggaaaaa  1380
atgtataggt ttttgttaca atactgaacg taaattgtga ccatgattcc ataaagcagt  1440
aacatttcaa actctaaaaa ttgttgatat taatctagtt tacagaaaaa gtagaagaaa  1500
gaaaaaatga aattagaaaa tgttgagctg acatcacacg ccacacacag aattgtatag  1560
aaaagaggaa gtgtaattaa gcatattctt ccgcattaac ctctctcctc tctgtgtcat  1620
ccaacctcat atactactga tctccatttc cagatcccca agaacacaac tcatcaacaa  1680
gtactttaaa tactctatct ctctctttag agatctctct ttctctctct ctctctctct  1740
ctctctctct ctctctttct ctctgtttct cactaattac tctctacctc tcttacatac  1800
acaaacacaa tctctctcgc ttctctctaa ttcacacatc aagataaaag aatcaaacca  1860
tccttgaaat gaatcctgta attaattata ggatttcagt ttttgagttt tttgttctta  1920
atttggtttt gtagttaatt agggtttctt tatagtttat ctaccttgca tatatatatg  1980
tatgacatag acttacatga cactgaatca ggaggaagag gaaggaacga ataagaggaa  2040
gaggagagag atgggaagag ggaagataga gataaagaag atagagaatc agacagcgag  2100
gcaagtgacc ttctgcaaga ggagaactgg tcttatcaag aagactaatg agctctctgt  2160
tctctgcgat gctcacattg gtctcatcgt cttctcctcc accggaaagc tctcgcagta  2220
ctgttccgaa cccctcaggt taacttcttc ttcctctccc tctctcgaat tagggtttca  2280
gagatctata catacatgtg tatgtattat ctaattaaat gagtaaataa gagatatata  2340
gctcgtgctt gtgaacagac aattctcatc attagtttct gaagttagca ggtatcatga  2400
atactatgtt tcagatttta atttgaccca gaagttaaga atctctctga tgctatatat  2460
atatatatat atatatatat atatttactt ttgcagtatt tgatttgtat atatctgtag  2520
atgcatgtat ataatcattg tttattgata tcggtcaaat tctgtaattt ctacacctgc  2580
caagcaaaga gatgtttttt caaagatttt tcatttcttg atcaaccttt tttcccatat  2640
aatgtttacg acatatatat atatatacct agtatatata taagtcttat ttgaatcatt  2700
cgatataagt accattaatt ataaaggatt tttattaaaa gttgtaaatc taagtcatga  2760
accagaagac gaatttattc acatctagcc taacaatata agaagaaagg tatgctgata  2820
tagtttgaat tttgctatca taaaacaaaa atggggaaaa tgtatactct ctccgttttt  2880
ttatataaaa tattttatga attgtttttt gttcaaaaat agttgatgtt ctcacatatc  2940
tatgcagaaa ttaattgcat tttattgatt ttaagtgttt aaattttgta tattgttttt  3000
ttattggttg aattgttttg gaattaatga ctaaaacatg ttttgttttg gaaatataca  3060
aaattaaatg atttcttaat ctatataaaa aaaccttaaa catcgtatat aaaaaaaacgg  3120
agggagtatg ttatttgatt tttgtgttcc tccaatgatg attaaagtcc tgacgatgta  3180
cgattaaaga tactatttga taacaattta ttattaccaa tgttgaatag gatgcctcag  3240
ctcattgacc gatacttgaa gaccagtgga atgcgacttc ctgatcctaa tgacggccgg  3300
gtaatatata tatacacgca tacttattcc tttgtcttag ccaattcaaa acaaagaata  3360
taacattctc acaaaaatca ataatcattt ggagtttttt gtgtgtatat ataggaggaa  3420
```

```
ttgtaccaag agatggaagt actaaaaaga gagacatgta agcttgagct tcgtctgcgt  3480
ccataccatg gacatgactt aacctccctt cctccacacg agctcgatgg tctcgagcaa  3540
cagctcgaac attctgtcct taaagtccgc gagcgtaagg taacgtaata tatgttcaca  3600
tcaatataca tattctctta aaactatagt gattattaca cttttgtttg atctctcttt  3660
tctatctcta ctgttaataa attgaagaat gagttgatgc agcaacagtt ggagaatcta  3720
agcagaaagg tcgctctcta attaatcatt cttttgataa gtactcttaa ttttattttc  3780
ctctaattag tcatctttta taccgcggat ttaatgatca ttaccgtgtc tatataaata  3840
tatgatcaga ggcggatgct agaagaagat aacaacaata tgtaccgttt ggtaagtttg  3900
gttactagag aacgtttaat ttggttgcac attttcggtt tgtgtgacat aattattcaa  3960
cgtattaatt gcagcttcat gagcatcgta acgcggttga atttcagcaa gctgggatag  4020
agacgaaacc aggggagtat caacagtttc tagagcagct tcagtactat aatgatcatc  4080
agcaacaacc aaacagtgtt cttcagcttg ctacgcttcc ttctgagatt gatcctaatt  4140
accatctcca gcttgctcag cctaatcttc aaaacgatcc aacggccaag attgattagt  4200
cctcaaaagt gaatcattta tgtcttttat tactacctat tttgattata gccaatgcct  4260
tcttctgtgt ctgttttgtg tggttatgga aacctaatat tgtttgaagt acaattcact  4320
tgaaaagcgt ttatggtctt tctttgatta aataatttaa tcttcattat cacacatttg  4380
ccaactagag atcaactgtt tatgtaatcg cagattttga gatacatttt tggccataga  4440
aagagtggga gacacatgag taaactattc ttaggttgtt gacaaaagga agaaccaaca  4500
cctcagaatc ttaataatgt gtgatcgaca agcttatcaa ggaccttcac tgaaaataga  4560
ttttatatat ttcagacaga ttagatcgca atcccaaaaa tagctcttat aaactcagcc  4620
aagattgcaa aaattcaatc aacttctgta gggtattgca agggacgatc aagaagcagg  4680
aaaagagttc tggaagaaga atcttccttt cctcttttcc tcttcaatct gttttcatca  4740
taaagacgag aaaaaattga atacttggct tcttgatcgc tcgaataacc atcatcatca  4800
tctagatccc ccaaacgctg cgtttttgt tggctgaacc gtctacatcc atgacaggag  4860
gatattttat atccgagagt ggccatggaa aagagtacca agaaggccgt gttactgctt  4920
ttgtcgtgat ctcctgcatt gtggctgcaa tgggaggtct cctcttcggt tacgatatcg  4980
gtatctcagg tttgtttctt cccaaccaag aaaccccaag atttctcctt ctctcttctt  5040
ctttctcttc tcatcatggc gggatatatt tttttcagga ggagtgacat caatggatga  5100
gtttctaacg agattcttcc ccgacgtgca acgccaaagg caacacaata cagggcatga  5160
aacagagtat tgcaaattcg acaatgagct tctcactctc ttcacctcct ctctctacct  5220
cgcggctcta ttcgcttcct tcctcgcttc aacgatcaca aggcttttg gccggaaaat  5280
ctcaatgaag atcggaggtc tcgcttttct ctccggagct cttctcaacg gt          5332
```

```
SEQ ID NO: 48          moltype = DNA  length = 1071
FEATURE                Location/Qualifiers
source                 1..1071
                       mol_type = genomic DNA
                       organism = Thlaspi arvense
SEQUENCE: 48
atggctgcag tagaaagagt ggagagttta gccaaaagcg gaatcaaatc tatcccaaaa  60
gattacgttc gtccgaaaga agagctcgag agcatcaacg acgttttcca agaagagaag  120
aaagaagaag gtcctcaagt ccccaccatc gatctacaag acatcgagtc agaagacgaa  180
acgatccgcg agaagtgcac agaggagctg aggaaggcgg ctatggattg ggagtgatg  240
catttgatca accatggtat accggtcgat ctaatggagc gtgtgaagaa aaccggagaa  300
gagtttttcg gttctcctgt ggaagtgaag gagaagtatg ccaacgatca agccacaggg  360
aagattcaag ggtatggaag taagttggct aacaacgcga gcggacagtt ggagtggcaa  420
gattacttct tccatcttgt ttatcctgaa gataagagag atctaacact ttggcccaag  480
acaccaagtg attacattga agcaacgagt gagtacgcga agtgtcttcg tttgctagcg  540
acaaaagtct tcaaggctct ttctatcggt ctagggttag agcctgaccg tttagagaga  600
gaagtgggtg gtttagaaga gcttcttcta cagatgaaga tcaattatta cccaaaatgc  660
cctcagcctg agctagcact tggcgtggaa gctcacaccg acgttagcgc cttaaccttc  720
attctacaca acatggttcc aggtttgcag ctattctacg agggcaaatg ggtcattgca  780
aaatgtgtcc ccgactcgat tgtgatgcac attggagaca ctctagagat tcttagtaat  840
ggcaagtata agagtatact tcatcgtggg ttggtgaaca aggagaaggt tagggtttct  900
tgggctgtgt tttgtgagcc accaaaggaa aagattgttc ttaaaccgtt gccggagttg  960
gtgactgttg agtctccggc taagtttcct ccaaggacat ttgcacaaca tgtcgagcat  1020
aagttgttta ggaaggaaca agaggaattg gtgtctgaga aaaaaagttg a           1071
```

```
SEQ ID NO: 49          moltype = AA  length = 356
FEATURE                Location/Qualifiers
source                 1..356
                       mol_type = protein
                       organism = Thlaspi arvense
SEQUENCE: 49
MAAVERVESL AKSGIKSIPK DYVRPKEELE SINDVFQEEK KEEGPQVPTI DLQDIESEDE  60
TIREKCTEEL RKAAMDWGVM HLINHGIPVD LMERVKKTGE EFFGSPVEVK EKYANDQATG  120
KIQGYGSKLA NNASGQLEWQ DYFFHLVYPE DKRDLTLWPK TPSDYIEATS EYAKCLRLLA  180
TKVFKALSIG LGLEPDRLER EVGGLEELLL QMKINYYPKC PQPELALGVE AHTDVSALTF  240
ILHNMVPGLQ LFYEGKWVIA KCVPDSIVMH IGDTLEILSN GKYKSILHRG LVNKEKVRVS  300
WAVFCEPPKE KIVLKPLPEL VTVESPAKFP PRTFAQHVEH KLFRKEQEEL VSEKKS      356
```

```
SEQ ID NO: 50          moltype = DNA  length = 4065
FEATURE                Location/Qualifiers
source                 1..4065
                       mol_type = genomic DNA
                       organism = Thlaspi arvense
SEQUENCE: 50
gtaaagtaga cagcttttg gaatttgcag agattatggt acaggaataa acactgaatc  60
gagattatag ccactgaatc aatcaaagcc ttgagcaaat gcgattgaga gctgaaattt  120
```

```
aacagggttt cgagccacaa tactataaac tagtgactga aaaacttcga tcactaaagc  180
ttcagctaga tttggtggaa gaagaaatct accactaaat tctaaaaggc tccatctttg  240
tagaatcaat tgtgaacgga ttctaggtaa aggatgaaaa ttgaagacct gattgctctg  300
tggtggcttt tgcaggcaat aagaaggatc ttcttctcaa ggaaatcgat cttccagggc  360
tgagctgatc ccattgagtc ctcggcgacg acgacgacgg aggagaagga gaagagaaag  420
aagtggtggg tttgcgagaa acggcggaga aaagtcgagg gcttgtcaaa ttgaacaaca  480
tcttgctacc cattttcccc gggagaagca aggagagatc cttttcctct gttttccggg  540
aaggaacctg tggttgaaga tgagttactg tgagcttcag gttccttctg attttttat  600
tttattttaa ttcaatattt tattatttat ttatttaatt tagtagagag gatttggagg  660
gaagaaatta ggaaagataa gagaggtgtg gagatgaatt cctaggcaga tctctgatat  720
tttttccccc tctcatctta aagaaaaaga atatccacgt cagcaataaa tatcccacct  780
ttctgtattt tttgtaactt tataagaatt ttatttactt taatattttt taaatgatac  840
agtgatttct ctttgtatat aaaaaacttt gaagtactaa tttactttag acaaacaaat  900
gtgatattat tatttccttt gttcagttga tcttttatac aattagtctt tttgaaactg  960
aaaccagtca aatactcaaa atgtttttag tgatgctaaa aattacagaa attatgataa  1020
aatgtggaca ttaaaaataa aataaaaagg tggataatgt acagacacct atattgattg  1080
aactatttaa aggtggacac gtggagatac gatttaggca cgtgcacacg gacgcagaag  1140
aaacgccacc aaaagtctga cgttgatagt catcggttta actctattgg gcttcttttt  1200
tatgggcttt taaatccaaa gcccttacca agctaggaca tactgtagta acttctcttc  1260
cagaattaaa agaaaacttt tttgaccgtt ggatctcaag gatggtgaaa ccatcagtca  1320
acctctctcg ttgacctgac cgtgaagtgt gttgtcactc actcacctgt tcttcctccc  1380
tacccaaccg gtagctccac acttcctaat tccttgatta attcttaatt ctaatggaaa  1440
attaatataa ttatctttgt tatataagaa agcctctgca tatatttcat ttgacatgca  1500
acaaaatcgg caagaagaat agtagaacaa agtatttatt cgttagttat cttacacact  1560
gtttttttcct ctgctttatt aagtttcttt acttacttac tctgtttctt tgctctgttt  1620
tagcttttaa aagaagacaa taaagatggc tgcagtagaa agagtggaga gtttagccaa  1680
aagcggaatc aaatctatcc caaaagatta cgttcgtccg aaagaagagc tcgagagcat  1740
caacgacgtt ttccaagaag agaagaaaga agaaggtcct caagtcccca ccatcgatct  1800
acaagacatc gagtcagaag acgaaacgat ccgcgagaag tgcacagagg agctgaggaa  1860
ggcggctatg gattggggag tgatgcattt gatcaaccat ggtataccgg tcgatctaat  1920
ggagcgtgtg aagaaaaccg gagaagagtt tttcggttct cctgtggaag tgaaggagaa  1980
gtatgccaac gatcaagcca cagggaagat tcaagggtat ggaagtaagt tggctaacaa  2040
cgcgagcgga cagttggagt ggcaagatta cttcttccat cttgtttatc ctgaagataa  2100
gagagatcta acactttggc ccaagacacc aagtgattac atgtaagctt ttgattcgtt  2160
tgttttatca tttataaaac aaagttcttg ctttggttat agtaacgttt tttggatgat  2220
tgtagtgaag caacgagtga gtacgcgaag tgtcttcgtt tgctagcgac aaaagtcttc  2280
aaggctcttt ctatcggtct agggttagag cctgaccgtt tagagagaga agtgggtggt  2340
ttagaagagc ttcttctaca gatgaagatc aattattacc caaaatgccc tcagcctgag  2400
ctagcacttg gcgtggaagc tcacaccgac gttagcgcct taaccttcat tctacacaac  2460
atggttccag gtttgcagct attctacgag ggcaaatggg tcattgcaaa atgtgtcccc  2520
gactcgattg tgatgcacat tggagacact ctagagattc ttagtaatgg caagtataag  2580
agtatacttc atcgtgggtt ggtgaacaag gagaaggtta gggtttcttg ggctgtgttt  2640
tgtgagccac caaaggaaaa gattgttctt aaaccgttgc cggagttggt gactgttgag  2700
tctccggcta agtttcctcc aaggacattt gcacaacatg tcgagcataa gttgtttagg  2760
aaggaacaag aggaattggt gtctgagaaa aaaagttgaa gtttgagtct aatatgagta  2820
aaaactccat gttaaagttt ctcgtttctt ttgtgtttat gtctttatcc tgtatttgat  2880
gcgtcttgtt gaagatgaca cgaaatattt ctaccgattg tgaaattgtt aaaaatttca  2940
ctctattata agttggtttt atgtatcgcc gaagtgacag atgttggaag aaatctagtc  3000
attggaaact gtattacatt cgtgctaatt gcatttcttt tcaagtttaa accaaattag  3060
tggaacgtct ccggttctag tctgtgtgac ttagttatag cttggtgaat agtaaaggaa  3120
gctcagtaaa tacgagtaac atagaaagat atttatgaac cacattgttg tattaaggac  3180
ttgagaatat tctgatttac atttccagtt tgttcttttt tgttatgcta ctaactgtaa  3240
aaaaactact cttctccctc ctttaatgat aattggcatt ccctgcttgg aaagagttca  3300
ctctatttc cttgaagacc ttaaaaccaa gaatagattg cacaactcaa tgattagtgt  3360
tggaaaatag aaaaaaaaaa atcaaaaatt gagtttcaag tttcacaagg ctgcaccttt  3420
ggttgacgaa atcttgtgag agatccattg ttttgctgga gctccgattt gatagagagc  3480
tgcacaggtt taatacgggt caagagagcg tatacaaata aactagagtg tgtttaagaa  3540
agatccatta catcaaacca tgagctgtac cttgctgaaa agatctgttg gtaaatctgg  3600
ctgaactctc ttttccgaat gaaaactaaa ctcctgtgtt tgcattccca aaacagtttg  3660
catcctcatc aggtaactca attttacaga catacagaag atcaagcgca aaaagaataa  3720
ttggtaaaga ctaccatacc aaaggtactg ttgtttctcg cttgctgttt ttgaaaatgc  3780
ccatgtctcc tctgcttgag agtatctgtt ttgcaggagt gtgaaactat gtaaggtgtg  3840
acacgtataa ttaacgcaag cgaaatgaga ctcgagaaag gataatacct tcttgttcag  3900
aggacgagct ttaaaaacgt gttttccctc cgagacatca tgcttaggta tatccataac  3960
gcttggtctg caagaaaaaa atacactttt atgtttacat tcacttcaac cacaagttga  4020
agtgagaaat caagcaatcc ttcttaatgt tccatgtgac tttat                 4065
```

```
SEQ ID NO: 51           moltype = DNA  length = 645
FEATURE                 Location/Qualifiers
source                  1..645
                        mol_type = genomic DNA
                        organism = Thlaspi arvense
SEQUENCE: 51
atggttgtga agctatacgg gcaggtaacg gcagcttgtc cacagagggt cttgctttgt  60
tttctggaga aagaaattga atttgagatt gttcatatcg atcttgatac atttgagcag  120
aaaaaaccag aacatcttct tcgtcagcca tttggtcaag ttccagccat agaagatgga  180
gatttcaagc tttttgaatc aagagccatt gcgagatact acgcgaccaa gtactcggac  240
caaggcacga accttttggg caagtctcta gagcaccgag ccatcgtgga tcagtgggcc  300
gatgttgaga cccattactt caacgttctg gcccacccca ttgtgattaa cctagtcatc  360
```

```
aagcctaggt taggcgaaga atgtgacgtc gttttggtca aggacctcaa ggtgaagctt  420
gaggaagttt tggacatata cgagaaccgg cttgcttcga accggttttt ggctggtgat  480
gaattcacca tggctgattt gacgcacatg ccagctatgc ggtatttgat gggtataatc  540
gatataaacc ggatggtcaa ggctcgggtg aatatgaacc ggtggtggga agagattacg  600
gctagaccgg cttggaagaa gcttatggtg atggctggtt cttga                   645

SEQ ID NO: 52          moltype = AA  length = 214
FEATURE                Location/Qualifiers
source                 1..214
                       mol_type = protein
                       organism = Thlaspi arvense
SEQUENCE: 52
MVVKLYGQVT AACPQRVLLC FLEKEIEFEI VHIDLDTFEQ KKPEHLLRQP FGQVPAIEDG  60
DFKLFESRAI ARYYATKYSD QGTNLLGKSL EHRAIVDQWA DVETHYFNVL AHPIVINLVI  120
KPRLGEECDV VLVKDLKVKL EEVLDIYENR LASNRFLAGD EFTMADLTHM PAMRYLMGII  180
DINRMVKARV NMNRWWEEIT ARPAWKKLMV MAGS                               214

SEQ ID NO: 53          moltype = DNA  length = 3574
FEATURE                Location/Qualifiers
source                 1..3574
                       mol_type = genomic DNA
                       organism = Thlaspi arvense
SEQUENCE: 53
ttaaatgtcg gattccaatt gagttaagta agtctcatct atatgtaaat gggtttttgg  60
aatagtatca tcttataatc attttacaca gaatcaaagt tattagcctt gctaaatcta  120
ggttgtattg atcgaatgat cttcgaaaaa actcagttag ctgtaaatgc tttgcagggt  180
atgttaatga atgaaaatct acataatcac atccctcttg aactaatatg tctgtttata  240
gatcaaaaac aagttaggca tgtgaaagtt ttgtaatctt gttctggtta tggtatttgt  300
gcaagctttc gaactcgtgt ataaaggttt tcttctcatt ttcatgttac aacaacgcag  360
agatctcagg tcaaggttac caccacttca gatccactca cacgatgctc ttatccaaga  420
agtccagctt tggatctcgg cttcacttca gctatttttc taatgatggc tcagataatc  480
gtcagcgtcg gaagcggctg tctctgttgt agaaaaggtc ctgctccttc cagatctaat  540
tggattatcg ccttaacctg cttcgttgtt tcctggtaat cctcatcatt tctttctcct  600
atcgagcttt cctacttcac aattttgctg gacagacaca agtgacgaat ctttgtgttt  660
actcttaggt tcacttttgt gatagctttc ctcttgctgc taaccggagc tgcactcaac  720
gatgaacaca ctgaggagtc aatgtatgcc ggttactact cctgctacat tgtgaaaccg  780
ggagttttct ctaccggttc tttgctttcg cttctcactg ttgccctcgg gattgtctac  840
tatttgtgtt tgacttcgag taaacaaaac gttgctgaca cagcgacgac ggcgaaccga  900
ggaggaggta tagcaatggg acagcctcag attccggaga gagtggaaga tcctgtcttt  960
gttcatgaag atacttacat gagaagacag ttcacttaaa aacagaacat ggctttcttt  1020
ggatacacgt taggttttag gatgataatt agataaacaa gagatgctgt tttttttttt  1080
tggggatttt atctttgtga ttttagtatg tgaaactaag accatgaaac ttggtagctg  1140
gtaatgatga ttaatgatga ttgataacgt acagaaaacc aaacaaacgt ctccttttac  1200
ttatctatgt gaatttaaag tggttgttgg gaagtgttca caaaaatcag aaattgaaat  1260
aaataattaa cctatccacc ggtccgacca aacacgggac atctaataga aatcaatttt  1320
gtttatctcg aatcataaga cgaaaactac tgaaattttt atgttaataa gtttgtagag  1380
caactttgga tgatatccac cgttagtgga acaaccacca catgctctac ccaaccagca  1440
caacaaccag ctccttttaa atgtttttga gtctaataaa atgccaacac atctactact  1500
ctcacttctt cacatttata aataagatcc agagaagcaa ttttaaaata acacattgaa  1560
attgtttcaa agcttatttt tttttaaatt tatatcaata aaaatttggt tgcaaagtta  1620
ttgtaacgct tatagaatgg ttgtgaagct atacgggcag gtaacggcag cttgtccaca  1680
gagggtcttg ctttgtttc tggagaaaga aattgaattt gagattgttc atatcgatct  1740
tgatacattt gagcagaaaa aaccagaaca tcttcttcgt caggtcaaac attttatatt  1800
ttctaatttt gaaaagtcat gaattgtatt taatatcatt aatgttttct tttagccatt  1860
tggtcaagtt ccagccatag aagatggaga tttcaagctt tttggtaaga tcctaataac  1920
agcattgtaa aacattcttt aatacttgtt ttatatcatt aatatgtaga ttgtgttttg  1980
aaatttggcg tgtgtgctca gaatcaagag ccattgcgag atactacgcg accaagtact  2040
cggaccaagg cacgaacctt ttgggcaagt ctctagagca ccgagccatc gtggatcagt  2100
gggccgatgt tgagacccat tacttcaacg ttctggccca ccccattgtg attaacctag  2160
tcatcaagcc taggttaggc gaagaatgtg acgtcgtttt ggtcaaggac ctcaaggtga  2220
agcttgagga agttttggac atatacgaga accggcttgc ttcgaaccgg tttttggctg  2280
gtgatgaatt caccatggct gatttgacgc acatgccagc tatgcggtat ttgatgggta  2340
taatcgatat aaaccggatg gtcaaggctc gggtgaatat gaaccggtgg tgggaagaga  2400
ttacggctag accggcttgg aagaagctta tggtgatggc tggttcttga attatttcga  2460
atttatggtg atctgaacca aataagcttc atattttctg tactattttc tttatctatg  2520
ttttgtaagt ttcaattgat aaaataaatt tacttttaaa gatttaaatt cgttaatatt  2580
ttctttatct atgttttgta agtttcaatt gataaaataa atttactttt aaagatttaa  2640
attcgttaat tctcaatttt aaaggggact atagatttac agttatcatt ttgttacgta  2700
ttactacaaa ttgctgaatt gttatagaac tttttttcca attgtttgtg aacctaatac  2760
tttaaatctg aatagacatc atgtatttaa ttatttccca tgttatattt tcatctagta  2820
tatatagttc attcatttgt agccatgcag atgcacaatg aatctcgatt tttttttttt  2880
ttgtgcgagc acaatgaatc tcgatctctt agtgtttttg aattcagtaa cttctttgca  2940
tctttcacta aactatctct ccaaccaaaa aaattcatat ttcttcagca gccaagagag  3000
aaataaaaaa tttcaaaaat tactttttac atagagaaaa agaagggaac atccgcccat  3060
ttatatgtat attagttaac atgataaaaa atccgaccct aagttttttc attaatcaca  3120
aaagccctct ctttggttgt ttttcttggc ttctctcatt catgtcgact tagaagaaga  3180
agctaatctt gagcttgaag tctttagcac tgattttgca taagccaatg gcaaagctgc  3240
aattttcttg gctttcccta cataagctct ctttgtaaaa ttgttgtaat cattcgcttc  3300
aatctcgtcc agtatcctcc tgtataatag cagcgatgcc catacctgaa aaaattgcac  3360
```

```
agccaagtgt aagggggtta aatcgatcca aacaaaaaag ctttggggcg aaaacaaaac  3420
aaaaatgtaa acggtaaagt gtaaacgtgg gggcttaaga gtgttgttag agacacttac  3480
cggccatctg cttgcggcgt cgagctccgt gacgcctttc tcagcttcgt cgaagaacat  3540
tcttgctcgt ttaagctgca ttttcatgaa gttt                              3574

SEQ ID NO: 54          moltype = DNA  length = 1155
FEATURE                Location/Qualifiers
source                 1..1155
                       mol_type = genomic DNA
                       organism = Thlaspi arvense
SEQUENCE: 54
atggttagtc acaaagagac cgtgtgtgta acaggcgcat cgggattcat cggttcatgg  60
cttgttatgc gattattgga gcgtggttac tttgtccgtg ccactgttcg cgaccccgga  120
aatttgaaga aagtgcaaca tcttgttgat ttacctaacg ccaagacgca actcactcta  180
tggaaagccg atttatctga tgaaggaagc tacgatgacg ccataaacgg atgcgacggc  240
gttttccatg tagcaactcc catggatttt gaatcaacgg atccggaaaa cgaagtgata  300
aaaccaacag tgaatggagt gttggggata atgaaagctt gtgataaggc aaaaacagta  360
cgaagaatca tctttacttc ttctgccgga actgttaatg tcgaggaaca tcagaaaaat  420
gtctacgttg aaaatgattg gagtgatctt gactttatca tgtccaaaaa gatgaccgga  480
tggatgtatt tcttgtcgaa aactttagcc gagaaagcag cgtgggatta tgcgaaggaa  540
aatggattag acttcattag tataattcct acattggtga tcggtccatt cataacaaca  600
tctatgccgc ctagcctcat caccgcgctc tctcctatca ctcggaacga ggcacattac  660
tcgatcataa gacaagggca gtacgtgcat ttggacgact tatgcaatgc tcatatattc  720
ttgtacgaac aagctgatgc caagggacgt tatgtttgtt cctctcacga tgccacgatt  780
cttagtatct ctgaatttat taggaaaaag taccccgagt ataacgtgcc ttcaacgttt  840
gaaggtgtgg atgaaaatct agagagcatt gtgttcagtt cgaagaagct gattgatatg  900
ggatttagct ttaagtatag tctcgaggag atgttggtcg aatcgattga gacatgtcgt  960
caaaagggtt ttctcccggt ttctttacca gatccatcaa tatttgagga caaagttccg  1020
actagtgatg acaagattga gcacaaaacc ggagctggtt tacccgatga tgtggtgccc  1080
tgtaagaaga cagaaccggt ggtaatccgc gagaaaaccg atgcttgcat gccggcagag  1140
cagatgtgtg cttag                                                   1155

SEQ ID NO: 55          moltype = AA  length = 384
FEATURE                Location/Qualifiers
source                 1..384
                       mol_type = protein
                       organism = Thlaspi arvense
SEQUENCE: 55
MVSHKETVCV TGASGFIGSW LVMRLLERGY FVRATVRDPG NLKKVQHLVD LPNAKTQLTL  60
WKADLSDEGS YDDAINGCDG VFHVATPMDF ESTDPENEVI KPTVNGVLGI MKACDKAKTV  120
RRIIFTSSAG TVNVEEHQKN VYVENDWSDL DFIMSKKMTG WMYFLSKTLA EKAAWDYAKE  180
NGLDFISIIP TLVIGPFITT SMPPSLITAL SPITRNEAHY SIIRQGQYVH LDDLCNAHIF  240
LYEQADAKGR YVCSSHDATI LSISEFIRKK YPEYNVPSTF EGVDENLESI VFSSKKLIDM  300
GFSFKYSLEE MLVESIETCR QKGFLPVSLP DPSIFEDKVP TSDDKIEHKT GAGLPDDVVP  360
CKKTEPVVIR EKTDACMPAE QMCA                                         384

SEQ ID NO: 56          moltype = DNA  length = 4705
FEATURE                Location/Qualifiers
source                 1..4705
                       mol_type = genomic DNA
                       organism = Thlaspi arvense
SEQUENCE: 56
cctccgttat tatggagcct tgtaattagt gttcagaaaa tcaatcccaa caatattatc  60
taatatttc tatagaaaaa atatagttta acaagtgttt agatgcctca tatcaaactc  120
tctaagattg tgtttctaat ctagtactaa gtacaagtcc aatgactcca accacaatca  180
tatttattct acacatgagg ggtgaaattt taattgttaa ataaaaaaat atagatacaa  240
ttattctatt ctatagttta tatgttgaca aagaaatctt tggtaaattt tatttttaaa  300
agtcaaaaag atatttgtta aaagtattgt tgtttgagga aatgctccaa aataatccag  360
aataagaaaa taatatgaaa cggtactcca ttgagaaaaa actgtgaaaa taacccatat  420
tttatgattt tttttaaata ccagtgctac atttctaact atttttactt gtagtctaat  480
ggcatactga atgcagagta ctggcagact gattggtctt acaattgaat atagactatt  540
ggcagactaa atgcaaatta ctgacagact aacgacagat taaaagcata ttagtggatc  600
ctgcttatgg atcatttgaa aaaggttcat gtttggtaac aaaattacca aatgaataat  660
ttcaaaaatt atcccatttg agtaaagtat atttttattt ttggctaatt tcttctttga  720
attaacccaa attatggtgt ttgtaaattg taactgtgat tttttttac atcaagaagt  780
gaatggttga caaaaaaaaa agaatgatta aggtttaaat actaaactcg tatatttaaa  840
ttataaactt ttcgaattca tttttttaa ttttatcaat ctttagaaaa atattatatg  900
tttctagaaa gtttctataa attctaatgt gtttaccatt aaaaatatat tatttatttt  960
cctcatttga aatatcaatt tatttatata taactcataa ttttaaaaat ttatatatca  1020
actcatgtca aaattttaat ttcatatcag tttatttcaa taatgttttt acacgtatta  1080
aaatctaatc aattacactc ttttattatt aacaaatttg acgtattaaa ttttatatga  1140
taaatttgt taacgtatta aaataaatata aactcttctt gtagtttagt aacaaaataa  1200
aaaaattaca aaaaacaata agtaagaaaa ggaaacttca actcttgtcg ctatctcact  1260
aaacaaacaa gcaaacccat tcggcgtagt tcacccacca gtacaactaa aactatatcc  1320
taaaaaataa taaaatcaaa cttaccagtt tgtcacgtac cacacaaccc agtccttcgc  1380
caaccaacgt tcctcacgtg cttcgccggt tggtactcac gtgaccggca gctttctaat  1440
agcaattctc aatacatata taatctcttc ataccaaagc tacatatata gtctcttcat  1500
accaaagcta catagcaaag tctatcccaa agcacagtcc atctttataa tacacaaaaa  1560
tggttagtca caaagagacc gtgtgtgtaa caggcgcatc gggattcatc ggttcatggc  1620
```

```
ttgttatgcg attattggag cgtggttact ttgtccgtgc cactgttcgc gaccccggta  1680
cgtatatatg ttcttacaaa ctaactcgtt aattaatttt tcctaagatt aattaaatct  1740
atgtgtggct aatttacggg ttttattggg ttatttatat aggaaatttg aagaaagtgc  1800
aacatcttgt tgatttacct aacgccaaga cgcaactcac tctatggaaa gccgatttat  1860
ctgatgaagg aagctacgat gacgccataa acggatgcga cggcgttttc catgtagcaa  1920
ctcccatgga ttttgaatca acggatccgg aagtaagtta taatatgaac ctcttttagg  1980
tttcatatca accctaaaag atcttgttgg ttaaattttt tttttttttt aatcagaacg  2040
aagtgataaa accaacagtg aatggagtgt tggggataat gaaagcttgt gataaggcaa  2100
aaacagtacg aagaatcatc tttacttctt ctgccggaac tgttaatgtc gaggaacatc  2160
agaaaaatgt ctacgttgaa aatgattgga gtgatcttga ctttatcatg tccaaaaaga  2220
tgaccggatg ggtaaatata tataaattat atatcaaaca tcacactaac cctaagttta  2280
ttcttcttca tagttattta tgttttaata aaatgttttt ggcagatgta tttcttgtcg  2340
aaaactttag ccgagaaagc agcgtgggat tatgcgaagg aaaatggatt agacttcatt  2400
agtataattc ctacattggt gatcggtcca ttcataacaa catctatgcc gcctagcctc  2460
atcaccgcgc tctctcctat cactcgtgag ctctcactta atttctactc tttttgtaaa  2520
ctaagagatt tcttgacctt aggccaggtc ttgctcataa aatcaatgtc cactgagcaa  2580
tattctattt tataagccta ataatcataa atggcaagga aaacaaccta tttttttttta  2640
aagaacctta acgtctaacc aaaaattaca aaaagttata tggacccaat gcaaatacat  2700
ctttggcaca tgccaagaac cggatcgtag gaagatcttt ctggctagcg actagagcat  2760
gtcaactagt ctcttctatc ttccatcttc ttttgttgga atttgaaatg ttaatttttt  2820
ttaaaaacgg tgaaaatgtt tcagggaacg aggcacatta ctcgatcata agacaagggc  2880
agtacgtgca tttggacgac ttatgcaatg ctcatatatt cttgtacgaa caagctgatg  2940
ccaagggacg ttatgtttgt tcctctcacg atgccacgat tcttagtatc tctgaattta  3000
ttaggaaaaa gtaccccgag tataacgtgc cttcaacgta agatttatag atttaaatta  3060
cggagtttaa gccttgtttt gcttaagcaa tcaagatcgt ttgctgaaaa actatttgga  3120
acaggtttga aggtgtggat gaaaatctag agagcattgt gttcagttcg aagaagctga  3180
ttgatatggg atttagcttt aagtatagtc tcgaggagat gttggtcgaa tcgattgaga  3240
catgtcgtca aaagggtttt ctcccggttt ctttaccaga tccatcaata tttgaggaca  3300
aagttccgac tagtgatgac aagattgagc acaaaaccgg agctggttta cccgatgatg  3360
tggtgccctg taagaagaca gaaccggtgg taatccgcga gaaaaccgat gcttgcatgc  3420
cggcagagca gatgtgtgct tagagattta accggtatct attatatatc aattgtcgta  3480
tcgttttagt attggatgtg tgttttgaat ttgttacttt ctgaatcgta gattattatt  3540
gaagggtggt atggactgat tctgatagta acatgattga gtgtaacatt atgaactttt  3600
acatatttaa gaagcagagt gatatttaaa caatgttgcc ttgagtcaaa ttagtcgtgt  3660
aatgtcgctt gaatgcttcc ataatctata attagacaat ttcaacatct caatcgcagg  3720
catgcatttc ttaacaaaga gttatatatt cggtggtcac tggaaatatt ttatacatat  3780
ataatataat ttaactacta tgcagattac agagtataag aaaacaattc ttggctaaat  3840
agatttttcag ttacaaaata aagaaaaacc aaatgactga acttttttta tttgaagaac  3900
aaaaaatgaa aatttagtcg ttcgagttaa tttacggatc ctatcagcta aaaataattt  3960
agttctgttg agatgtccat gctttttttg gaatttggat tttcctttttt ccatatgtga  4020
aacctttcca tataccaaaa actctatcat caaactaccc agcctttgta tctctatgcc  4080
aaaaaaaaaa aattaaacaa aatctttaat ttgaagtcgg actgtcggag tatatggttt  4140
ttcttgtacg tacgttttcc aaatgcttca gtaaattgct cttcgaagtc tttcatcgtc  4200
agctggaaag aaatacaaaa gtgattcctc ttgtgcctca aatgttcttt tgtagcttag  4260
gagaggatat tgggagatgg gttttaaaga atttttcaaa ttttgagatt ctattgttta  4320
taaattttta aaatcttaat agttaatatt gttattggtt gaaagatttt aaaattctat  4380
ccaaaatcct ttgttattta aaaaatttag cttttaaaga ttttatgatt tattaaaatc  4440
ttgtgttatt ggaacatgaa ttttaaacaa tctaacttat aaaataattc tttcaaaata  4500
ctacctatat agcttagatt ctcaaagtca ttataataaa atattttgat agattttttta  4560
aatataaaaa ctctttccaa atttaacaaa tattttttac aagtttaaca aatctcccaa  4620
ctcttgaaat caatcaaaac tttataattt catctcttaa tgaccctccc ttactctttg  4680
ctttttgttg tttgtttctc aattc                                         4705
```

```
SEQ ID NO: 57          moltype = DNA  length = 1188
FEATURE                Location/Qualifiers
source                 1..1188
                       mol_type = genomic DNA
                       organism = Thlaspi arvense
SEQUENCE: 57
atggtgatgg gtacacaacc gtcgttggaa gagatcagaa aggcacagag agcggatggc  60
cccgcaggca tcttggggat aggcacggcc aaccctgcga accatgtgat ccaggcagag  120
tatccggact actacttccg catcaccaac agtgagcaca tgactgacct caaggagaag  180
ttcaagcgca tgtgcgacaa gtcgatgata cggaaacggc acatgcacct gacggaggag  240
ttcctgaagg agaatccgga catgtgcgcc tacatggctc cttctcttga tgtgaggcag  300
gacatcgtgg tggtcgaggt ccctaagcta gggaaagagg cggcagtgaa ggccatcaag  360
gagtggggtc agcccaagtc caagatcacc cacgtcgtct tctgcactac atccggagtt  420
gacatgcctg gtgctgacta ccagctcacc aagctcctcg gtcttcgccc ttccgtcaag  480
cgtctcatga tgtaccagca aggttgctac gccggcggca ctgtcctccg actcgccaag  540
gacctcgctg agaataaccg tggtgctcgt gtccttgtcg tctgctccga gatcacagcc  600
gtcaccttcc gtggcccctc tgacacacac ctcgactccc tcgttggtca ggctctcttc  660
agtgacggtg ctgccgcgct cattgttggt gcggaccctg atgcctccgt gggagagaag  720
cctatcttcg agatggtgtc tgctgcacag accatcctcc cagactcgga cggagccata  780
gatggacact tgagggaagt tgggctcacc ttccatctcc tcaaggacgt ccctgggctc  840
atctcgaaga acatagagaa gagtctagaa gaagcgttta aaccgctcgg gataagtgac  900
tggaactctc tcttttggat agctcaccct ggaggtcctg cgatcctgga ccaggttgag  960
ttaaagctag gactcaagga agagaagatg agggccacgc gtcacgtgct gagcgagtac  1020
ggaaacatgt cgagcgcgtg cgttctcttc attatggacg agatgaggag gaagtccaag  1080
gaggatggtg tggccacgac aggagaaggg ttggagtggg gtgtcttgtt tggtttcgga  1140
ccaggtctca ccgtagagac agtcgtcttg cacagcgtcc ctgtttga              1188
```

```
SEQ ID NO: 58          moltype = AA  length = 395
FEATURE                Location/Qualifiers
source                 1..395
                       mol_type = protein
                       organism = Thlaspi arvense
SEQUENCE: 58
MVMGTQPSLE EIRKAQRADG PAGILGIGTA NPANHVIQAE YPDYYFRITN SEHMTDLKEK  60
FKRMCDKSMI RKRHMHLTEE FLKENPDMCA YMAPSLDVRQ DIVVVEVPKL GKEAAVKAIK  120
EWGQPKSKIT HVVFCTTSGV DMPGADYQLT KLLGLRPSVK RLMMYQQGCY AGGTVLRLAK  180
DLAENNRGAR VLVVCSEITA VTFRGPSDTH LDSLVGQALF SDGAAALIVG ADPDASVGEK  240
PIFEMVSAAQ TILPDSDGAI DGHLREVGLT FHLLKDVPGL ISKNIEKSLE EAFKPLGISD  300
WNSLFWIAHP GGPAILDQVE LKLGLKEEKM RATRHVLSEY GNMSSACVLF IMDEMRRKSK  360
EDGVATTGEG LEWGVLFGFG PGLTVETVVL HSVPV                           395

SEQ ID NO: 59          moltype = DNA  length = 4151
FEATURE                Location/Qualifiers
source                 1..4151
                       mol_type = genomic DNA
                       organism = Thlaspi arvense
SEQUENCE: 59
cgaatccgca tagagaagct gaagctcagg tttctcaatt atttcttctt tctttttcaa  60
aaggcttatc attgacttgt ctctgttttt tttttttttt ttttgtgatc attgattcag  120
tctctccaac ttgatgaaaa agataaccat ccaagagccc acctttgaga gaattattgt  180
agtatacagg tacaagagta gagtaatggt gaaatctttg gagggatgtg agtttgattc  240
tcattttggc tttggattca catacacgca ggagagtttc agggaagaga gaatcagaaa  300
ggaacatata tgtgaaacac ttcaagagca ttcctatggc tgatatggaa attgtgcttg  360
taagcatcca ttaaccaaca ctttgtgctc aaatgtatct tactaattat aaattaactg  420
attgctcata acggcacagc cagagaagaa aaatccaggt cttacgccac tggactgggt  480
caagtttctt gtctctgctg ccattggact ggtcagttct gctacactat tctaaagact  540
ttaataatca gactctgaaa attttgattt ctcaaactct gcttttacag gtcacagtgg  600
ttagttcagt gagcctaaaa aaaactgaca tcagagtcat tgctgccata cttagcacgg  660
tcgtggccta ctgcgttaaa acatatttca cgtaatctac actcaataat cagacaacac  720
cctcgcttat agctaaatta atccttaatt agctctgtct cttcctctgt atgaaatgta  780
ggttccagag aaacttggta gattatcaga gccttatcac aagatctgtg tatgataagc  840
agctagacag tggaagaggc actctgcttc acctctgcga tgaagtcatc caacaagagg  900
tgctaataaa tagtcctttt ttcttatttt tcttatgtca tattcttgtg ttttgctaat  960
taaaaaactg atcaaacgca ggttaaagag gtcattattt ccttcttcat gctgataaag  1020
caagggcgtc ccacgagcaa ggaggagctt gacatgcaaa gtgaagcatt catcaaagaa  1080
gaattcaacg aaagttgcaa tttcgatgtg gatgatgctg tcaagaagct tgagaagctt  1140
ggacttgtct ctcgtgtgag tctccttcat ctctcttcta taatcttttc tttttctcca  1200
cgcatatgct tgtatatact cagtaagtaa actaatattg tgaaaatgga aagggttggt  1260
caggattcag aagacaagta tagatgcgtg aatatgaagg aagcaaacga gataatggga  1320
acaacgacgg aagagatggt actcaaggca agaagaggtg gtgaatatga agatgaagag  1380
gcagcagaga ctgagccacg gatgaatcct caagatgaac tcacagcaaa ggaagaacgt  1440
tatcaatctc aattagacga gttcgagacc ttgtggttgt aaaaagattt gacgtcattc  1500
aagacaaata aatttgatat tgtattaaag aaaaagaaaa aaagacataa aggcagacaa  1560
attaattgaa aggacccatc aacaatgagt ccaccacatt tcacatttca cactaaatga  1620
attctccctt aattatttca tacataattt atattaaaat gaaaaacata agactcgatg  1680
atggaaagta tgtgtaggta ggtaggcata taagaggaga gcgctctgta tggtgatggg  1740
tacacaaccg tcgttggaag agatcagaaa ggcacagaga gcggatggcc ccgcaggcat  1800
cttggggata ggcacggcca accctgcgaa ccatgtgatc caggcagagt atccggacta  1860
ctacttccgc atcaccaaca gtgagcacat gactgacctc aaggagaagt tcaagcgcat  1920
gtgtgagtat ccctcttaat actccctatt ttgtatctct tcatttcttt tggcatatgg  1980
ttcccatagt taacaattac tgtaacaggc gacaagtcga tgatacggaa acggcacatg  2040
cacctgacgg aggagttcct gaaggagaat ccggacatgt gcgcctacat ggctccttct  2100
cttgatgtga ggcaggacat cgtggtggtc gaggtcccta agctagggaa agaggcggca  2160
gtgaaggcca tcaaggagtg gggtcagccc aagtccaaga tcacccacgt cgtcttctgc  2220
actacatccg gagttgacat gcctggtgct gactaccagc tcaccaagct cctcggtctt  2280
cgcccttccg tcaagcgtct catgatgtac cagcaaggtt gctacgccgg cggcactgtc  2340
ctccgactcg ccaaggacct cgctgagaat aaccgtggtg ctcgtgtcct tgtcgtctgc  2400
tccgagatca cagccgtcac cttccgtggc cccctctgaca cacacctcga ctccctcgtt  2460
ggtcaggctc tcttcagtga cggtgctgcc gcgctcattg ttggtgcgga ccctgatgcc  2520
tccgtgggag agaagcctat cttcgagatg gtgtctgctg cacagaccat cctcccagac  2580
tcggacggag ccatagatgg acacttgagg gaagttgggc tcaccttcca tctcctcaag  2640
gacgtccctg ggctcatctc gaagaacata gagaagagtc tagaagaagc gtttaaaccg  2700
ctcgggataa gtgactggaa ctctctcttt tggatagctc accctggagg tcctgcgatc  2760
ctggaccagg ttgagttaaa gctaggactc aaggaagaga agatgagggc cacgcgtcac  2820
gtgctgagcg agtacggaaa catgtcgagc gcgtgcgttc tcttcattat ggacgagatg  2880
aggaggaagt ccaaggagga tggtgtggcc acgacaggag aagggttgga gtggggtgtc  2940
ttgtttggtt tcggaccagg tctcaccgta gagacagtcg tcttgcacag cgtccctgtt  3000
tgacttttac aattcaagtc ttttagagtt tgatcgatga gtgagattgt gtactatgca  3060
agttatgtat atttgatggc aagcggagag tgggagttta tattaacgag agaaagggag  3120
aagagagagt gtggtaggtt agatggacgg gcagatgaag cactacgtgt ctatgtgtta  3180
gctccctttt atgtggttct ccttcttgct tccctttat ttcgttactt accaagaata  3240
ttgaatggtg gtttttttat tgattttacg tatattcgca acaacaagtc atattaattt  3300
ctatgtgcgt aattattata tattcgatgt atatacatgt aaagatacgt acggcctact  3360
ggagaggtta gttgtataga ttttcccaca cgtgcatact taactccatc attagctcct  3420
actaatctaa ttttccttct taatatacct gataatccta taactaacta aaaattacat  3480
```

```
taggtacgtc tcgttttctc tctcccaccc catcatgatg atagtttgaa tctgctcctt  3540
tttcggcttc caacaacgca agatgcattt cgcatcccat cataatgata tttgtgttgt  3600
tgctgttctt tatgttagac taataaaaga tgcatttgta agcttttgcc tcattaattt  3660
tattcggaaa aaaattgaat atgcgtaata tcacatcgtt ttttgttagt attcatttat  3720
tcaattcatg tcttaataat gttgtagata tttttattgg aaaaataata tcaatgggcc  3780
cataaaagaa ggtgggccct agagctggtt atgcttagcc atgtgggcag aatataacca  3840
gagtgtgttg tcattgtggt aagtaggggc actccaatgc gggtgttttt atcaacccgg  3900
cccggcccaa agcctatccg tcgaaaaccc gtgtccatca aaaactcgcc aaactagcgg  3960
ttatatttag ggttgggcaa attatccgtt atatttgatt cgatctgcta tttgtttcga  4020
ttcgattcga aaaatccaga tatccatagc tttacggagc aaagcaaata ctaaattttg  4080
atattcgtta aaaacggagc aaatcacaaa tattaaaatt ttaagagtcg gatatccgat  4140
ctgctctaat a                                                        4151

SEQ ID NO: 60          moltype = DNA  length = 759
FEATURE                Location/Qualifiers
source                 1..759
                       mol_type = genomic DNA
                       organism = Thlaspi arvense
SEQUENCE: 60
atgtcttctt ccgcatgtcc gtcaccgtta ccctcagtca gcaaacttca tgtcgattcc  60
gttacttttc caccgtccgt caattcaccg gcttcctcca atcccctatt cctcggtggc  120
gcaggggtgc gagggttaga tattcaagga aagtttgtga ttttcaccgt catcggagtt  180
tacctagacg ctgtcgccgt cccgtcactc tctgttaagt gggagggcaa aactacagaa  240
gagttaacgg aatccgtccc ttttttccgt gaaatcgtca caggtgcgtt tgagaaattc  300
ataaaggtga cgatgaaact gccgttaacg ggacagcagt attcggagaa agtaacggag  360
aattgtgtgg cgatttggaa atcgttaggg atttacacag agagtgaagc taaagctgtg  420
gagagatttt tggaagtctt caaggaccaa actttcgctc ctggtgcatc catcctcttc  480
gctctctccc ctaacggctc cctcacggtt gcgttttcga aagacgatag cattcctgaa  540
accggaaaag cggtgatcga gaataaattg ttggcagagg cagttcttga atcaataatt  600
ggaaagaagg gtgtgtctcc tgggactagg ctgagtatag cagagaggtt agctaagctg  660
atgaagaaga agaaggtcga agaagatgca tcatcactga ctgatcaaga ggaagctaca  720
gatctctccc tcggagataa attggccaaa gagaactga                          759

SEQ ID NO: 61          moltype = AA  length = 252
FEATURE                Location/Qualifiers
source                 1..252
                       mol_type = protein
                       organism = Thlaspi arvense
SEQUENCE: 61
MSSSACPSPL PSVSKLHVDS VTFPPSVNSP ASSNPLFLGG AGVRGLDIQG KFVIFTVIGV  60
YLDAVAVPSL SVKWEGKTTE ELTESVPFFR EIVTGAFEKF IKVTMKLPLT GQQYSEKVTE  120
NCVAIWKSLG IYTESEAKAV ERFLEVFKDQ TFAPGASILF ALSPNGSLTV AFSKDDSIPE  180
TGKAVIENKL LAEAVLESII GKKGVSPGTR LSIAERLAKL MKKKKVEEDA SSLTDQEEAT  240
DLSLGDKLAK EN                                                       252

SEQ ID NO: 62          moltype = DNA  length = 3963
FEATURE                Location/Qualifiers
source                 1..3963
                       mol_type = genomic DNA
                       organism = Thlaspi arvense
SEQUENCE: 62
ttccccacaa acaatgtgtg tgtcagctat atatttatgg gaaggctgaa acgtttaaat  60
actagcctct gcatcgtttg ttgtaatttt gtgataaaat tgtaacatat ttaatcgttt  120
tatctctagg tacttttatg gaatattgta aaagaattct atttttgtgt aaaatccaaa  180
ttagcgtatt atacttgaat acacaagcat ttcggcacat agttcaattg gggttaattc  240
atgaatcatt tttaattcaa aaatttcgac ccatcaaaat tagacaatga ccaaagaaat  300
tataaaaaat gagatgatgt ttgaaaatgt ttagtgagga agtgaaggta tagattatag  360
acgtttattg tcaaatttca acggatgtta tatacgttgt taaatttaaa acaactttag  420
aatatatatg gcgcgtgatt ttgttaaatc gactttggta ggaaaatgtt attttgcgat  480
tttgtcaaga aaacgtaatt ttgtgatttt gaccaaaaaa aatgttattt acagtaatag  540
aaaaaaataa ttttataatt taaaaaacat gatttttgat tttattgaaa ttttttttt   600
ttaattttag tgagaagtga ttgcacattt ttaatgggaa aattttctac aattttaatt  660
aaaaaaatga tttcagcata attttagtaa aaaaattgtg attttacagt tttataaaaa  720
aatatacgtt tttatttttt tgaaataatt gaaaaatctc atttatatta tgttgattta  780
ttcatctgaa atttgcattt aaatattcta tctaaataaa agtattttaa ttatttgtta  840
ttttaaaata gattatttcc attttttatc aataaacaac cccatatgtt gttaaacaaa  900
gaaagaaagg acaatctata tttcttagtt atttttatta ttatattttc tttattcttt  960
attctcttta tttatattat ttttataatg ttcattaatt aaaacctacc tcttacagaa  1020
ctttttgggg ttgttttaaa aggatcagac atagtgtaaa ctaaaaaatt aaactgaacc  1080
aaaccaaact atgtcttata cttatcaagt aatatacact acatgataag cttaaactag  1140
attctatctt tatcataaat taattttatc tttatcacat tgtggtctac ataaatcctc  1200
attacataag tatcttaatt aaatcttcta gattcttcct taacagtaaa ccaagattaa  1260
aaatgatctg atttgaactg ataaaaccta aactaaaaag aaattggcat acctaccgac  1320
tctaaagcgg tcagagttcc cgcaaccacc aaaattataa accactgaat cttccaatca  1380
acaaaaccac gtgtttaccc atccaacact cgtaagctat tgctagttgc tacctacctc  1440
catcttctct tataattacc aatctccatc aaattctttt ttactttttt ttacattata  1500
atcaaaccta acaccctcaa agtcaaaacc atgtcttctt ccgcatgtcc gtcaccgtta  1560
ccctcagtca gcaaacttca tgtcgattcc gttacttttc caccgtccgt caattcaccg  1620
gcttcctcca atcccctatt cctcggtggc gcaggttcga gtgctgttta attcatttgc  1680
```

```
tcttgcagca ttcttttttt tttttttaaa tgcgtttttt gttgcctctt tgagtttctc  1740
tgtttcttgc taacttacgc aggggtgcga gggttagata ttcaaggaaa gtttgtgatt  1800
ttcaccgtca tcggagttta cctagacgct gtcgccgtcc cgtcactctc tgttaagtgg  1860
gagggcaaaa ctacagaaga gttaacggaa tccgtccctt ttttccgtga aatcgtcaca  1920
ggtgcttgtc atgcaacaaa ctgttttaag tcaaaaaggg attttaattt gtttagacca  1980
aactatttga ccgtcattaa tttattatta ccatttttag ttaattatga ttttttttttg  2040
tttttgggca cgattaggtg cgtttgagaa attcataaag gtgacgatga aactgccgtt  2100
aacgggacag cagtattcgg agaaagtaac ggagaattgt gtggcgattt ggaaatcgtt  2160
agggatttac acagagagtg aagctaaagc tgtggagaga tttttggaag tcttcaagga  2220
ccaaactttc gctcctggtg catccatcct cttcgctctc tcccctaacg gctccctcac  2280
ggtacttctt gtcctatcac acagctttgc gtttgcgttt acattactat tacgaactgt  2340
ttacaatgaa acgcaaatta atgtagaaat agcgtttaaa acgaactgtg cccaaaacat  2400
gtatttttaa gtaagatttg gttttaaaaa ttgttttacg tgtattaaac gcaattgacg  2460
ttagaaaaac agtcgtaggt tgtaaaatgt ctttgttgtg aaaaaaaaat cgttttgcag  2520
gttgcgtttt cgaaagacga tagcattcct gaaaccggaa aagcggtgat cgagaataaa  2580
ttgttggcag aggcagttct tgaatcaata attggaaaga agggtgtgtc tcctgggact  2640
aggctgagta tagcagagag gttagctaag ctgatgaaga agaagaaggt cgaagaagat  2700
gcatcatcac tgactgatca agaggaagct acagatctct ccctcggaga taaattggcc  2760
aaagagaact gatcctatgc cgagattttt cttggtttct gagggatttt atgtttctgt  2820
tatatttaat cctattccat cgcatgttta atttatctct gttcgtaaga ataattaaat  2880
aacctcatgg tattggatca aagtttccaa acaaaacaaa attgtattgt caaatattta  2940
atacaagcca aacttgataa acatttagtt ctaggcttga tcacacggat ccgcaaggtt  3000
aagtaattgg ttaaccgaag ggaagggaaa acacctacac gaatcccgga ccgggcctaa  3060
attcttttaa ctagaacacg gcccaatctg tagaccagtt cggcccattg tagtatcaaa  3120
aatattccat aaacgaaatc atttgatttc aaatggagga aatcattaaa ttagcagacg  3180
cggaaaacca ctatctcatc aaaataaatt gcgaaattta ttgaataaac taatgaatca  3240
ataaataaat gaaatggtcc aaccatctaa aaattgattt tctaagatgt cactgtatca  3300
atatcaccca ttcatgttca tataaaccct acccgccagc ataatgcata ttgagtattg  3360
acgacttata aacaaaagaa gaaatcactt acagaaaaat gatttcttga ggaaatagat  3420
cacaggatgt gtatgttgat taatgaccta gggtacaata atgcagtttg attcactact  3480
agacccataa tttttttttt ttaaaaataa aaagggcttt catgacccat aaaaattatt  3540
attatctttt tttcccataa aaattatttg ataattgttt acgtgtttgt ttgttttctc  3600
gttcatattg atatttctct catccgaatt cttgcatttt caacgtgtca attatctttt  3660
taaaactacg taaatactat tatgatacct tgtaggcttg tactgaatat ttgtgagtat  3720
tttaggcttt ataaattctt atgccgactt tgttatcaag ccttcgacac attttctgtg  3780
gcgttcttga gactataaaa tttgggagac gattgaacca ttttgttttt atctataatg  3840
gtttttcttt tgtatccttt atttgatttt ttttcttctt tttttggctg gttctagaga  3900
ccttcttagc cacagtgatt cttctgtcat cagttcatca aatcctgaaa agagcatcat  3960
agc                                                                3963

SEQ ID NO: 63          moltype = DNA  length = 1239
FEATURE                Location/Qualifiers
source                 1..1239
                       mol_type = genomic DNA
                       organism = Thlaspi arvense
SEQUENCE: 63
atggctccag ggactctcac cgagctcgcc ggagaggcta agctcaactc taaattcgtc  60
cgggacgagg acgaacgtcc caaggtggca tacaacaagt ttagcgacga tatcccggtg  120
atatctctcg ccggactcga cgatgttggt gggaaaagag gagagatctg ccgtaagatc  180
gttgaggctt gcgagaattg gggcgtgttc caggtggtcg atcatggtgt cgataccaat  240
ttggtagagg atatgactcg cctcgctcgc gacttctttg ctttaccacc cgaagagaaa  300
cttagtttcg acatgtctgg tggtaagaaa ggcggcttca tcgtctctag tcaccttcag  360
ggagagactg tgcaagattg gagagagatc gtgacgtact tctcgtaccc ggtgagaaac  420
agagactact cacggtggcc agataagccg gaagggtggg tgaaagtgac ggaggagtac  480
agcgacaaac tgatgggttt agcttgtaag cttcttgagg ttttgtctga agctatgggg  540
ctcgagaaag aagcacttac caatgcttgc gtcgatatgg accaaaagat agttgttaat  600
tattacccta aatgccctca gcctgatctc accctcggac tcaagcgtca cactgatcct  660
ggaaccatca ctttgctgct ccaagaccag gtcggtggat tacaagccac acgcgacgat  720
ggcaaaacat ggataacggt tcagccaatt gagggagctt ttgtcgtgaa tctcggcgac  780
catggtcact atttgagcaa cgggaggttc aagaacgcgg atcatcaggc ggtggtgaat  840
tccaactcga gcaggctatc tatagccacg tttcagaatc cggcgcagga tgcaaccgtg  900
tatccgctta aagttagaga aggagagaag ccgatcttgg aggagccaat cacttttgca  960
gagatgtata agagaaagat gggaaaagat ctggagctgg ctcgcctcaa gaagcttgcg  1020
aaagaagaaa atgaccagaa gctggccaaa gaagaacatg acaagaacct ggccaaagaa  1080
gaaaatgatc agaagctggc taaagaagaa catgaccaga agctggccaa agaagaacat  1140
gacaagagcc ttgccaaaga agaaaattac caaaagctgg ccaaagatga acatagccac  1200
acggaagctg ttaagcgtct cggccaaatc ctcgcttag                         1239

SEQ ID NO: 64          moltype = AA  length = 412
FEATURE                Location/Qualifiers
source                 1..412
                       mol_type = protein
                       organism = Thlaspi arvense
SEQUENCE: 64
MAPGTLTELA GEAKLNSKFV RDEDERPKVA YNKFSDDIPV ISLAGLDDVG GKRGEICRKI  60
VEACENWGVF QVVDHGVDTN LVEDMTRLAR DFFALPPEEK LSFDMSGGKK GGFIVSSHLQ  120
GETVQDWREI VTYFSYPVRN RDYSRWPDKP EGWVKVTEEY SDKLMGLACK LLEVLSEAMG  180
LEKEALTNAC VDMDQKIVVN YYPKCPQPDL TLGLKRHTDP GTITLLLQDQ VGGLQATRDD  240
GKTWITVQPI EGAFVVNLGD HGHYLSNGRF KNADHQAVVN SNSSRLSIAT FQNPAQDATV  300
```

-continued

```
YPLKVREGEK PILEEPITFA EMYKRKMGKD LELARLKKLA KEENDQKLAK EEHDKNLAKE  360
ENDQKLAKEE HDQKLAKEEH DKSLAKEENY QKLAKDEHSH TEAVKRLGQI LA          412

SEQ ID NO: 65          moltype = DNA  length = 4251
FEATURE                Location/Qualifiers
source                 1..4251
                       mol_type = genomic DNA
                       organism = Thlaspi arvense
SEQUENCE: 65
aaaatgtagg gaaaaaaaaa cagagagaat cagatacaga gagacgaaat ccgaatcgga  60
gtctatctat ctacttgaaa ttggtgacag aagaggaaca gagaattgct aataaaattc  120
taagataggc acaaaaaaac aagaacaagt ttcatttgga acaagaagat gactgaaaga  180
aactgcaaga agagaatcat ggaaagacaa aacataccta atgaaaaggg aattttagag  240
tcagaatcag agttactgat tgaaaagata gcctgcgatc tagtgactct tcttgctgat  300
gatggagtct ccattaggat cttgatcgtc ttgcaagcaa caacggctaa agatcaagtg  360
aaagaatttc tgggaaaatc aatctgaatt tcaatatctg agatatcaat aaagaagaga  420
aaggggataa acaattgcga atctcttagg tagcagtatt ataggtatgg ggaaaaggtt  480
accgtttgaa ataaactagc cgttgcgtct aaacggaagg aaggagccgt aatactagcc  540
gttgggtcca ttctctcatg gaaagaaatc aagaatggtt aaagacttaa agtagctgtt  600
tgggttgaaa tctcagtacg ttaggggctt ttacggatta agaaggctgc gattaatagc  660
tcggcccatt tatctctctg ttgcgagttg caagctgcta aaagttttat aagctttttt  720
attcggttat ttgccaatcg tttaaattac tcctatgatt tataaatctt ggaatgtgtg  780
tatgagacga agtattcatt gttttcaatc tatggtgtct gttttatgtt ttgctttttt  840
tttttaatt aaatatacaa ctcacaattc acaagccatg acaaaacata tcaaaatgtt  900
gataagagta atgaaaacta aatacactag aaaagtcaga tccaacattt cgtcttctcg  960
gattaaggac gatataaata taatatatat agtgaaaaaa aggtttttct tctctgatct  1020
caatgggatt atgtacaaat aaccatgcaa aattgatgat catttggatt tttgtagtgc  1080
aaacccgtaa cgtaacaatt tttgccatgt gaattcaccg agaacgacca tttttttct  1140
tttttaata aaaaaatatg caacccattt tttaagacgt ggcattaaat tcaccgtaaa  1200
aaacatttaa ctatattggg catggtgtta aagcaacttt actagaaacg atttatgtac  1260
acaatggaat gtagcgcaga aaatatgatt tattagaaag aaattaaaga cagaagcacg  1320
tataggaagt tgagtaactg cgtgtttcta gaaacagaac ggacggtata gtactgtggt  1380
aggtagcgag cgacctcttc gttcgtcagt cttcacaacc tttgaaaggt ttttcagcta  1440
ccagtcatct ccttatatat tggttacctc ttttatctct ctttataaac ttaattagtc  1500
ttttgccttt gtaaccaaac actcacaaaa aaatataaaa atggctccag ggactctcac  1560
cgagctcgcc ggagaggcta agctcaactc taaattcgtc cgggacgagg acgaacgtcc  1620
caaggtggca tacaacaagt ttagcgacga tatcccggtg atatctctcg ccggactcga  1680
cgatgttggt gggaaaagag gagagatctg ccgtaagatc gttgaggctt gcgagaattg  1740
gggcgtgttc caggtggtcg atcatggtgt cgataccaat ttggtagagg atatgactcg  1800
cctcgctcgc gacttctttg ctttaccacc cgaagagaaa cttagtttcg acatgtctgg  1860
tggtaagaaa ggcggcttca tcgtctctag tcaccttcag gtaaagccac acaatttacg  1920
ttacgttttc atgcgactca aactttata ctgtagactt aattagacct ataatcacat  1980
ttcgggccgc aaaaatacga attatgtttt gatcttgtag ttaaatacga aataatgatg  2040
ataaacgcag ggagagactg tgcaagattg gagagagatc gtgacgtact tctcgtaccc  2100
ggtgagaaac agagactact cacggtggcc agataagccg gaagggtggg tgaaagtgac  2160
ggaggagtac agcgacaaac tgatgggttt agcttgtaag cttcttgagg ttttgtctga  2220
agctatgggg ctcgagaaag aagcacttac caatgcttgc gtcgatatgg accaaaagat  2280
agttgttaat tattacccta aatgccctca gcctgatctc accctcggac tcaagcgtca  2340
cactgatcct ggaaccatca ctttgctgct ccaagaccag gtcggtggat tacaagccac  2400
acgcgacgat ggcaaaacat ggataacggt tcagccaatt gagggagctt ttgtcgtgaa  2460
tctcggcgac catggtcacg tacgtcagta tactctctca atctctctgc ttatattttt  2520
ctccgtttgt gattttgact tggccaaact tgcttgtcta ttgaagtatt tgagcaacgg  2580
gaggttcaag aacgcggatc atcaggcggt ggtgaattcc aactcgagca ggctatctat  2640
agccacgttt cagaatccgg cgcaggatgc aaccgtgtat ccgcttaaag ttagagaagg  2700
agagaagccg atcttggagg agccaatcac ttttgcagag atgtataaga gaaagatggg  2760
aaaagatctg gagctggctc gcctcaagaa gcttgcgaaa gaagaaaatg accagaagct  2820
ggccaaagaa gaacatgaca agaacctggc caaagaagaa aatgatcaga agctggctaa  2880
agaagaacat gaccagaagc tggccaaaga agaacatgac aagagccttg ccaaagaaga  2940
aaattaccaa aagctggcca aagatgaaca tagccacacg gaagctgtta agcgtctcgg  3000
ccaaatcctc gcttagagtc cttgttgctc cgctgtgttg gtttcggttt ggttttgtaa  3060
tttgttttat cgtcaagtta acgaacgtgg tgtgtttgag tttcttctca atatagaaat  3120
aatgacaagt aatgcaattg tacttgctct gtttgtttgg ttactttta tgtcagaagc  3180
acatacatta ctttctcgct attcgtgtgg atgtaaattt aataagataa tgacggttaa  3240
accggtagta ggaccatttt atttctttat ggtttcttta cgccacgtgt ccgtctaaaa  3300
gaaacttacc ttgaaaaagt gaataattca tccctctttt tcaagtttcg attttttttt  3360
ctcttttcga gtcattttgt tctaatcaac gacgacgcga cggagatgaa tccttttcac  3420
ggtgccgacg ggaagcaaag accggcgatg tatccggaca tcgatcaatc aattccggat  3480
aatcctttcg ctcagacaaa cccttatgcc gcttctgccc ctaatctcta cccttctccc  3540
tcctcgaaca atctcgggcc taatcttttc ccggaccacg gagatgcatc caacaaccag  3600
tcaccgtctg ctccgcctca agcgacggag gaggttctca tccgtgtccc gggctccatt  3660
ctcaacctta tcgacaaatc ctacagcgtc gaactcgcgt gcggtgactt caccatcgtt  3720
cgaatcgtcc agggccagaa catcgtcgcc gttctcgcca acgtcgccga tgagattcaa  3780
tggccgttga acaagagcga ggtagcagcg aaggtcgatg ggtcgcacta tttcttttca  3840
atccacccgc caaaggaaga gggtcacgga tctgggtccg actccgatgg tgagaagcag  3900
gggaaaaaga gcaatccgaa accggaggac gaaattctca attacggatt gaccattgct  3960
tcgaaagggc aagagaacgt attaaacgag ctcgaccggg ttctccggga ctattgctgc  4020
ttcacggagc agaggatgtc tgaaaaggcg aaggagacgg gagaggaggt gctgggaaac  4080
tccatggctg cggcgacttc gccggaggag ctgaagggtg agaggaaaga catcgtggag  4140
ggtcaatgcg cggcgtattg gaccacactc gcgcctaaca tcgaggatta cagtagcaag  4200
```

```
actgctaagt tgatagcttc cgggtcaggt cagctgatca gagggatact t          4251

SEQ ID NO: 66           moltype = DNA  length = 1545
FEATURE                 Location/Qualifiers
source                  1..1545
                        mol_type = genomic DNA
                        organism = Thlaspi arvense
SEQUENCE: 66
atggccactc tcttactcac aatcctcctc cccactttcc tcttcctcct cgtcctcctc  60
ctttctctcc gccgcaacca caaccgcagt agccgtctcc caccaggccc aaaaccatgg  120
cccatcctcg gaaacctccc tcacatgggt cctaaacccc atcgaaccct agccgccatg  180
gtaaccacct acggtccaat cctccacctc cgattagggt tctccaacgt cgtggttgct  240
gcgtctaaat ccgtggccga acagttcttc aaaatccatg atgccaattt cgctagccga  300
ccaccaaatt caggagccaa acacatggca tataactatc aagatcttgt ctttgcgcct  360
tacggacaac gatggagaat gttgaggaag attagttctg ttcatttatt ttcagctaaa  420
gctcttgaag attacaagca tgttcggcag gaagaggtag gaacgctcac gcgcgagcta  480
gtggatgcag gcacgaaacc cgtaaactta ggccagttgg tgaacatgtg tgtggtcaac  540
gcgcttggaa gagagatgat cggacggcgt ctgttcggcg ccggagctga tcacaaagcg  600
gaggagtttc gatcgatggt gacggaaatg atggctctcg ccggagtatt caacctcgga  660
gatttcgtgc cggctctgga ttggttagat ttacaaggcg ttgctggtaa aatgaaacgg  720
ctacacaaaa gattcgacac ttttctatcg tcgattttga aggagcacga gatgatgcac  780
ggtcaagatc aaaagcataa agatatgctc agcactttaa tctcgctcaa gggaactgat  840
tttgacggtg acggcggaag cctaacggat actgagatca aagccttgct cttgaacatg  900
tttacggctg gaactgacac gtcagcaagt acggtggact gggccatagc tgaactgata  960
cgacacccgg atgcaatgac cagagcccaa gaagaacttg attcagttgt aggccgcgat  1020
aggcccatta acgagtcaga cctttctcgg cttccttatc ttcaggcggt tatcaaagag  1080
aatttcaggc ttcatccgcc gacaccactc tcgttaccac acatcgcatc agagagctgt  1140
gagatcaacg gctaccatat cccgaaagga tcgactcttt taacaaacat atgggccata  1200
gcccgtgacc cggaacaatg gtccgacccg ttatcgtttc gacccgagag atttttacag  1260
ggtggagaaa aatccggcgt cgatgtgaaa ggaagcgatt tcgagcttat accgttcgga  1320
gccgggagga gaatctgcgc tgggctcagt ttagggctac ggatgattca gttactgacg  1380
gcgacgctgg ttcacggatt tgattgggaa ttggccggag gaattccgcc ggagaagctg  1440
aatatggagg agacttatgg gattactctg caaagagcag ttcctttggt ggtgcatcct  1500
aagccaaggt tggctcccag tgtttacgaa ctcgggtcgc gctaa                 1545

SEQ ID NO: 67           moltype = AA  length = 514
FEATURE                 Location/Qualifiers
source                  1..514
                        mol_type = protein
                        organism = Thlaspi arvense
SEQUENCE: 67
MATLLLTILL PTFLFLLVLL LSLRRNHNRS SRLPPGPKPW PILGNLPHMG PKPHRTLAAM  60
VTTYGPILHL RLGFSNVVVA ASKSVAEQFF KIHDANFASR PPNSGAKHMA YNYQDLVFAP  120
YGQRWRMLRK ISSVHLFSAK ALEDYKHVRQ EEVGTLTREL VDAGTKPVNL GQLVNMCVVN  180
ALGREMIGRR LFGAGADHKA EEFRSMVTEM MALAGVFNLG DFVPALDWLD LQGVAGKMKR  240
LHKRFDTFLS SILKEHEMMH GQDQKHKDML STLISLKGTD FDGDGGSLTD TEIKALLLNM  300
FTAGTDTSAS TVDWAIAELI RHPDAMTRAQ EELDSVVGRD RPINESDLSR LPYLQAVIKE  360
NFRLHPPTPL SLPHIASESC EINGYHIPKG STLLTNIWAI ARDPEQWSDP LSFRPERFLQ  420
GGEKSGVDVK GSDFELIPFG AGRRICAGLS LGLRMIQLLT ATLVHGFDWE LAGGIPPEKL  480
NMEETYGITL QRAVPLVVHP KPRLAPSVYE LGSR                             514

SEQ ID NO: 68           moltype = DNA  length = 7303
FEATURE                 Location/Qualifiers
source                  1..7303
                        mol_type = genomic DNA
                        organism = Thlaspi arvense
SEQUENCE: 68
ctctttttcg tttaaaaata aatataaaat cagttcttta tgaaattcaa atgcggtcta  60
tgatccataa acgtggcctt ggcatttacc cgaatcccat ccgtctccat catttgcctt  120
tcgatcgtat atggaagttg gaacgacgtc gacgccaatt ctgcggtaat cgtaatagta  180
ttaaaattgt ggagccaacg gaaacacaat gcatttttgc atttccatgc acacctttgt  240
ttaattttct aaagagaaat tagtatatat ataatttgta ttgatctaat ttttttaaat  300
ccagttcgac tttgaaggaa tttaagttcg acttgtatat aattcttgtc aagacctcga  360
tcccgcatcc agtaataaaa taataatgat tgcaaaggac aacactaata aagaaaatgc  420
tataacgaga aagaattctg aaagacgtac taacgaaaat tgtgtcctag tgaccataac  480
aggagtatca tccaacacta tgaaccacat atcttaccta cccttcacga gtactctcca  540
gctaccacga ttaacgataa atatatggtc cagagaattt ccgaatgatc cgctaatatt  600
cgaataactg aaattatcaa gcagtgagtt taattttttg taaccgtata tctttttagc  660
cttttaaaat gataaactca tttatgaatt aattgaatat atattacgtt taacccatcc  720
attcatattg tcacatattt ttgaattttg ttaacttcct ttttatttct tttcgtattt  780
tctcaaaatc atatgtagtc attatatata cacacaaaaa aaagagatag atattgacta  840
aaaggtagtg aaaaattaca aatctataga cattacacca taaaaaccat ttttcaatag  900
acaaatatat ggttttacta tgtgttgcgg gaatcaacgg aatcaacttg atgttagtat  960
ttacaaatag acgataaatc ttctaaaatt aattataaac acgtgaaagc ttaaagacat  1020
tgtgtaatat cttctgataa tttttaatgt tcaagacagt attttgatta tgaagcttgg  1080
tcgaaaccaa aaacaaaaat caaaagacaa gaagaattga agaagtgaag aacacaacgt  1140
ttcgttttaa accatacaaa aaagtggttc acgatgtgat cttaaatgta tatctcttta  1200
ataatcactt ttccgttgaa aaggagagga aaaaatcact gtagacttag tttttggaaa  1260
gtatttctca tccccttttc gcaaggggat tgtgtttttt tttatcgaaa atacatggtc  1320
```

```
catggttaaa tgggtcaaga gtataattta gtactataat tttataatca aaatgttcta  1380
agttctatct tatatttata taaaaataga agaagatgtt ctaacttata tcatattaat  1440
tagtggcttt acttaaccaa aagattgtta cttatatttt tcaacctacg ttctactaac  1500
gactaagtat tcagtaagat atatagctac ctttcatagt attaatcaaa tcttacgaac  1560
cagaaagctc acctaccatt cgactctctt tcgcttccaa cttattctac ataagataag  1620
attttctcat ctacatattc gtatgtttga cgtcgtggtg ggatccatga tttatccact  1680
ttaacaatag aaaacaaaaa cctaatcaga gaaatataag ctcttatgtt ttaaaaggaa  1740
aaaagcaatg gaaattgaag ctttttaacc aacaaaaaaa ccagagaaat atacattatt  1800
ataattttat atattctgtc aagacgataa ttatcaatgt atatgtgtac taataatgtt  1860
attactcgat tacacccgta gttaataagc cacttaaaat taactattta caaaaaaaaa  1920
aaatcttttg gtgactttga tttgatggtg tgaaaatcta catctcattc ttcagtattc  1980
agatgattat aacaaaatgt tttttttcta aacttgcatt tccgataatc taatactaaa  2040
aaatgtatcg gcagaaagaa tactagcttg aaaaaccttt ttataaaaaa gaaaagtaaa  2100
tatactagct aatggtgccc aacaggagat cgaagtggtg atgtttaatt agttaaaggt  2160
aaaagaaaac ctatttctaa cttttgatga aacaataaaa acaaaaaaat ctttctaacc  2220
taaccgagac atgcatagat agattattgg atttcgcaaa aaaaaaaaaa tcacccttta  2280
tttatagctt atgtttgtta ttcctcattt ctcacttacc attcaaaccc aacactatgg  2340
ccactctctt actcacaatc ctcctcccca ctttcctctt cctcctcgtc ctcctccttt  2400
ctctccgccg caaccacaac cgcagtagcc gtctcccacc aggcccaaaa ccatggccca  2460
tcctcggaaa cctccctcac atgggtccta aaccccatcg aaccctagcc gccatggtaa  2520
ccacctacgg tccaatcctc cacctccgat tagggttctc caacgtcgtg gttgctgcgt  2580
ctaaatccgt ggccgaacag ttcttcaaaa tccatgatgc caatttcgct agccgaccac  2640
caaattcagg agccaaacac atggcatata actatcaaga tcttgtcttt gcgccttacg  2700
gacaacgatg gagaatgttg aggaagatta gttctgttca tttattttca gctaaagctc  2760
ttgaagatta caagcatgtt cggcaggtaa cagtattagt tataaacgtt attctcattt  2820
cctaacgcta taactcacct atatatagag atagtcatgc cgttaatttt tatatttatg  2880
attagtttat tttatatcat tatttaactg tggtacgaac tctagaattt aataaaataa  2940
atttagagaa gtacgtatag agatttttaa tggtggagtg gcgttttttt gtttagtatt  3000
atgttttcag tgttgataaa ataaccaaaa aataataatg ttagtaatcg ttaaaacaca  3060
aaacaaattt tgttgataaa acgagattta tgacttttta tcaacagatt ttgttttgaa  3120
aaacgagaac tagaacataa tactataaca agttccaatc ctgtagaact agtcaccaag  3180
tcataaaact ggaacttttt tatcaaaaaa tattgtttcg tttttcacga tttgcaacct  3240
ttttcgttat tttaacaata ttggaaacat tgcaacctat aaaccccaat ttaaacgagt  3300
aaaacaaaaa aaaaatacta aagtaggcct aagtgcaact gtgcaatact gtcgttgcca  3360
tagacgtaca gtacgatgta tccttgataa taccatggaa aaatggaaag ttcatcagaa  3420
acccaaggac aaaatacttc aatatgtatg gaccacattt ttccttaaat aagatgtatc  3480
aacgagtcac cacgagacac gagtgattca ctttcagtag tataagattg tttttgcatt  3540
ttcgtttaaa aaaatgtaga tgaacataca agatgatcct gacaatttat ttataggtag  3600
attacttttc attgatggaa caattgaata tacaaaaatg taaactagac ttcagaattt  3660
taagtttagg ggttaaagta acttaactag ggtctaaagt gtatataggc tttatatttg  3720
agcttaggat ttagatattg gttaattagt ggattttaat cgatttaaat ttagaagcaa  3780
gattatttgt tattaagtta ttacttttta aaatcatagt taaagtcatg tgttaggggt  3840
ttaataaatt ctaaatatta gttgaaattt aatgttatta atttttataa gaaatcgatt  3900
ttacattcga ttttagtttt taacatcttt gtaagtgctt ttgagttact aaagcaactt  3960
tcttatttaa aaacaggctt attgaatttt ttttaaaaat tacgttttga aagcatttga  4020
gtaattgtaa atcttaagta aatttataaa tcaattataa ccctaactaa aatttattaa  4080
tcaactaaac ttcatacacc aataatccta cttagagttt tataaggttt ttgctgttaa  4140
tcaaacatca agatttaaaa atgagtaaaa taaattccaa aatcaactaa tatacccaaa  4200
attttccatt tatagtttaa gtagagcaaa attgaatttt acaggaagag gtaggaacgc  4260
tcacgcgcga gctagtggat gcaggcacga aacccgtaaa cttaggccag ttggtgaaca  4320
tgtgtgtggt caacgcgctt ggaagagaga tgatcggacg gcgtctgttc ggcgccggag  4380
ctgatcacaa agcggaggag tttcgatcga tggtgacgga aatgatggct ctcgccggag  4440
tattcaacct cggagatttc gtgccggctc tggattggtt agatttacaa ggcgttgctg  4500
gtaaaatgaa acggctacac aaaagattcg acacttttct atcgtcgatt ttgaaggagc  4560
acgagatgat gcacggtcaa gatcaaaagc ataaagatat gctcagcact ttaatctcgc  4620
tcaagggaac tgattttgac ggtgacggcg gaagcctaac ggatactgag atcaaagcct  4680
tgctcttggt tcgtataacg atcaattaat tgtagtatta atttcatact ttatgaaaag  4740
ttattgattc cttcttaaat acagaacatg tttacggctg gaactgacac gtcagcaagt  4800
acggtggact gggccatagc tgaactgata cgacacccgg atgcaatgac cagagcccaa  4860
gaagaacttg attcagttgt aggccgcgat aggcccatta acgagtcaga cctttctcgg  4920
cttccttatc ttcaggtata cccttaaccg ggaattagga attgtcttgg ttaacgagct  4980
ctattgttaa tccggtttaa acggttttgt tttaaaaaca ggcggttatc aaagagaatt  5040
tcaggcttca tccgccgaca ccactctcgt taccacacat cgcatcagag agctgtgaga  5100
tcaacggcta ccatatcccg aaaggatcga ctcttttaac aaacatatgg gccatagccc  5160
gtgacccgga acaatggtcc gacccgttat cgtttcgacc cgagagattt ttacagggtg  5220
gagaaaaatc cggcgtcgat gtgaaaggaa gcgatttcga gcttataccg ttcggagccg  5280
ggaggagaat ctgcgctggg ctcagtttag ggctacggat gattcagtta ctgacggcga  5340
cgctggttca cggatttgat tgggaattgg ccggaggaat tccgccggag aagctgaata  5400
tggaggagac ttatgggatt actctgcaaa gagcagttcc tttggtggtg catcctaagc  5460
caaggttggc tcccagtgtt tacgaactcg ggtcgcgcta aacctaagtt tgcttgccag  5520
caaaggtagg tcttgcacgg aggttaaaaa gcttgtttct ggaatttcct caaataaagt  5580
ttaaaatagc gtaatgtggt ccggagtata aggctatgtt atctgcgtcg tcgatccgat  5640
gccgaggaag aagacgatgg ctctcgaaag caaacctgat ccgcggaccc gacccgtttt  5700
atacgactaa gattttcatt cataatagta tatgataatt ttaaatttta aatttttatc  5760
gtgtaatttt tacagtactg aattttgtat taaagcatct tccttactgt accagatgca  5820
tttacaactc tagatttttt tctgccagca aaatcagatt tttccatctt ttttatatat  5880
attaaagtgg aacaccacta caacctgcaa ttctgcaaca catgttacat tacacattca  5940
tttggcgttt tccaataagt tataaacagt gaatgtttgt agacaataga caattataaa  6000
cagtaaatca tgtttcccct ctgttttcaa aagtgaaaaa gtttctaaat atgtatatgt  6060
```

```
attatacttt aataactcgt cggaccatac tattcccacc ttctaattaa ccttgtatac  6120
actggtttac caacaccatg tctcttcctt gttcaaaaaa actccatgtc tctttaatta  6180
cttttttct tcttctcgaa atttgttgat aatagaaact agtcgaagtt tctctttaat  6240
tctgttttca tttaatataa gcgtcgttgt tataatttca aatttcaaaa aggtacttac  6300
aagttcacac ggagagctac aataatggaa aagctgactc aagaagggct agaaaagaaa  6360
caagagtcac ggaacaagta gtcactttca atctcagtat acagtacact agtgtctgct  6420
tgcatctctc tctctctctc tctctctctc ttggtctaaa aatatcagaa gagaaaatct  6480
ctctatctat ttatctctct ttccctttct ctttcaacaa gacaatagtg acgacatttg  6540
tgtttccatg gctgttctgg ttctctatct cctcggtttc ctcatggctg gccactgtag  6600
taagaaactc tcgctcttca ctacattact tatctctctc ttttttttaa atgtgtctat  6660
tgatgggaac taaatttcaa taaaattctt tcggctctta gctagttatc actacatctc  6720
ttaagttcac gaccctcaaa aagaaggttt cctcaaatct tcttggcttc acacttacaa  6780
tttgtttcat ttggtaggcg cgacgtggtg tgtgtgcaaa acaggactga gtgactcagt  6840
gctacaaaag acattagact atgcttgcgg gaatggagct gactgtaacc caactcaccc  6900
aaaagggtct tgcttcaacc ccgacaatgt tagggctcat tgtaactatg ctgtcaatag  6960
cttctatcaa aagaaaggtc aagcttctga atcttgtaat ttcactggaa ctgccactcc  7020
taccacaact gatcccagta agtttccctc agaaatctga tgcttttact gtgattgttt  7080
acaactctaa atagtttttg gagtcacaga aagtccaccg tcattttggt tacttaaaat  7140
gatttggtat tagagattag tgaatattaa agtttaaagt aacaatttgg ttttagtaat  7200
gtatgaggag gatctgattt ggttacagta cactaaatgt tttttttttt gtgtgtgtgc  7260
ttttttgctt tgatgggtga acattttgtc acaggctact cag                    7303

SEQ ID NO: 69           moltype = DNA  length = 1581
FEATURE                 Location/Qualifiers
source                  1..1581
                        mol_type = genomic DNA
                        organism = Thlaspi arvense
SEQUENCE: 69
atggatgaat caagtatttt tacggcagag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaag  180
acgaggaaga caactcagcc ggcggaagtg acggcggaag aggctgcgtt agagaggagt  240
cagcagctaa gggaacttta cgaggccctt ttggccggag agtcctcatc ggaagctagg  300
gcatgcacgg cattatcgcc ggaggatctg acggagactg aatggtttta tctaatgtgt  360
gtctctttct ctttccctcc tccttccggg atgccaggaa aggcgtatgc gaggaggaaa  420
cacgtatggc tatgtggtgc aaatgaggtt gacagtaaaa tcttttctag ggctattctc  480
gcaaagagtg ccaaaatcca gcagacagtg gtttgcattc ccatgcttga tggcgttgtg  540
gaactaggca caacgaacaa ggtaaaagaa gatatagcgt ttgttgagct cataaagagt  600
tttttccata accaccccaa gtcaaaccca aaagctgctc tttctgaaca ctccatcaac  660
gaagagcacg aagaagacga agaacaagaa gaagaagaag aagaagaagt agaagaagaa  720
atgacaatgt cagaggagat aaggcttggc tctcctgatg atgatgacgt ctccaatcaa  780
aacctactct ctgatttcca tgtagaatca acccacactt tagacacaca catggacatg  840
atgaatctaa tggaggaggg tggaaactat tctcagacag tatcaacact tcttatgtca  900
caacccacga gtcttttttc agattcagtt tccacatctt cttacatcca atcatcattt  960
gccacatgga aggctgataa ttttaaagag catcagcgag tggaaactaa atcgacgtcg  1020
tcgtcgcaat ggatgctcaa acacataatc ttgagagttc ctttactcca cgaccacact  1080
aaagaaaaga ggctgcctcg agaagagctt aatcacgtgg tggcagagcg ccgcaggaga  1140
gagaagctga atgagagatt cataacactg agatcattgg ttccctttgt gaccaagatg  1200
gataaagtct caattcttgg agacaccatc aactacgtaa accatcttcg aaatagggtc  1260
caagagctgg agactaatca tcacgaacaa aaacataagc ggatgcgtag ctgtaaggga  1320
aaaacgtggg aagaggtcgt tgaggtttcc atcatagaga gtgatgtttt gttagagatg  1380
agatgcgagt accgagatgg tctattgctc gacatccttc aggttcttaa ggaacatggt  1440
atagagacta ctgcagttca taccgcggtg aacgagcgtg atttcgaggc cgagataagg  1500
gctatggtga gagggaagaa accaagcatt gctgaggtca aaagagccat ccatcaaact  1560
atatccaata ttaaactata g                                           1581

SEQ ID NO: 70           moltype = AA  length = 526
FEATURE                 Location/Qualifiers
source                  1..526
                        mol_type = protein
                        organism = Thlaspi arvense
SEQUENCE: 70
MDESSIFTAE KVIGAEKREL QGLLKAAVQS VEWTYSLFWQ LCPQQRVLLW ENGYYNGAIK  60
TRKTTQPAEV TAEEAALERS QQLRELYEAL LAGESSSEAR ACTALSPEDL TETEWFYLMC  120
VSFSFPPPSG MPGKAYARRK HVWLCGANEV DSKIFSRAIL AKSAKIQQTV VCIPMLDGVV  180
ELGTTNKVKE DIAFVELIKS FFHNHPKSNP KAALSEHSIN EEHEEDEEQE EEEEEEVEEE  240
MTMSEEIRLG SPDDDDVSNQ NLLSDFHVES THTLDTHMDM MNLMEEGGNY SQTVSTLLMS  300
QPTSLFSDSV STSSYIQSSF ATWKADNFKE HQRVETKSTS SSQWMLKHII LRVPLLHDHT  360
KEKRLPREEL NHVVAERRRR EKLNERFITL RSLVPFVTKM DKVSILGDTI NYVNHLRNRV  420
QELETNHHEQ KHKRMRSCKG KTWEEVVEVS IIESDVLLEM RCEYRDGLLL DILQVLKEHG  480
IETTAVHTAV NERDFEAEIR AMVRGKKPSI AEVKRAIHQT ISNIKL                 526

SEQ ID NO: 71           moltype = DNA  length = 5726
FEATURE                 Location/Qualifiers
source                  1..5726
                        mol_type = genomic DNA
                        organism = Thlaspi arvense
SEQUENCE: 71
atctaatcaa gagaagctag ctaacaatat cgaaggggaag acatgaacac atcctcactt  60
```

-continued

```
ttgcctaatc gaatgaaagc taaaaatgga tctagggttt aagggatcta acgatggaaa  120
gcaaaggact caagagaacg gcggctagga acggcggaac gacggcggct ctcctcagcg  180
gcggcggtcg gcggcgaaaa cgaacggcgg cggcggcttg ctcggttagg gttcctaggt  240
tatatctctg agtgctttgg gagttatgat ggaaaaccta attctctaac tctgtttata  300
tagggaagac tcaggaaaaa tcctaatatc cttttctctt gggcttctga cacatgaacc  360
tttccttttc ctattgagcc tagatccagg acgttacaac tagaatcaga atcgaacaac  420
aagcgtatgc gcttaagaaa tgatttttac tcacactata tgggcgcgca tggcattgtc  480
gtaagaatta aataagcttc gtcccactcc ttaatggatt tacgcacaca gtcaatccac  540
gtggttgtca taactaaata taattggtga aaaaactaat ttaaagacaa agtaagaagc  600
ggaaaccgaa ggaaaagcca aacaacatta tgtttatcga caaaaaagcc aaaacaacat  660
ttaatgttaa tttttgtcca aaccaggaat acatcactca tacggtcata tataccatac  720
cccaaattgt atgtactaca tgtgtacgta actgatttat gtatatctat ctatttctct  780
tttattgtag gggtcaaaat ctacctatcg atatttataa ataggatttt ataagacatt  840
gttaaaatgg aaaacatggt agctacttgg ccagcgatta acatcaataa ttaaaaatac  900
gaattgtgaa acatctcact ctcttccttt tatcacacca aaccacttct ctttctttac  960
ttaccggtca ggtcaacaat tctaccattc cctttattta gttttttttt ttcatctatc  1020
tctcttttca tttttaactt ttaaaaaata ttagtccgaa aatcgcactc ttttatattc  1080
gttgatgggc attaaaatat tgtaaaaatt aaaaaaaatg tgtaaattaa aacgcaattt  1140
gtttgcacct gcagcagtag taacacacaa gtcaaagcaa tgtctgtttt ctcttgtatg  1200
tcggttagct attttatgta ctgaaatatg ttattctttc tgaccaaaac atattaagaa  1260
atttgcattc tgtaatttga tttatccaat cagtagagga cacgtaacca agataattag  1320
atatttttat tctatctgta tactactaat tcatccaacg tctgttggac gaccaaccag  1380
tcaaaactca taaaagtcaa cttttactac atcgtgaatt ttttggtcat gcatttatat  1440
acacatacat ggaagaaaaa acaatacttt acctatgtca aaatgctgca aaagcattaa  1500
gatggtatgt atacatacat attgatataa cagtggtccc atatatcatt ttaaatcatc  1560
ataaagagta tccatcttct ttcatattaa catcccttc aaagttataa gatttttctc  1620
tcttcattag agagagagag agagagaatt aacacaagtt ttaatctccg ggaaagatgg  1680
atgaatcaag tatttttacg gcagagaaag tgatcggagc tgagaaaaga gagcttcaag  1740
ggctgcttaa ggcggcggtg caatctgtgg agtggactta tagtctcttc tggcaacttt  1800
gtcctcaaca aaggttcttt ttttttttta ataaatttca tcgatctctc acaataaaaa  1860
ccctaaattt tatatcattt attattatat gtttaactac ataattatca gtattttaac  1920
cgtccatgtg ctttatttgg ttccatttct gtctcatatt ttacttgagg ttcagactgc  1980
cgagcacatc tctcgtttgt ctcgaatctg tgagactttt tcgtttattg gcacttctgt  2040
gtcaattgag ttatactgaa gtaattatat gtttaaatga attagggttt tgctgtggga  2100
gaatggatac tacaacggtg caataaagac gaggaagaca actcagccgg cggaagtgac  2160
ggcggaagag gctgcgttag agaggagtca gcagctaagg gaactttacg aggccctttt  2220
ggccggagag tcctcatcgg aagctagggc atgcacggca ttatcgccgg aggatctgac  2280
ggagactgaa tggttttatc taatgtgtgt ctctttctct ttccctcctc cttccgggta  2340
cccaactctc tctctctctc tctctctctc tctctctctc tctctctctc tctctctctt  2400
ttgtctatac tgaagtttct taatttatct ttttatcatc tcctactgaa gacaaaaata  2460
gtattgtgtg ttaaatgcga atcacgaata ttgtggaagc attaaaaaca aactgaggag  2520
gttgagttac tgaaagaaga aatgtattgg agttgatgaa acgtacactc catttttagtg  2580
aacataattg gaccgttgag attcttattt ttttgctgat tgattatcta aagtagaagc  2640
ataaatagat aatacataaa tgcataacaa attgtgttag ttatgggtat agttaatgct  2700
ttttctctat gagaggaaaa aaaaaaaaat atataaatgt ggaagtaata attttgtagg  2760
atgccaggaa aggcgtatgc gaggaggaaa cacgtatggc tatgtggtgc aaatgaggtt  2820
gacagtaaaa tcttttctag ggctattctc gcaaaggtct atttcctttt tcatttacca  2880
ctactctatg catctacttc tctacctatt tatatatctc atctttcaaa ttaattaatt  2940
ttctgtcttt attttcttgg atgctccttc tacatcggtc ggttccttaa tggttagagt  3000
gccaaaatcc aggtaaacgt tgtctttatt gattaattct aattttgagt aatattttac  3060
atttatttta catgtttgaa aattgttttg tgataaaaaa aaagcagaca gtggtttgca  3120
ttcccatgct tgatggcgtt gtggaactag gcacaacgaa caaggtacgg cgtagttatc  3180
tttttatata tgcataacca aatggttaag aaaaaggtta gaagagaaat agatcatgct  3240
taagttttat cagttaaatt aaaaatgtaa aaataagata ttatgttcat taataatgta  3300
tagtccctgt tagttaaaaa aaagaataaa atatttaacc atttgaagtc ataatataaa  3360
aatattgttt ttggagatag tacataattc tcacaataaa aaaaataaca aagggatgat  3420
taagggaagg agttggatac atgttgtttg tctgtgtgtg tgaaggtaaa agaagatata  3480
gcgtttgttg agctcataaa gagtttttttc cataaccacc ccaagtcaaa cccaaaagct  3540
gctctttctg aacactccat caacgaagag cacgaagaag acgaagaaca agaagaagaa  3600
gaagaagaag aagtagaaga agaaatgaca atgtcagagg agataaggct tggctctcct  3660
gatgatgatg acgtctccaa tcaaaaccta ctctctgatt tccatgtaga atcaacccac  3720
actttaggta tacacttata cattaaatta gttaacgata tcattacacg tatctattta  3780
ttttgttaac aagaaattta aaaatattcg ccatttcttt gttatgtcta aagaaaatct  3840
ataaaatttt atgaatagac acacacatgg acatgatgaa tctaatggag gagggtggaa  3900
actattctca gacagtatca acacttctta tgtcacaacc cacgagtctt ttttcagatt  3960
cagtttccac atcttcttac atccaatcat catttgccac atggaaggct gataatttta  4020
aagagcatca gcgagtggaa actaaatcga cgtcgtcgtc gcaatggatg ctcaaacaca  4080
taatcttgag agttccttta ctccacgacc acactaaaga aaagaggctg cctcgagaag  4140
agcttaatca cgtggtggca gagcgccgca ggagagagaa gctgaatgag agattcataa  4200
cactgagatc attggttccc tttgtgacca agatggataa agtctcaatt cttggagaca  4260
ccatcaacta cgtaaaccat cttcgaaata gggtccaaga gctggagact aatcatcacg  4320
aacaaaaaca taagcggatg cgtagctgta agggaaaaac gtgggaagag gtcgttgagg  4380
tttccatcat agagagtgat gttttgttag agatgagatg cgagtaccga gatggtctat  4440
tgctcgacat ccttcaggtt cttaaggaac atggtataga gactactgca gttcataccg  4500
cggtgaacga gcgtgatttc gaggccgaga taagggctat ggtgagaggg aagaaaccaa  4560
gcattgctga ggtcaaaaga gccatccatc aaactatatc caatattaaa ctatagttta  4620
agactctaac aatattgatg ccaactctag aaaaggacaa ctgaacttat tttgttttaa  4680
gccttggcta tattacatta tcagttttac acttctacgt atacacaact ttaatttttc  4740
tatattacta catgcatact agatgttaga aatatcttat ataagcatac atattaaatt  4800
```

```
agttatgcga tatttaaaat taatgtatat aaatattcag tttcaaagct tacgaatacg  4860
taaaattaat caatacaaac cgaaaccaaa aagccacttc tcatctcaaa atgttaatta  4920
caaatttaca ataagccgaa tcactatcta aaaagctttt gggatcccga gacccaaaac  4980
atttcttcgt ataagtgcaa caattatcga gtgtgatgag acacgtaaaa agcaaggatc  5040
gggacaacga ttttcggcta tatagtagtt tctcatatct gactttatta gcaaattact  5100
acataaaatt gcttttaagt atgattaacg gaacaagtat aatgcgttta tttaattaca  5160
gatctggcta aatgtaatat ggtatcaaag ctggaaagac aaatagtcta aggtttggaa  5220
tttttcatct gtctataaaa ttcttaagac actgatagat cattaactta ttttggagtc  5280
accaatggac aaatcaataa ctattgatgt ccaaaaccca caagacaagc ctattttttt  5340
tgcacgtgca agtacaccgg tggaagaatt catttgtata ctgaatctga aattataaaa  5400
gattagaatt ggttgaagaa tttacttcaa aacaagctag aagatggtgt tatttaaata  5460
aacaatgtta aattatatca atgactttca aattttatca aaacattttt tgaaagagaa  5520
tcacgcacaa agtatttcga attacaaaac aattttttgc aataaatttt atagttaaag  5580
caaattttgt caattattga aaaaaattac ttagataaaa tatctaattt tttttttaa  5640
acaatgtctc tataaaagat ggattagcca agaaaatctg atggatgcta caacgcaggg  5700
ttggagatat ggtgctgaca ctacat                                        5726

SEQ ID NO: 72           moltype = DNA  length = 2583
FEATURE                 Location/Qualifiers
source                  1..2583
                        mol_type = genomic DNA
                        organism = Thlaspi arvense
SEQUENCE: 72
atggaaggga actctttaag ttcatcttcc ttagtttcag ccaatcgggt gggtcaatgt  60
gacaatcttg agcatagtag aatgacttgt tctcgaaatt tcattgagat gcatttgact  120
gaccagctga gaaaaactca gatagtgaac gagaccaata aggatcttgt tgtcgaggca  180
ctgagatcaa tcgcggagat attgacttat ggcgatcagc acgacccttt attctttgaa  240
ttttttatgg agaagcaagt aatgggagag tttgtacgta ttttgagggt tagcaagaca  300
gtaacagttt ccgttcagtt gttgcaaacc atgagtatta tgatccagaa cctaaaaagt  360
gaacaagcca tctactactt gttcagtaac gaatatgtaa attatttgat aacatataca  420
tttgacttcc aacatgaaga gcttctatct tactacatat ccttcctaag agctgttagt  480
gggaaactaa accagcatac aatatcgttg cttttgaaga ccgagaacga tgtagtagtt  540
tcttttcccc tttacgtcga gggcataaaa tttgcatttc atgaagagaa catgatacgc  600
actgcagttc gtgccctgac tcttaatgtg tatcatgttg gcgatgaatc tgtgaatgat  660
tatgtagtta gtccaccgca cactgagtac ttttcaaaat tagttacatt tttccaaaag  720
caatgcatgg atctaagtgc aatggtgttg aacactctaa agagcccatc ccgagactca  780
ggtggaaaat tgtttgctgc cgttgatggg atcgaggaca cgctgtacta ctttagtgat  840
gttatctctg ctggcatacc tgatatcggg aggctgataa cagatcacat tctacagcat  900
ctaactctcc cacttcttct cccgtctttg tgctctgagg ctgataaatc agttgatcct  960
gtgacttctc tctatctgct ctgttgcatc gtgcggatag ttaaaatcaa agatttggcg  1020
aatttgactg ctgctacttt tttctgccct gtagaagctt tcatttcaag ttccctagtg  1080
aaacctaata gtagcttggc tcctgaacgt cttacatatg gaaatgggca tccagacaat  1140
ggtgttgctg aggaaacagt tcaacagtgt ccaagcactg cagtctcgag tgaatatgga  1200
aattcccacg tttgcagtga aaatactacg aaaagcatct tcaacaattc acgtattacg  1260
tttagggata ctttacttca atatatttct gagggagatg atgtgcaagc tcagggttcc  1320
ttgtttgtgc tagccacgtt gttgcagaca aaagaacttg aagagtcaat gctagatgct  1380
tttggcattc ttcctcagcg taagcagcac aaaaagcttt tgctgcaatc tttggttggg  1440
gaagacactg gtgaagaaca actgttttca ccacaaaatg gttccatgag agatggctta  1500
agcagcgaac ttgattggta tctacggagg ttggaggagc agtttggagt atgctgttca  1560
ctgcctgggg ctgcaatgtg cccgcgtgta catagacatc aggtggtgga tgcattggtc  1620
attcttctct gccgtgaaaa catatctgca gaaacattat gggatggagg gtggctttta  1680
cggcagttgc ttccttatag cgaggcagag tttaatcgta aacatctcaa aatgctgaat  1740
gattcatatg agaagtgcac aagtgcacta atccgggagg ttaaaggtac ctggcctgat  1800
ctactcatca cggtgctgct tgatgagtgg aaaaagttga tcgaagctcc atcccctcaa  1860
aaagagccta aatctgttct tctccagctg gataaatcct cttctagtgg taacactgtt  1920
agcgaatcat cattcacagc cggtgaaaaa ctgtgcgagg tggtgaaggt ttttgtgctt  1980
cttcaccaac tccagatctt ctcgcttggt aggcccttgc cagagcagcc tcctatccat  2040
cctcctgcag acagatctga aacgtctcgc gccacaagtg ctggtttgga tgtttcagtc  2100
cccaaaactg gcaccgaagt gaagctagtt gatgctgtac actgtaggat tgcctttgaa  2160
agaggcaagg agcggaattt ctcgtttcta gcattatcat ctggtgtgtc tgggtggatt  2220
gtccttgctg aagaatcgct ttcgaagcca gatcacggaa ccgtccgtgt taccgcacct  2280
ttagccggct gcaaaccccg gatagatgaa aagcacccaa gatggctaca cttgaagatc  2340
cggccatcga cgttaccatt cttggatcca acaaagcgag gagtctatga gaagctcaag  2400
tccaaaggtc tagtagacgg gagatggaca ttagcattca gagacgaaga gtcttgttac  2460
tctgcttact caatggttgt acatgagatc gatctacaat gcagcgaggt tgaaaggagg  2520
ttaaagccat tgttcgacct tgagagaaac cagcaagatc aatcaaacgt tgcttctcta  2580
tag                                                                 2583

SEQ ID NO: 73           moltype = AA  length = 860
FEATURE                 Location/Qualifiers
source                  1..860
                        mol_type = protein
                        organism = Thlaspi arvense
SEQUENCE: 73
MEGNSLSSSS LVSANRVGQC DNLEHSRMTC SRNFIEMHLT DQLRKTQIVN ETNKDLVVEA  60
LRSIAEILTY GDQHDPLFFE FFMEKQVMGE FVRILRVSKT VTVSVQLLQT MSIMIQNLKS  120
EQAIYYLFSN EYVNYLITYT FDFQHEELLS YYISFLRAVS GKLNQHTISL LLKTENDVVV  180
SFPLYVEGIK FAFHEENMIR TAVRALTLNV YHVGDESVND YVVSPPHTEY FSKLVTFFQK  240
QCMDLSAMVL NTLKSPSRDS GGKLFAAVDG IEDTLYYFSD VISAGIPDIG RLITDHILQH  300
```

```
LTLPLLLPSL CSEADKSVDP VTSLYLLCCI VRIVKIKDLA NLTAATFFCP VEAFISSSLV  360
KPNSSLAPER LTYGNGHPDN GVAEETVQQC PSTAVSSEYG NSHVCSENTT KSIFNNSRIT  420
FRDTLLQYIS EGDDVQAQGS LFVLATLLQT KELEESMLDA FGILPQRKQH KKLLLQSLVG  480
EDTGEEQLFS PQNGSMRDGL SSELDWYLRR LEEQFGVCCS LPGAAMCPRV HRHQVVDALV  540
ILLCRENISA ETLWDGGWLL RQLLPYSEAE FNRKHLKMLN DSYEKCTSAL IREVKGTWPD  600
LLITVLLDEW KKLIEAPSPQ KEPKSVLLQL DKSSSSGNTV SESSFTAGEK LCEVVKVFVL  660
LHQLQIFSLG RPLPEQPPIH PPADRSETSR ATSAGLDVSV PKTGTEVKLV DAVHCRIAFE  720
RGKERNFSFL ALSSGVSGWI VLAEESLSKP DHGTVRVTAP LAGCKPRIDE KHPRWLHLKI  780
RPSTLPFLDP TKRGVYEKLK SKGLVDGRWT LAFRDEESCY SAYSMVVHEI DLQCSEVERR  840
LKPLFDLERN QQDQSNVASL                                              860

SEQ ID NO: 74          moltype = DNA  length = 7185
FEATURE                Location/Qualifiers
source                 1..7185
                       mol_type = genomic DNA
                       organism = Thlaspi arvense
SEQUENCE: 74
cgtggatgga ggaagggttt ctcgtcgtgt tcgtcgcgaa agatggttcc tcttctgcgc  60
cgccaccgcc ggagatcgag gagaatcgca acgtgagagt cgtggaaatc accggtgatg  120
aatgaatgaa taattatgtc tttaaaactt caaaatctgt gtattatatg aacagagtaa  180
tcatgttgtg atcgtgctgc tgttttcgta tgtaatagtg aaagttgcat aaaagccctt  240
aaactaatca aagttttcaa aataacccat catttaagaa aactataaaa cgatcaaaat  300
taatgtaaaa tctacattg agcttccgac tacaacattt attcgattca atttcccttt  360
taataatcta acaaatttc caaatttcaa caaatctcga accgaatgat tatttgattc  420
aaagacaaac tattatgttt tcgctacaac ccaaaacgat gaatttaagt gtacagtcgg  480
aattgtatta ctgtatagat tttaaattag atgggacatt tgtttaaaca atttaattaa  540
gtgagggtta ttttacaact ttgctatatt ttgaggggtt ttgttataat tttgtgactt  600
aatagcaaga gtcgtctttg aaggaaccgt tgtgacgtgg cggtcttcaa cactcgaatg  660
gtcgatcgta aaaataaatg ttttccctaa ttaaaatgcc atagacggat ccccccattc  720
taaagattct ttctttgaat tcgatattga acccgacccg gatccgaatc tggatacttg  780
acccaacgcc agctcaacgc cccacttcgg tgcttgcttc tattcgtctc tccgtcaaca  840
attctgttgt ttaccggaat acctagagcc ttcgagaaat tcaaacacga cgcagatatc  900
attctttcgc ttacgctatt gatttgtatg attttgtcgt cggtgaagca atccgaaccg  960
gaactggaat cggatttcat caggacttgt ggggttccct ttaatcgagg agcaaccatg  1020
gaattggggt tttcgcggga gtgaaggatg atccagagaa gactggattc agaggattga  1080
tccgataatc atgtggttct ccttcttaag acccagagat cgattctcct tggtcgaact  1140
caggttaaat tttttttgt ttgatcgggt cgatcccgca acaagttcca tttgcgatat  1200
atatctctgt ttcgtttgat ccctattgtg actaagatta gcggattttt gtgaattctg  1260
gccttaaaat gtgtctttta agggtggttg agaggttttt cgtcgtaatc tctttggtgt  1320
gaatgacttg ttctcgaaat ttcattgaga ttttagtgta cgacaagtat ttgttcggtg  1380
attgtaagcg ttgaaatttt gagtttttc gtcgtagtct cttcggaatt agaatgggca  1440
gtttgcagtt atctgttagg gttttcgaga atttgaacat ttgatcgctt gaatggtgtc  1500
atggaaggga actctttaag ttcatcttcc ttagtttcag ccaatcgggt gggtcaatgt  1560
gacaatcttg agcatagtag aatgacttgt tctcgaaatt tcattgagat gttagtgtac  1620
gacaagtatt tgttcggtga ttataccaga tgatgaagca taaacgttga aactttgggt  1680
tttgtttttg taggcatttg actgaccagc tgagaaaaac tcagatagtg aacgagacca  1740
ataaggtcag tgggataaaa gtctttttca ctttagcaac tttgtcttgg cattactgtt  1800
ctgtttttc cttgtggatt cgatctttgt ttaccgtttt gaaggatctt gttgtcgagg  1860
cactgagatc aatcgcggag atattgactt atggcgatca gcacgaccct ttattctttg  1920
agtgagagtc tttatgtcaa ttatcagtca atgcccttca ttttcttatt ggcatatatg  1980
ctaataatac tttgcgctcg ttgcagattt tttatggaga agcaagtaat gggagagttt  2040
gtacgtattt tgagggttag caagacagta acagtttccg ttcagttgtt gcaaaccatg  2100
agtattatga tccagaacct aaaaagtgaa caagccatct gtgagttcat cagaagcagt  2160
gtatattttg tctttgataa ttcgtaatga ttatagccta ttgatgatct tcttttgaaa  2220
ctacttgcag actacttgtt cagtaacgaa tatgtaaatt atttgataac atatacattt  2280
gacttccaac atgaagagct tctatcttac tacatatcct tcctaaggta cattcttctg  2340
ttgttgacct cggcttcagg aagtacatgt tgactgtatc tggtaactgt tttgtttttct  2400
ttttgtagag ctgttagtgg gaaactaaac cagcatacaa tatcgttgct tttgaagacc  2460
gagaacgtga gtattcttta agttgcatct tccttaaact tctataatag tcctttatgg  2520
atttttttt tctgccatat tttaattctg cgtttctgcg tctaggatgt agtagtttct  2580
tttccccttt acgtcgaggg cataaaattt gcatttcatg aagagaacat gatacgcact  2640
gcagttcgtg ccctgactct taatgtgtat catggtaagt cactcagtcc tttcgatttg  2700
tcactttaat gactcagaag cttttagcaa tgtttctgat gcctttagtt tttttttct  2760
tttcgcagtt ggcgatgaat ctgtgaatga ttatgtagtt agtccaccgc acactgagta  2820
cttttcaaaa ttagttacat ttttccaaaa gcaatgcatg gatctaagtg caatggtgtt  2880
gaacactcta aagtaagatt cactgcatct tcatttccca gggcaataat atcgtgttaa  2940
atacgtatca tatccccttt tcatctattg actcattagt tatattcttc tgaaagattt  3000
ccatttactt tgtctaaagg agcccatccc gagactcagg tggaaaattg tttgctgccg  3060
ttgatgggat cgaggacacg ctgtactact ttagtgatgt tatctctgct ggcatacctg  3120
atatcgggag gctgataaca gatcacattc tacagcatct aactctccca cttcttctcc  3180
cgtctttgtg ctctgaggct gtaaatgtat aacatatcta ctttttcgat ttattttgtc  3240
cttttgtgct aattttgtaa gccttgttag tttttttctat gcaagagtac aatttctaat  3300
gtcagtatac tgtttgttct gtggttattt caggataaat cagttgatcc tgtgacttct  3360
ctctatctgc tctgttgcat cgtgcggata gttaaaatca aagatttggc gaatttgact  3420
gctgctactt ttttctgccc tgtagaagct ttcatttcaa gttccctagt gaaacctaat  3480
agtagcttgg ctcctgaacg tcttacatat ggaaatgggc atccagacaa tggtgttgct  3540
gaggaaacag ttcaacagtg tccaagcact gcagtctcga gtgaatatgg aaattcccac  3600
gtttgcagtg aaaatactac gaaaagcatc ttcaacaatt cacgtattac gtttaggtaa  3660
catgttatct aacaacctga gtgaatttga gatagttgct ttttacactc cttaagctgt  3720
```

```
cttaatcata atatattcct atatctctcc gaagctgatg ttccttttgt aaatagggat  3780
actttacttc aatatatttc tgagggagat gatgtgcaag ctcagggttc cttgtttgtg  3840
ctagccacgt tgttgcagac aaaaggtatt ggtagtggct ttgtgcatct ccttatttta  3900
tttctagttt tgacagggaa attcgcatct cacgcttaca ttctctttgt ggtagaactt  3960
gaagagtcaa tgctagatgc ttttggcatt cttcctcagc gtaagcagca caaaaagctt  4020
ttgctggtga gtatctgtca ttattcttta tcttctgctc ttttccagca aattccaagg  4080
cagattgcca gggaaattcg catctcatgg tttatggacc gtctactata gtctggacca  4140
aaaatataag ctttacttct tggatagcta aacttaattt ggtggtcatc tctgacagca  4200
atctttggtt ggggaagaca ctggtgaaga acaactgttt tcaccacaaa atggttccat  4260
gagagatggc ttaagcagcg aacttgattg gtatctacgg aggttggagg tacttcagtc  4320
actgcatatc ttagaatttt gcaaacacgt tctacttctc catctctttg gtgttgtgtt  4380
aaattgtgat tgacttactc attcaagtac cctcaacagg agcagtttgg agtatgctgt  4440
tcactgcctg ggctgcaat gtgcccgcgt gtacatagac atcaggtaaa ttacgaatgt  4500
ttgtaaacct aaattattag cctcgcttct tctgaaaagt gaaaattcca tctgcttgag  4560
ttaggttctt tcttcatcac agagcaagtt cttgtcttga atcaatgaaa aaattgtggt  4620
ataggtggtg gatgcattgg tcattcttct ctgccgtgaa aacatatctg cagaaacatt  4680
atgggatgga gggtggcttt tacggcagtt gcttccttat agcgaggcag agtttaatcg  4740
taaacatctc aaaatgctga atgtatgtgt gttgctttta agatgttgac actgttacac  4800
tctccctttc gtcattattt accagtttcc tgctgatgtc aggattcata tgagaagtgc  4860
acaagtgcac taatccggga ggttaaaggt acctggcctg atctactcat cacggtgctg  4920
cttgatgagt ggaaaaagtg taaaagaggc aagtaaagaa gcaaaatgtt tggattttga  4980
ttctaaattt acatgttcag tgaatctaat accaaatctc ttgtgacagt gatcgaagct  5040
ccatcccctc aaaaagagcc taaatctgtt cttctccagc tggataaatc ctcttctagt  5100
ggtagaattt ttgttttaca atcaatgtga atgatataga cactcccttg ttcagttcct  5160
gctaatgcaa accgttaaca actgaacttt tacaggtaac actgttagcg aatcatcatt  5220
cacagccggt gaaaaactgt gcgaggtggt gaaggtaagt ccattgtgtt ccctctgtat  5280
tttcaatcag cgcttgtcgt tgatgtgtaa atgctacaga aatctgagaa tggagcattt  5340
tactccttag gtttttgtgc ttcttcacca actccagatc ttctcgcttg gtaggccctt  5400
gccagagcag cctcctatcc atcctcctgc agacagatct gaaacgtctc gcgccacaag  5460
tgctggtttg gatgtttcag tccccaaaac tggcaccgaa gtgaagctag gttagcacat  5520
gatgctcttt atgcttgctt agttcaacat ctaccaaacc gacaccatgt ccgtagttaa  5580
actgatgttt gaaatttccc ggtgcagttg atgctgtaca ctgtaggatt gcctttgaaa  5640
gaggcaagga gcggaatttc tcgtttctag cattatcatc tggtgtgtct gggtggattg  5700
tccttgctga agaatcgctt tcgaagccag atcacggaac cgtccgtgtt accgcacctt  5760
tagccggctg caaagtacgt gctcacctac attgtctttt tttttgtaac gatattgctt  5820
gtgaacacca cttacaagga cagatataat catgatgttg gcatagagaa atgagctatc  5880
ttttgtttgg tattcagccc cggatagatg aaaagcaccc aagatggcta cacttgaaga  5940
tccggccatc gacgttacca ttcttggatc caacaaagcg aggagtctat gagaagctca  6000
agtccaaagg tctagtagac gggagatgga cattagcatt cagagacgaa gagtcttgtt  6060
actctgctta ctcaatggtt gtacatgaga tcgatctaca atgcagcgag gttgaaagga  6120
ggttaaagcc attgttcgac cttgagagaa accagcaaga tcaatcaaac gttgcttctc  6180
tatagctctt gggtttgttt ttgttttatt cattaaattt tttgtttctt ctttgtaatg  6240
ttgctataat gtgataatat cgttgtatat ttgaaagtga tagtgaattt cagtttttat  6300
cacacaaaaa tatgactagt gtgagtgtcg agaactctgc ttactcttat aattctgtga  6360
ttctgcgtct cttcttgttg aatatgaaac cctaaaacaa atgaaccctt actcttcttt  6420
atgcatcctg tagctgtcaa cgagagcagt tttgtatgag ttacggacac tctgtttcca  6480
gatggagaga gaagcaatca ccgtccgtat tttgagcaat cctcttttta acgcagctaa  6540
tggatgcaac attggctttt agacttgtaa ctatgtctct ctctctctct ctcttccttc  6600
agccgcagtt taaaagaccc acatacagta ccacatcata cctcagatgt gaatggtttg  6660
tcttcactaa aaggtttgct ggaaccaaaa cctaaacagg aaacataact ccttgaccca  6720
cagtaaatta aactaccaga atcactctga aagaagttcc tcgaccagaa atatccaaaa  6780
gccacataaa cagggtctgg tcagacataa cagtggcaac atcgtaataa gaaagatgcc  6840
aagaagttgc agaggctaat gtttgaaaaa aaaagaagcc atgagagacc aaaattaaga  6900
gaatttgtaa ttaatacagt actcaggaaa agagtttcaa ccacttgcgc caacaaacta  6960
gatagacatt gttatccaac acacaaactc atgtccaacc aaaagataga gagataaaga  7020
gacattatcc aacacaacac atgtccaaat aaaagagata acagataaaa gatagaagag  7080
tgggttctcc ttttcttact acaaacaccc atgaattcga ttccctactt tcggccaagt  7140
accctgaaac acaacacaaa actgaattgt tatacaaaac tatgt                  7185
```

```
SEQ ID NO: 75           moltype = DNA  length = 1026
FEATURE                 Location/Qualifiers
source                  1..1026
                        mol_type = genomic DNA
                        organism = Thlaspi arvense
SEQUENCE: 75
atggataact cagctccgga ttctttgtcc agatcggaaa ccgccgtcac ctacgattct  60
ccttacccac tctacgccat ggccttctct tccatcggta ctccctccgg ccaccgaatc  120
gccgtcggaa gcttcctcga ggattacaac aaccgcatcg acattctctc cttcgattcc  180
gactccatga cggtgaagcc tctcccgaat ctctccttcg atcatcctta tcctcccaca  240
aagctgatgt tcagccctcc ctccctccgt cgtccctccg ccggcgatct cctcgcttcc  300
tccggcgatt tcctccgttt atgggagatc agtgaagatt cctccaccgt cgagcctgtc  360
tcggtgctca acaacagcaa gacgagcgag ttctgcgcgc cgttgacctc cttcgactgg  420
aacgacgtcg agccgaaacg cctgggaacc tgcagcatcg acacgacctg cacgatttgg  480
gacatcgaga agtgcgtggt ggagacgcag ctcatagcgc acgataagga ggtccacgac  540
atcgcttggg gagaagctag ggttttcgcg tcggtctccg ccgacggatc cgtcaggatc  600
ttcgatctac gcgacaagga gcattccacc atcatctacg agagtcctca gcccgatacg  660
cctctcctaa gactcgcctg gaacaaacaa gacctgaggt acatggcgac gatcctgatg  720
gattcgaata aggtcgtgat tctcgacatt cgctcgccga cgatgcctgt cgccgagctc  780
gaacggcacc aggctagcgt caacgccata gcttgggctc cacagagctg caaacacatc  840
```

```
tgctctgctg gtgacgacac gcaggctctc atctgggagc tcccgactgt agctggaccc  900
aacggcattg atccgatgtc ggtttactca gccggctcgg agataaacca gttgcagtgg  960
tcctcttcac agcctgattg gattggcatc gctttcgcta acaaaatgca gctccttaga  1020
gtttga                                                            1026

SEQ ID NO: 76          moltype = AA  length = 341
FEATURE                Location/Qualifiers
source                 1..341
                       mol_type = protein
                       organism = Thlaspi arvense
SEQUENCE: 76
MDNSAPDSLS RSETAVTYDS PYPLYAMAFS SIGTPSGHRI AVGSFLEDYN NRIDILSFDS  60
DSMTVKPLPN LSFDHPYPPT KLMFSPPSLR RPSAGDLLAS SGDFLRLWEI SEDSSTVEPV  120
SVLNNSKTSE FCAPLTSFDW NDVEPKRLGT CSIDTTCTIW DIEKCVVETQ LIAHDKEVHD  180
IAWGEARVFA SVSADGSVRI FDLRDKEHST IIYESPQPDT PLLRLAWNKQ DLRYMATILM  240
DSNKVVILDI RSPTMPVAEL ERHQASVNAI AWAPQSCKHI CSAGDDTQAL IWELPTVAGP  300
NGIDPMSVYS AGSEINQLQW SSSQPDWIGI AFANKMQLLR V                      341

SEQ ID NO: 77          moltype = DNA  length = 4435
FEATURE                Location/Qualifiers
source                 1..4435
                       mol_type = genomic DNA
                       organism = Thlaspi arvense
SEQUENCE: 77
acacatatct aatactataa aaaaaggtgt atagcgtccg cgaaactcat gtcttccata  60
atcattaatc aaaaaccgat atctctaatc aagatgcatt tgacaagaaa aaagaatcaa  120
aatgcattgc caagaaaaaa agaatcaaga tgcatgattg tttggtgagt aaacgagaca  180
tcttaatttt aatataacaa ttcgttcctt gttttttttt ttcctgtatc gtacgtgatt  240
catgtgttca actgttttgt tgtcatctca tgtgttagtt aaattctatc ttattgattt  300
taatacatag atatttcggt gcagcgcaaa aacattatta tatttcggtg tagccgcatt  360
tagcacaatc atacctaaat attaccaaat tgtgctccac tatcttacgt gattcatgtg  420
ttaaactgtt ttttctttcc tgtggtctac caaaattaag tttttaattg caaagacgat  480
tgccaatttt aattgacgat ctaatttgtc acagataaca taattatctg atggcgtata  540
agttataagc tcttttattt tttgaacaaa atatttttgt tcttagctga gctgggaaat  600
gtcgtattta aagtattaaa cctataatct cttcggtaat atgttaaata aatctgtttt  660
ttcaggtcgt tagtaaatta tttcggctac agacgccata tcaaataata tatcaggttg  720
ctgtgaatga gtatctcaat ttgcatgcta agaactatat aaactgtatt aacttttatc  780
ttaataccat gagtaagtcg aattatcgat ctatctatta tttttatttt taaacgtgtg  840
gcctgattga taaaataaac ttgtggtcat atcaaatctg aaactggagt aaacgtggga  900
ttggggatga agaaattagg gcatgtcaac gtcttgggac ttaccgtcat gtcccttcac  960
tgtaatattg gacctatcat tttcttcctt atcatcttag tttttttttgt cgtctcatcc  1020
tctttaaaat aaagtaaaag taattaacac tattatattt tctcacaaaa ttagatatta  1080
tatgctcttt tcaaaaaaat gttaggcatc taacatgata tttttgagat agaaaatgac  1140
acaaatactc ttcaccccaa cctcacgcat atctctatat ttattacatc gctattacac  1200
acattacaca tagtattcat gtacatgtct atttacgcaa aggatcacac gttccacaaa  1260
ccatttgcta aatcctaaat gagtagtaac aagatattgt ccgtctcaaa acaaaatata  1320
tatttgtaga gaatatcata attttagtat cgtcttcaaa atggtttgaa aatgttattg  1380
actttttgta gacaacattt taatctgtgt gtttgggaaa gaaatgtgga aagctcgctt  1440
agcgttgaaa aggcctacta tgtaaagaca caaggcccaa aaatgcgttg aaaggcccac  1500
tatcaataga tattgattga cacagagggt ttagcatgca gtcaaaatat cgcactggac  1560
actgaccata gaactttctg tcattttcct ctgaaaaacg gagatgtcgc cgtgaagaat  1620
ccaaaaatcg aatcgaatca gatcaaacca ttccacattt tcgtgcagag ataatggata  1680
actcagctcc ggattctttg tccagatcgg aaaccgccgt cacctacgat tctccttacc  1740
cactctacgc catggccttc tcttccatcg gtactccctc cggccaccga atcgccgtcg  1800
gaagcttcct cgaggattac aacaaccgca tcgacattct ctccttcgat tccgactcca  1860
tgacggtgaa gcctctcccg aatctctcct tcgatcatcc ttatcctccc acaaagctga  1920
tgttcagccc tccctccctc cgtcgtccct ccgccggcga tctcctcgct tcctccggcg  1980
atttcctccg tttatgggag atcagtgaag attcctccac cgtcgagcct gtctcggtgc  2040
tcaacaacag caagacgagc gagttctgcg cgccgttgac ctccttcgac tggaacgacg  2100
tcgagccgaa acgcctggga acctgcagca tcgacacgac ctgcacgatt tgggacatcg  2160
agaagtgcgt ggtggagacg cagctcatag cgcacgataa ggaggtccac gacatcgctt  2220
ggggagaagc tagggtttc gcgtcggtct ccgccgacgg atccgtcagg atcttcgatc  2280
tacgcgacaa ggagcattcc accatcatct acgagagtcc tcagcccgat acgcctctcc  2340
taagactcgc ctggaacaaa caagacctga ggtacatggc gacgatcctg atggattcga  2400
ataaggtcgt gattctcgac attcgctcgc cgacgatgcc tgtcgccgag ctcgaacggc  2460
accaggctag cgtcaacgcc atagcttggg ctccacagag ctgcaaacac atctgctctg  2520
ctggtgacga cacgcaggct ctcatctggg agctcccgac tgtagctgga cccaacggca  2580
ttgatccgat gtcggtttac tcagccggct cggagataaa ccagttgcag tggtcctctt  2640
cacagcctga ttggattggc atcgctttcg ctaacaaaat gcagctcctt agagtttgag  2700
gttaggtttt atatttaact atgaagtcga tgatatgaat gatatcacct ggttaggcct  2760
aatgaattcg caaagaaagt tgaactgaaa actcacttga atgctttcat ggctggctat  2820
tacagattgt cttgtagcta taagagaact ttgttagtaa atgatctcac agttgctgta  2880
atggctgata aaatgatatt catgtagacg atgattgggt acaaaacacc tttgtacttt  2940
gtgcttcagg tttttgcaac tcatatagag aatctagatt gaacaataac attgcacatg  3000
tagaaaatca aataacattt ccttattata tacatctcgc ttgatgtcag atgcagatgg  3060
tgaagtggtc aaaatcagat ttagcataga cccgatgtga caagtaggtt cggtgcacgc  3120
gcactctcgc gtcttgggtc agcaagcaat gcctctgtat ctacctgatt gtaactaaaa  3180
ctgatttcat ttgatgaacc aaatgccact gttatctttc tgttttgtgt ataaacccca  3240
accagaattt attgcggttt ctggtgttta gatttgaagt ggaagcttat tacagtataa  3300
```

```
tgcaccctgt ctttcctttg ttgggtattc ttcggataaa acagctactt gtcatcggtt  3360
atttagcatc taaacaaagc aattataaaa tatgtgttac aggttccaac ttcgaacacc  3420
tgtttttagt cagagttttt tttttgtatt ttgcaaatta acttcaagtg acaagcaaat  3480
tctcaattta ttataccttc ttcgtttgag aaaacctctg aacgtccgac tgttatattt  3540
ctctatctca ttctttacaa agagataaat ttatgttaaa cttctctatt taccattttt  3600
aaaatttcat ataaccaatt tacataactt tggagaacgt tgatattcat attttccatt  3660
taataaaatg aataaaaata gaaaatttag cttaagggaa aggaaaatat gtgtcagatt  3720
cttgatttca caaaaaccta caagcaaccc cctctacata taaatagcaa cgtccttgta  3780
acttaaaagg caagtgataa taatagtgca aaaagatttg aaaaaaaagg ttagagagaa  3840
tgtccaccag cgagcttgcc tgcacatatg ccgctctaat cctccacgat gatgggattg  3900
acatcaccgt tagttttctc ttctctctaa ttctcaattt taacctcttt ttgatctagt  3960
ttctactctt tttctttgct cttcatgcat gtacttatat atgttgtagt tgcgaatttc  4020
gtttatatag tttcatgtcg gtaactttct tgtttattgt ggatttacta ggccgagaag  4080
atatcaaagc tggtgaaagc agccaacgtg aatgttgaat catactggcc tagcctcttt  4140
gctaagctat gtgcgaagaa gaatattgac gatctcatca tgaatgttgg agccagtggt  4200
ggtggtgagg cagctccggt tgcaaccaac gttcctccaa ctgctcaagc agctccagca  4260
gttgaggaga caaagaagaa gaaggtatat cctattgtct ttctaacagt cttagcgtta  4320
ttgcaatcca aatcatcaac tatataattt aacaagctta tgattaaaac taaccaatgg  4380
gaatattgtt ttaaaaattc tcaggaggag gtgaaggaag agagtgaaga tgaca       4435
```

```
SEQ ID NO: 78          moltype = DNA  length = 1275
FEATURE                Location/Qualifiers
source                 1..1275
                       mol_type = genomic DNA
                       organism = Thlaspi arvense
SEQUENCE: 78
atggaggtga aagagagtga aagagtggta atagccaaac cagtggcttc aaggccttca  60
tgctctagct tcaggacttt cactgagctt ctgactgatt cagctactgt gtctcctcaa  120
tcgaattgcc acgagattgt agacgctgcc attagaccaa agactctcag gtttaaccag  180
ccagctgcag ctgcggtctc atgtccacgg gctaaagaaa atggcaatgg aaagtcttgt  240
gatgacacag atggcggaaa ctacgtcgtt tacaaaccta aagcaaagct tgtctccaaa  300
gcaaccgtct ctgtgttggc taacatgggg aatcgtcaac agacttggag acaacccgaa  360
gcagtagcgt atgggaagag tgtgagtcaa ggtactggtc ctaatctagt ccagagagtt  420
tcatccttta cagaaacaga gacatcggtc ggggacagat catctgtgga cggatacaac  480
tggaggaaat acggacagaa gcaagttaaa ggaagtgagt gtccaagaag ctattacaaa  540
tgcacacacc cgaaatgtcc ggtgaagaag aaagtagaga ggtcattggg aggtcaggtc  600
tcagagattg tgtatcaagg tgagcataat cactcgaagc cgtcttgtcc acttccacgg  660
cgcgcttcgt catcatcctc ttcagggttt cagaaaccac caaaagggct tgtctctgaa  720
ggatcaatgg gacaagaccc taatagtaat gccttttatc atcatcctct ttggagcaat  780
caaagcaatg actcgtctaa gatgtatgag ggttgtgttg taactccatt cgagttcgct  840
gttccaagat cggcgaattc aaccggcgga acttcggatt ccggttgtcg aagtagccag  900
tgtgatgaag gcagcaatgg aggagagctt gatgatccaa gcagaagcaa aagaagcagg  960
aagaacgaga agcaatcaag tgaagcagga gtatcgcaag gttcggtgga atcagacagt  1020
cttgaagatg gatttaggtg gagaaaatac ggacagaaag ttgttggagg caatgcgtat  1080
ccaagaagtt attacagatg cacgagcgcg aattgcagag caaggaaaca cgtcgagaga  1140
gcgagtgatg atccaagagc ttttattaca acctacgaag gtaaacacaa tcaccatttg  1200
ctcttgagac ctccaccttc gtctacggtt cttcttccct ttaactccac acaacattct  1260
aatcaagcca tttga                                                  1275
```

```
SEQ ID NO: 79          moltype = AA  length = 424
FEATURE                Location/Qualifiers
source                 1..424
                       mol_type = protein
                       organism = Thlaspi arvense
SEQUENCE: 79
MEVKESERVV IAKPVASRPS CSSFRTFTEL LTDSATVSPQ SNCHEIVDAA IRPKTLRFNQ  60
PAAAAVSCPR AKENGNGKSC DDTDGGNYVV YKPKAKLVSK ATVSVLANMG NRQQTWRQPE  120
AVAYGKSVSQ GTGPNLVQRV SSFTETETSV GDRSSVDGYN WRKYGQKQVK GSECPRSYYK  180
CTHPKCPVKK KVERSLGGQV SEIVYQGEHN HSKPSCPLPR RASSSSSSGF QKPPKGLVSE  240
GSMGQDPNSN AFYHHPLWSN QSNDSSKMYE GCVVTPFEFA VPRSANSTGG TSDSGCRSSQ  300
CDEGSNGGEL DDPSRSKRSR KNEKQSSEAG VSQGSVESDS LEDGFRWRKY GQKVVGGNAY  360
PRSYYRCTSA NCRARKHVER ASDDPRAFIT TYEGKHNHHL LLRPPPSSTV LLPFNSTQHS  420
NQAI                                                              424
```

```
SEQ ID NO: 80          moltype = DNA  length = 5443
FEATURE                Location/Qualifiers
source                 1..5443
                       mol_type = genomic DNA
                       organism = Thlaspi arvense
SEQUENCE: 80
ttgaatgtga tatatgatat tgcggctggc cgagctggct ggtttaagta ctcaaccaga  60
cagtaaagta aaacagccgc atagattgaa atctcgtgga acgtataacc agctcctgtc  120
tgtcctagaa ttggcggttc gggatagaac tgttccttac atctcttgga atctccggtt  180
gagttgatgc taattgtatc actacttgtg atgtgatcta gaaacaaaca tagcttatgt  240
tttgcgtttg cggtctctga gaaatcgttg gggttctatg attcttctgg cctgacaatt  300
aaaatcattt tatggaccca attgaaagac taaaccggac gcagcctatt gcaatttaaa  360
gaacaataac gagcatgtag gttagaaacc ggtttgtagt tccacttgag tcgaaactgt  420
actacttgaa aaatttgggt tttagactta aactggtttc aagctccttt tatctagggt  480
ggagagaact tgttaggaaa aaaaacaaat tgttgtaatg cgcggaacgg atcgacttat  540
```

-continued

```
gctctataaa agtctgcgga cgcagccaat attaaaggca tgttattata agaaaatgtc  600
ttgcggatgc aaaattaagg taaaataaaa cttctgtttt aaactgtaac tgtgtgtaca  660
ttgattatgc tcaaacaaac caccttctta acgaatcttt aaggaggtgt tattggttct  720
tatattttaa tggatttgag aatctaaacc aaattcagta ttattggttt ttgtatttta  780
aaatttatat tgaaatatag tgttattagt tttatgattt taaaattcat aatgaaatac  840
agtgttattg gttctattat tttagaatct aaatattata aggattnaag aaaatgtctt  900
gcggatgcaa aattaaggta aaataaaact tctgttttaa actgtaactg tgtgtacatt  960
gattatgctc aaacaaacca ccttcttaac gaatctttaa ggaggtgtta ttggttttta  1020
tattttaatg gatttgagaa tctaaaccaa attcagtatt attattttaa aatttatatt  1080
gaaatatagt gttattagtt ttatgatttt aaaatccata atgaaataca gtgttattgt  1140
atctatcatt ttagaatcta aatattataa ggatttgagt tttaattgaa tttgaatgga  1200
tttggaagga ttttcatgac taaaatataa agatccaaat acaaagtcta attttggtat  1260
ttaaatagat ttgatttttt ttttatttta ttgattttga aatcaataaa tttatcaaat  1320
ccaaaaaaga tttataaatc taccaaaata caagaaccaa taacccctag taagtaatcc  1380
agcaaactgt ttgtataatg tcacctctaa tagtagttga aaattacaaa ctaataattg  1440
tttaactttc ataaatgttt ctgttaatgg ataattcata atatttttttg tattgtgata  1500
ctttattata ttcatgcgaa taataatatt ttagtttcgg ttcaatataa acttctgaaa  1560
ttgggacaac agcaacgtga taatattata tatcttctta tttctgacaa tggagagggg  1620
tgaaatcgag aatgaaccgg tttaaatttc ggtacggttc agttcacttt gtctaaacga  1680
gttggtatgg ttcacgcgtg ctttacttct aacaagacaa gctcgcgcgc gtgtgtcaac  1740
aaccaaccaa agtcactttg gccgctggag cctcaaccaa aattcgaaac gacgccgttt  1800
ctttggccgc gtttccaact aactttcaaa ggcctataaa actcaactaa cgttcaacca  1860
aaactatctg tctcttctct gtctttcatt ttcatcgcct tctttcatca ctatagacta  1920
gctcatctaa agtacggacc ttgatccatc caacgtaccc taccttgaca cgtgtccctt  1980
gacagtgtgt cggcaagact caacgaactg aaccgatacg acggatacat caacgcccac  2040
cttaatgaaa aacccgaatt cggatcttcc taaagggttt tgcctcaaac tccttttttg  2100
aacttcagat tctgcatcat catctctctc accgtgagta acttacttat gtcctctctt  2160
ttgcgtcact tatggtttta catttgtatt catcttttgg gtttttgatt tggaatgatt  2220
cagaacctaa tcacaactgt atcggcgcat gtgggtatca tcaagtttct tttttttttt  2280
tttccggcat catcaagttt ctttcttttt gctatagttt gcatcaaact ttccaaggct  2340
ctatatatag atcgagatta tgtattgttg gatttgatgc ttctcaccgt ccaaatccaa  2400
tcttttgttc ctctcctttt aaaaccttct cgatacttga cttaagactc tagaaaatga  2460
gctccgattc agaatctgaa tctcttataa atttgattga ggctatgtga agctaatgtg  2520
ttgattttta atctgtggaa catttttcag gttgaatcaa agctttttga ctggaaacaa  2580
ttttgggtgg taaggttgga acaatggagg tgaaagagag tgaaagagtg gtaatagcca  2640
aaccagtggc ttcaaggcct tcatgctcta gcttcaggac tttcactgag cttctgactg  2700
attcagctac tgtgtctcct caatcgaatt gccacgagat tgtagacgct gccattagac  2760
caaagactct caggtttaac cagccagctg cagctgcggt ctcatgtcca cgggtgattc  2820
atcttattaa tctcttggca atataatata tcttcttatt tctgaatctt ctgcatttta  2880
gcactgactc gtataagttt ttctcataat cttaggctaa agaaaatggc aatggaaagt  2940
cttgtgatga cacagatggc ggaaactacg tcgtttacaa acctaaagca aagcttgtct  3000
ccaaagcaac cgtctctgtg ttggctaaca tggtaagttg tttctagtgc tacaaagatc  3060
aagaatttct cggaattagt ttcttaactc tgtttttgtt ttagcttcag gggaatcgtc  3120
aacagacttg gagacaaccc gaagcagtag cgtatgggaa gagtgtgagt caaggtactg  3180
gtcctaatct agtccagaga gtttcatcct ttacagaaac agagacatcg gtcggggaca  3240
gatcatctgt ggacggatac aactggagga aatacggaca gaagcaagtt aaaggaagtg  3300
agtgtccaag aagctattac aaatgcacac acccgaaatg tccggtgaag aagaaagtag  3360
agaggtcatt gggaggtcag gtctcagaga ttgtgtatca aggtgagcat aatcactcga  3420
agccgtcttg tccacttcca cggcgcgctt cgtcatcatc ctcttcaggg tttcagaaac  3480
caccaaaagg gcttgtctct gaaggatcaa tgggacaaga ccctaatagt aatgcctttt  3540
atcatcatcc tctttggagc aatcaaagca atgactcgtc taagatgtat gagggttgtg  3600
ttgtaactcc attcgagttc gctgttccaa gatcggcgaa ttcaaccggc ggaacttcgg  3660
attccggttg tcgaagtagc cagtgtgatg aaggcagcaa tggaggagag cttgatgatc  3720
caagcagaag caaaagaagg tataatatta gagagctttg aatagtttca aaacaccaat  3780
cttcttcgtt tactgttaca ttgactttta tgaataataa tatacagcag gaagaacgag  3840
aagcaatcaa gtgaagcagg agtatcgcaa ggttcggtgg aatcagacag tcttgaagat  3900
ggatttaggt ggagaaaata cggacagaaa gttgttggag gcaatgcgta tccaagaagt  3960
tattacagat gcacgagcgc gaattgcaga gcaaggaaac acgtcgagag agcgagtgat  4020
gatccaagag cttttattac aacctacgaa ggtaaacaca atcaccattt gctcttgaga  4080
cctccacctt cgtctacggt tcttcttccc tttaactcca cacaacattc taatcaagcc  4140
atttgatgaa tgatggtata ttgatacatt acttcttcaa tcttcatagc aacattagtt  4200
catcatttc ttgttgttgc actgtgaatt tatttatttt acatcaaaat tgtaaggaga  4260
agcaaaatag ttgttattta acaaacgaaa aaaaaagcaa ataaaaagag tgttatattt  4320
taggtttaac aacttatgtt cccatgttgt agctttcttc tgttagtata ttgggtttga  4380
tctacagtag tggtaaaaag aaactacttt tactaatcac aaaaacagta aatgtaaaac  4440
gcaacacaca cttaccgctt aataaatcat ttgaagctta accaccaatt agttgaaata  4500
caaacatgaa aggtttggtt acaattgatt tcatggcaat aaacaatttt tatttaggaa  4560
aatagcagaa aatcggaata tttaatttgg agttaagaac cattgaagat ggaaaccata  4620
tcactttaat gtatcagctt tctaattaga aatataaaga tgaaatattc ttaaatatga  4680
aaccgtttga tcaaagatcc caagtcgata aagcgtcaaa acttgattaa aggtagagaa  4740
attttctgaa acatatccaa agctaacgaa aacagcacaa aaaaaatgtc tttggagata  4800
taatgcaaac tcagggcaaa ggaagatccc ttaacgattg gccttggcaa cacgctcaat  4860
ctcatctttc ttcttgatag catagctgca aagacaagac aaagatgcat ctcatcagct  4920
actaaagtaa cacaaatgtg aagccattta atagacaaga cgatgtagag aatttgtttt  4980
ataaaacctg ttggaagatc ccttggcagc attgatgagt tcatcagcaa ggcactcagc  5040
gattgtcttg acgtttctaa acgcagcctc acgtgcacca gtggtgatca agaagattgc  5100
ttggttcaca cgtcttagag gagagatatc aacggcctgc ctcctaacca caccagcaga  5160
tccaatcctg gtagcatctt ctctcggacc actgtctcac caaaaataaa cgaacatcat  5220
gagaaaagag gttcataaca acacaacaag aaagtgagag ggtttcagta tcaccacatg  5280
```

```
tttgatttac ttacctgtta acaatggcat caatgataac ctgaatcggg ttctggtcag  5340
acaagagatg gatgatctcc atggcgtgct tgatgatcct gacggccatc agcttcttac  5400
cgttgttcct tccgtgcatc atgagagagt tcgtgagcct ctc                    5443

SEQ ID NO: 81          moltype = DNA  length = 404
FEATURE                Location/Qualifiers
source                 1..404
                       mol_type = genomic DNA
                       organism = Thlaspi arvense
SEQUENCE: 81
caaacacacg ctcggacgca tattacacat gttcatacac ttaatactcg ctgttttgaa  60
ttgatgtttt aggaatatat atgtagctat ctgatcggtc agtattttca caggtcgtga  120
tatgattcaa ttagcttccg actcattcat ccaaataccg agtcgccaaa attcaaacta  180
gactcgttaa atgaatgaat gatgcggtag acaaattgga tcattgattc tctttgataa  240
tactcaccga tcagacagct ctcttttgta ttccaatttt cttgattaat ctttcctgca  300
caaaaacatg cttgatccac taagtgacat atatgctgcc ttcgtatata tagttctggt  360
aaaattaaca ttttgggttt atctttattt aaggcatcgc catg                   404

SEQ ID NO: 82          moltype = DNA  length = 404
FEATURE                Location/Qualifiers
source                 1..404
                       mol_type = genomic DNA
                       organism = Thlaspi arvense
SEQUENCE: 82
caaacacacg ctcggacgca tattacacat gttcatacac ttaatactcg ctgttttgaa  60
ttgatgtttt aggaatatat atgtaggaac gtattaccta cacattttca caggtcgtga  120
tatgattcaa ttagcttccg actcattcat ccaaataccg agtcgccaaa attcaaacta  180
gactcgttaa atgaatgaat gatgcggtag acaaattgga tcattgattc tctttgataa  240
tgtgaaggta atacgctcct ctcttttgta ttccaatttt cttgattaat ctttcctgca  300
caaaaacatg cttgatccac taagtgacat atatgctgcc ttcgtatata tagttctggt  360
aaaattaaca ttttgggttt atctttattt aaggcatcgc catg                   404

SEQ ID NO: 83          moltype = DNA  length = 404
FEATURE                Location/Qualifiers
source                 1..404
                       mol_type = genomic DNA
                       organism = Thlaspi arvense
SEQUENCE: 83
caaacacacg ctcggacgca tattacacat gttcatacac ttaatactcg ctgttttgaa  60
ttgatgtttt aggaatatat atgtagtcag ctccgagtta tcaattttca caggtcgtga  120
tatgattcaa ttagcttccg actcattcat ccaaataccg agtcgccaaa attcaaacta  180
gactcgttaa atgaatgaat gatgcggtag acaaattgga tcattgattc tctttgataa  240
ttgaaaactc ggagccgact ctcttttgta ttccaatttt cttgattaat ctttcctgca  300
caaaaacatg cttgatccac taagtgacat atatgctgcc ttcgtatata tagttctggt  360
aaaattaaca ttttgggttt atctttattt aaggcatcgc catg                   404

SEQ ID NO: 84          moltype = DNA  length = 404
FEATURE                Location/Qualifiers
source                 1..404
                       mol_type = genomic DNA
                       organism = Thlaspi arvense
SEQUENCE: 84
caaacacacg ctcggacgca tattacacat gttcatacac ttaatactcg ctgttttgaa  60
ttgatgtttt aggaatatat atgtaggaac ttgacagtat aatcttttca caggtcgtga  120
tatgattcaa ttagcttccg actcattcat ccaaataccg agtcgccaaa attcaaacta  180
gactcgttaa atgaatgaat gatgcggtag acaaattgga tcattgattc tctttgataa  240
gattttactg tcaagctcct ctcttttgta ttccaatttt cttgattaat ctttcctgca  300
caaaaacatg cttgatccac taagtgacat atatgctgcc ttcgtatata tagttctggt  360
aaaattaaca ttttgggttt atctttattt aaggcatcgc catg                   404

SEQ ID NO: 85          moltype = DNA  length = 1998
FEATURE                Location/Qualifiers
source                 1..1998
                       mol_type = genomic DNA
                       organism = Thlaspi arvense
SEQUENCE: 85
ctataaaata taatatttag caccttgaca ggattgtcag ttattatatt gttagagtga  60
taaagatcat catcacgtac atataaagag attataagat aaaaataatt ttcggtactg  120
taggttttct gcaatttaaa ttatttaaaa tatgtaattg agaaaatatt cggtcgcctg  180
gtttatatag tcaagtgtta cgaaaacatg tttgttttgt atgcaatttt tgttttactt  240
atttgagaca taaatgagtt attttataat gggctgttac agatatgttt aattaatata  300
aattattggt ttttaacttg ttgatttttt atttttattt ttcaagcttt agaaactgat  360
gccacgtggc attgtgggag agagtttttt ttgcttaggt ggatagccta agaagcccca  420
aataatcctt tttatttagt atagattagt cacggcttcc acgaaacaag ttcaattaaa  480
tttaacggaa ataaatggta attaatgaaa gtttgaattg tattaattac tgcttccacg  540
aaacaaccaa aaaaatcatt tgacaaagta atttgtgtac ggtattagcc acatggggcc  600
aatcctctat gtatatcgga gttgttttgc caaatgccca attcttactc tagtaaatat  660
taaaccattt tgtagatcct aatcttgagt caactcaaag tcctatgttt ggaaactaaa  720
aataagttta aatcctctag actacgacta agttgtaaaa agaaatgttc aaaattcctt  780
```

```
agacattgaa attgaatact tcaattaaag aaaattttac cagcatgttc atagtagtag  840
accaccacag aacaaaatta atagttttta cattgcattc ttatataata attttggagt  900
ataattgtaa ttataaacaa aataactaaa agaaaaggaa agtattcttg acatatttat  960
aggtactaat ttgctagtac gactattaat tatggagatt aaatctagta tttgactaac  1020
cagaaacatt ttaaaggtaa gtgataagtt gataacctcg caattatttt tgaaagctat  1080
taatcacttt agcagaatgt atacaagttc tatattaaca agtttatctc aaaatcttga  1140
gatcctacta ataaatcata acttttctct tattggtatg tcgaatctag tgtttaccaa  1200
actagaggtg ttgaccgtta gagacaatta aacaacttac atacatacaa aagtacaagc  1260
cgaagaataa tagtaataac agtgcatttt ctacaataat taaaacaaaa aagtatatta  1320
aaaattagca tttattccaa ttaataccaa tattcgaaaa ttaatatggt agaaaagcaa  1380
aaagcttacg taaattccac agattgtcaa aaccctgcaa tgaaaaagtt gccaaaaatt  1440
gacgaggttg gtccacaaaa tttaaggttc tttgcttcac actctattta taggcgaaga  1500
gatgaaacag aggaaattaa ttactcctta acaaaggttg ttttcactca accacatgcc  1560
ttctcaagtg tctgctgctc acattccccg agattctcat ttacttactc ctctatttgg  1620
tacgtccttt atattacaat tctagtattt tttttttcat tattcgtttt gttcatactt  1680
cgtttcataa acatatatag ttaatcttat attatacagt aactttgata aatatgtatc  1740
ttaatttact cacgcagttt agagagacga ttgatacgtg gggactactt acgtacctgc  1800
atgattatat aagttataaa agttattgca gaacattaaa ttactttgat agctcgagag  1860
caatcattat ataaagctat atttttaatc acaaatatac atctactcga aagttttttt  1920
tttaaaaaaa agatgaaatc cctaaacaaa cgttcccaaa tgttctcatc actctccaac  1980
cacgattcac cacattca                                                1998

SEQ ID NO: 86          moltype = DNA  length = 1978
FEATURE                Location/Qualifiers
source                 1..1978
                       mol_type = genomic DNA
                       organism = Thlaspi arvense
SEQUENCE: 86
agtaactgag aggaatgtaa ctgagagaaa aaagaaaagt aataattaaa ataattgaaa  60
ataataagta agagcatcta gatagtcctt accaaaaaaa agatcatcta gatagtcttt  120
ccatagtatc tgatttatat aatactaata taatgtattt atataattaa attataaatt  180
aataaagaga tgaaccaatt cttaacagac atttgcctag agacatatct ttattcttaa  240
caaacatttg gctagaaaca tatctaatag tttcttgttt caaaaatgtc ttcgcttttt  300
ttctgttttt ctcccttcct ttttccttat ttttttttatt tttcttattc actaaatata  360
ctcccataat atctgctata taatattaat ataatatatt tatataatta aattaaaaat  420
tcataaagag atgaaccaat tcttaataga tatttggcta aatacatatt taatattttt  480
ttgtttgaaa gatatctttg ctattttttt tctgtttctt tctcttcttt tcttcttata  540
tttcttattt tttttattca ataaatatat tttaaaaaac accaatttc ttataagaat  600
atctgaaaat aattgagaat aattaaatta aatattttct tttagtaaaa cttataatta  660
tatatatgct aaaaagatat gtgatattta ttattctatc tttaaagatt tttttatcgt  720
gaatcactat tttcagttat ccaacctaaa atgaatactc agagagcaac cacatcgaaa  780
gtgttagaga ttgaatgaat acagttctta aaaggtttat ttcacattaa tgaagtctat  840
caaaacaaaa tttatctaat tacatctcta taacaaaaat gataattcta aagttaaatg  900
aaaaaaaaaa acaaaaaaat agagagaatt tttctttaaa aaaaagataa gaaagatcaa  960
taaaaccgac ttcctcacat tataaataga aaagtcttca taatttgaag attcaatccg  1020
aaaatcccta aaattctaga aagtaagacc aaatgttcaa agttttctag tttaattttt  1080
tcaagtgttc ttacacacag tttagcaaaa cgtgattgtt aagctatctt tgtaatcact  1140
ctgagctttt gagtaataat gagatttaat tttttaaaca cacaacctta tattgctttt  1200
tttctttgag tgatatcttg gttaacaatt gacgtcgtct gtagaaaata aagaataaat  1260
tcttaagcaa aacaaggttt agagatgagc tctccgaata agagcaatca acacactcaa  1320
atccctacct ttgatgagca cagcaacccc cattgtcatt ggaaatcaaa caccacctcc  1380
accactagcc acatgaacat tgacccttgt ctctaccggt gatcttgctg ctgcaattca  1440
acccgcccta aaaatcgatc acctaagacc ttagttccaa attcgataac ttgcaagctc  1500
agcaagcaag ggatcaggaa caactcaacc tcatggcaac ctcggccact aaacaagttg  1560
caccacttgg acgaagactt gtctttgaga cacccaccgt ccacatcgta gcaagagcca  1620
caacagacac ccaagcaaac aagacgaatg tcccagccct aactaatgaa gcgttacatg  1680
ccaaggtggg ttatgaagtc tcacctgcca aggtgggtta gacgaatgtc tctctgttag  1740
acacctccac ttgaccactt gtttgaggat ggtaaggagt agcaacctta tgcttaacac  1800
catgcttcct tagcagattc tcaaaaactt tgttgatgaa gtggcttcct ccatcactta  1860
taacacacct tggaacacca aaccttggga agatgattat cttgaaaagt ttcagcacaa  1920
ccctagcatc atttgttgga ctggctatgg cttcaaccca ctttgagaca tagtctac    1978

SEQ ID NO: 87          moltype = DNA  length = 1424
FEATURE                Location/Qualifiers
source                 1..1424
                       mol_type = genomic DNA
                       organism = Thlaspi arvense
SEQUENCE: 87
tgctttggga gttatgatgg aaaacctaat tctctaactc tgtttatata gggaagactc  60
aggaaaaatc ctaatatcct tttctcttgg gcttctgaca catgaacctt tccttttcct  120
attgagccta gatccagaac gttacaacta gaatcagaat cgaacaacaa gcgtatgcgc  180
ttaagaaatg atttttactc acactatatg ggcgcgcatg gcattgtcgt aagaattaaa  240
taagcttcgt cccactcctt attggattta cgcacacagt caatccacgt ggttgtcata  300
actaaatata attggtgaaa aaactaattt aaagacaaag taagaagcgg aaaccgaagg  360
aaaagccaaa caacattatg tttatcgaca aaaaagccaa aacaacattt aatgttaatt  420
tttgtccaaa ccaggaatac atcactcata cggtcatata taccataccc caaattgtat  480
gtactacatg tgtacgtaac tgatttatgt atatctatct atttctcttt tattgtaggg  540
gtcaaaatct acctatcgat atttataaat aggattttat aagacattgt taaaatggaa  600
aacatggtag ctacttggcc agcgattaac atcaataatt aaaaatacga attgtgaaac  660
```

```
atctcactct cttcctttta tcacaccaaa ccacttctct ttctttactt accggtcagg  720
tcaacaattc taccattccc tttatttagt tttttttttt catctatctc tcttttcatt  780
tttaactttt aaaaaatatt agtccgaaaa tcgcactctt ttatattcgt tgatgggcat  840
taaaatattg taaaaattaa aaaaaatgtg taaattaaaa cgcaatttgt ttgcacctgc  900
agcagtagta acacacaagt caaagcaatg tctgtttttct cttgtatgtc ggttagctat  960
tttatgtact gaaatatgtt attctttctg accaaaacat attaagaaat ttgcattctg  1020
taatttgatt tatccaatca gtagaggaca cgtaaccaag ataattagat atttttattc  1080
tatctgtata ctactaattc atccaacgtc tgttggacga ccaaccagtc aaaactcata  1140
aaagtcaact tttactacat cgtgaatttt ttggtcatgc atttatatac acatacatgg  1200
aagaaaaaac aatactttac ctatgtcaaa atgctgcaaa agcattaaga tggtatgtat  1260
acatacatat tgatataaca gtggtcccat atatcatttt aaatcatcat aaagagtatc  1320
catcttcttt catattaaca tccccttcaa agttataaga tttttctctc ttcattagag  1380
agagagagag agagaattaa cacaagtttt aatctccggg aaag                  1424

SEQ ID NO: 88          moltype = DNA  length = 1982
FEATURE                Location/Qualifiers
source                 1..1982
                       mol_type = genomic DNA
                       organism = Thlaspi arvense
SEQUENCE: 88
tttaagactc taacaatatt gatgccaact ctagaaaagg acaactgaac ttattttgtt  60
ttaagccttg gctatattac attatcagtt ttacacttct acgtatacac aactttaatt  120
tttctatatt actacatgca tactagatgt tagaaatatc ttatataagc atacatatta  180
aattagttat gcgatattta aaattaatgt atataaatat tcagtttcaa agcttacgaa  240
tacgtaaaat taatcaatac aaaccgaaac caaaaagcca cttctcatct caaaatgtta  300
attacaaatt tacaataagc cgaatcacta tctaaaaagc ttttgggatc ccgagaccca  360
aaacatttct tcgtataagt gcaacaatta tcgagtgtga tgagacacgt aaaaagcaag  420
gatcgggaca acgattttcg gctatatagt agtttctcat atctgacttt attagcaaat  480
tactacataa aattgctttt aagtatgatt aacggaacaa gtataatgcg tttatttaat  540
tacagatctg gctaaatgta atatggtatc aaagctggaa agacaaatag tctaaggttt  600
ggaatttttc atctgtctat aaaattctta agacactgat agatcattaa cttattttgg  660
agtcaccaat ggacaaatca ataactattg atgtccaaaa cccacaagac aagcctattt  720
tttttgcacg tgcaagtaca ccggtggaag aattcatttg tatactgaat ctgaaattat  780
aaaagattag aattggttga agaatttact tcaaaacaag ctagaagatg gtgttattta  840
aataaacaat gttaaattat atcaatgact ttcaaatttt atcaaaacat tttttgaaag  900
agaatcacgc acaaagtatt tcgaattaca aaacaatttt ttgcaataaa ttttatagtt  960
aaagcaaatt ttgtcaatta ttgaaaaaaa ttacttagat aaaatatcta attttttttt  1020
ttaaacaatg tctctataaa agatggatta gccaagaaaa tctgatggat gctacaacgc  1080
agggttggag atatggtgct gacactacat actattaatt ggttgataga atcggtaaat  1140
atagatatga atatcgaaat ggagacaaca ggaaactcaa ccgtatggaa ggaataaaat  1200
agaggaactt taaagagaac ttgaggatat acaaacagat gactcacgta tgcaagagaa  1260
gcttaatgag ataacaaata actaaaggat gcgtatcggg atgagaaaca attctggcaa  1320
cagaagagca gaaacttatg gaacaaatgt ggagatttta atacataatt ttataatact  1380
tcaacaaagc aacggaggac tataaacaga atagtgggac tacatgatag tcagggtgta  1440
tggataactt aggttgcatg gaaactccct ccgaggtacg tttctcgctt ccgaaacgtt  1500
tcggaaaccg aaactctcgg aagctcgtcg gaaacacaaa aatcacgttt cctaaaaatt  1560
ctaatttgtg aatactttgg aaacacgttt ccattttaaa aacacatgtt tccattttgg  1620
aaagaagata aaaactaatt ttttttgttt tatgaaataa atagataatt ataaaaatta  1680
gatttaaatg atcaatttaa ttatttatag taaataataa ttgatttggt aactaaaatt  1740
aattttgata ttattaagtt tgaaaattat tctttccatg aattagaatt agagatagtt  1800
tggttaatga aactaataaa attgataata aagaaaatct tctaaatttt tgactttaca  1860
tattttaatt tttatagttt aataattatg taaaaattat atattagatt ttgttgattt  1920
aaatattcta cttataacat aattagatct ttaataatta atatatatat atacacattt  1980
cc                                                                1982

SEQ ID NO: 89          moltype = DNA  length = 24
FEATURE                Location/Qualifiers
source                 1..24
                       mol_type = genomic DNA
                       organism = Thlaspi arvense
SEQUENCE: 89
attgtatatc atgatccatg gcga                                        24

SEQ ID NO: 90          moltype = DNA  length = 24
FEATURE                Location/Qualifiers
source                 1..24
                       mol_type = genomic DNA
                       organism = Thlaspi arvense
SEQUENCE: 90
aaactcgcca tggatcatga tata                                        24

SEQ ID NO: 91          moltype = DNA  length = 24
FEATURE                Location/Qualifiers
source                 1..24
                       mol_type = genomic DNA
                       organism = Thlaspi arvense
SEQUENCE: 91
attgatctga tggatttgga aggt                                        24
```

```
SEQ ID NO: 92           moltype = DNA  length = 24
FEATURE                 Location/Qualifiers
source                  1..24
                        mol_type = genomic DNA
                        organism = Thlaspi arvense
SEQUENCE: 92
aaacaccttc caaatccatc agat                                          24

SEQ ID NO: 93           moltype = DNA  length = 24
FEATURE                 Location/Qualifiers
source                  1..24
                        mol_type = genomic DNA
                        organism = Thlaspi arvense
SEQUENCE: 93
attgttcgtg ctgatgaatc ttct                                          24

SEQ ID NO: 94           moltype = DNA  length = 24
FEATURE                 Location/Qualifiers
source                  1..24
                        mol_type = genomic DNA
                        organism = Thlaspi arvense
SEQUENCE: 94
aaacagaaga ttcatcagca cgaa                                          24

SEQ ID NO: 95           moltype = DNA  length = 24
FEATURE                 Location/Qualifiers
source                  1..24
                        mol_type = genomic DNA
                        organism = Thlaspi arvense
SEQUENCE: 95
attgacaacg gtgcaataaa gacg                                          24

SEQ ID NO: 96           moltype = DNA  length = 24
FEATURE                 Location/Qualifiers
source                  1..24
                        mol_type = genomic DNA
                        organism = Thlaspi arvense
SEQUENCE: 96
aaaccgtctt tattgcaccg ttgt                                          24

SEQ ID NO: 97           moltype = DNA  length = 24
FEATURE                 Location/Qualifiers
source                  1..24
                        mol_type = genomic DNA
                        organism = Thlaspi arvense
SEQUENCE: 97
attggcatgc cctagcttcc gatg                                          24

SEQ ID NO: 98           moltype = DNA  length = 24
FEATURE                 Location/Qualifiers
source                  1..24
                        mol_type = genomic DNA
                        organism = Thlaspi arvense
SEQUENCE: 98
aaaccatcgg aagctagggc atgc                                          24

SEQ ID NO: 99           moltype = DNA  length = 24
FEATURE                 Location/Qualifiers
source                  1..24
                        mol_type = genomic DNA
                        organism = Thlaspi arvense
SEQUENCE: 99
attgatgcac ggcattatcg ccgg                                          24

SEQ ID NO: 100          moltype = DNA  length = 24
FEATURE                 Location/Qualifiers
source                  1..24
                        mol_type = genomic DNA
                        organism = Thlaspi arvense
SEQUENCE: 100
aaacccggcg ataatgccgt gcat                                          24

SEQ ID NO: 101          moltype = DNA  length = 24
FEATURE                 Location/Qualifiers
source                  1..24
                        mol_type = genomic DNA
                        organism = Thlaspi arvense
SEQUENCE: 101
attgagtttc ctggaccagt gtta                                          24
```

```
SEQ ID NO: 102          moltype = DNA  length = 24
FEATURE                 Location/Qualifiers
source                  1..24
                        mol_type = genomic DNA
                        organism = Thlaspi arvense
SEQUENCE: 102
aaactaacac tggtccagga aact                                          24

SEQ ID NO: 103          moltype = DNA  length = 24
FEATURE                 Location/Qualifiers
source                  1..24
                        mol_type = genomic DNA
                        organism = Thlaspi arvense
SEQUENCE: 103
attgccatcg aagacgcgac tgtt                                          24

SEQ ID NO: 104          moltype = DNA  length = 24
FEATURE                 Location/Qualifiers
source                  1..24
                        mol_type = genomic DNA
                        organism = Thlaspi arvense
SEQUENCE: 104
aaacaacagt cgcgtcttcg atgg                                          24

SEQ ID NO: 105          moltype = DNA  length = 24
FEATURE                 Location/Qualifiers
source                  1..24
                        mol_type = genomic DNA
                        organism = Thlaspi arvense
SEQUENCE: 105
attggttctc tgcgatgctc acat                                          24

SEQ ID NO: 106          moltype = DNA  length = 24
FEATURE                 Location/Qualifiers
source                  1..24
                        mol_type = genomic DNA
                        organism = Thlaspi arvense
SEQUENCE: 106
aaacatgtga gcatcgcaga gaac                                          24

SEQ ID NO: 107          moltype = DNA  length = 24
FEATURE                 Location/Qualifiers
source                  1..24
                        mol_type = genomic DNA
                        organism = Thlaspi arvense
SEQUENCE: 107
attggaccga tacttgaaga ccag                                          24

SEQ ID NO: 108          moltype = DNA  length = 24
FEATURE                 Location/Qualifiers
source                  1..24
                        mol_type = genomic DNA
                        organism = Thlaspi arvense
SEQUENCE: 108
aaacctggtc ttcaagtatc ggtc                                          24

SEQ ID NO: 109          moltype = DNA  length = 20
FEATURE                 Location/Qualifiers
source                  1..20
                        mol_type = genomic DNA
                        organism = Thlaspi arvense
SEQUENCE: 109
cggaagaggc tgcgttagag                                               20

SEQ ID NO: 110          moltype = DNA  length = 20
FEATURE                 Location/Qualifiers
source                  1..20
                        mol_type = genomic DNA
                        organism = Thlaspi arvense
SEQUENCE: 110
gcagctaagg gaactttacg                                               20

SEQ ID NO: 111          moltype = DNA  length = 20
FEATURE                 Location/Qualifiers
source                  1..20
                        mol_type = genomic DNA
                        organism = Thlaspi arvense
SEQUENCE: 111
```

```
cggaagaggc tgcgttagag                                            20

SEQ ID NO: 112          moltype = DNA  length = 20
FEATURE                 Location/Qualifiers
source                  1..20
                        mol_type = genomic DNA
                        organism = Thlaspi arvense
SEQUENCE: 112
caggaaaggc gtatgcgagg                                            20

SEQ ID NO: 113          moltype = DNA  length = 20
FEATURE                 Location/Qualifiers
source                  1..20
                        mol_type = genomic DNA
                        organism = Thlaspi arvense
SEQUENCE: 113
cgccgtcgga agcttcctcg                                            20

SEQ ID NO: 114          moltype = DNA  length = 20
FEATURE                 Location/Qualifiers
source                  1..20
                        mol_type = genomic DNA
                        organism = Thlaspi arvense
SEQUENCE: 114
caaacaagac ctgaggtaca                                            20

SEQ ID NO: 115          moltype = DNA  length = 20
FEATURE                 Location/Qualifiers
source                  1..20
                        mol_type = genomic DNA
                        organism = Thlaspi arvense
SEQUENCE: 115
agcattccac catcatctac                                            20

SEQ ID NO: 116          moltype = DNA  length = 20
FEATURE                 Location/Qualifiers
source                  1..20
                        mol_type = genomic DNA
                        organism = Thlaspi arvense
SEQUENCE: 116
tcgactggaa cgacgtcgag                                            20

SEQ ID NO: 117          moltype = DNA  length = 1188
FEATURE                 Location/Qualifiers
source                  1..1188
                        mol_type = genomic DNA
                        organism = Thlaspi arvense
SEQUENCE: 117
atggtgatgg gtacacaacc gtcgttggaa gagatcagaa aggcacagag agcggatggc  60
cccgcaggca tcttggggat aggcacggcc aaccctgcga accatgtgat ccaggcagag  120
tatccggact actacttccg catcaccaac agtgagcaca tgactgacct caaggagaag  180
ttcaagcgca tgtgcgacaa gtcgatgata cggaaacggc acatgcacct gacggaggag  240
ttcctgaagg agaatccgga catgtgcgcc tacatggctc cttctcttga tgtgaggcag  300
gacatcgtgg tggtcgaggt ccctaagcta gggaaagagg cggcagtgaa ggccatcaag  360
gagtggggtc agcccaagtc caagatcacc cacgtcgtct tctgcactac atccggagtt  420
gacatgcctg gtgctgacta ccagctcacc aagctcctcg gtcttcgccc ttccgtcaag  480
cgtctcatga tgtaccagca aggttgctac gccggcggca ctgtcctccg actcgccaag  540
gacctcgctg agaataaccg tggtgctcgt gtccttgtcg tctgctccaa gatcacagcc  600
gtcaccttcc gtggcccctc tgacacacac ctcgactccc tcgttggtca ggctctcttc  660
agtgacggtg ctgccgcgct cattgttggt gcggaccctg atgcctccgt gggagagaag  720
cctatcttcg agatggtgtc tgctgcacag accatcctcc cagactcgga cggagccata  780
gatggacact tgagggaagt tgggctcacc ttccatctcc tcaaggacgt ccctgggctc  840
atctcgaaga acatagagaa gagtctagaa gaagcgttta aaccgctcgg gataagtgac  900
tggaactctc tcttttggat agctcaccct ggaggtcctg cgatcctgga ccaggttgag  960
ttaaagctag gactcaagga agagaagatg agggccacgc gtcacgtgct gagcgagtac  1020
ggaaacatgt cgagcgcgtg cgttctcttc attatggacg agatgaggag gaagtccaag  1080
gaggatggtg tggccacgac aggagaaggg ttggagtggg gtgtcttgtt tggtttcgga  1140
ccaggtctca ccgtagagac agtcgtcttg cacagcgtcc ctgtttga               1188

SEQ ID NO: 118          moltype = AA  length = 395
FEATURE                 Location/Qualifiers
source                  1..395
                        mol_type = protein
                        organism = Thlaspi arvense
SEQUENCE: 118
MVMGTQPSLE EIRKAQRADG PAGILGIGTA NPANHVIQAE YPDYYFRITN SEHMTDLKEK  60
FKRMCDKSMI RKRHMHLTEE FLKENPDMCA YMAPSLDVRQ DIVVVEVPKL GKEAAVKAIK  120
EWGQPKSKIT HVVFCTTSGV DMPGADYQLT KLLGLRPSVK RLMMYQQGCY AGGTVLRLAK  180
DLAENNRGAR VLVVCSKITA VTFRGPSDTH LDSLVGQALF SDGAAALIVG ADPDASVGEK  240
```

```
PIFEMVSAAQ TILPDSDGAI DGHLREVGLT FHLLKDVPGL ISKNIEKSLE EAFKPLGISD  300
WNSLFWIAHP GGPAILDQVE LKLGLKEEKM RATRHVLSEY GNMSSACVLF IMDEMRRKSK  360
EDGVATTGEG LEWGVLFGFG PGLTVETVVL HSVPV                            395

SEQ ID NO: 119         moltype = DNA  length = 1188
FEATURE                Location/Qualifiers
source                 1..1188
                       mol_type = genomic DNA
                       organism = Thlaspi arvense
SEQUENCE: 119
atggtgatgg gtacacaacc gtcgttggaa gagatcagaa aggcacagag agcggatggc  60
cccgcaggca tcttggggat aggcacggcc aaccctgcga accatgtgat ccaggcagag  120
tatccggact actacttccg catcaccaac agtgagcaca tgactgacct caaggagaag  180
ttcaagcgca tgtgcgacaa gtcgatgata cggaaacggc acatgcacct gacggaggag  240
ttcctgaagg agaatccgga catgtgcgcc tacatggctc cttctcttga tgtgaggcag  300
gacatcgtgg tggtcgaggt ccctaagcta gggaaagagg cggcagtgaa ggccatcaag  360
gagtggggtc agcccaagtc caagatcacc cacgtcgtct tctgcactac atccggagtt  420
gacatgcctg gtgctgacta ccagctcacc aagctcctcg gtcttcgccc ttccgtcaag  480
cgtctcatga tgtaccagca aggttgctac gccggcggca ctgtcctccg actcgccaag  540
gacctcgctg agaataaccg tggtgctcgt gtccttgtcg tctgctccga gatcacagcc  600
gtcaccttcc gtggcccctc tgacacacac ctcgactccc tcgttggtca ggctctcttc  660
agtgacggtg ctgccgcgct cattgttggt gcggaccctg atgcctccgt gggagagaag  720
cctatcttcg agatggtgtc tgctgcacag accatcctcc cagactcgga cggagccata  780
gatggacact tgagggaagt tggctcacc ttccatctcc tcaaggacgt ccctgggctc  840
atctcgaaga acatagagaa gagtctagaa gaagcgttta aaccgctcgg gataagtgac  900
tgaaactctc tcttttggat agctcaccct ggaggtcctg cgatcctgga ccaggttgag  960
ttaaagctag gactcaagga agagaagatg agggccacgc gtcacgtgct gagcgagtac  1020
ggaaacatgt cgagcgcgtg cgttctcttc attatggacg agatgaggag gaagtccaag  1080
gaggatggtg tggccacgac aggagaaggg ttggagtggg gtgtcttgtt tggtttcgga  1140
ccaggtctca ccgtagagac agtcgtcttg cacagcgtcc ctgtttga              1188

SEQ ID NO: 120         moltype = AA  length = 300
FEATURE                Location/Qualifiers
source                 1..300
                       mol_type = protein
                       organism = Thlaspi arvense
SEQUENCE: 120
MVMGTQPSLE EIRKAQRADG PAGILGIGTA NPANHVIQAE YPDYYFRITN SEHMTDLKEK  60
FKRMCDKSMI RKRHMHLTEE FLKENPDMCA YMAPSLDVRQ DIVVVEVPKL GKEAAVKAIK  120
EWGQPKSKIT HVVFCTTSGV DMPGADYQLT KLLGLRPSVK RLMMYQQGCY AGGTVLRLAK  180
DLAENNRGAR VLVVCSEITA VTFRGPSDTH LDSLVGQALF SDGAAALIVG ADPDASVGEK  240
PIFEMVSAAQ TILPDSDGAI DGHLREVGLT FHLLKDVPGL ISKNIEKSLE EAFKPLGISD  300

SEQ ID NO: 121         moltype = DNA  length = 1239
FEATURE                Location/Qualifiers
source                 1..1239
                       mol_type = genomic DNA
                       organism = Thlaspi arvense
SEQUENCE: 121
atggctccag ggactctcac cgagctcgcc ggagaggcta agctcaactc taaattcgtc  60
cgggacgagg acgaacgtcc caaggtggca tacaacaagt ttagcgacga tatcccggtg  120
atatctctcg ccggactcga cgatgttggt gggaaaagag gagagatctg ccgtaagatc  180
gttgaggctt gcgagaattg gggcgtgttc caggtggtcg atcatggtgt cgataccaat  240
ttggtagagg atatgactcg cctcgctcgc gacttctttg ctttaccacc cgaagagaaa  300
cttagtttcg acatgtctgg tggtaagaaa ggcggcttca tcgtctctag tcaccttcag  360
ggagagactg tgtaagattg gagagagatc gtgacgtact tctcgtaccc ggtgagaaac  420
agagactact cacggtggcc agataagccg gaagggtggg tgaaagtgac ggaggagtac  480
agcgacaaac tgatgggttt agcttgtaag cttcttgagg ttttgtctga agctatgggg  540
ctcgagaaag aagcacttac caatgcttgc gtcgatatgg accaaaagat agttgttaat  600
tattacccta aatgccctca gcctgatctc accctcggac tcaagcgtca cactgatcct  660
ggaaccatca ctttgctgct ccaagaccag gtcggtggat tacaagccac acgcgacgat  720
ggcaaaacat ggataacggt tcagccaatt gagggagctt ttgtcgtgaa tctcggcgac  780
catggtcact atttgagcaa cgggaggttc aagaacgcgg atcatcaggc ggtggtgaat  840
tccaactcga gcaggctatc tatagccacg tttcagaatc cggcgcagga tgcaaccgtg  900
tatccgctta aagttagaga aggagagaag ccgatcttgg aggagccaat cacttttgca  960
gagatgtata agagaaagat gggaaaagat ctggagctgg ctcgcctcaa gaagcttgcg  1020
aaagaagaaa atgaccagaa gctggccaaa gaagaacatg acaagaacct ggccaaagaa  1080
gaaaatgatc agaagctggc taaagaagaa catgaccaga agctggccaa agaagaacat  1140
gacaagagcc ttgccaaaga agaaaattac caaaagctgg ccaaagatga acatagccac  1200
acggaagctg ttaagcgtct cggccaaatc ctcgcttag                        1239

SEQ ID NO: 122         moltype = AA  length = 124
FEATURE                Location/Qualifiers
source                 1..124
                       mol_type = protein
                       organism = Thlaspi arvense
SEQUENCE: 122
MAPGTLTELA GEAKLNSKFV RDEDERPKVA YNKFSDDIPV ISLAGLDDVG GKRGEICRKI  60
VEACENWGVF QVVDHGVDTN LVEDMTRLAR DFFALPPEEK LSFDMSGGKK GGFIVSSHLQ  120
```

```
GETV                                                              124

SEQ ID NO: 123          moltype = DNA  length = 1239
FEATURE                 Location/Qualifiers
source                  1..1239
                        mol_type = genomic DNA
                        organism = Thlaspi arvense
SEQUENCE: 123
atggctccag ggactctcac cgagctcgcc ggagaggcta agctcaactc taaattcgtc  60
cgggacgagg acgaacgtcc caaggtggca tacaacaagt ttagcgacga tatcccggtg  120
atatctctcg ccggactcga cgatgttggt gggaaaagag gagagatctg ccgtaagatc  180
gttgaggctt gcgagaattg gggcgtgttc caggtggtcg atcatggtgt cgataccaat  240
ttggtagagg atatgactcg cctcgctcgc gacttctttg ctttaccacc cgaagagaaa  300
cttagtttcg acatgtctgg tggtaagaaa ggcggcttca tcgtctctag tcaccttcag  360
ggagagactg tgcaagattg gagagagatc gtgacgtact tctcgtaccc ggtgagaaac  420
agagactact cacggtggcc agataagccg gaagggtggg tgaaagtgac ggaggagtac  480
agcgacaaac tgatgggttt agcttgtaag cttcttgagg ttttgtctga agctatgggg  540
ctcgagaaag aagcacttac caatgcttgc gtcgatatgg accaaaagat agttgttaat  600
tattacccta aatgccctca gcctgatctc accctcggac tcaagcgtca cactgatcct  660
ggaaccatca ctttgctgct ccaagaccag gtcggtggat tacaagccac acgcgacgat  720
ggcaaaacat ggataacggt tcagccaatt gagggagctt ttgtcgtgaa tctcggcgac  780
catggtcact atttgagcaa cgggaggttc aagaacgcgg atcatcaggc ggtggtgaat  840
tccaactcga gcaggctatc tatagccacg tttcagaatc tggcgcagga tgcaaccgtg  900
tatccgctta aagttagaga aggagagaag ccgatcttgg aggagccaat cacttttgca  960
gagatgtata agagaaagat gggaaaagat ctggagctgg ctcgcctcaa gaagcttgcg  1020
aaagaagaaa atgaccagaa gctggccaaa gaagaacatg acaagaacct ggccaaagaa  1080
gaaaatgatc agaagctggc taaagaagaa catgaccaga agctggccaa agaagaacat  1140
gacaagagcc ttgccaaaga agaaaattac caaaagctgg ccaaagatga acatagccac  1200
acggaagctg ttaagcgtct cggccaaatc ctcgcttag                         1239

SEQ ID NO: 124          moltype = AA  length = 412
FEATURE                 Location/Qualifiers
source                  1..412
                        mol_type = protein
                        organism = Thlaspi arvense
SEQUENCE: 124
MAPGTLTELA GEAKLNSKFV RDEDERPKVA YNKFSDDIPV ISLAGLDDVG GKRGEICRKI  60
VEACENWGVF QVVDHGVDTN LVEDMTRLAR DFFALPPEEK LSFDMSGGKK GGFIVSSHLQ  120
GETVQDWREI VTYFSYPVRN RDYSRWPDKP EGWVKVTEEY SDKLMGLACK LLEVLSEAMG  180
LEKEALTNAC VDMDQKIVVN YYPKCPQPDL TLGLKRHTDP GTITLLLQDQ VGGLQATRDD  240
GKTWITVQPI EGAFVVNLGD HGHYLSNGRF KNADHQAVVN SNSSRLSIAT FQNLAQDATV  300
YPLKVREGEK PILEEPITFA EMYKRKMGKD LELARLKKLA KEENDQKLAK EEHDKNLAKE  360
ENDQKLAKEE HDQKLAKEEH DKSLAKEENY QKLAKDEHSH TEAVKRLGQI LA         412

SEQ ID NO: 125          moltype = DNA  length = 1545
FEATURE                 Location/Qualifiers
source                  1..1545
                        mol_type = genomic DNA
                        organism = Thlaspi arvense
SEQUENCE: 125
atggccactc tcttactcac aatcctcctc cccactttcc tcttcctcct cgtcctcctc  60
ctttctctcc gccgcaacca caaccgcagt agccgtctcc caccaggccc aaaaccatgg  120
cccatcctcg gaaacctccc tcacatgggt cctaaacccc atcgaaccct agccgccatg  180
gtaaccacct acggtccaat cctccacctc cgattagggt tctccaacgt cgtggttgct  240
gcgtctaaat ccgtggccga acagttcttc aaaatccatg atgccaattt cgctagccga  300
ccaccaaatt caagagccaa acacatggca tataactatc aagatcttgt ctttgcgcct  360
tacggacaac gatggagaat gttgaggaag attagttctg ttcatttatt ttcagctaaa  420
gctcttgaag attacaagca tgttcggcag gaagaggtag gaacgctcac gcgcgagcta  480
gtggatgcag gcacgaaacc cgtaaactta ggccagttgg tgaacatgtg tgtggtcaac  540
gcgcttggaa gagagatgat cggacggcgt ctgttcggcg ccggagctga tcacaaagcg  600
gaggagtttc gatcgatggt gacggaaatg atggctctcg ccggagtatt caacctcgga  660
gatttcgtgc cggctctgga ttggttagat ttacaaggcg ttgctggtaa aatgaaacgg  720
ctacacaaaa gattcgacac ttttctatcg tcgattttga aggagcacga gatgatgcac  780
ggtcaagatc aaaagcataa agatatgctc agcactttaa tctcgctcaa gggaactgat  840
tttgacggtg acggcggaag cctaacggat actgagatca aagccttgct cttgaacatg  900
tttacggctg gaactgacac gtcagcaagt acggtggact gggccatagc tgaactgata  960
cgacacccgg atgcaatgac cagagcccaa gaagaacttg attcagttgt aggccgcgat  1020
aggcccatta acgagtcaga cctttctcgg cttccttatc ttcaggcggt tatcaaagag  1080
aatttcaggc ttcatccgcc gacaccactc tcgttaccac acatcgcatc agagagctgt  1140
gagatcaacg gctaccatat cccgaaagga tcgactcttt taacaaacat atgggccata  1200
gcccgtgacc cggaacaatg gtccgacccg ttatcgtttc gacccgagag atttttacag  1260
ggtggagaaa aatccggcgt cgatgtgaaa ggaagcgatt tcgagcttat accgttcgga  1320
gccgggagga gaatctgcgc tgggctcagt ttagggctac ggatgattca gttactgacg  1380
gcgacgctgg ttcacggatt tgattgggaa ttggccggag gaattccgcc ggagaagctg  1440
aatatggagg agacttatgg gattactctg caaagagcag ttcctttggt ggtgcatcct  1500
aagccaaggt tggctcccag tgtttacgaa ctcgggtcgc gctaa                   1545

SEQ ID NO: 126          moltype = AA  length = 514
FEATURE                 Location/Qualifiers
```

```
source                  1..514
                        mol_type = protein
                        organism = Thlaspi arvense
SEQUENCE: 126
MATLLLTILL PTFLFLLVLL LSLRRNHNRS SRLPPGPKPW PILGNLPHMG PKPHRTLAAM  60
VTTYGPILHL RLGFSNVVVA ASKSVAEQFF KIHDANFASR PPNSRAKHMA YNYQDLVFAP  120
YGQRWRMLRK ISSVHLFSAK ALEDYKHVRQ EEVGTLTREL VDAGTKPVNL GQLVNMCVVN  180
ALGREMIGRR LFGAGADHKA EEFRSMVTEM MALAGVFNLG DFVPALDWLD LQGVAGKMKR  240
LHKRFDTFLS SILKEHEMMH GQDQKHKDML STLISLKGTD FDGDGGSLTD TEIKALLLNM  300
FTAGTDTSAS TVDWAIAELI RHPDAMTRAQ EELDSVVGRD RPINESDLSR LPYLQAVIKE  360
NFRLHPPTPL SLPHIASESC EINGYHIPKG STLLTNIWAI ARDPEQWSDP LSFRPERFLQ  420
GGEKSGVDVK GSDFELIPFG AGRRICAGLS LGLRMIQLLT ATLVHGFDWE LAGGIPPEKL  480
NMEETYGITL QRAVPLVVHP KPRLAPSVYE LGSR                              514

SEQ ID NO: 127          moltype = DNA  length = 1581
FEATURE                 Location/Qualifiers
source                  1..1581
                        mol_type = genomic DNA
                        organism = Thlaspi arvense
SEQUENCE: 127
atggatgaat caagtatttt tacggcaaag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaag  180
acgaggaaga caactcagcc ggcggaagtg acggcggaag aggctgcgtt agagaggagt  240
cagcagctaa gggaacttta cgaggccctt ttggccggag agtcctcatc ggaagctagg  300
gcatgcacgg cattatcgcc ggaggatctg acggagactg aatggtttta tctaatgtgt  360
gtctctttct ctttccctcc tccttccggg atgccaggaa aggcgtatgc gaggaggaaa  420
cacgtatggc tatgtggtgc aaatgaggtt gacagtaaaa tcttttctag ggctattctc  480
gcaaagagtg ccaaaatcca gcagacagtg gtttgcattc ccatgcttga tggcgttgtg  540
gaactaggca caacgaacaa ggtaaaagaa gatatagcgt ttgttgagct cataaagagt  600
tttttccata accaccccaa gtcaaaccca aaagctgctc tttctgaaca ctccatcaac  660
gaagagcacg aagaagacga agaacaagaa gaagaagaag aagaagaagt agaagaagaa  720
atgacaatgt cagaggagat aaggcttggc tctcctgatg atgatgacgt ctccaatcaa  780
aacctactct ctgatttcca tgtagaatca acccacactt tagacacaca catggacatg  840
atgaatctaa tggaggaggg tggaaactat tctcagacag tatcaacact tcttatgtca  900
caacccacga gtctttttc agattcagtt tccacatctt cttacatcca atcatcattt  960
gccacatgga aggctgataa ttttaaagag catcagcgag tggaaactaa atcgacgtcg  1020
tcgtcgcaat ggatgctcaa acacataatc ttgagagttc ctttactcca cgaccacact  1080
aaagaaaaga ggctgcctcg agaagagctt aatcacgtgg tggcagagcg ccgcaggaga  1140
gagaagctga atgagagatt cataacactg agatcattgg ttccctttgt gaccaagatg  1200
gataaagtct caattcttgg agacaccatc aactacgtaa accatcttcg aaatagggtc  1260
caagagctgg agactaatca tcacgaacaa aaacataagc ggatgcgtag ctgtaaggga  1320
aaaacgtggg aagaggtcgt tgaggtttcc atcatagaga gtgatgtttt gttagagatg  1380
agatgcgagt accgagatgg tctattgctc gacatccttc aggttcttaa ggaacatggt  1440
atagagacta ctgcagttca taccgcggtg aacgagcgtg atttcgaggc cgagataagg  1500
gctatggtga gagggaagaa accaagcatt gctgaggtca aaagagccat ccatcaaact  1560
atatccaata ttaaactata g                                            1581

SEQ ID NO: 128          moltype = AA  length = 526
FEATURE                 Location/Qualifiers
source                  1..526
                        mol_type = protein
                        organism = Thlaspi arvense
SEQUENCE: 128
MDESSIFTAK KVIGAEKREL QGLLKAAVQS VEWTYSLFWQ LCPQQRVLLW ENGYYNGAIK  60
TRKTTQPAEV TAEEAALERS QQLRELYEAL LAGESSSEAR ACTALSPEDL TETEWFYLMC  120
VSFSFPPPSG MPGKAYARRK HVWLCGANEV DSKIFSRAIL AKSAKIQQTV VCIPMLDGVV  180
ELGTTNKVKE DIAFVELIKS FFHNHPKSNP KAALSEHSIN EEHEEDEEQE EEEEEEVEEE  240
MTMSEEIRLG SPDDDDVSNQ NLLSDFHVES THTLDTHMDM MNLMEEGGNY SQTVSTLLMS  300
QPTSLFSDSV STSSYIQSSF ATWKADNFKE HQRVETKSTS SSQWMLKHII LRVPLLHDHT  360
KEKRLPREEL NHVVAERRRR EKLNERFITL RSLVPFVTKM DKVSILGDTI NYVNHLRNRV  420
QELETNHHEQ KHKRMRSCKG KTWEEVVEVS IIESDVLLEM RCEYRDGLLL DILQVLKEHG  480
IETTAVHTAV NERDFEAEIR AMVRGKKPSI AEVKRAIHQT ISNIKL                 526

SEQ ID NO: 129          moltype = DNA  length = 1581
FEATURE                 Location/Qualifiers
source                  1..1581
                        mol_type = genomic DNA
                        organism = Thlaspi arvense
SEQUENCE: 129
atggatgaat caagtatttt tacggcagag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaag  180
acgaggaaga caactcagcc ggcggaagtg acggcggaag aggctgcgtt agagaggagt  240
cagcagctaa gggaacttta cgaggccctt ttggccggag agtcctcatc ggaagctagg  300
gcatgcacgg cattatcgcc ggaggatctg acggagactg aatggtttta tctaatgtgt  360
gtctctttct ctttccctcc tccttccggg atgccaggaa aggcgtatgc gaggaggaaa  420
cacgtatggc tatgtggtgc aaatgaggtt gacagtaaaa tcttttctag ggctattctc  480
gcaaagagtg ccaaaatcca gcagacagtg gtttgcattc ccatgcttga tggcgttgtg  540
```

```
gaactaggca caacgaacaa ggtaaaagaa gatatagcgt ttgttgagct cataaagagt  600
tttttccata accaccccaa gtcaaaccca aaagctgctc tttctgaaca ctccatcaac  660
gaagagcacg aagaagacga agaacaagaa gaagaagaag aagaagaagt agaagaagaa  720
atgacaatgt cagaggagat aaggcttggc tctcctgatg atgatgacgt ctccaatcaa  780
aacctactct ctgatttcca tgtagaatca acccacactt tagacacaca catggacatg  840
atgaatctaa tggaggaggg tggaaactat tctcagacag tatcaacact tcttatgtca  900
caacccacga gtctttttc agattcagtt tccacatctt cttacatcta atcatcattt  960
gccacatgga aggctgataa ttttaaagag catcagcgag tggaaactaa atcgacgtcg  1020
tcgtcgcaat ggatgctcaa acacataatc ttgagagttc ctttactcca cgaccacact  1080
aaagaaaaga ggctgcctcg agaagagctt aatcacgtgg tggcagagcg ccgcaggaga  1140
gagaagctga atgagagatt cataacactg agatcattgg ttccctttgt gaccaagatg  1200
gataaagtct caattcttgg agacaccatc aactacgtaa accatcttcg aaatagggtc  1260
caagagctgg agactaatca tcacgaacaa aaacataagc ggatgcgtag ctgtaaggga  1320
aaaacgtggg aagaggtcgt tgaggtttcc atcatagaga gtgatgtttt gttagagatg  1380
agatgcgagt accgagatgg tctattgctc gacatccttc aggttcttaa ggaacatggt  1440
atagagacta ctgcagttca taccgcggtg aacgagcgtg atttcgaggc cgagataagg  1500
gctatggtga gagggaagaa accaagcatt gctgaggtca aaagagccat ccatcaaact  1560
atatccaata ttaaactata g                                            1581

SEQ ID NO: 130         moltype = AA  length = 316
FEATURE                Location/Qualifiers
source                 1..316
                       mol_type = protein
                       organism = Thlaspi arvense
SEQUENCE: 130
MDESSIFTAE KVIGAEKREL QGLLKAAVQS VEWTYSLFWQ LCPQQRVLLW ENGYYNGAIK  60
TRKTTQPAEV TAEEAALERS QQLRELYEAL LAGESSSEAR ACTALSPEDL TETEWFYLMC  120
VSFSFPPPSG MPGKAYARRK HVWLCGANEV DSKIFSRAIL AKSAKIQQTV VCIPMLDGVV  180
ELGTTNKVKE DIAFVELIKS FFHNHPKSNP KAALSEHSIN EEHEEDEEQE EEEEEEVEEE  240
MTMSEEIRLG SPDDDDVSNQ NLLSDFHVES THTLDTHMDM MNLMEEGGNY SQTVSTLLMS  300
QPTSLFSDSV STSSYI                                                  316

SEQ ID NO: 131         moltype = DNA  length = 1581
FEATURE                Location/Qualifiers
source                 1..1581
                       mol_type = genomic DNA
                       organism = Thlaspi arvense
SEQUENCE: 131
atggatgaat caagtatttt tacggcagag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaag  180
acgaggaaga caactcagcc ggcggaagtg acggcggaag aggctgcgtt agagaggagt  240
cagcagctaa gggaacttta cgaggccctt ttggccggag agtcctcatc ggaagctagg  300
gcatgcacgg cattatcgcc ggaggatctg acggagactg aatggtttta tctaatgtgt  360
gtctctttct ctttccctcc tccttccggg atgccaggaa aggcgtatgc gaggaggaaa  420
cacgtatggc tatgtggtgc aaatgaggtt gacagtaaaa tcttttctag ggctattctc  480
gcaaagagtg ccaaaatcca gcagacagtg gtttgcattc ccatgcttga tggcgttgtg  540
gaactaggca caacgaacaa ggtaaaagaa gatatagcgt ttgttgagct cataaagagt  600
tttttccata accaccccaa gtcaaaccca aaagctgctc tttctgaaca ctccatcaac  660
gaagagcacg aagaagacga agaacaagaa gaagaagaag aagaagaagt agaagaagaa  720
atgacaatgt cagaggagat aaggcttggc tctcctgatg atgatgacgt ctccaatcaa  780
aacctactct ctgatttcca tgtagaatca acccacactt tagacacaca catggacatg  840
atgaatctaa tggaggaggg tggaaactat tctcagacag tatcaacact tcttatgtca  900
caacccacga gtctttttc agattcagtt tccacatctt cttacatcca atcatcattt  960
gccacatgaa aggctgataa ttttaaagag catcagcgag tggaaactaa atcgacgtcg  1020
tcgtcgcaat ggatgctcaa acacataatc ttgagagttc ctttactcca cgaccacact  1080
aaagaaaaga ggctgcctcg agaagagctt aatcacgtgg tggcagagcg ccgcaggaga  1140
gagaagctga atgagagatt cataacactg agatcattgg ttccctttgt gaccaagatg  1200
gataaagtct caattcttgg agacaccatc aactacgtaa accatcttcg aaatagggtc  1260
caagagctgg agactaatca tcacgaacaa aaacataagc ggatgcgtag ctgtaaggga  1320
aaaacgtggg aagaggtcgt tgaggtttcc atcatagaga gtgatgtttt gttagagatg  1380
agatgcgagt accgagatgg tctattgctc gacatccttc aggttcttaa ggaacatggt  1440
atagagacta ctgcagttca taccgcggtg aacgagcgtg atttcgaggc cgagataagg  1500
gctatggtga gagggaagaa accaagcatt gctgaggtca aaagagccat ccatcaaact  1560
atatccaata ttaaactata g                                            1581

SEQ ID NO: 132         moltype = AA  length = 322
FEATURE                Location/Qualifiers
source                 1..322
                       mol_type = protein
                       organism = Thlaspi arvense
SEQUENCE: 132
MDESSIFTAE KVIGAEKREL QGLLKAAVQS VEWTYSLFWQ LCPQQRVLLW ENGYYNGAIK  60
TRKTTQPAEV TAEEAALERS QQLRELYEAL LAGESSSEAR ACTALSPEDL TETEWFYLMC  120
VSFSFPPPSG MPGKAYARRK HVWLCGANEV DSKIFSRAIL AKSAKIQQTV VCIPMLDGVV  180
ELGTTNKVKE DIAFVELIKS FFHNHPKSNP KAALSEHSIN EEHEEDEEQE EEEEEEVEEE  240
MTMSEEIRLG SPDDDDVSNQ NLLSDFHVES THTLDTHMDM MNLMEEGGNY SQTVSTLLMS  300
QPTSLFSDSV STSSYIQSSF AT                                           322
```

```
SEQ ID NO: 133          moltype = DNA  length = 1582
FEATURE                 Location/Qualifiers
source                  1..1582
                        mol_type = genomic DNA
                        organism = Thlaspi arvense
SEQUENCE: 133
atggatgaat caagtatttt tacggcagag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaag  180
aacgaggaag acaactcagc cggcggaagt gacggcggaa gaggctgcgt tagagaggag  240
tcagcagcta agggaacttt acgaggccct tttggccgga gagtcctcat cggaagctag  300
ggcatgcacg gcattatcgc cggaggatct gacggagact gaatggtttt atctaatgtg  360
tgtctctttc tctttccctc ctccttccgg gatgccagga aaggcgtatg cgaggaggaa  420
acacgtatgg ctatgtggtg caaatgaggt tgacagtaaa atcttttcta gggctattct  480
cgcaaagagt gccaaaatcc agcagacagt ggtttgcatt cccatgcttg atggcgttgt  540
ggaactaggc acaacgaaca aggtaaaaga agatatagcg tttgttgagc tcataaagag  600
tttttttccat aaccacccca agtcaaaccc aaaagctgct ctttctgaac actccatcaa  660
cgaagagcac gaagaagacg aagaacaaga agaagaagaa gaagaagaag tagaagaaga  720
aatgacaatg tcagaggaga taaggcttgg ctctcctgat gatgatgacg tctccaatca  780
aaacctactc tctgatttcc atgtagaatc aacccacact ttagacacac acatggacat  840
gatgaatcta atggaggagg gtggaaacta ttctcagaca gtatcaacac ttcttatgtc  900
acaacccacg agtcttttt cagattcagt ttccacatct tcttacatcc aatcatcatt  960
tgccacatgg aaggctgata attttaaaga gcatcagcga gtggaaacta aatcgacgtc  1020
gtcgtcgcaa tggatgctca aacacataat cttgagagtt cctttactcc acgaccacac  1080
taaagaaaag aggctgcctc gagaagagct taatcacgtg gtggcagagc gccgcaggag  1140
agagaagctg aatgagagat tcataacact gagatcattg gttccctttg tgaccaagat  1200
ggataaagtc tcaattcttg gagacaccat caactacgta aaccatcttc gaaatagggt  1260
ccaagagctg gagactaatc atcacgaaca aaaacataag cggatgcgta gctgtaaggg  1320
aaaaacgtgg gaagaggtcg ttgaggtttc catcatagag agtgatgttt tgttagagat  1380
gagatgcgag taccgagatg gtctattgct cgacatcctt caggttctta aggaacatgg  1440
tatagagact actgcagttc ataccgcggt gaacgagcgt gatttcgagg ccgagataag  1500
ggctatggtg agagggaaga aaccaagcat tgctgaggtc aaaagagcca tccatcaaac  1560
tatatccaat attaaactat ag                                          1582

SEQ ID NO: 134          moltype = AA  length = 99
FEATURE                 Location/Qualifiers
source                  1..99
                        mol_type = protein
                        organism = Thlaspi arvense
SEQUENCE: 134
MDESSIFTAE KVIGAEKREL QGLLKAAVQS VEWTYSLFWQ LCPQQRVLLW ENGYYNGAIK  60
NEEDNSAGGS DGGRGCVREE SAAKGTLRGP FGRRVLIGS                        99

SEQ ID NO: 135          moltype = DNA  length = 1579
FEATURE                 Location/Qualifiers
source                  1..1579
                        mol_type = genomic DNA
                        organism = Thlaspi arvense
SEQUENCE: 135
atggatgaat caagtatttt tacggcagag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaac  180
gaggaagaca actcagccgg cggaagtgac ggcggaagag gctgcgttag agaggagtca  240
gcagctaagg gaactttacg aggccctttt ggccggagag tcctcatcgg aagctagggc  300
atgcacggca ttatcgccgg aggatctgac ggagactgaa tggttttatc taatgtgtgt  360
ctctttctct ttccctcctc cttccgggat gccaggaaag gcgtatgcga ggaggaaaca  420
cgtatggcta tgtggtgcaa atgaggttga cagtaaaatc ttttctaggg ctattctcgc  480
aaagagtgcc aaaatccagc agacagtggt ttgcattccc atgcttgatg gcgttgtgga  540
actaggcaca acgaacaagg taaaagaaga tatagcgttt gttgagctca taaagagttt  600
tttccataac caccccaagt caaacccaaa agctgctctt tctgaacact ccatcaacga  660
agagcacgaa gaagacgaag aacaagaaga agaagaagaa gaagaagtag aagaagaaat  720
gacaatgtca gaggagataa ggcttggctc tcctgatgat gatgacgtct ccaatcaaaa  780
cctactctct gatttccatg tagaatcaac ccacacttta gacacacaca tggacatgat  840
gaatctaatg gaggagggtg gaaactattc tcagacagta tcaacacttc ttatgtcaca  900
acccacgagt ctttttttcag attcagtttc cacatcttct tacatccaat catcatttgc  960
cacatggaag gctgataatt ttaaagagca tcagcgagtg gaaactaaat cgacgtcgtc  1020
gtcgcaatgg atgctcaaac acataatctt gagagttcct ttactccacg accacactaa  1080
agaaaagagg ctgcctcgag aagagcttaa tcacgtggtg gcagagcgcc gcaggagaga  1140
gaagctgaat gagagattca taacactgag atcattggtt ccctttgtga ccaagatgga  1200
taaagtctca attcttggag acaccatcaa ctacgtaaac catcttcgaa atagggtcca  1260
agagctggag actaatcatc acgaacaaaa acataagcgg atgcgtagct gtaagggaaa  1320
aacgtgggaa gaggtcgttg aggtttccat catagagagt gatgttttgt tagagatgag  1380
atgcgagtac cgagatggtc tattgctcga catccttcag gttcttaagg aacatggtat  1440
agagactact gcagttcata ccgcggtgaa cgagcgtgat ttcgaggccg agataagggc  1500
tatggtgaga gggaagaaac caagcattgc tgaggtcaaa agagccatcc atcaaactat  1560
atccaatatt aaactatag                                              1579

SEQ ID NO: 136          moltype = AA  length = 98
FEATURE                 Location/Qualifiers
```

```
source                  1..98
                        mol_type = protein
                        organism = Thlaspi arvense
SEQUENCE: 136
MDESSIFTAE KVIGAEKREL QGLLKAAVQS VEWTYSLFWQ LCPQQRVLLW ENGYYNGAIN  60
EEDNSAGGSD GGRGCVREES AAKGTLRGPF GRRVLIGS                          98

SEQ ID NO: 137          moltype = DNA  length = 1582
FEATURE                 Location/Qualifiers
source                  1..1582
                        mol_type = genomic DNA
                        organism = Thlaspi arvense
SEQUENCE: 137
atggatgaat caagtatttt tacggcagag aaagtgatcg gagctgagaa aagagagctt  60
caagggctgc ttaaggcggc ggtgcaatct gtggagtgga cttatagtct cttctggcaa  120
ctttgtcctc aacaaagggt tttgctgtgg gagaatggat actacaacgg tgcaataaag  180
gacgaggaag acaactcagc cggcggaagt gacggcggaa gaggctgcgt tagagaggag  240
tcagcagcta agggaacttt acgaggccct tttggccgga gagtcctcat cggaagctag  300
ggcatgcacg gcattatcgc cggaggatct gacggagact gaatggtttt atctaatgtg  360
tgtctctttc tctttccctc ctccttccgg gatgccagga aaggcgtatg cgaggaggaa  420
acacgtatgg ctatgtggtg caaatgaggt tgacagtaaa atcttttcta gggctattct  480
cgcaaagagt gccaaaatcc agcagacagt ggtttgcatt cccatgcttg atggcgttgt  540
ggaactaggc acaacgaaca aggtaaaaga agatatagcg tttgttgagc tcataaagag  600
ttttttccat aaccacccca agtcaaaccc aaaagctgct ctttctgaac actccatcaa  660
cgaagagcac gaagaagacg aagaacaaga agaagaagaa gaagaagaag tagaagaaga  720
aatgacaatg tcagaggaga taaggcttgg ctctcctgat gatgatgacg tctccaatca  780
aaacctactc tctgatttcc atgtagaatc aacccacact ttagacacac acatggacat  840
gatgaatcta atggaggagg gtggaaacta ttctcagaca gtatcaacac ttcttatgtc  900
acaacccacg agtctttttt cagattcagt ttccacatct tcttacatcc aatcatcatt  960
tgccacatgg aaggctgata attttaaaga gcatcagcga gtggaaacta aatcgacgtc  1020
gtcgtcgcaa tggatgctca aacacataat cttgagagtt cctttactcc acgaccacac  1080
taaagaaaag aggctgcctc gagaagagct taatcacgtg gtggcagagc gccgcaggag  1140
agagaagctg aatgagagat tcataacact gagatcattg gttccctttg tgaccaagat  1200
ggataaagtc tcaattcttg gagacaccat caactacgta aaccatcttc gaaatagggt  1260
ccaagagctg gagactaatc atcacgaaca aaaacataag cggatgcgta gctgtaaggg  1320
aaaaacgtgg gaagaggtcg ttgaggtttc catcatagag agtgatgttt tgttagagat  1380
gagatgcgag taccgagatg gtctattgct cgacatcctt caggttctta aggaacatgg  1440
tatagagact actgcagttc ataccgcggt gaacgagcgt gatttcgagg ccgagataag  1500
ggctatggtg agagggaaga aaccaagcat tgctgaggtc aaaagagcca tccatcaaac  1560
tatatccaat attaaactat ag                                           1582

SEQ ID NO: 138          moltype = AA  length = 99
FEATURE                 Location/Qualifiers
source                  1..99
                        mol_type = protein
                        organism = Thlaspi arvense
SEQUENCE: 138
MDESSIFTAE KVIGAEKREL QGLLKAAVQS VEWTYSLFWQ LCPQQRVLLW ENGYYNGAIK  60
NEEDNSAGGS DGGRGCVREE SAAKGTLRGP FGRRVLIGS                         99

SEQ ID NO: 139          moltype = DNA  length = 1707
FEATURE                 Location/Qualifiers
source                  1..1707
                        mol_type = genomic DNA
                        organism = Thlaspi arvense
SEQUENCE: 139
atgtcacaat attccttctt ctatttcttc ctaatctctc ttttcctcta cgaaaattgc  60
attgcgtatc gctacacatt cacggttatt gaagctccat atagcaaact gtgtagcacg  120
aagaagattt tgaccgttaa tggtcagttt cctggaccag tgttaagggc ttacaaaggt  180
gacaccattt acgttaacgt tcgtaaccaa gctagtgaaa atatcacatt gcattggcat  240
ggtgtagagc agccgagaaa cccgtggtca gatggacccg aatacatcac acaatgcccg  300
attcaacccg ggtcagattt tacgtacaaa attttacttt ccatcgaaga cgcgactgtt  360
tgatggcatg cgcatagctc gtggacacgt gccaccgtac acggtctgat tttcgtgtat  420
cctcggcctc ctgataccct gccttttcca gaaccggact acgaagtccc cttagttttt  480
ggagagtggt ggaagaggga tgtgagagaa gtagtggagg atttcatgag gaacggaggt  540
gaacctaatg tgtccgatgc tttgactatc aatgggcatc ctggtttctt gtatccttgc  600
tctcaatcag atacattcaa gctcgtggta gagaagggca aaacctaccg cattcggatg  660
gtaaacgccg cgatgaacct aattctcttc ttcgccatcg cgaaccacaa actcaccgtg  720
gtcgccgccg atggccacta caccaaacct ctaaccgcta gttatatcac catatctcct  780
ggccaaacgc tagacctgtt actatacgcc gaccaaagtc cagagagcac ttataacatg  840
gcggccagag cttaccatag caaccccaac gttgggttca acaactctac caccgtcggg  900
atcttacgtt actactcttc aaacgacgcc ggaacgtctt catcagaacg ttacccgtac  960
cttcctggct acaatgacac ctcagcagct ttcgatttct tcacaaaaat caaaggctta  1020
tactccagag tagctcccgc caaagtttca cgtaggataa tcacgacggt ttcgataaat  1080
ctcctcaagt gtcccaacga ctcgtgtgca ggcccaaacg ggtcgaggtt agcggcgagt  1140
atgaacaaca tatcgttcgt cacaccgagc cacgtggaca tactaagagc ttattacctt  1200
cacattaacg gcgtttacgg aacgcggttt ccggagttcc caccgcggat attcaatttc  1260
acagcggacg accaaccgct gtttttgcag actccgaggc tggcgacgga ggtaaagaag  1320
tttcagtacg gggagacggt tgagattgtt atacaaggga cgagtttggt aggtggtgga  1380
```

```
atcgatcatc ctatgcatct ccatggtttt agcttctacg tggttggttt agggtttggg  1440
aattttaacg cacgtaaaga tccctccaac tataatctag acgatcctcc ttacagaaac  1500
acggcgactg tgcccaggaa cggttggatc gctatcagat tcgtagctga caatccaggg  1560
gtttggttca tgcactgtca ctttgataga catcaaacgt ggggtatgaa tgttgtcttc  1620
attgttaaga atggaataaa accaaatcag aagattctac ctccaccgcc tggcttacca  1680
ccttgtgacc aatttgagaa tctataa                                       1707

SEQ ID NO: 140          moltype = AA  length = 120
FEATURE                 Location/Qualifiers
source                  1..120
                        mol_type = protein
                        organism = Thlaspi arvense
SEQUENCE: 140
MSQYSFFYFF LISLFLYENC IAYRYTFTVI EAPYSKLCST KKILTVNGQF PGPVLRAYKG  60
DTIYVNVRNQ ASENITLHWH GVEQPRNPWS DGPEYITQCP IQPGSDFTYK ILLSIEDATV  120

SEQ ID NO: 141          moltype = DNA  length = 1707
FEATURE                 Location/Qualifiers
source                  1..1707
                        mol_type = genomic DNA
                        organism = Thlaspi arvense
SEQUENCE: 141
atgtcacaat attccttctt ctatttcttc ctaatctctc ttttcctcta cgaaaattgc  60
attgcgtatc gctacacatt cacggttatt gaagctccat atagcaaact gtgtagcacg  120
aagaagattt tgaccgttaa tggtcagttt cctggaccag tgttaagggc ttacaaaggt  180
gacaccattt acgttaacgt tcgtaaccaa gctagtgaaa atatcacatt gcattggcat  240
ggtgtagagc agccgagaaa cccgtggtca gatggacccg aatacatcac acaatgcccg  300
attcaacccg ggtcagattt tacgtacaaa attttacttt ccatcgaaga cgcgactgtt  360
tggtggcatg cgcatagctc gtggacacgt gccaccgtac acggtctgat tttcgtgtat  420
cctcggcctc ctgataccct gccttttcca gaaccggact acgaagtccc cttagttttt  480
ggagagtggt ggaagaggga tgtgagagaa gtagtggagg atttcatgag gaacggaggt  540
gaacctaatg tgtccgatgc tttgactatc aatgggcatc ctggtttctt gtatccttgc  600
tctcaatcag atacattcaa gctcgtggta gagaagggca aaacctaccg catttggatg  660
gtaaacgccg cgatgaacct aattctcttc ttcgccatcg cgaaccacaa actcaccgtg  720
gtcgccgccg atggccacta caccaaacct ctaaccgcta gttatatcac catatctcct  780
ggccaaacgc tagacctgtt actatacgcc gaccaaagtc cagagagcac ttataacatg  840
gcggccagag cttaccatag caaccccaac gttgggttca acaactctac caccgtcggg  900
atcttacgtt actactcttc aaacgacgcc ggaacgtctt catcagaacg ttacccgtac  960
cttcctggct acaatgacac ctcagcagct ttcgatttct tcacaaaaat caaaggctta  1020
tactccagag tagctcccgc caaagtttca cgtaggataa tcacgacggt ttcgataaat  1080
ctcctcaagt gtcccaacga ctcgtgtgca ggcccaaacg ggtcgaggtt agcggcgagt  1140
atgaacaaca tatcgttcgt cacaccgagc cacgtggaca tactaagagc ttattacctt  1200
cacattaacg gcgtttacgg aacgcggttt ccggagttcc caccgcggat attcaatttc  1260
acagcggacg accaaccgct gtttttgcag actccgaggc tggcgacgga ggtaaagaag  1320
tttcagtacg gggagacggt tgagattgtt atacaaggga cgagtttggt aggtggtgga  1380
atcgatcatc ctatgcatct ccatggtttt agcttctacg tggttggttt agggtttggg  1440
aattttaacg cacgtaaaga tccctccaac tataatctag acgatcctcc ttacagaaac  1500
acggcgactg tgcccaggaa cggttggatc gctatcagat tcgtagctga caatccaggg  1560
gtttggttca tgcactgtca ctttgataga catcaaacgt ggggtatgaa tgttgtcttc  1620
attgttaaga atggaataaa accaaatcag aagattctac ctccaccgcc tggcttacca  1680
ccttgtgacc aatttgagaa tctataa                                       1707

SEQ ID NO: 142          moltype = AA  length = 568
FEATURE                 Location/Qualifiers
source                  1..568
                        mol_type = protein
                        organism = Thlaspi arvense
SEQUENCE: 142
MSQYSFFYFF LISLFLYENC IAYRYTFTVI EAPYSKLCST KKILTVNGQF PGPVLRAYKG  60
DTIYVNVRNQ ASENITLHWH GVEQPRNPWS DGPEYITQCP IQPGSDFTYK ILLSIEDATV  120
WWHAHSSWTR ATVHGLIFVY PRPPDTLPFP EPDYEVPLVF GEWWKRDVRE VVEDFMRNGG  180
EPNVSDALTI NGHPGFLYPC SQSDTFKLVV EKGKTYRIWM VNAAMNLILF FAIANHKLTV  240
VAADGHYTKP LTASYITISP GQTLDLLLYA DQSPESTYNM AARAYHSNPN VGFNNSTTVG  300
ILRYYSSNDA GTSSSERYPY LPGYNDTSAA FDFFTKIKGL YSRVAPAKVS RRIITTVSIN  360
LLKCPNDSCA GPNGSRLAAS MNNISFVTPS HVDILRAYYL HINGVYGTRF PEFPPRIFNF  420
TADDQPLFLQ TPRLATEVKK FQYGETVEIV IQGTSLVGGG IDHPMHLHGF SFYVVGLGFG  480
NFNARKDPSN YNLDDPPYRN TATVPRNGWI AIRFVADNPG VWFMHCHFDR HQTWGMNVVF  540
IVKNGIKPNQ KILPPPPGLP PCDQFENL                                      568

SEQ ID NO: 143          moltype = DNA  length = 1708
FEATURE                 Location/Qualifiers
source                  1..1708
                        mol_type = genomic DNA
                        organism = Thlaspi arvense
SEQUENCE: 143
atgtcacaat attccttctt ctatttcttc ctaatctctc ttttcctcta cgaaaattgc  60
attgcgtatc gctacacatt cacggttatt gaagctccat atagcaaact gtgtagcacg  120
aagaagattt tgaccgttaa tggtcagttt cctggaccag tgtttaaggg cttacaaagg  180
tgacaccatt tacgttaacg ttcgtaacca agctagtgaa aatatcacat tgcattggca  240
```

```
tggtgtagag cagccgagaa acccgtggtc agatggaccc gaatacatca cacaatgccc  300
gattcaaccc gggtcagatt ttacgtacaa aattttactt tccatcgaag acgcgactgt  360
ttggtggcat gcgcatagct cgtggacacg tgccaccgta cacggtctga ttttcgtgta  420
tcctcggcct cctgataccc tgccttttcc agaaccggac tacgaagtcc ccttagtttt  480
tggagagtgg tggaagaggg atgtgagaga agtagtggag gatttcatga ggaacggagg  540
tgaacctaat gtgtccgatg ctttgactat caatgggcat cctggtttct tgtatccttg  600
ctctcaatca gatacattca agctcgtggt agagaagggc aaaacctacc gcattcggat  660
ggtaaacgcc gcgatgaacc taattctctt cttcgccatc gcgaaccaca aactcaccgt  720
ggtcgccgcc gatggccact acaccaaacc tctaaccgct agttatatca ccatatctcc  780
tggccaaacg ctagacctgt tactatacgc cgaccaaagt ccagagagca cttataacat  840
ggcggccaga gcttaccata gcaaccccaa cgttgggttc aacaactcta ccaccgtcgg  900
gatcttacgt tactactctt caaacgacgc cggaacgtct tcatcagaac gttacccgta  960
ccttcctggc tacaatgaca cctcagcagc tttcgatttc ttcacaaaaa tcaaaggctt  1020
atactccaga gtagctcccg ccaaagtttc acgtaggata atcacgacgg tttcgataaa  1080
tctcctcaag tgtcccaacg actcgtgtgc aggcccaaac gggtcgaggt tagcggcgag  1140
tatgaacaac atatcgttcg tcacaccgag ccacgtggac atactaagag cttattacct  1200
tcacattaac ggcgtttacg gaacgcggtt tccggagttc ccaccgcgga tattcaattt  1260
cacagcggac gaccaaccgc tgtttttgca gactccgagg ctggcgacgg aggtaaagaa  1320
gtttcagtac ggggagacgg ttgagattgt tatacaaggg acgagtttgg taggtggtgg  1380
aatcgatcat cctatgcatc tccatggttt tagcttctac gtggttggtt tagggtttgg  1440
gaattttaac gcacgtaaag atccctccaa ctataatcta gacgatcctc cttacagaaa  1500
cacggcgact gtgcccagga acggttggat cgctatcaga ttcgtagctg acaatccagg  1560
ggtttggttc atgcactgtc actttgatag acatcaaacg tggggtatga atgttgtctt  1620
cattgttaag aatggaataa aaccaaatca gaagattcta cctccaccgc ctggcttacc  1680
accttgtgac caatttgaga atctataa                                    1708

SEQ ID NO: 144          moltype = AA  length = 60
FEATURE                 Location/Qualifiers
source                  1..60
                        mol_type = protein
                        organism = Thlaspi arvense
SEQUENCE: 144
MSQYSFFYFF LISLFLYENC IAYRYTFTVI EAPYSKLCST KKILTVNGQF PGPVFKGLQR  60

SEQ ID NO: 145          moltype = DNA  length = 1708
FEATURE                 Location/Qualifiers
source                  1..1708
                        mol_type = genomic DNA
                        organism = Thlaspi arvense
SEQUENCE: 145
atgtcacaat attccttctt ctatttcttc ctaatctctc ttttcctcta cgaaaattgc  60
attgcgtatc gctacacatt cacggttatt gaagctccat atagcaaact gtgtagcacg  120
aagaagattt tgaccgttaa tggtcagttt cctggaccag tgattaaggg cttacaaagg  180
tgacaccatt tacgttaacg ttcgtaacca agctagtgaa aatatcacat tgcattggca  240
tggtgtagag cagccgagaa acccgtggtc agatggaccc gaatacatca cacaatgccc  300
gattcaaccc gggtcagatt ttacgtacaa aattttactt tccatcgaag acgcgactgt  360
ttggtggcat gcgcatagct cgtggacacg tgccaccgta cacggtctga ttttcgtgta  420
tcctcggcct cctgataccc tgccttttcc agaaccggac tacgaagtcc ccttagtttt  480
tggagagtgg tggaagaggg atgtgagaga agtagtggag gatttcatga ggaacggagg  540
tgaacctaat gtgtccgatg ctttgactat caatgggcat cctggtttct tgtatccttg  600
ctctcaatca gatacattca agctcgtggt agagaagggc aaaacctacc gcattcggat  660
ggtaaacgcc gcgatgaacc taattctctt cttcgccatc gcgaaccaca aactcaccgt  720
ggtcgccgcc gatggccact acaccaaacc tctaaccgct agttatatca ccatatctcc  780
tggccaaacg ctagacctgt tactatacgc cgaccaaagt ccagagagca cttataacat  840
ggcggccaga gcttaccata gcaaccccaa cgttgggttc aacaactcta ccaccgtcgg  900
gatcttacgt tactactctt caaacgacgc cggaacgtct tcatcagaac gttacccgta  960
ccttcctggc tacaatgaca cctcagcagc tttcgatttc ttcacaaaaa tcaaaggctt  1020
atactccaga gtagctcccg ccaaagtttc acgtaggata atcacgacgg tttcgataaa  1080
tctcctcaag tgtcccaacg actcgtgtgc aggcccaaac gggtcgaggt tagcggcgag  1140
tatgaacaac atatcgttcg tcacaccgag ccacgtggac atactaagag cttattacct  1200
tcacattaac ggcgtttacg gaacgcggtt tccggagttc ccaccgcgga tattcaattt  1260
cacagcggac gaccaaccgc tgtttttgca gactccgagg ctggcgacgg aggtaaagaa  1320
gtttcagtac ggggagacgg ttgagattgt tatacaaggg acgagtttgg taggtggtgg  1380
aatcgatcat cctatgcatc tccatggttt tagcttctac gtggttggtt tagggtttgg  1440
gaattttaac gcacgtaaag atccctccaa ctataatcta gacgatcctc cttacagaaa  1500
cacggcgact gtgcccagga acggttggat cgctatcaga ttcgtagctg acaatccagg  1560
ggtttggttc atgcactgtc actttgatag acatcaaacg tggggtatga atgttgtctt  1620
cattgttaag aatggaataa aaccaaatca gaagattcta cctccaccgc ctggcttacc  1680
accttgtgac caatttgaga atctataa                                    1708

SEQ ID NO: 146          moltype = AA  length = 60
FEATURE                 Location/Qualifiers
source                  1..60
                        mol_type = protein
                        organism = Thlaspi arvense
SEQUENCE: 146
MSQYSFFYFF LISLFLYENC IAYRYTFTVI EAPYSKLCST KKILTVNGQF PGPVFKGLQR  60

SEQ ID NO: 147          moltype = DNA  length = 1700
```

```
FEATURE                Location/Qualifiers
source                 1..1700
                       mol_type = genomic DNA
                       organism = Thlaspi arvense
SEQUENCE: 147
atgtcacaat attccttctt ctatttcttc ctaatctctc ttttcctcta cgaaaattgc  60
attgcgtatc gctacacatt cacggttatt gaagctccat atagcaaact gtgtagcacg  120
aagaagattt tgaccgttaa tggtcagttt cctggttaag ggcttacaaa ggtgacacca  180
tttacgttaa cgttcgtaac caagctagtg aaaatatcac attgcattgg catggtgtag  240
agcagccgag aaacccgtgg tcagatggac ccgaatacat cacacaatgc ccgattcaac  300
ccgggtcaga ttttacgtac aaaattttac tttccatcga agacgcgact gtttggtggc  360
atgcgcatag ctcgtggaca cgtgccaccg tacacggtct gattttcgtg tatcctcggc  420
ctcctgatac cctgcctttt ccagaaccgg actacgaagt ccccttagtt tttggagagt  480
ggtggaagag ggatgtgaga gaagtagtgg aggatttcat gaggaacgga ggtgaaccta  540
atgtgtccga tgctttgact atcaatgggc atcctggttt cttgtatcct tgctctcaat  600
cagatacatt caagctcgtg gtagagaagg gcaaaaccta ccgcattcgg atggtaaacg  660
ccgcgatgaa cctaattctc ttcttcgcca tcgcgaacca caaactcacc gtggtcgccg  720
ccgatggcca ctacaccaaa cctctaaccg ctagttatat caccatatct cctggccaaa  780
cgctagacct gttactatac gccgaccaaa gtccagagag cacttataac atggcggcca  840
gagcttacca tagcaacccc aacgttgggt tcaacaactc taccaccgtc gggatcttac  900
gttactactc ttcaaacgac gccggaacgt cttcatcaga acgttacccg taccttcctg  960
gctacaatga cacctcagca gctttcgatt tcttcacaaa aatcaaaggc ttatactcca  1020
gagtagctcc cgccaaagtt tcacgtagga taatcacgac ggtttcgata aatctcctca  1080
agtgtcccaa cgactcgtgt gcaggcccaa acgggtcgag gttagcggcg agtatgaaca  1140
acatatcgtt cgtcacaccg agccacgtgg acatactaag agcttattac cttcacatta  1200
acggcgttta cggaacgcgg tttccggagt tcccaccgcg gatattcaat ttcacagcgg  1260
acgaccaacc gctgtttttg cagactccga ggctggcgac ggaggtaaag aagtttcagt  1320
acggggagac ggttgagatt gttatacaag ggacgagttt ggtaggtggt ggaatcgatc  1380
atcctatgca tctccatggt tttagcttct acgtggttgg tttagggttt gggaatttta  1440
acgcacgtaa agatccctcc aactataatc tagacgatcc tccttacaga aacacggcga  1500
ctgtgcccag gaacggttgg atcgctatca gattcgtagc tgacaatcca ggggtttggt  1560
tcatgcactg tcactttgat agacatcaaa cgtggggtat gaatgttgtc ttcattgtta  1620
agaatggaat aaaaccaaat cagaagattc tacctccacc gcctggctta ccaccttgtg  1680
accaatttga gaatctataa                                              1700

SEQ ID NO: 148         moltype = AA  length = 52
FEATURE                Location/Qualifiers
source                 1..52
                       mol_type = protein
                       organism = Thlaspi arvense
SEQUENCE: 148
MSQYSFFYFF LISLFLYENC IAYRYTFTVI EAPYSKLCST KKILTVNGQF PG          52

SEQ ID NO: 149         moltype = DNA  length = 1520
FEATURE                Location/Qualifiers
source                 1..1520
                       mol_type = genomic DNA
                       organism = Thlaspi arvense
SEQUENCE: 149
atgagctcca cggagacata tgagcctcta ttgagacggc tccactcaga ttctcagtta  60
accgtaggtt cttcaccgga gatagaggag tttctcggcc gtcgtagatc cacggtgacg  120
ccacggtggt ggctaaggct ggccgtatgg gaatcaaagc ttctttggac gctctctgga  180
gcctccatag tggtctctgt gctgaattac atgctcagct tcgtcaccgt tatgttcatc  240
ggccatcttg gctctcttca gctcgccggc gcatccatcg ccaccgtcgg tatccaaggc  300
ctcgcttacg gtatcatgtt gggaatggcg agcgcggtcc agacagtgtg tggtcaagcg  360
tacggcgcga ggcagtactc atcaatggga ataatttgcc aacgagccat ggtcttgcac  420
ctcgcagctg cggtcctcct cacgttcctc tactggtact cgggtccgat cctaaaggcg  480
atgggccaat ccgcagccat cgcacgcgag ggtcaggtct ttgcacgtgg gattattccg  540
cagatttatg cttttgccct cgcttgccct atgcagaggt tcctccaggc tcaaaaaatt  600
gtaaaccctt ttacatgtca ctaggagttt tcgtgctaca cacgctacta acctggctgg  660
taaccaacgt cctgcatttc ggcttgctcg gtgcagctct ggtgctgagt ttttcgtggt  720
ggcttctcgc ggctgtgaat ggtctgtata tcgtgatgag cccgagttgc aaggaaactt  780
ggaccgggtt ctcagctagg gctttaagag ggatttggcc ttacttcaag ctcacgatag  840
cttcagcagt catgctatgt ttggagatat ggtacgtcca agggctagtg attatttccg  900
gtttactcac caatcccaca attgccctag acgcaatttc gatttgcatg tattactgga  960
attgggatat gcagttcatg cttggtctaa gtgcggcaat cactgtccga gtgagcaacg  1020
agctaggagc gggaaaccca cgagtggcta agttatcagt ggtagtggtt aacatcacga  1080
cggttgtcat cagcttattc ctctgtgtcg ttgtgctcgt gttccgcatt ggccttagta  1140
aagccttcac cagcgacgca gaggttatag ctgcagtctc tgatctcttt cccctgctcg  1200
ccgtttccat tttcttaaac ggaatccaac caattctctc tggtgttgcc attggaagtg  1260
ggtggcaagc agtggtggct tatgtgaatc ttgttactta ctatgtcatt ggtcttccta  1320
ttggctgtgt tcttggcttc aaaaccagtc ttggagttgc ggggatctgg tgggggatga  1380
ttgcaggagt tatacttcaa accctaactt tgattgttct tacactcaga actaactgga  1440
attccgaggt ggagaatgca gctcataggt taaaagcttc agcaaatgag agtcaagaaa  1500
tggctaccga aggaatctaa                                              1520

SEQ ID NO: 150         moltype = AA  length = 207
FEATURE                Location/Qualifiers
source                 1..207
```

```
                        mol_type = protein
                        organism = Thlaspi arvense
SEQUENCE: 150
MSSTETYEPL LRRLHSDSQL TVGSSPEIEE FLGRRRSTVT PRWWLRLAVW ESKLLWTLSG  60
ASIVVSVLNY MLSFVTVMFI GHLGSLQLAG ASIATVGIQG LAYGIMLGMA SAVQTVCGQA  120
YGARQYSSMG IICQRAMVLH LAAAVLLTFL YWYSGPILKA MGQSAAIARE GQVFARGIIP  180
QIYAFALACP MQRFLQAQKI VNPFTCH                                     207

SEQ ID NO: 151          moltype = DNA  length = 1524
FEATURE                 Location/Qualifiers
source                  1..1524
                        mol_type = genomic DNA
                        organism = Thlaspi arvense
SEQUENCE: 151
atgagctcca cggagacata tgagcctcta ttgagacggc tccactcaga ttctcagtta  60
accgtaggtt cttcaccgga gatagaggag tttctcggcc gtcgtagatc cacggtgacg  120
ccacggtggt ggctaaggct ggccgtatgg gaatcaaagc ttctttggac gctctctgga  180
gcctccatag tggtctctgt gctgaattac atgctcagct tcgtcaccgt tatgttcatc  240
ggccatcttg gctctcttca gctcgccggc gcatccatcg ccaccgtcgg tatccaaggc  300
ctcgcttacg gtatcatgtt gggaatggcg agcgcggtcc agacagtgtg tggtcaagcg  360
tacggcgcga ggcagtactc atcaatggga ataatttgcc aacgagccat ggtcttgcac  420
ctcgcagctg cggtcctcct cacgttcctc tactggtact cgggtccgat cctaaaggcg  480
atgggccaat ccgcagccat cgcacgcgag ggtcaggtct ttgcacgtgg gattattccg  540
cagatttatg cttttgccct cgcttgccct atgcagaggt tcctccaggc tcaaaaaatt  600
gtaaaccctt tggcttacat gtcactagga gttttcgtgc tacacacgct actaacctgg  660
ctggtaacca acgtcctgca tttcggcttg ctcggtgcag ctctggtgct gagtttttcg  720
tggtggcttc tcgcggctgt gaatggtctg tatatcgtga tgagcccgag ttgcaaggaa  780
acttggaccg ggttctcagc tagggcttta agagggattt ggccttactt caagctcacg  840
atagcttcag cagtcatgct atgtttggag atatggtacg tccaagggct agtgattatt  900
tccggtttac tcaccaatcc cacaattgcc ctagacgcaa tttcgatttg catgtattac  960
tggaattggg atatgcagtt catgcttggt ctaagtgcgg caatcactgt ccgagtgagc  1020
aacgagctag gagcgggaaa cccacgagtg gctaagttat cagtggtagt ggttaacatc  1080
acgacggttg tcatcagctt attcctctgt gtcgttgtgc tcgtgttccg cattggcctt  1140
agtaaagcct tcaccagcga cgcagaggtt atagctgcag tctctgatct ctttcccctg  1200
ctcgccgttt ccattttctt aaacggaatc caaccaattc tctctagtgt tgccattgga  1260
agtgggtggc aagcagtggt ggcttatgtg aatcttgtta cttactatgt cattggtctt  1320
cctattggct gtgttcttgg cttcaaaacc agtcttggag ttgcggggat ctggtggggg  1380
atgattgcag gagttatact tcaaacccta actttgattg ttcttacact cagaactaac  1440
tggaattccg aggtggagaa tgcagctcat aggttaaaag cttcagcaaa tgagagtcaa  1500
gaaatggcta ccgaaggaat ctaa                                        1524

SEQ ID NO: 152          moltype = AA  length = 507
FEATURE                 Location/Qualifiers
source                  1..507
                        mol_type = protein
                        organism = Thlaspi arvense
SEQUENCE: 152
MSSTETYEPL LRRLHSDSQL TVGSSPEIEE FLGRRRSTVT PRWWLRLAVW ESKLLWTLSG  60
ASIVVSVLNY MLSFVTVMFI GHLGSLQLAG ASIATVGIQG LAYGIMLGMA SAVQTVCGQA  120
YGARQYSSMG IICQRAMVLH LAAAVLLTFL YWYSGPILKA MGQSAAIARE GQVFARGIIP  180
QIYAFALACP MQRFLQAQKI VNPLAYMSLG VFVLHTLLTW LVTNVLHFGL LGAALVLSFS  240
WWLLAAVNGL YIVMSPSCKE TWTGFSARAL RGIWPYFKLT IASAVMLCLE IWYVQGLVII  300
SGLLTNPTIA LDAISICMYY WNWDMQFMLG LSAAITVRVS NELGAGNPRV AKLSVVVVNI  360
TTVVISLFLC VVVLVFRIGL SKAFTSDAEV IAAVSDLFPL LAVSIFLNGI QPILSSVAIG  420
SGWQAVVAYV NLVTYYVIGL PIGCVLGFKT SLGVAGIWWG MIAGVILQTL TLIVLTLRTN  480
WNSEVENAAH RLKASANESQ EMATEGI                                     507

SEQ ID NO: 153          moltype = DNA  length = 2214
FEATURE                 Location/Qualifiers
source                  1..2214
                        mol_type = genomic DNA
                        organism = Thlaspi arvense
SEQUENCE: 153
atgcttccat taatggcgat accacttgcg acttgcagga gcatcaactg gtcagccacg  60
gaaaggattc ctgtttcgct tctgttccgg agtattcttc tccaagacga cgaagtttgt  120
agcgctgtgc cactataccg gatcctcgat cagaatgacg ggcaacttgg tcctataagt  180
atggccgagg aatcagacaa accattgctg gatcctgata ctctcaacag agaaggaatt  240
gacttgggtc tgttgccatt ggaggaggtt tttgaatacc taagaacatc tccacggggg  300
cttttatctg gagatgctga agaaagattg acgatatttg gtcctaacag ccttgaagag  360
aaacgggaga acaagtttct gaagttccta ggttttatgt ggaatccttt gtcatgggtt  420
atggaagctg cagcattgat ggccatcgcc ctagcagata gtgaagtaga gactatcagt  480
cttttgctat accatttctg ctcagtgctg accggagaat cgctacctgt gaccaagaag  540
aagggtgagc aagtcttctc tggctctact tgtaagcaag gtgagataga agctgttgtg  600
atagccaccg gttcgagcac tttctttggt aaaacagcat ctttggtgga cagcacagat  660
gcaactggac attttcagca ggttctaagc ttgtgccagc agaaaaatga gattgcgcaa  720
agagtttatg ccatcataaa tagatttgca gaaaaaggtt tgaggtctct tgctgttgct  780
tatcaggaaa ttccagagag aagcagcaac agtcctggag gaccatggtt gttctgtggt  840
ctgttgccac tgtttgatcc tccaaggcat gacagtgctg aaaccatact gagagctctt  900
aactttggag tttgtgttaa gatgatcacc ggtgatcagt tggcgattgc aaaggagaca  960
```

```
ggaaggcgac ttgggatggg aaccaatatg tatccttctt cctctttgtt aggccacaac  1020
aacgatgatc acgaagccat tccattggat gagcttattg aaatggcaga tggatttgct  1080
ggagtgttcc ctgaacacaa gtatgagatt gtaaagatat tacaagaaaa gaagcatgtg  1140
gttggaatga ccggagatgg tgtgaatgat gctcctgctc tgaaaaaggc tgacattgga  1200
atagctgtcg ctgatgcaac agatgccgca agaagttctg ctgacattgt actaactgag  1260
cctggcttaa gtgtaattat cagtgctgtc ttgaccagca gagccatttt ccagcgtatg  1320
aagaactata cagtatatgc agtctcgatc accatacgaa tagtgctcgg ttttacactt  1380
ttagcgttga tatgggaata cgactttcca cctttcatgg ttttgataat cgcaatactc  1440
aatgacggga ccatcatgac tatctctaaa gatcgagtaa ggccatctcc tacacccgag  1500
agttggaagc tcaaccagat atttgcgact ggaattgtca ttggaacata ccttgcattg  1560
gtcactgtcc tattctactg gatcattgtc tctaccacct tcttcgagaa acacttccat  1620
gtaaaatcaa tcggcaacaa cagtgaacaa gtctcatccg ctctgtatct ccaagtaagc  1680
atcatcagtc aagcactcat atttgtaaca cgtagtcgaa gctggtcttt tcttgaacgt  1740
cccgggactc tcctgatttt cgccttcctt gttgcccaac ttgccgctac attgattgct  1800
gtctatgcca acatcagctt tgctaacatc accggcattg gatggggatg ggcaggtgtt  1860
atatggttat acagtttgat tttttacata cctcttgata ttataaagtt cttcttccac  1920
tacgcattga gtggagatgc ttggaacctt gtatttgacc gtaagacagc atttactaat  1980
aagaaagatt atagaaaaga tgacggagcg tccaatgtaa ccatctctca gagaagtcac  2040
tctgcagaag aactcagtgg aagtcgttct cgcgcatctt ggatcgctga gcagaccaga  2100
aggcgtgcag aaaccgccag gctcttggag ggacactcgg tgtcaaggca tttggaatca  2160
gtaatgaagc tcaaacaaat tgaccccaag atgattcgtg cagacactgt ctaa        2214

SEQ ID NO: 154         moltype = AA  length = 737
FEATURE                Location/Qualifiers
source                 1..737
                       mol_type = protein
                       organism = Thlaspi arvense
SEQUENCE: 154
MLPLMAIPLA TCRSINWSAT ERIPVSLLFR SILLQDDEVC SAVPLYRILD QNDGQLGPIS  60
MAEESDKPLL DPDTLNREGI DLGLLPLEEV FEYLRTSPRG LLSGDAEERL TIFGPNSLEE  120
KRENKFLKFL GFMWNPLSWV MEAAALMAIA LADSEVETIS LLLYHFCSVL TGESLPVTKK  180
KGEQVFSGST CKQGEIEAVV IATGSSTFFG KTASLVDSTD ATGHFQQVLS LCQQKNEIAQ  240
RVYAIINRFA EKGLRSLAVA YQEIPERSSN SPGGPWLFCG LLPLFDPPRH DSAETILRAL  300
NFGVCVKMIT GDQLAIAKET GRRLGMGTNM YPSSSLLGHN NDDHEAIPLD ELIEMADGFA  360
GVFPEHKYEI VKILQEKKHV VGMTGDGVND APALKKADIG IAVADATDAA RSSADIVLTE  420
PGLSVIISAV LTSRAIFQRM KNYTVYAVSI TIRIVLGFTL LALIWEYDFP PFMVLIIAIL  480
NDGTIMTISK DRVRPSPTPE SWKLNQIFAT GIVIGTYLAL VTVLFYWIIV STTFFEKHFH  540
VKSIGNNSEQ VSSALYLQVS IISQALIFVT RSRSWSFLER PGTLLIFAFL VAQLAATLIA  600
VYANISFANI TGIGWGWAGV IWLYSLIFYI PLDIIKFFFH YALSGDAWNL VFDRKTAFTN  660
KKDYRKDDGA SNVTISQRSH SAEELSGSRS RASWIAEQTR RRAETARLLE GHSVSRHLES  720
VMKLKQIDPK MIRADTV                                                 737

SEQ ID NO: 155         moltype = DNA  length = 2214
FEATURE                Location/Qualifiers
source                 1..2214
                       mol_type = genomic DNA
                       organism = Thlaspi arvense
SEQUENCE: 155
atgcttccat taatggcgat accacttgcg acttgcagga gcatcaactg gtcagccacg  60
gaaaggattc ctgtttcgct tctgttccgg agtattcttc tccaagacga cgaagtttgt  120
agcgctgtgc cactataccg gatcctcgat cagaatgacg ggcaacttgg tcctataagt  180
atggccgagg aatcagacaa accattgctg gatcctgata ctctcaacag agaaggaatt  240
gacttgggtc tgttgccatt ggaggaggtt tttgaatacc taagaacatc tccacggggg  300
cttttatctg gagatgctga agaaagattg acgatatttg gtcctaacag ccttgaagag  360
aaacgggaga acaagtttct gaagttccta ggttttatgt ggaatccttt gtcatgggtt  420
atggaagctg cagcattgat ggccatcgcc ctagcagata gtgaagtaga gactatcagt  480
cttttgctat accatttctg ctcagtgctg accggagaat cgctacctgt gaccaagaag  540
aagggtgagc aagtcttctc tggctctact tgtaagcaag gtgagataga agctgttgtg  600
atagccaccg gttcgagcac tttctttggt aaaacagcat ctttggtgga cagcacagat  660
gcaactggac attttcagca ggttctaagc ttgtgccagc agaaaaatga gattgcgcaa  720
agagtttatg ccatcataaa tagatttgca gaaaaaggtt tgaggtctct tgctgttgct  780
tatcaggaaa ttccagagag aagcagcaac agtcctggag gaccatggtt gttctgtggt  840
ctgttgccac tgtttgatcc tccaaggcat gacagtgctg aaaccatact gagagctctt  900
aaccttggag tttgtgttaa gatgatcacc ggtgatcagt tggcgattgc aaaggagaca  960
ggaaggtgac ttgggatggg aaccaatatg tatccttctt cctctttgtt aggccacaac  1020
aacgatgatc acgaagccat tccattggat gagcttattg aaatggcaga tggatttgct  1080
ggagtgttcc ctgaacacaa gtatgagatt gtaaagatat tacaagaaaa gaagcatgtg  1140
gttggaatga ccggagatgg tgtgaatgat gctcctgctc tgaaaaaggc tgacattgga  1200
atagctgtcg ctgatgcaac agatgccgca agaagttctg ctgacattgt actaactgag  1260
cctggcttaa gtgtaattat cagtgctgtc ttgaccagca gagccatttt ccagcgtatg  1320
aagaactata cagtatatgc agtctcgatc accatacgaa tagtgctcgg ttttacactt  1380
ttagcgttga tatgggaata cgactttcca cctttcatgg ttttgataat cgcaatactc  1440
aatgacggga ccatcatgac tatctctaaa gatcgagtaa ggccatctcc tacacccgag  1500
agttggaagc tcaaccagat atttgcgact ggaattgtca ttggaacata ccttgcattg  1560
gtcactgtcc tattctactg gatcattgtc tctaccacct tcttcgagaa acacttccat  1620
gtaaaatcaa tcggcaacaa cagtgaacaa gtctcatccg ctctgtatct ccaagtaagc  1680
atcatcagtc aagcactcat atttgtaaca cgtagtcgaa gctggtcttt tcttgaacgt  1740
cccgggactc tcctgatttt cgccttcctt gttgcccaac ttgccgctac attgattgct  1800
gtctatgcca acatcagctt tgctaacatc accggcattg gatggggatg ggcaggtgtt  1860
```

```
atatggttat acagtttgat tttttacata cctcttgata ttataaagtt cttcttccac  1920
tacgcattga gtggagatgc ttggaacctt gtatttgacc gtaagacagc atttactaat  1980
aagaaagatt atagaaaaga tgacggagcg tccaatgtaa ccatctctca gagaagtcac  2040
tctgcagaag aactcagtgg aagtcgttct cgcgcatctt ggatcgctga gcagaccaga  2100
aggcgtgcag aaaccgccag gctcttggag ggacactcgg tgtcaaggca tttggaatca  2160
gtaatgaagc tcaaacaaat tgaccccaag atgattcgtg cagacactgt ctaa        2214

SEQ ID NO: 156          moltype = AA  length = 322
FEATURE                 Location/Qualifiers
source                  1..322
                        mol_type = protein
                        organism = Thlaspi arvense
SEQUENCE: 156
MLPLMAIPLA TCRSINWSAT ERIPVSLLFR SILLQDDEVC SAVPLYRILD QNDGQLGPIS  60
MAEESDKPLL DPDTLNREGI DLGLLPLEEV FEYLRTSPRG LLSGDAEERL TIFGPNSLEE  120
KRENKFLKFL GFMWNPLSWV MEAAALMAIA LADSEVETIS LLLYHFCSVL TGESLPVTKK  180
KGEQVFSGST CKQGEIEAVV IATGSSTFFG KTASLVDSTD ATGHFQQVLS LCQQKNEIAQ  240
RVYAIINRFA EKGLRSLAVA YQEIPERSSN SPGGPWLFCG LLPLFDPPRH DSAETILRAL  300
NLGVCVKMIT GDQLAIAKET GR                                          322

SEQ ID NO: 157          moltype = DNA  length = 2214
FEATURE                 Location/Qualifiers
source                  1..2214
                        mol_type = genomic DNA
                        organism = Thlaspi arvense
SEQUENCE: 157
atgcttccat taatggcgat accacttgcg acttgcagga gcatcaactg gtcagccacg  60
gaaaggattc ctgtttcgct tctgttccgg agtattcttc tccaagacga cgaagtttgt  120
agcgctgtgc cactataccg gatcctcgat cagaatgacg ggcaacttgg tcctataagt  180
atggccgagg aatcagacaa accattgctg gatcctgata ctctcaacag agaaggaatt  240
gacttgggtc tgttgccatt ggaggaggtt tttgaatacc taagaacatc tccacggggg  300
cttttatctg gagatgctga agaaagattg acgatatttg gtcctaacag ccttgaagag  360
aaacgggaga acaagtttct gaagttccta ggttttatgt ggaatccttt gtcatgggtt  420
atggaagctg cagcattgat ggccatcgcc ctagcagata gtgaagtaga gactatcagt  480
cttttgctat accatttctg ctcagtgctg accggagaat cgctacctgt gaccaagaag  540
aagggtgagc aagtcttctc tggctctact tgtaagcaag gtgagataga agctgttgtg  600
atagccaccg gttcgagcac tttctttggt aaaacagcat ctttggtgga cagcacagat  660
gcaactggac attttcagca ggttctaagc ttgtgccagc agaaaaatga gattgcgcaa  720
agagtttatg ccatcataaa tagatttgca gaaaaaggtt tgaggtctct tgctgttgct  780
tatcaggaaa ttccagagag aagcagcaac agtcctggag gaccatggtt gttctgtggt  840
ctgttgccac tgtttgatcc tccaaggcat gacagtgctg aaaccatact gagagctctt  900
aaccttggag tttgtgttaa gatgatcacc ggtgatcagt tggcgattgc aaaggagaca  960
ggaaggcgac ttgggatggg aaccaatatg tatccttctt cctctttgtt aggccacaac  1020
aacgatgatc acgaagccat tccattggat gagcttattg aaatggcaga tggatttgct  1080
ggagtgttcc ctgaacacaa gtatgagatt gtaaagatat tacaagaaaa gaagcatgtg  1140
gttggaatga ccagagatgg tgtgaatgat gctcctgctc tgaaaaaggc tgacattgga  1200
atagctgtcg ctgatgcaac agatgccgca agaagttctg ctgacattgt actaactgag  1260
cctggcttaa gtgtaattat cagtgctgtc ttgaccagca gagccatttt ccagcgtatg  1320
aagaactata cagtatatgc agtctcgatc accatacgaa tagtgctcgg ttttacactt  1380
ttagcgttga tatgggaata cgactttcca cctttcatgg ttttgataat cgcaatactc  1440
aatgacggga ccatcatgac tatctctaaa gatcgagtaa ggccatctcc tacacccgag  1500
agttggaagc tcaaccagat atttgcgact ggaattgtca ttggaacata ccttgcattg  1560
gtcactgtcc tattctactg gatcattgtc tctaccacct tcttcgagaa acacttccat  1620
gtaaaatcaa tcggcaacaa cagtgaacaa gtctcatccg ctctgtatct ccaagtaagc  1680
atcatcagtc aagcactcat atttgtaaca cgtagtcgaa gctggtcttt tcttgaacgt  1740
cccgggactc tcctgatttt cgccttcctt gttgcccaac ttgccgctac attgattgct  1800
gtctatgcca acatcagctt tgctaacatc accggcattg gatggggatg ggcaggtgtt  1860
atatggttat acagtttgat tttttacata cctcttgata ttataaagtt cttcttccac  1920
tacgcattga gtggagatgc ttggaacctt gtatttgacc gtaagacagc atttactaat  1980
aagaaagatt atagaaaaga tgacggagcg tccaatgtaa ccatctctca gagaagtcac  2040
tctgcagaag aactcagtgg aagtcgttct cgcgcatctt ggatcgctga gcagaccaga  2100
aggcgtgcag aaaccgccag gctcttggag ggacactcgg tgtcaaggca tttggaatca  2160
gtaatgaagc tcaaacaaat tgaccccaag atgattcgtg cagacactgt ctaa        2214

SEQ ID NO: 158          moltype = AA  length = 737
FEATURE                 Location/Qualifiers
source                  1..737
                        mol_type = protein
                        organism = Thlaspi arvense
SEQUENCE: 158
MLPLMAIPLA TCRSINWSAT ERIPVSLLFR SILLQDDEVC SAVPLYRILD QNDGQLGPIS  60
MAEESDKPLL DPDTLNREGI DLGLLPLEEV FEYLRTSPRG LLSGDAEERL TIFGPNSLEE  120
KRENKFLKFL GFMWNPLSWV MEAAALMAIA LADSEVETIS LLLYHFCSVL TGESLPVTKK  180
KGEQVFSGST CKQGEIEAVV IATGSSTFFG KTASLVDSTD ATGHFQQVLS LCQQKNEIAQ  240
RVYAIINRFA EKGLRSLAVA YQEIPERSSN SPGGPWLFCG LLPLFDPPRH DSAETILRAL  300
NLGVCVKMIT GDQLAIAKET GRRLGMGTNM YPSSSLLGHN NDDHEAIPLD ELIEMADGFA  360
GVFPEHKYEI VKILQEKKHV VGMTRDGVND APALKKADIG IAVADATDAA RSSADIVLTE  420
PGLSVIISAV LTSRAIFQRM KNYTVYAVSI TIRIVLGFTL LALIWEYDFP PFMVLIIAIL  480
NDGTIMTISK DRVRPSPTPE SWKLNQIFAT GIVIGTYLAL VTVLFYWIIV STTFFEKHFH  540
```

```
VKSIGNNSEQ VSSALYLQVS IISQALIFVT RSRSWSFLER PGTLLIFAFL VAQLAATLIA  600
VYANISFANI TGIGWGWAGV IWLYSLIFYI PLDIIKFFFH YALSGDAWNL VFDRKTAFTN  660
KKDYRKDDGA SNVTISQRSH SAEELSGSRS RASWIAEQTR RRAETARLLE GHSVSRHLES  720
VMKLKQIDPK MIRADTV                                                 737

SEQ ID NO: 159          moltype = DNA  length = 733
FEATURE                 Location/Qualifiers
source                  1..733
                        mol_type = genomic DNA
                        organism = Thlaspi arvense
SEQUENCE: 159
atgggaagag ggaagataga gataaagaag atagagaatc agacagcgag gcaagtgacc  60
ttctgcaaga ggagaactgg tcttatcaag aagactaatg agctctctgt tctctgcgat  120
gctcacattg gtctcatcgt cttctcctcc accggaaagc tctcgcagta ctgttccgaa  180
cccctcagga tgcctcagct cattgaccga tacttgaaga cccagtggaa tgcgacttcc  240
tgatcctaat gacggccggg aggaattgta ccaagagatg gaagtactaa aaagagagac  300
atgtaagctt gagcttcgtc tgcgtccata ccatggacat gacttaacct cccttcctcc  360
acacgagctc gatggtctcg agcaacagct cgaacattct gtccttaaag tccgcgagcg  420
taagaatgag ttgatgcagc aacagttgga gaatctaagc agaaagaggc ggatgctaga  480
agaagataac aacaatatgt accgtttgct tcatgagcat cgtaacgcgg ttgaatttca  540
gcaagctggg atagagacga aaccagggga gtatcaacag tttctagagc agcttcagta  600
ctataatgat catcagcaac aaccaaacag tgttcttcag cttgctacgc ttccttctga  660
gattgatcct aattaccatc tccagcttgc tcagcctaat cttcaaaacg atccaacggc  720
caagattgat tag                                                     733

SEQ ID NO: 160          moltype = AA  length = 80
FEATURE                 Location/Qualifiers
source                  1..80
                        mol_type = protein
                        organism = Thlaspi arvense
SEQUENCE: 160
MGRGKIEIKK IENQTARQVT FCKRRTGLIK KTNELSVLCD AHIGLIVFSS TGKLSQYCSE  60
PLRMPQLIDR YLKTQWNATS                                              80

SEQ ID NO: 161          moltype = DNA  length = 733
FEATURE                 Location/Qualifiers
source                  1..733
                        mol_type = genomic DNA
                        organism = Thlaspi arvense
SEQUENCE: 161
atgggaagag ggaagataga gataaagaag atagagaatc agacagcgag gcaagtgacc  60
ttctgcaaga ggagaactgg tcttatcaag aagactaatg agctctctgt tctctgcgat  120
gctcacattg gtctcatcgt cttctcctcc accggaaagc tctcgcagta ctgttccgaa  180
cccctcagga tgcctcagct cattgaccga tacttgaaga cgcagtggaa tgcgacttcc  240
tgatcctaat gacggccggg aggaattgta ccaagagatg gaagtactaa aaagagagac  300
atgtaagctt gagcttcgtc tgcgtccata ccatggacat gacttaacct cccttcctcc  360
acacgagctc gatggtctcg agcaacagct cgaacattct gtccttaaag tccgcgagcg  420
taagaatgag ttgatgcagc aacagttgga gaatctaagc agaaagaggc ggatgctaga  480
agaagataac aacaatatgt accgtttgct tcatgagcat cgtaacgcgg ttgaatttca  540
gcaagctggg atagagacga aaccagggga gtatcaacag tttctagagc agcttcagta  600
ctataatgat catcagcaac aaccaaacag tgttcttcag cttgctacgc ttccttctga  660
gattgatcct aattaccatc tccagcttgc tcagcctaat cttcaaaacg atccaacggc  720
caagattgat tag                                                     733

SEQ ID NO: 162          moltype = AA  length = 80
FEATURE                 Location/Qualifiers
source                  1..80
                        mol_type = protein
                        organism = Thlaspi arvense
SEQUENCE: 162
MGRGKIEIKK IENQTARQVT FCKRRTGLIK KTNELSVLCD AHIGLIVFSS TGKLSQYCSE  60
PLRMPQLIDR YLKTQWNATS                                              80

SEQ ID NO: 163          moltype = DNA  length = 733
FEATURE                 Location/Qualifiers
source                  1..733
                        mol_type = genomic DNA
                        organism = Thlaspi arvense
SEQUENCE: 163
atgggaagag ggaagataga gataaagaag atagagaatc agacagcgag gcaagtgacc  60
ttctgcaaga ggagaactgg tcttatcaag aagactaatg agctctctgt tctctgcgat  120
gctcacattg gtctcatcgt cttctcctcc accggaaagc tctcgcagta ctgttccgaa  180
cccctcagga tgcctcagct cattgaccga tacttgaaga ctcagtggaa tgcgacttcc  240
tgatcctaat gacggccggg aggaattgta ccaagagatg gaagtactaa aaagagagac  300
atgtaagctt gagcttcgtc tgcgtccata ccatggacat gacttaacct cccttcctcc  360
acacgagctc gatggtctcg agcaacagct cgaacattct gtccttaaag tccgcgagcg  420
taagaatgag ttgatgcagc aacagttgga gaatctaagc agaaagaggc ggatgctaga  480
agaagataac aacaatatgt accgtttgct tcatgagcat cgtaacgcgg ttgaatttca  540
gcaagctggg atagagacga aaccagggga gtatcaacag tttctagagc agcttcagta  600
```

```
ctataatgat catcagcaac aaccaaacag tgttcttcag cttgctacgc ttccttctga  660
gattgatcct aattaccatc tccagcttgc tcagcctaat cttcaaaacg atccaacggc  720
caagattgat tag                                                      733

SEQ ID NO: 164         moltype = AA  length = 80
FEATURE                Location/Qualifiers
source                 1..80
                       mol_type = protein
                       organism = Thlaspi arvense
SEQUENCE: 164
MGRGKIEIKK IENQTARQVT FCKRRTGLIK KTNELSVLCD AHIGLIVFSS TGKLSQYCSE  60
PLRMPQLIDR YLKTQWNATS                                               80

SEQ ID NO: 165         moltype = DNA  length = 1005
FEATURE                Location/Qualifiers
source                 1..1005
                       mol_type = genomic DNA
                       organism = Thlaspi arvense
SEQUENCE: 165
atggataact cagctccgga ttctttgtcc agatcggaaa ccgccgtcac ctacgattct  60
ccttacccac tctacgccat ggccttctct tccatcggta ctccctccgg ccaccgaatc  120
gccgtcggaa gcttcctcga ggattacaac aaccgcatcg acattctctc cttcgattcc  180
gactccatga cggtgaagcc tctcccgaat ctctccttcg atcatcctta tcctcccaca  240
aagctgatgt tcagccctcc ctccctccgt cgtccctccg ccggcgatct cctccgttta  300
tgggagatca gtgaagattc ctccaccgtc gagcctgtct cggtgctcaa caacagcaag  360
acgagcgagt tctgcgcgcc gttgacctcc ttcgactgga acgacgtcga gccgaaacgc  420
ctgggaacct gcagcatcga cacgacctgc acgatttggg acatcgagaa gtgcgtggtg  480
gagacgcagc tcatagcgca cgataaggag gtccacgaca tcgcttgggg agaagctagg  540
gttttcgcgt cggtctccgc cgacggatcc gtcaggatct tcgatctacg cgacaaggag  600
cattccacca tcatctacga gagtcctcag cccgatacgc ctctcctaag actcgcctgg  660
aacaaacaag acctgaggta catggcgacg atcctgatgg attcgaataa ggtcgtgatt  720
ctcgacattc gctcgccgac gatgcctgtc gccgagctcg aacggcacca ggctagcgtc  780
aacgccatag cttgggctcc acagagctgc aaacacatct gctctgctgg tgacgacacg  840
caggctctca tctgggagct cccgactgta gctggaccca acggcattga tccgatgtcg  900
gtttactcag ccggctcgga gataaaccag ttgcagtggt cctcttcaca gcctgattgg  960
attggcatcg ctttcgctaa caaaatgcag ctccttagag tttga                  1005

SEQ ID NO: 166         moltype = AA  length = 334
FEATURE                Location/Qualifiers
source                 1..334
                       mol_type = protein
                       organism = Thlaspi arvense
SEQUENCE: 166
MDNSAPDSLS RSETAVTYDS PYPLYAMAFS SIGTPSGHRI AVGSFLEDYN NRIDILSFDS  60
DSMTVKPLPN LSFDHPYPPT KLMFSPPSLR RPSAGDLLRL WEISEDSSTV EPVSVLNNSK  120
TSEFCAPLTS FDWNDVEPKR LGTCSIDTTC TIWDIEKCVV ETQLIAHDKE VHDIAWGEAR  180
VFASVSADGS VRIFDLRDKE HSTIIYESPQ PDTPLLRLAW NKQDLRYMAT ILMDSNKVVI  240
LDIRSPTMPV AELERHQASV NAIAWAPQSC KHICSAGDDT QALIWELPTV AGPNGIDPMS  300
VYSAGSEINQ LQWSSSQPDW IGIAFANKMQ LLRV                               334

SEQ ID NO: 167         moltype = DNA  length = 1026
FEATURE                Location/Qualifiers
source                 1..1026
                       mol_type = genomic DNA
                       organism = Thlaspi arvense
SEQUENCE: 167
atggataact cagctccgga ttctttgtcc agatcggaaa ccgccgtcac ctacgattct  60
ccttacccac tctacgccat ggccttctct tccatcggta ctccctccgg ccaccgaatc  120
gccgtcggaa gcttcctcga ggattacaac aaccgcatcg acattctctc cttcgattcc  180
gactccatga cggtgaagcc tctcccgaat ctctccttcg atcatcctta tcctcccaca  240
aagctgatgt tcagccctcc ctccctccgt cgtccctccg ccggcgatct cctcgcttcc  300
ttcggcgatt tcctccgttt atgggagatc agtgaagatt cctccaccgt cgagcctgtc  360
tcggtgctca acaacagcaa gacgagcgag ttctgcgcgc cgttgacctc cttcgactgg  420
aacgacgtcg agccgaaacg cctgggaacc tgcagcatcg acacgacctg cacgatttgg  480
gacatcgaga agtgcgtggt ggagacgcag ctcatagcgc acgataagga ggtccacgac  540
atcgcttggg gagaagctag ggttttcgcg tcggtctccg ccgacggatc cgtcaggatc  600
ttcgatctac gcgacaagga gcattccacc atcatctacg agagtcctca gcccgatacg  660
cctctcctaa gactcgcctg gaacaaacaa gacctgaggt acatggcgac gatcctgatg  720
gattcgaata aggtcgtgat tctcgacatt cgctcgccga cgatgcctgt cgccgagctc  780
gaacggcacc aggctagcgt caacgccata gcttgggctc cacagagctg caaacacatc  840
tgctctgctg gtgacgacac gcaggctctc atctgggagc tcccgactgt agctggaccc  900
aacggcattg atccgatgtc ggtttactca gccggctcgg agataaacca gttgcagtgg  960
tcctcttcac agcctgattg gattggcatc gctttcgcta acaaaatgca gctccttaga  1020
gtttga                                                              1026

SEQ ID NO: 168         moltype = AA  length = 341
FEATURE                Location/Qualifiers
source                 1..341
                       mol_type = protein
```

```
                         organism = Thlaspi arvense
SEQUENCE: 168
MDNSAPDSLS RSETAVTYDS PYPLYAMAFS SIGTPSGHRI AVGSFLEDYN NRIDILSFDS  60
DSMTVKPLPN LSFDHPYPPT KLMFSPPSLR RPSAGDLLAS FGDFLRLWEI SEDSSTVEPV  120
SVLNNSKTSE FCAPLTSFDW NDVEPKRLGT CSIDTTCTIW DIEKCVVETQ LIAHDKEVHD  180
IAWGEARVFA SVSADGSVRI FDLRDKEHST IIYESPQPDT PLLRLAWNKQ DLRYMATILM  240
DSNKVVILDI RSPTMPVAEL ERHQASVNAI AWAPQSCKHI CSAGDDTQAL IWELPTVAGP  300
NGIDPMSVYS AGSEINQLQW SSSQPDWIGI AFANKMQLLR V                     341

SEQ ID NO: 169           moltype = DNA  length = 1026
FEATURE                  Location/Qualifiers
source                   1..1026
                         mol_type = genomic DNA
                         organism = Thlaspi arvense
SEQUENCE: 169
atggataact cagctccgga ttctttgtcc agatcggaaa ccgccgtcac ctacgattct  60
ccttacccac tctacgccat ggccttctct tccatcggta ctccctccgg ccaccgaatc  120
gccgtcggaa gcttcctcga ggattacaac aaccgcatcg acattctctc cttcgattcc  180
gactccatga cggtgaagcc tctcccgaat ctctccttcg atcatcctta tcctcccaca  240
aagctgatgt tcagccctcc ctccctccgt cgtccctccg ccggcgatct cctcgcttcc  300
tccggcgatt tcctccgttt atgggagatc agtgaagatt cctccaccgt cgagcctgtc  360
tcggtgctca acaacagcaa gacgagcgag ttctgcgcgc cgttgacctc cttcgactgg  420
aacgacgtcg agccgaaacg cctgggaacc tgcagcatcg acacgacctg cacgatttgg  480
gacatcgaga agtgcgtggt ggagacgcag ctcatagcgc acgataagga ggtccacgac  540
atcgcttggg aagaagctag ggttttcgcg tcggtctccg ccgacggatc cgtcaggatc  600
ttcgatctac gcgacaagga gcattccacc atcatctacg agagtcctca gcccgatacg  660
cctctcctaa gactcgcctg gaacaaacaa gacctgaggt acatggcgac gatcctgatg  720
gattcgaata aggtcgtgat tctcgacatt cgctcgccga cgatgcctgt cgccgagctc  780
gaacggcacc aggctagcgt caacgccata gcttgggctc cacagagctg caaacacatc  840
tgctctgctg gtgacgacac gcaggctctc atctgggagc tcccgactgt agctggaccc  900
aacggcattg atccgatgtc ggtttactca gccggctcgg agataaacca gttgcagtgg  960
tcctcttcac agcctgattg gattggcatc gctttcgcta acaaaatgca gctccttaga  1020
gtttga                                                             1026

SEQ ID NO: 170           moltype = AA  length = 341
FEATURE                  Location/Qualifiers
source                   1..341
                         mol_type = protein
                         organism = Thlaspi arvense
SEQUENCE: 170
MDNSAPDSLS RSETAVTYDS PYPLYAMAFS SIGTPSGHRI AVGSFLEDYN NRIDILSFDS  60
DSMTVKPLPN LSFDHPYPPT KLMFSPPSLR RPSAGDLLAS SGDFLRLWEI SEDSSTVEPV  120
SVLNNSKTSE FCAPLTSFDW NDVEPKRLGT CSIDTTCTIW DIEKCVVETQ LIAHDKEVHD  180
IAWEEARVFA SVSADGSVRI FDLRDKEHST IIYESPQPDT PLLRLAWNKQ DLRYMATILM  240
DSNKVVILDI RSPTMPVAEL ERHQASVNAI AWAPQSCKHI CSAGDDTQAL IWELPTVAGP  300
NGIDPMSVYS AGSEINQLQW SSSQPDWIGI AFANKMQLLR V                     341

SEQ ID NO: 171           moltype = DNA  length = 1917
FEATURE                  Location/Qualifiers
source                   1..1917
                         mol_type = genomic DNA
                         organism = Thlaspi arvense
SEQUENCE: 171
atgatggatg gaatggttac tgaacaaaac agaatatctg ttccggagaa tctgaaaaaa  60
cagctcgcag tttcagttcg aagaattcaa tggagttacg caatcttctg gtctatttct  120
gcttctcagc ctggagtgtt agaatgggga gatggatact ataatggaga tatcaaaacg  180
aggaagacga ttctagcatc ggagatcaaa gctgatcagc ttggtttacg aaggagcgag  240
caacttaggg agctttacga gtctctttct gtcgctgaat cttcttcctc cggcgtcgcc  300
gccggatctc aggtcactag acgagcttcc gccgccgcac tctcgccgga agatctcgcc  360
gacacagagt ggtactactt ggtttgtatg tctttcgtct tcaacatcgg tgaaggaatg  420
cctggacgaa cgtttgcgaa cagtgaaccg atatggttgt gcaacgctca caccgcagat  480
agtaaagtct ttagccgctc tcttctggca aaaagtgctt cggttgtgac agtgatttgc  540
ttcccgtttc ttggaggagt cgttgagatc ggtactacag aacatatcat agaggacatg  600
aatgtaatac aatgcgtgaa gacatcattc ctcgaagctc cagatccata cgcttcactg  660
ttaccaacaa gatccgatta tcacatcgac aacgttctcg atccgcaaca gatcctaggt  720
gacgagattt acgcgcctat gtttggtact gagacttttc cggcgacttc tcctagcaga  780
actaccagca ggttcgatcc tgaacacgag caagtagcag aagatcatga ctcgttcatg  840
gccgaaggaa tcaatggagg agcttctcag gttcaaagct ggcagttcat ggacgaagag  900
cttagtaact gcgttcacca atcgcttaat tccagtgatt gcgtctctca aacgtttgtt  960
aaagcagcgg ctggacgagt ttcttgcaac gcaagaaaag gaagggctca aaggttaggg  1020
catattcaag agcggcagag aaatgtgaaa atgttgtctt ttgatccaag aaacgatgac  1080
gttcattacc aaagtgtgat ctccacaatt tttaagacca accatcagtt aattctcgga  1140
ccgcagttcc ggaattgcga taagcggtca agcttcacga ggtggaagaa attatcgtca  1200
tcatcatctg gaaccgcgtc aatcgtatca ccgtcacaag gaatgttaaa gaagattctt  1260
ttcgaggttc ctcgagtgca ccagaaagag aagttgttgt tggattcacc agggatcggg  1320
gatgaaacca cgaaccacgc ggttttagag aagaaacggc gtgagaaatt gaacgaacgg  1380
ttcatgatct tgagatcaat cattccatca atcaataaga tcgataaagt atcaattctt  1440
gacgatacga tagagtatct tcaagaactg gaaagacgtg ttcaagaact agaatcttgc  1500
agagaatcaa ccgatacaga aacacgtggg acaatgacag tgaagaggaa gaaatctcac  1560
```

```
gacgcagggg aaagaacttc agccaactgc acaaacaatg aaaccggaaa cgggaagaga  1620
gttcaggttg gagaaaccga gccggcagag accgattata ccggtttaac tgataattta  1680
aggatcggtt cgtttggtaa tgaggtcgtt attgagctta gatgtgcttg gagagaagga  1740
gtattgcttg agataatgga tgtcattagt gatctcaact tagattctca ttcggtacaa  1800
tcctcgacag gagatggttt actctgctta accgtcaact gcaagcacaa gggttcaaaa  1860
atgacgacaa caggaatgat caaagaggca cttcaaaagg ttgcatggat ctgttga     1917

SEQ ID NO: 172         moltype = AA  length = 638
FEATURE                Location/Qualifiers
source                 1..638
                       mol_type = protein
                       organism = Thlaspi arvense
SEQUENCE: 172
MMDGMVTEQN RISVPENLKK QLAVSVRRIQ WSYAIFWSIS ASQPGVLEWG DGYYNGDIKT  60
RKTILASEIK ADQLGLRRSE QLRELYESLS VAESSSSGVA AGSQVTRRAS AAALSPEDLA  120
DTEWYYLVCM SFVFNIGEGM PGRTFANSEP IWLCNAHTAD SKVFSRSLLA KSASVVTVIC  180
FPFLGGVVEI GTTEHIIEDM NVIQCVKTSF LEAPDPYASL LPTRSDYHID NVLDPQQILG  240
DEIYAPMFGT ETFPATSPSR TTSRFDPEHE QVAEDHDSFM AEGINGGASQ VQSWQFMDEE  300
LSNCVHQSLN SSDCVSQTFV KAAAGRVSCN ARKGRAQRLG HIQERQRNVK MLSFDPRNDD  360
VHYQSVISTI FKTNHQLILG PQFRNCDKRS SFTRWKKLSS SSSGTASIVS PSQGMLKKIL  420
FEVPRVHQKE KLLLDSPGIG DETTNHAVLE KKRREKLNER FMILRSIIPS INKIDKVSIL  480
DDTIEYLQEL ERRVQELESC RESTDTETRG TMTVKRKKSH DAGERTSANC TNNETGNGKR  540
VQVGETEPAE TDYTGLTDNL RIGSFGNEVV IELRCAWREG VLLEIMDVIS DLNLDSHSVQ  600
SSTGDGLLCL TVNCKHKGSK MTTTGMIKEA LQKVAWIC                          638

SEQ ID NO: 173         moltype = DNA  length = 3577
FEATURE                Location/Qualifiers
source                 1..3577
                       mol_type = genomic DNA
                       organism = Thlaspi arvense
SEQUENCE: 173
atgatgtaaa gagttgcagg tttttctttt cttttttttgt ttgctataat tttaacccca  60
aaaaaaaaac tcacttttc taaatcagga caaaaatgaa attgatcctt ttgttttctt  120
tttccatttt gtatggtttc atgaaaattt agggatggaa tggttactga acaaaacaga  180
atatctgttc cggagaatct gaaaaaacag ctcgcagttt cagttcgaag aattcaatgg  240
agttacgcaa tcttctggtc tatttctgct tctcagcctg ggtgagtttc ttaatcacta  300
tccttgaaac tgatcagttt tgttattttt gaaggttcaa atctctacta gggggaaaaa  360
aatgaatttc gaattttcat tgctaaagcc tttgtctgaa gctagaagtg cttttggttc  420
tgccttaaaa attattaaaa ctttgataaa aagattactg atttaatttg ggaaattttg  480
atttattctg cttctaagtt ccatcaatga agttcttcaa ctcaagacaa tgttctaagt  540
cgatttgagt tttaggttga tactgtctta gagattatta gaaattttat aagtggaaat  600
agtgagacct tattagttac aaaaaaaact caaaacaaag attaattatg gttttttttt  660
tcttaaaatt caattttctt ttgtcttttt tttgtgtgtg gataattcgg gccggaaacc  720
gattaatctc agagtgtgca agttcgttgg gttcttgaag ttcttcatta gtttcttact  780
gattcgattc gatttttgt ttttattgt ttgaaccaaa agagtgttag aatggggaga  840
tggatactat aatggagata tcaaaacgag gaagacgatt ctagcatcgg agatcaaagc  900
tgatcagctt ggtttacgaa ggagcgagca acttagggag ctttacgagt ctctttctgt  960
cgctgaatct tcttcctccg gcgtcgccgc cggatctcag gtcactagac gagcttctgc  1020
cgccgcactc tcgccggaag atctcgccga cacagagtgg tactacttgg tttgtatgtc  1080
tttcgtcttc aacatcggtg aagggtaatt gcgtctattt atctttcggc attgacattt  1140
actatgtgcg tcgtcatgtt cggattgatc ttgtcagtga aataaataaa aaaaagacaa  1200
aatacccttt tattacatgt atgtctggat attagacttt ttggtaaaaa actaaaaagt  1260
tttaactaga aaccaaaaat tattattttc cacaatcgtt tgaaatttct tttttttttc  1320
tttttttttt ggtttggttt ggttcagttt agggtttttt tggattttca gatttttagg  1380
tcctggagaa aagaagtcca agatcggttt ggttaagtca aattttaaaa tgatttggat  1440
aattggtctt ggtttggttt ttaattaaaa attaatcaaa atgaaaatat ataattagat  1500
ttaatcatta ttataaattt tgtaaatgct taatgaaatg aatttcgatt tattcagttc  1560
tgttacacca aatatgcgtt tggttttgct ttttatgcat ggcatttccg tcttttcacg  1620
tatctagcta ttcattcaca gaatgcctgg acgaacgttt gcgaacagtg aaccgatatg  1680
gttgtgcaac gctcacaccg cagatagtaa agtctttagc cgctctcttc tggcaaaagt  1740
tagttgtatt atattgtagt tgctatataa catttctttt tttgcgactg caaacgctta  1800
aattaatcgt tttttttgtg tgtttgtgtg ttttgtgcct gtttagagtg cttcggttgt  1860
gacagtgatt tgcttcccgt ttcttggagg agtcgttgag atcggtacta cagaacatgt  1920
aaggcaaaat ttccattttc tgtcacaatt tgagaatagt tataaaacaa ccactagtta  1980
agtttataac agtgcgaact aattcatcag accgacgaat taaggtataa agttatgata  2040
caaaaagttt aaagacttat cttgttgtgt gttttatccc gtagatcata gaggacatga  2100
atgtaataca atgcgtgaag acatcattcc tcgaagctcc agatccatac gcttcactgt  2160
taccaacaag atccgattat cacatcgaca acgttctcga tccgcaacag atcctaggtg  2220
acgagattta cgcgcctatg tttggtactg agacttttcc ggcgacttct cctagcagaa  2280
ctaccagcag gttcgatcct gaacacgagc aagtagcaga agatcatgac tcgttcatgg  2340
ccgaaggaat caatggagga gcttctcagg ttcaaagctg gcagttcatg gacgaagagc  2400
ttagtaactg cgttcaccaa tcgcttaatt ccagtgattg cgtctctcaa acgtttgtta  2460
aagcagcggc tggacgagtt tcttgcaacg caagaaaagg aagggctcaa aggttagggc  2520
atattcaaga gcggcagaga aatgtgaaaa tgttgtcttt tgatccaaga aacgatgacg  2580
ttcattacca aagtgtgatc tccacaattt ttaagaccaa ccatcagtta attctcggac  2640
cgcagttccg gaattgcgat aagcggtcaa gcttcacgag gtggaagaaa ttatcgtcat  2700
catcatctgg aaccgcgtca atcgtatcac cgtcacaagg aatgttaaag aagattcttt  2760
tcgaggttcc tcgagtgcac cagaaagaga agttgttgtt ggattcacca gggatcgggg  2820
atgaaaccac gaaccacgcg gttttagaga agaaacggcg tgagaaattg aacgaacggt  2880
```

```
tcatgatctt gagatcaatc attccatcaa tcaataaggt atatataacc gaatcttcaa  2940
aaattcaaat tcatattatg taaccagagt taactaattc taggtttgac attttcaata  3000
gatcgataaa gtatcaattc ttgacgatac gatagagtat cttcaagaac tggaaagacg  3060
tgttcaagaa ctagaatctt gcagagaatc aaccgataca gaaacacgtg ggacaatgac  3120
agtgaagagg aagaaatctc acgacgcagg ggaaagaact tcagccaact gcacaaacaa  3180
tgaaaccgga aacgggaaga gagttcaggt tggagaaacc gagccggcag agaccgatta  3240
taccggttta actgataatt taaggatcgg ttcgtttggt aatgaggtcg ttattgagct  3300
tagatgtgct tggagagaag gagtattgct tgagataatg gatgtcatta gtgatctcaa  3360
cttagattct cattcggtac aatcctcgac aggagatggt ttactctgct taaccgtcaa  3420
ctgcaaggta cagcctttaa cctaattttt gcttaaccgg gataaggtta acatggattg  3480
atatattgtg aaatgttggt ttcagcacaa gggttcaaaa atgacgacaa caggaatgat  3540
caaagaggca cttcaaaagg ttgcatggat ctgttga                           3577

SEQ ID NO: 174         moltype = DNA  length = 1917
FEATURE                Location/Qualifiers
source                 1..1917
                       mol_type = genomic DNA
                       organism = Thlaspi arvense
SEQUENCE: 174
atgatggatg gaatggttac tgaacaaaac agaatatctg ttccggagaa tctgaaaaaa  60
cagctcgcag tttcagttcg aagaattcaa tggagttacg caatcttctg gtctatttct  120
gcttctcagc ctggagtgtt agaatgggga gatggatact ataatggaga tatcaaaacg  180
aggaagacga ttctagcatc ggagatcaaa gctgatcagc ttggtttacg aaggagcgag  240
caacttagga agctttacga gtctctttct gtcgctgaat cttcttcctc cggcgtcgcc  300
gccggatctc aggtcactag acgagcttct gccgccgcac tctcgccgga agatctcgcc  360
gacacagagt ggtactactt ggtttgtatg tctttcgtct tcaacatcgg tgaaggaatg  420
cctggacgaa cgtttgcgaa cagtgaaccg atatggttgt gcaacgctca caccgcagat  480
agtaaagtct ttagccgctc tcttctggca aaaagtgctt cggttgtgac agtgatttgc  540
ttcccgtttc ttggaggagt cgttgagatc ggtactacag aacatatcat agaggacatg  600
aatgtaatac aatgcgtgaa gacatcattc ctcgaagctc cagatccata cgcttcactg  660
ttaccaacaa gatccgatta tcacatcgac aacgttctcg atccgcaaca gatcctaggt  720
gacgagattt acgcgcctat gtttggtact gagacttttc cggcgacttc tcctagcaga  780
actaccagca ggttcgatcc tgaacacgag caagtagcag aagatcatga ctcgttcatg  840
gccgaaggaa tcaatggagg agcttctcag gttcaaagct ggcagttcat ggacgaagag  900
cttagtaact gcgttcacca atcgcttaat tccagtgatt gcgtctctca aacgtttgtt  960
aaagcagcgg ctggacgagt ttcttgcaac gcaagaaaag gaagggctca aaggttaggg  1020
catattcaag agcggcagag aaatgtgaaa atgttgtctt ttgatccaag aaacgatgac  1080
gttcattacc aaagtgtgat ctccacaatt tttaagacca accatcagtt aattctcgga  1140
ccgcagttcc ggaattgcga taagcggtca agcttcacga ggtggaagaa attatcgtca  1200
tcatcatctg gaaccgcgtc aatcgtatca ccgtcacaag gaatgttaaa gaagattctt  1260
ttcgaggttc ctcgagtgca ccagaaagag aagttgttgt tggattcacc agggatcggg  1320
gatgaaacca cgaaccacgc ggttttagag aagaaacggc gtgagaaatt gaacgaacgg  1380
ttcatgatct tgagatcaat cattccatca atcaataaga tcgataaagt atcaattctt  1440
gacgatacga tagagtatct tcaagaactg gaaagacgtg ttcaagaact agaatcttgc  1500
agagaatcaa ccgatacaga aacacgtggg acaatgacag tgaagaggaa gaaatctcac  1560
gacgcagggg aaagaacttc agccaactgc acaaacaatg aaaccggaaa cgggaagaga  1620
gttcaggttg gagaaaccga gccggcagag accgattata ccggtttaac tgataattta  1680
aggatcggtt cgtttggtaa tgaggtcgtt attgagctta gatgtgcttg gagagaagga  1740
gtattgcttg agataatgga tgtcattagt gatctcaact tagattctca ttcggtacaa  1800
tcctcgacag gagatggttt actctgctta accgtcaact gcaagcacaa gggttcaaaa  1860
atgacgacaa caggaatgat caaagaggca cttcaaaagg ttgcatggat ctgttga     1917

SEQ ID NO: 175         moltype = AA  length = 638
FEATURE                Location/Qualifiers
source                 1..638
                       mol_type = protein
                       organism = Thlaspi arvense
SEQUENCE: 175
MMDGMVTEQN RISVPENLKK QLAVSVRRIQ WSYAIFWSIS ASQPGVLEWG DGYYNGDIKT  60
RKTILASEIK ADQLGLRRSE QLRKLYESLS VAESSSSGVA AGSQVTRRAS AAALSPEDLA  120
DTEWYYLVCM SFVFNIGEGM PGRTFANSEP IWLCNAHTAD SKVFSRSLLA KSASVVTVIC  180
FPFLGGVVEI GTTEHIIEDM NVIQCVKTSF LEAPDPYASL LPTRSDYHID NVLDPQQILG  240
DEIYAPMFGT ETFPATSPSR TTSRFDPEHE QVAEDHDSFM AEGINGGASQ VQSWQFMDEE  300
LSNCVHQSLN SSDCVSQTFV KAAAGRVSCN ARKGRAQRLG HIQERQRNVK MLSFDPRNDD  360
VHYQSVISTI FKTNHQLILG PQFRNCDKRS SFTRWKKLSS SSSGTASIVS PSQGMLKKIL  420
FEVPRVHQKE KLLLDSPGIG DETTNHAVLE KKRREKLNER FMILRSIIPS INKIDKVSIL  480
DDTIEYLQEL ERRVQELESC RESTDTETRG TMTVKRKKSH DAGERTSANC TNNETGNGKR  540
VQVGETEPAE TDYTGLTDNL RIGSFGNEVV IELRCAWREG VLLEIMDVIS DLNLDSHSVQ  600
SSTGDGLLCL TVNCKHKGSK MTTTGMIKEA LQKVAWIC                          638

SEQ ID NO: 176         moltype = DNA  length = 1917
FEATURE                Location/Qualifiers
source                 1..1917
                       mol_type = genomic DNA
                       organism = Thlaspi arvense
SEQUENCE: 176
atgatggatg gaatggttac tgaacaaaac agaatatctg ttccggagaa tctgaaaaaa  60
cagctcgcag tttcagttcg aagaattcaa tggagttacg caatcttctg gtctatttct  120
gcttctcagc ctggagtgtt agaatgggga gatggatact ataatggaga tatcaaaacg  180
```

```
aggaagacga ttctagcatc ggagatcaaa gctgatcagc ttggtttacg aaggagcgag  240
caacttaggg agctttacga gtctctttct gtcgctgaat cttcttcctc cggcgtcgcc  300
gccggatctc aggtcactag acgagcttct gccgccgcac tctcgccgga agatctcgcc  360
gacacaaagt ggtactactt ggtttgtatg tctttcgtct tcaacatcgg tgaaggaatg  420
cctggacgaa cgtttgcgaa cagtgaaccg atatggttgt gcaacgctca caccgcagat  480
agtaaagtct ttagccgctc tcttctggca aaaagtgctt cggttgtgac agtgatttgc  540
ttcccgtttc ttggaggagt cgttgagatc ggtactacag aacatatcat agaggacatg  600
aatgtaatac aatgcgtgaa gacatcattc ctcgaagctc cagatccata cgcttcactg  660
ttaccaacaa gatccgatta tcacatcgac aacgttctcg atccgcaaca gatcctaggt  720
gacgagattt acgcgcctat gtttggtact gagacttttc cggcgacttc tcctagcaga  780
actaccagca ggttcgatcc tgaacacgag caagtagcag aagatcatga ctcgttcatg  840
gccgaaggaa tcaatggagg agcttctcag gttcaaagct ggcagttcat ggacgaagag  900
cttagtaact gcgttcacca atcgcttaat tccagtgatt gcgtctctca aacgtttgtt  960
aaagcagcgg ctggacgagt ttcttgcaac gcaagaaaag gaagggctca aaggttaggg  1020
catattcaag agcggcagag aaatgtgaaa atgttgtctt ttgatccaag aaacgatgac  1080
gttcattacc aaagtgtgat ctccacaatt tttaagacca accatcagtt aattctcgga  1140
ccgcagttcc ggaattgcga taagcggtca agcttcacga ggtggaagaa attatcgtca  1200
tcatcatctg gaaccgcgtc aatcgtatca ccgtcacaag gaatgttaaa gaagattctt  1260
ttcgaggttc ctcgagtgca ccagaaagag aagttgttgt tggattcacc agggatcggg  1320
gatgaaacca cgaaccacgc ggttttagag aagaaacggc gtgagaaatt gaacgaacgg  1380
ttcatgatct tgagatcaat cattccatca atcaataaga tcgataaagt atcaattctt  1440
gacgatacga tagagtatct tcaagaactg gaaagacgtg ttcaagaact agaatcttgc  1500
agagaatcaa ccgatacaga aacacgtggg acaatgacag tgaagaggaa gaaatctcac  1560
gacgcagggg aaagaacttc agccaactgc acaaacaatg aaaccggaaa cgggaagaga  1620
gttcaggttg gagaaaccga gccggcagag accgattata ccggtttaac tgataattta  1680
aggatcggtt cgtttggtaa tgaggtcgtt attgagctta gatgtgcttg gagagaagga  1740
gtattgcttg agataatgga tgtcattagt gatctcaact tagattctca ttcggtacaa  1800
tcctcgacag gagatggttt actctgctta accgtcaact gcaagcacaa gggttcaaaa  1860
atgacgacaa caggaatgat caaagaggca cttcaaaagg ttgcatggat ctgttga     1917

SEQ ID NO: 177          moltype = AA  length = 638
FEATURE                 Location/Qualifiers
source                  1..638
                        mol_type = protein
                        organism = Thlaspi arvense
SEQUENCE: 177
MMDGMVTEQN RISVPENLKK QLAVSVRRIQ WSYAIFWSIS ASQPGVLEWG DGYYNGDIKT  60
RKTILASEIK ADQLGLRRSE QLRELYESLS VAESSSSGVA AGSQVTRRAS AAALSPEDLA  120
DTKWYYLVCM SFVFNIGEGM PGRTFANSEP IWLCNAHTAD SKVFSRSLLA KSASVVTVIC  180
FPFLGGVVEI GTTEHIIEDM NVIQCVKTSF LEAPDPYASL LPTRSDYHID NVLDPQQILG  240
DEIYAPMFGT ETFPATSPSR TTSRFDPEHE QVAEDHDSFM AEGINGGASQ VQSWQFMDEE  300
LSNCVHQSLN SSDCVSQTFV KAAAGRVSCN ARKGRAQRLG HIQERQRNVK MLSFDPRNDD  360
VHYQSVISTI FKTNHQLILG PQFRNCDKRS SFTRWKKLSS SSSGTASIVS PSQGMLKKIL  420
FEVPRVHQKE KLLLDSPGIG DETTNHAVLE KKRREKLNER FMILRSIIPS INKIDKVSIL  480
DDTIEYLQEL ERRVQELESC RESTDTETRG TMTVKRKKSH DAGERTSANC TNNETGNGKR  540
VQVGETEPAE TDYTGLTDNL RIGSFGNEVV IELRCAWREG VLLEIMDVIS DLNLDSHSVQ  600
SSTGDGLLCL TVNCKHKGSK MTTTGMIKEA LQKVAWIC                          638

SEQ ID NO: 178          moltype = DNA  length = 1917
FEATURE                 Location/Qualifiers
source                  1..1917
                        mol_type = genomic DNA
                        organism = Thlaspi arvense
SEQUENCE: 178
atgatggatg gaatggttac tgaacaaaac agaatatctg ttccggagaa tctgaaaaaa  60
cagctcgcag tttcagttcg aagaattcaa tggagttacg caatcttctg gtctatttct  120
gcttctcagc ctggagtgtt agaatgggga gatggatact ataatggaga tatcaaaacg  180
aggaagacga ttctagcatc ggagatcaaa gctgatcagc ttggtttacg aaggagcgag  240
caacttaggg agctttacga gtctctttct gtcgctgaat cttcttcctc cggcgtcgcc  300
gccggatctc aggtcactag acgagcttct gccgccgcac tctcgccgga agatctcgcc  360
gacacagagt ggtactactt ggtttgtatg tctttcgtct tcaacatcgg tgaaggaatg  420
cctggacgaa cgtttgcgaa cagtgaaccg atatggttgt gcaacgctca caccgcagat  480
agtaaagtct ttagccgctc tcttctggca aaaagtgctt cggttgtgac agtgatttgc  540
ttcccgtttc ttggaggagt cgttgagatc ggtactacag aacatatcat agaggacatg  600
aatgtaatac aatgcgtgaa gacatcattc ctcgaagctc cagatccata cgcttcactg  660
ttaccaacaa gatccgatta tcacatcgac aacgttctcg atccgcaaca gatcctaggt  720
gacgagattt acgcgcctat gtttggtact gagacttttc cggcgacttc tcctagcaga  780
actaccagca ggttcgatcc tgaacacgag caagtagcag aagatcatga ctcgttcatg  840
gccgaaggaa tcaatggagg agcttctcag gttcaaagct ggcagttcat ggacgaagag  900
cttagtaact gcgttcacca atcgcttaat tccagtgatt gcgtctctca aacgtttgtt  960
aaagcagcgg ctggacgagt ttcttgcaac gcaagaaaag gaagggctca aaggttaggg  1020
catattcaag agcggcagag aaatgtgaaa atgttgtctt ttgatccaag aaacgatgac  1080
gttcattacc aaagtgtgat ctccacaatt tttaagacca accatcagtt aattctcgga  1140
ccgcagttcc ggaattgcga taagcggtca agcttcacga ggtggaagaa attatcgtca  1200
tcatcatctg gaaccgcgtc aatcgtatca ccgtcacaag gaatgttaaa gaagattctt  1260
ttcgaggttc ctcgagtgca ccagaaagag aagttgttgt tggattcacc agggatcggg  1320
gatgaaacca cgaaccacgc ggttttagag aagaaacggc gtgagaaatt gaacgaacgg  1380
ttcatgatct tgagatcaat cattccatca atcaataaga tcgataaagt atcaattctt  1440
gacgatacga tagagtatct tcaagaactg gaaagacgtg ttcaagaact agaatcttgc  1500
```

```
agagaatcaa ccgatacaga aacacgtggg acaatgacag tgaagaggaa gaaatctcac  1560
gacgcagggg aaagaacttc agccaactgc acaaacaatg aaaccggaaa cgggaagaga  1620
gttcaggttg gagaaaccga gccggcagag accgattata ccggtttaac taataattta  1680
aggatcggtt cgtttggtaa tgaggtcgtt attgagctta gatgtgcttg gagagaagga  1740
gtattgcttg agataatgga tgtcattagt gatctcaact tagattctca ttcggtacaa  1800
tcctcgacag gagatggttt actctgctta accgtcaact gcaagcacaa gggttcaaaa  1860
atgacgacaa caggaatgat caaagaggca cttcaaaagg ttgcatggat ctgttga     1917

SEQ ID NO: 179          moltype = AA  length = 638
FEATURE                 Location/Qualifiers
source                  1..638
                        mol_type = protein
                        organism = Thlaspi arvense
SEQUENCE: 179
MMDGMVTEQN RISVPENLKK QLAVSVRRIQ WSYAIFWSIS ASQPGVLEWG DGYYNGDIKT  60
RKTILASEIK ADQLGLRRSE QLRELYESLS VAESSSSGVA AGSQVTRRAS AAALSPEDLA  120
DTEWYYLVCM SFVFNIGEGM PGRTFANSEP IWLCNAHTAD SKVFSRSLLA KSASVVTVIC  180
FPFLGGVVEI GTTEHIIEDM NVIQCVKTSF LEAPDPYASL LPTRSDYHID NVLDPQQILG  240
DEIYAPMFGT ETFPATSPSR TTSRFDPEHE QVAEDHDSFM AEGINGGASQ VQSWQFMDEE  300
LSNCVHQSLN SSDCVSQTFV KAAAGRVSCN ARKGRAQRLG HIQERQRNVK MLSFDPRNDD  360
VHYQSVISTI FKTNHQLILG PQFRNCDKRS SFTRWKKLSS SSSGTASIVS PSQGMLKKIL  420
FEVPRVHQKE KLLLDSPGIG DETTNHAVLE KKRREKLNER FMILRSIIPS INKIDKVSIL  480
DDTIEYLQEL ERRVQELESC RESTDTETRG TMTVKRKKSH DAGERTSANC TNNETGNGKR  540
VQVGETEPAE TDYTGLTNNL RIGSFGNEVV IELRCAWREG VLLEIMDVIS DLNLDSHSVQ  600
SSTGDGLLCL TVNCKHKGSK MTTTGMIKEA LQKVAWIC                          638

SEQ ID NO: 180          moltype = DNA  length = 1041
FEATURE                 Location/Qualifiers
source                  1..1041
                        mol_type = genomic DNA
                        organism = Thlaspi arvense
SEQUENCE: 180
atgacaatct tggatcagac cgttgtaaca accggatcga agaaggcttg tgtcatcggt  60
ggcacaggaa acttagcttc tactctcatc aagcatttgc ttcaaagtgg ctacaaagtt  120
aacactacag ttagagatcc agagaatgag aagaaaatgg ctcacttaag ggtacttcaa  180
gaacttgggg acctcaagat cttcaaggcg gaatttactg atgaagagag tttcgattca  240
ccagtttcgg gctgtgatta cgttttccat gtcgcaacgc ctatcaactt tacatctgaa  300
gatcccgaga aagacatgat caagccaagg atacaaggag tgaccaatgt gttgaaatct  360
tgcttaaaat cgaaatcagt caagcgtgtg atctacactt cttcagctgc tgcggtttcc  420
atcaacaatc tttctggacc tggacttgtg atgaacgaag aaaactggac tgaccttgat  480
tatctcacaa aggagaagcc gtttaactgg ggctacccag tgtcaaagat actagcagaa  540
aaggcagctt gtaaatttgc ggaagagaac aagatcgatc tagttaccgt gattccggca  600
ctcatatccg gaaaatctct cctctcggat cctcctccga gcagctcatt tctctctatg  660
tctttaatca ccgggaatga aatgtatctg aaaggtctca aggaaatgca gaagcaatct  720
ggctccatct cgttcagcca cgtgaaggat ttggctcgtg cccatttgtt tcttgcggag  780
aaagaaactg cgtctggtcg ttacatttgc tgtacttaca acacaagtgt tccggagatt  840
gcagattttc tcaggcagag atatcctaag tacaatgtgc tgtctgaatt cgaagagtgc  900
ttatcaagtg cgaagctgac gctatcttcg gaaaaactca tcaatgaagg ctttcgattc  960
gaatatggga ttaatgagat ctatgatgag atgatagagc acttcgagtc caaaggatta  1020
atcaaagcta aagaatcttg a                                            1041

SEQ ID NO: 181          moltype = AA  length = 346
FEATURE                 Location/Qualifiers
source                  1..346
                        mol_type = protein
                        organism = Thlaspi arvense
SEQUENCE: 181
MTILDQTVVT TGSKKACVIG GTGNLASTLI KHLLQSGYKV NTTVRDPENE KKMAHLRVLQ  60
ELGDLKIFKA EFTDEESFDS PVSGCDYVFH VATPINFTSE DPEKDMIKPR IQGVTNVLKS  120
CLKSKSVKRV IYTSSAAAVS INNLSGPGLV MNEENWTDLD YLTKEKPFNW GYPVSKILAE  180
KAACKFAEEN KIDLVTVIPA LISGKSLLSD PPPSSSFLSM SLITGNEMYL KGLKEMQKQS  240
GSISFSHVKD LARAHLFLAE KETASGRYIC CTYNTSVPEI ADFLRQRYPK YNVLSEFEEC  300
LSSAKLTLSS EKLINEGFRF EYGINEIYDE MIEHFESKGL IKAKES                 346

SEQ ID NO: 182          moltype = DNA  length = 1188
FEATURE                 Location/Qualifiers
source                  1..1188
                        mol_type = genomic DNA
                        organism = Thlaspi arvense
SEQUENCE: 182
atggtgatgg gtacacaacc gtcgttggaa gagatcagaa aggcacagag agcggatggc  60
cccgcaggca tcttggggat aggcacggcc aaccctgcga accatgtgat ccaggcagag  120
tatccggact actacttccg catcaccaac agtgagcaca tgactgacct caaggagaag  180
ttcaagcgca tgtgcgacaa gtcgatgata cggaaacggc acatgcacct gacggaggag  240
ttcctgaagg agaatccgga catgtgcgcc tacatggctc cttctcttga tgtgaggcag  300
gacatcgtgg tggtcgaggt ccctaagcta gggaaagagg cggcagtgaa ggccatcaag  360
gagtggggtc agcccaagtc caagatcacc cacgtcgtct tctgcactac atccggagtt  420
gacatgcctg gtgctgacta ccagctcacc aagctcctcg gtcttcgccc ttccgtcaag  480
cgtctcatga tgtaccagca aggttgctac gccggcggca ctgtcctccg actcgccaag  540
```

-continued

```
gacctcgctg agaataaccg tggtgctcgt gtccttgtcg tctgctccga gatcacagcc  600
gtcaccttcc gtggcccctc tgacacacac ctcgactccc tcgttggtca ggctctcttc  660
agtgacggtg ctgccgcgct cattgttggt gcggaccctg atgcctccgt gggagagaag  720
cctatcttcg agatggtgtc tgctgcacag accatcctcc cagactcgga cggagccata  780
gatggacact tgagggaagt tgggctcacc ttccatctcc tcaaggacgt ccctgggctc  840
atctcgaaga acatagagaa gagtctagaa gaagcgttta aaccgctcgg gataagtgac  900
tggaactctc tcttttggat agctcaccct gaaggtcctg cgatcctgga ccaggttgag  960
ttaaagctag gactcaagga agagaagatg agggccacgc gtcacgtgct gagcgagtac  1020
ggaaacatgt cgagcgcgtg cgttctcttc attatggacg agatgaggag gaagtccaag  1080
gaggatggtg tggccacgac aggagaaggg ttggagtggg gtgtcttgtt tggtttcgga  1140
ccaggtctca ccgtagagac agtcgtcttg cacagcgtcc ctgtttga               1188

SEQ ID NO: 183          moltype = AA  length = 395
FEATURE                 Location/Qualifiers
source                  1..395
                        mol_type = protein
                        organism = Thlaspi arvense
SEQUENCE: 183
MVMGTQPSLE EIRKAQRADG PAGILGIGTA NPANHVIQAE YPDYYFRITN SEHMTDLKEK  60
FKRMCDKSMI RKRHMHLTEE FLKENPDMCA YMAPSLDVRQ DIVVVEVPKL GKEAAVKAIK  120
EWGQPKSKIT HVVFCTTSGV DMPGADYQLT KLLGLRPSVK RLMMYQQGCY AGGTVLRLAK  180
DLAENNRGAR VLVVCSEITA VTFRGPSDTH LDSLVGQALF SDGAAALIVG ADPDASVGEK  240
PIFEMVSAAQ TILPDSDGAI DGHLREVGLT FHLLKDVPGL ISKNIEKSLE EAFKPLGISD  300
WNSLFWIAHP EGPAILDQVE LKLGLKEEKM RATRHVLSEY GNMSSACVLF IMDEMRRKSK  360
EDGVATTGEG LEWGVLFGFG PGLTVETVVL HSVPV                             395
```